(12) United States Patent
Prentice, III

(10) Patent No.: US 7,028,478 B2
(45) Date of Patent: Apr. 18, 2006

(54) METHOD AND APPARATUS FOR THE PRODUCTION OF ENERGY

(75) Inventor: James Andrew Prentice, III, Rome, GA (US)

(73) Assignee: Advanced Combustion Energy Systems, Inc., Rome, GA (US)

( * ) Notice: Subject to any disclaimer, the term of this patent is extended or adjusted under 35 U.S.C. 154(b) by 294 days.

(21) Appl. No.: 10/738,422

(22) Filed: Dec. 16, 2003

(65) Prior Publication Data

US 2006/0053791 A1  Mar. 16, 2006

(51) Int. Cl.
*F01K 13/00* (2006.01)

(52) U.S. Cl. .......................... 60/645; 60/670

(58) Field of Classification Search ............... 60/645, 60/670
See application file for complete search history.

(56) References Cited

U.S. PATENT DOCUMENTS

| | | | |
|---|---|---|---|
| 2,510,572 A * | 6/1950 | Goddard | 60/260 |
| 2,847,825 A * | 8/1958 | Spears | 60/797 |
| 3,101,592 A * | 8/1963 | Robertson et al. | 60/39.463 |
| 3,779,212 A | 12/1973 | Wagner | |
| 4,377,067 A | 3/1983 | Sternfeld et al. | |
| 4,472,935 A * | 9/1984 | Acheson et al. | 60/777 |
| 4,854,853 A * | 8/1989 | McElroy | 431/115 |
| 4,907,406 A * | 3/1990 | Kirikami et al. | 60/39.182 |
| 4,915,038 A | 4/1990 | Sujata et al. | |
| 4,916,904 A * | 4/1990 | Ramsaier et al. | 60/723 |
| 5,088,450 A * | 2/1992 | Sternfeld et al. | 122/31.1 |
| 5,209,187 A | 5/1993 | Khinkis | |
| 5,680,764 A | 10/1997 | Viteri | |
| 5,709,077 A | 1/1998 | Beichel | |
| 5,715,673 A | 2/1998 | Beichel | |
| 5,859,071 A | 1/1999 | Young et al. | |
| 5,956,937 A | 9/1999 | Beichel | |
| 5,970,702 A | 10/1999 | Beichel | |
| 6,170,264 B1 | 1/2001 | Viteri et al. | |
| 6,206,684 B1 | 3/2001 | Mueggenburg | |
| 6,247,316 B1 | 6/2001 | Viteri | |
| 6,439,682 B1 * | 8/2002 | Kakutani | 347/15 |
| 6,523,349 B1 | 2/2003 | Viteri | |
| 6,596,220 B1 | 7/2003 | Gross | |
| 6,637,183 B1 | 10/2003 | Viteri et al. | |

* cited by examiner

*Primary Examiner*—Hoang Nguyen
(74) *Attorney, Agent, or Firm*—Sutherland Asbill & Brennan LLP

(57) ABSTRACT

The invention provides processes and apparatuses for safely, rapidly, cost-effectively and efficiently producing a superheated steam. These processes and apparatuses involve the combustion of one or more fuels containing the element hydrogen, the element carbon or the elements hydrogen and carbon. One or more of the combustion reactions are incomplete combustion reactions, and another combustion is a complete combustion reaction. Water that circulates around one or more combustion chambers and areas, but that does not enter into the combustion chambers or areas becomes converted into a high purity superheated steam product or dry saturated steam product containing superheated steam.

41 Claims, 10 Drawing Sheets

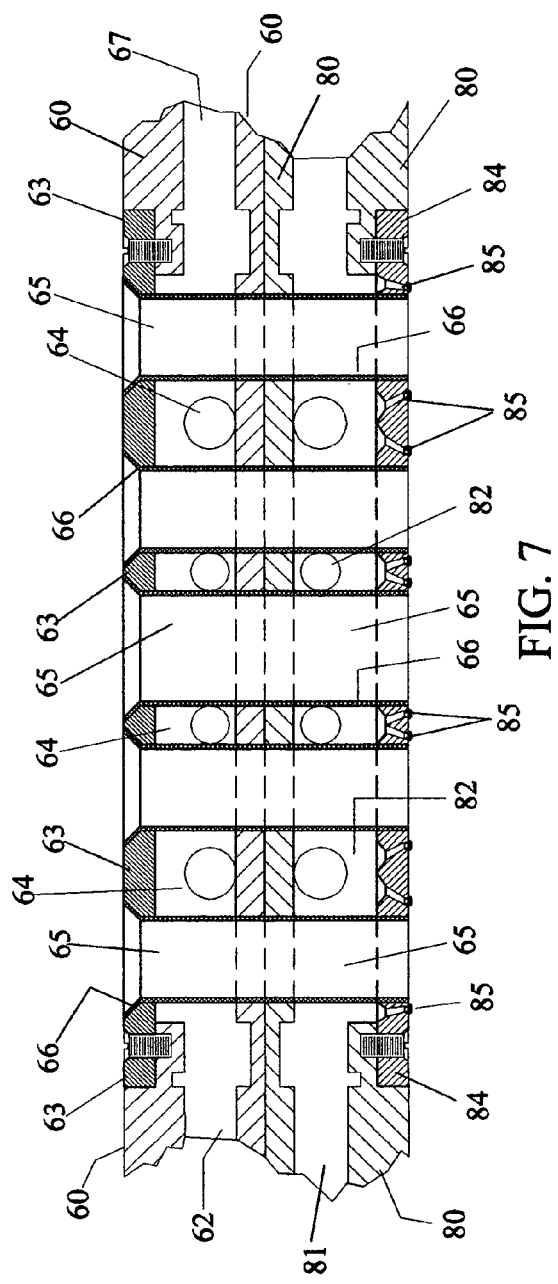
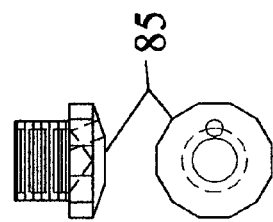
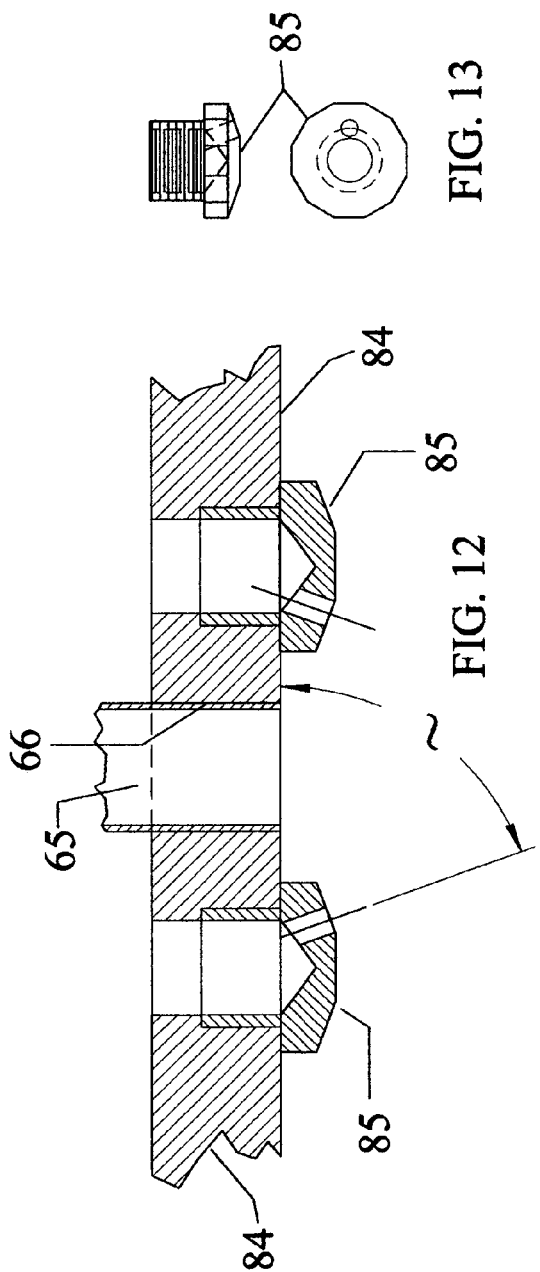

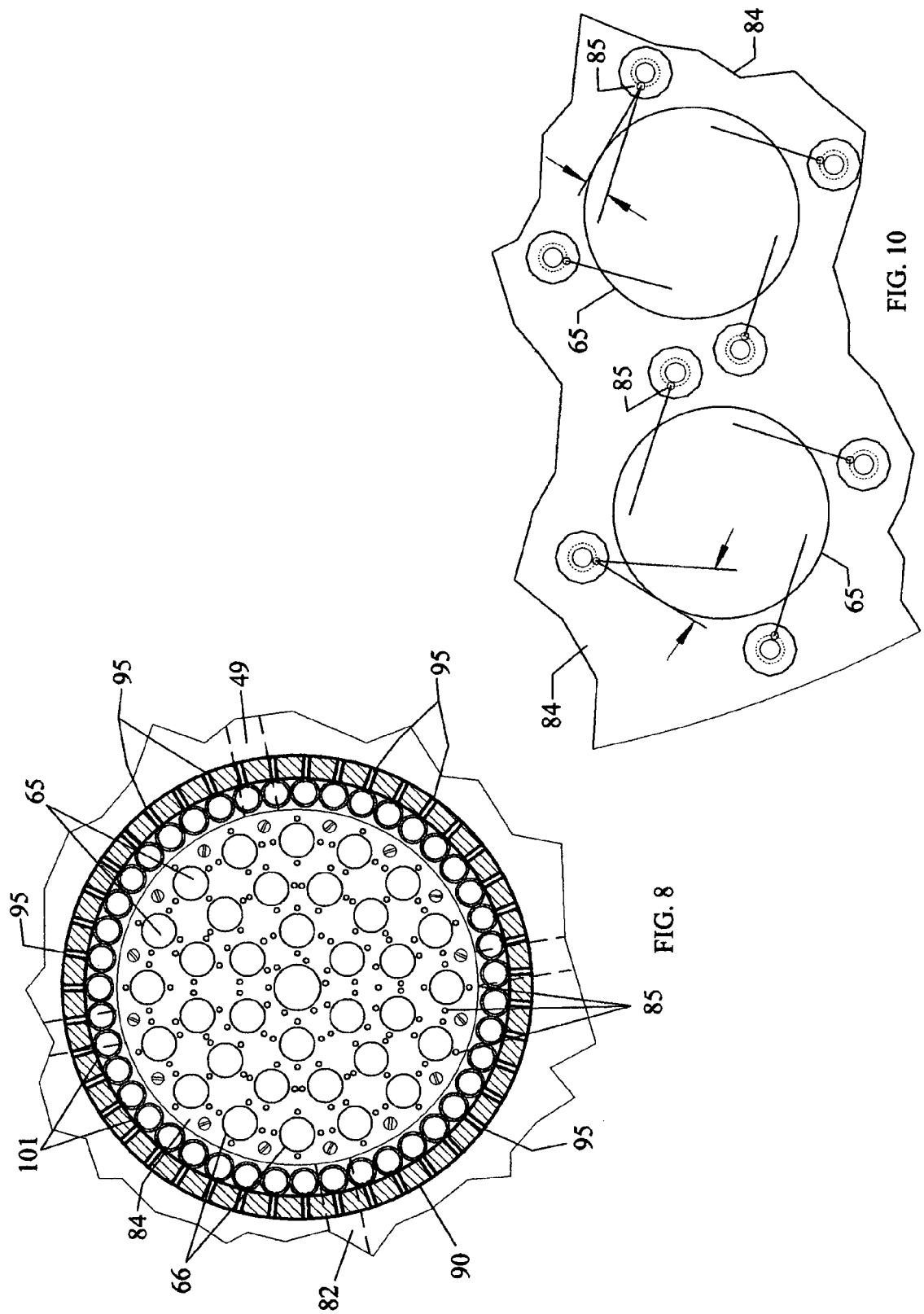

METHOD AND APPARATUS FOR THE PRODUCTION OF ENERGY

BACKGROUND OF THE INVENTION

1. Field of Invention

The present invention generally relates to processes and apparatuses that can convert waste materials, such as the rubber from scrap tires, discarded carpeting and used milk, water or soda bottles, into a high-purity, high-efficiency, high-energy, environmentally clean superheated steam product or dry saturated steam product in an efficient, cost-effective manner, while also beneficially extending the lifespans of landfills in which the waste materials would likely otherwise have been placed.

Using an oxidizer other than air, the processes and apparatuses of the present invention convert chemical energy that is present in a fuel containing the element hydrogen, the element carbon or the elements hydrogen and carbon, which may be derived from waste materials, into thermal energy, which is transferred to surrounding water, converting the water into a superheated steam product or dry saturated steam product that can be used to produce electrical power, or in other manufacturing and/or non-manufacturing processes. A separate, environmentally clean, hot combustion gas exhaust product is also produced by the processes and apparatuses of the invention, which can be released into the atmosphere, or can be employed in other processes, for example, in the production of an additional (separate) steam product that can be used in the same or a different manner.

The superheated steam product or dry saturated steam product produced by the processes and apparatuses of the invention generally does not contain any environmental pollutants or hazardous materials. Further, the other major product generally produced by the processes and apparatuses of the invention, which is a separate combustion gas exhaust product, generally contains no environmental pollutants and/or hazardous materials, or contains reduced levels of environmental pollutants and/or hazardous materials in comparison with combustion processes and apparatuses that employ air in, or otherwise allow air to enter into, their systems, including conventional and most other methods and apparatuses for producing steam and/or electrical power, such as conventional coal-burning steam or power plants, natural gas-burning steam or power plants, nuclear power plants, boilers, furnaces and turbines. Additionally, the quantities of various environmental pollutants and/or hazardous materials that may be present in a combustion gas exhaust product produced by the processes and/or apparatuses of the invention are generally further reduced when one or more of the fuels of the present invention are employed in these processes and apparatuses. Thus, the fuels, processes and apparatuses of the invention are capable of producing steam and/or electrical power without generating unacceptable environmental pollution and/or hazardous materials, thus providing a cleaner and safer environment.

The superheated steam product or dry saturated steam product generated by the processes and apparatuses of the invention can be used to produce electrical power for a wide variety of power uses by, for example, driving, rotating or otherwise turning high pressure (or other) steam turbines, generators, engines, pistons and/or other energy extracting and/or electricity generating equipment in electrical power or other plants.

Additionally, the separate hot combustion gas exhaust product that exits the apparatuses of the invention can, via the use of heat transfer, be used to produce a separate steam product that may contain varying weight percents of different types of steam, such as superheated steam, dry saturated steam and/or wet steam. If more than one type of steam is present in this steam product, the different types of steam can be separated using conventional steam separating equipment. Any superheated steam and/or dry saturated steam produced using the combustion gas exhaust product may also be employed for the production of electrical power, thereby increasing the amount of electrical power that can be generated by the processes and apparatuses. Any wet steam produced using the combustion gas exhaust product can be separately employed in any apparatus, system and/or plant that uses wet steam in processes conducted therein, such as the food industry, the wood industry, the pulp and paper industry, the pharmaceutical industry and in ships. For example, the wet steam can be employed to drive blowers and pumps, for direct contact with products, for direct contact sterilization, in noncontact processing and to regulate temperatures for heating and air conditioning.

The present invention also generally relates to processes and apparatuses for converting hazardous materials into non-hazardous materials, to the fuels that may be employed in the processes and apparatuses of the invention (and in other processes and apparatuses), and to methods for producing these fuels.

A Confidential Invention Disclosure document entitled "Waste Hydrocarbon Combustion Gas Generator" that describes and illustrates the processes and apparatuses of the present invention was filed with the U.S. Patent and Trademark Office on Mar. 17, 2003, and was assigned Disclosure Document No. 528050.

2. Background

Production of Electrical Power and Pollution

Electricity has conventionally been produced at power plants by spinning the shafts of electrical generators that are driven by various means, such as by hydroelectric dams, large diesel engines, gas turbines or steam turbines. The steam employed in the power plants has conventionally been created by burning coal, oil or natural gas, or by nuclear reactors, and turns a turbine that turns an electric generator. Electrical power generated by the power plants is transmitted through electrical power transmission lines that are part of a larger power grid.

The world is currently facing a persistent and complex energy and electrical power crisis.

In August of 2003, a lengthy blackout that occurred in eight of the Northeastern states, and in two Canadian provinces, and that is considered to be the worst blackout ever in U.S. history, caused a series of difficulties for 50 million people and entities across a large portion of the United States and Canada, including massive social and economic disruption. A huge chunk of the Northeastern electrical power grid came crashing down, providing evidence that a grid of twigs and twine cannot meet the electrical power demands of $21^{st}$ century consumers, much less protect itself from terrorists who may try to damage or destroy it. In just a few minutes, a glitch in the Midwest rippled through 100 electrical power plants, plunging millions of people into darkness, and resulting in at least 3 deaths, in 10 major airports being shut down, in 700 flights being canceled nationwide and in 350,000 people being stranded on the New York City subway in the dark, with 19 trains being in underwater tunnels. More than 100 electrical power plants, including 22 nuclear power plants, in the U.S. and Canada crashed despite an electrical power structure designed by experts specifically with such a danger in mind. This blackout was the fourth catastrophic failure of the central power grid in the last decade, and shows that a single electrical power failure can ripple through the complex interconnections and delicate balance of supply and demand that govern our nation's electrical supply with disastrous results.

As a result of an energy crises in the state, in 2001 the governor of the state of California issued an emergency executive order expediting the permitting for peaker electrical power plants generating less than 300 megawatts of electrical power to a 21 day period. An executive order was also issued exempting peaker power plants from the California Environmental Quality Act. The state of California has experienced significant difficulties in supplying sufficient amounts of electrical power to its residents without blackouts and other service interruptions since that time.

The 2001 market for electric power generation, transmission and distribution totaled approximately 197.2 billion dollars. Over the past 10 years, electrical power demand has increased by about 30%, while transmission capacity has increased only half that much. As the world population increases, the demand for electricity, and for fuel that may be used to produce electricity, is projected to increase. In its December of 2000 report, the Energy Information Administration estimated that the United States will need about 393,000 megawatts of new electrical power generating capacity by the year 2020 to meet this growing demand for electricity. With the worldwide growth of energy demand, sensible energy policy requires the careful balancing of three objectives: (a) low cost; (b) minimal environmental impact; and (c) security of supply. Energy security depends upon an ability to properly manage the economics, supply and environmental consequences of the energy sources that are employed to produce electricity.

The United States currently produces electricity using several different fuels, including coal, which represents about 57 percent of the electrical supply, and nuclear energy, which represents about 20 percent of the electrical supply. The remainder of the electrical supply is provided by natural gas-fired power plants, hydroelectric dams and small amounts of renewable energy.

Solar and fuel cell technologies are currently underdeveloped, and are expensive. Hydroelectric and wind powers are disadvantageously limited in use by geographic location. The energy industry has long been seeking more environmentally friendly, efficient, safe and cost effective alternatives to coal, natural gas and nuclear energy.

Coal-Burning Power Plants

Coal is a fossil fuel formed from the decomposition of organic materials that have been subjected to geological heat and pressure over millions of years. Coal is considered to be a nonrenewable resource because it cannot be replenished on a human time frame. 57 percent of the electricity in the United States is produced by conventional coal-fueled power plants. In the United States alone, there are more than 400 coal-burning power plants.

Conventional coal-burning power plants are generally quite large (have large footprints), and are relatively expensive to build, in part because of the extensive pollution control equipment, fuel storage facilities, combustion waste holding ponds, cooling towers and other auxiliaries that they generally require. For example, a 500-megawatt conventional coal power plant boiler (which burns coal to generate steam) is about 250 to 300 feet tall, has sulfur dioxide ($SO_2$) and nitrous oxide (NOx) emissions controls (scrubbers and SCRs) that can equal the boiler in volume, and has a "smoke stack" (used to release combustion gas exhaust products) that can be 400 to 1,000 feet tall. About 300 to 500 acres of space is generally required for a 500-megawatt conventional coal-burning plant.

Coal mining is an energy intensive, labor intensive and money intensive undertaking. Underground mining is one of the most hazardous occupations, killing and injuring many in accidents, and causing chronic health problems. It also creates tons of hazardous and/or acidic waste materials, which can contaminate ground water. Once extracted from mines, the handling of coal can also cause problems, such as the spontaneous generation of heat and dust, during transportation and storage. Coal often has to be transported across the country to the destination of use, adding a significant amount of cost and risk to the process. Injuries from coal transportation alone, such as train crossing accidents, are estimated to cause 450 deaths and 6,800 injuries per year.

The burning of coal is generally only about 20% efficient (only about 20% of the Btus per pound contained in the coal are actually used to convert water into steam), and there is currently only approximately 200 years of minable coal left in the earth. Thus, coal resources will likely not last more than 200 years.

Currently, some 40 million tons of coal are used annually for power generation. A 100-watt light bulb running 24 hours per day for one year requires the burning of 714 pounds of coal. Producing over 9,000 megawatts of electricity (enough to light one hundred million light bulbs), the largest coal-fueled power plants burn 20,000 tons of coal per day, or 7,300,000 tons of coal per year. A typical 500-megawatt coal-burning power plant produces 3.5 billion kilowatts of power per year, requiring the burning of 1.43 million tons of coal.

Coal-burning power plants produce millions of tons of toxic emissions into the Earth's atmosphere each year. While coal is relatively inexpensive to burn, it is one of the most impure of fuels, and is environmentally very dirty. Burned coal produces millions of pounds of "coal ash" and "fly ash," solid combustion waste materials that contain highly poisonous and/or radioactive chemicals, such as arsenic, uranium, mercury, lead and thorium. (The ash content ranges from about 5% to 15% of coal burned.) These chemicals can leak out from ash settlement ponds into lakes, rivers, streams, oceans and other bodies of water, contaminating fish and other aquatic life forms, and rendering severely ill human beings and animals that drink this water, or ingest the contaminated fish, and their fetuses and breast-feeding children. The long-term accumulation of radioactive materials from the continued worldwide combustion of coal poses additional serious potential health hazards.

Mercury, which is one of the most toxic substances presently in existence, is present in all coal, and evaporates when the coal is burned. The metal subsequently becomes released into the atmosphere along with smoke from the conventional coal-burning combustion process. When the mercury falls to the ground, some of it eventually washes into bodies of water, where water bacteria convert it to methylmercury, a compound that accumulates in the tissues of fish, and that causes nerve damage in humans and animals. One gram of mercury falling into a 25-acre lake each year could contaminate all of the fish present in the lake, making them unsafe to eat. Mercury that is present in contaminated fish destroys nerve cells, and easily crosses the placenta into unborn babies. Some mercury compounds can cause brain damage in developing fetuses, as well as in breast-feeding and other children. Because of the high levels of mercury that may be present in shark and swordfish, in particular, the Federal Food and Drug Administration ("FDA") has advised pregnant women not to eat these types of fish.

It is estimated that nearly one half of all mercury in the environment comes from conventional coal-burning power plants. Four hundred conventional coal-burning power plants in 43 states are emitting an estimated 98,000 pounds of mercury into the air each year. In the year 2000, annual mercury emissions at ten of Georgia's conventional coal-burning power plants ranged from 33 pounds to 1,192 pounds, and totaled 3,106 pounds. 81,000 pounds of mercury-tainted solid waste is produced by power plants each year.

An article entitled "How Safe is your Food? One Fish, Two Fish, Red Snapper, Swordfish: A Menace Lurks in your 'Healthy' Meal," appearing in the August of 2003 Readers' Digest magazine describes experiences that a respected internist, Dr. Jane Hightower, had with more than 100 of her ill patients who had been regularly eating fish or fish products (swordfish, halibut, tuna, trout, bass, salmon, mackerel and/or cod liver capsules). These patients were experiencing symptoms including hair loss, loss of memory (which Dr. Hightower dubbed "fish fog"), an inability to focus, twitching, uncontrollable trembling, nausea, dizziness, joint and muscle aches, stomach cramps, hangover-like headaches and/or insomnia. Dr. Hightower, who had heard a radio report linking hair loss with mercury, had more than 123 of her patients tested for mercury exposure. She determined that 9 out of 10 patients were determined to have blood mercury levels higher than the level that the U.S. Environmental Protection Agency ("EPA") deems to be safe (a limit of 5 micrograms of mercury per liter of blood). Over half of the patients had mercury concentrations more than double that amount, with many having mercury concentrations that were 3 or 4 times higher. Some of the patients had blood mercury levels that were from 6 to 15 times higher than the level deemed to be safe by the EPA. When Dr. Hightower advised her patients to stop eating fish, and urged breast-feeding mothers to "pump and dump" their breast milk until their mercury levels bottomed out, the mercury levels of her patients plunged, and their symptoms generally disappeared (hair stopped falling out, memory lapses disappeared and the like).

With respect to the source of the mercury that was apparently present in the fish and fish products that Dr. Hightower's patients had been eating, the Reader's Digest article states (page 67):

"Among the biggest polluters are coal-burning plants and waste incinerators. The mercury rains into oceans, lakes and streams, where bacteria convert it to methylmercury, an easily absorbable toxin. It collects in the tissues of waterfowl, marine mammals and fish. And the biggest, oldest fish—particularly those that each other fish—top the aquatic mercury charts.

Scientists have known for years that eating contaminated fish is the way most people absorb methylmercury. At high levels, the neurotoxin can cause birth defects, brain and kidney damage, vision loss, difficulty walking, slurred speech, a metallic taste in the mouth and tingling in the hands and feet. Some of the worst examples of mercury poisoning came from an infamous 1950s case. A chemical factory in the town of Minamata, Japan, secretly dumped tons of mercury into the bay, contaminating the fish that villagers ate every day. Babies were born blind, deaf and horribly twisted; thousands of people were sickened and scores died.

Recent studies suggest mercury may raise the risk of heart attack. Also, some experts are beginning to draw links between mercury and autism in children and Alzheimer's disease in adults.

But mercury's clearest threat is to fetuses and infants. It seeps into every cell in the body, and has a nasty affinity for the just-forming fetal brain, where it impedes cell division, permanently stunting the mind.

. . . And, in a cruel twist of nature, mercury is excreted through breast milk. (Human waste releases mercury as well.) Earlier this year, the U.S. Centers for Disease Control (CDC) announced that one in 12 women of childbearing age have mercury levels high enough to put an estimated 300,000 babies at risk for learning disorders and other developmental problems."

The Reader's Digest article states that the California Attorney General's office is taking Dr. Hightower's findings seriously. Citing her research, the state of California now requires mercury warnings at fish counters, and is calling for restaurants that serve fish to post warnings as well. Further, 45 states have issued fish advisories about mercury, and 10 states urge women and children to avoid eating canned tuna.

President Bush has a plan for regulating air pollution from electric power plants that would detail an effort by the EPA to reduce levels of mercury in the environment. Carol Browner, the head of the EPA under President Clinton, signed court agreements committing the agency to require coal-burning plants to reduce mercury emissions (from power plant exhaust that generally exits into incinerator smokestacks, and then into the atmosphere) by 90 percent by the year 2007.

Other environmental pollutants and/or hazardous materials that are produced by conventional coal-burning (or other) steam-production or power facilities, and that are generally released in coal ash, or in combustion gas exhaust products, include: (a) sulfur dioxide ($SO_2$), which is an acid gas that is a criteria air pollutant, and the main cause of acid rain, and that causes asthma, permanent damage to the lungs and heart disease; (b) other oxides of sulfur (sulfur oxides), such as $SO$, $SO_2$ and/or $SO_3$, which are environmental pollutants that are collectively known as SOx; (c) nitrogen dioxide ($NO_2$), which is the major component in smog, which causes damage to the lungs and breathing passages, and which causes more than 1,500 premature deaths per year in the state of Georgia; (d) nitric oxide (NO), also known as nitrogen monoxide, which is a poisonous gas that has adverse effects upon the environment (depletion of the ozone layer, formation of photochemical smog and the production of acid rain), and which reacts with oxygen to form $NO_2$; (e) NOx, which is a criteria air pollutant, which includes oxides of nitrogen (nitrogen oxides), such as NO, $N_2O$ and/or $NO_2$, which is generally produced as a result of the combustion of a fuel with air, or of a nitrogen-containing fuel, and which often causes smog, ozone and acid rain; (f) carbon monoxide (CO), a poisonous gas that is often produced as a result of the incomplete combustion of a fuel, and that is a criteria air pollutant; (g) carbon dioxide ($CO_2$), which is a greenhouse gas emission that is suspected of causing global warming; (h) methane ($CH_4$), which is also a greenhouse gas emission that is suspected of causing global warming, and that escapes when coal is burned; (i) hydrochloric acid (HCl), which is a strong and highly corrosive acid; (j) dioxin, which is a toxic compound that is a carcinogen, a teratogen and a mutagen, and that has been banned by the FDA for most purposes; (k) volatile organic compounds (VOCs), which cause smog, serious illnesses, such as cancer, and harm plants; (l) other metals (zinc, thallium, cadmium, nickel and chromium); (m) radioactive materials other than the isotopes uranium and thorium, such as the radioactive products produced by the decay of uranium and thorium, including radium, radon, polonium, bismuth and lead; (n) other carcinogenic and/or mutagenic substances; and (O) particulate matter, which is a criteria air pollutant.

Conventional coal-burning steam-generation and power plants use air, which contains 76.9 weight percent of nitrogen and 23.1 weight percent of oxygen, as well as some argon and $CO_2$, as a source of oxygen for combustion. As can be seen in Example 3 hereinbelow, when air is burned using coal as a fuel in this manner, high levels of atmospheric environmental pollutants, such as NOx, SOx, CO and particulate matter, are generally produced and released into the atmosphere. Such emissions are at, and in some cases above, critical threshold levels permitted by federal and/or state governments, and need to be reduced in order to preserve clean air.

Nuclear Power Plants

Nuclear power plants utilize nuclear fission, a process by which an atom is split into two smaller atoms with less mass total, to produce energy. A common reactant used in this process is Uranium-235. Disadvantageously, nuclear fission is a non-renewable energy source, and uranium is in a limited supply. Although other isotopes, such as Plutonium-239, can also be used in nuclear fission, Plutonium-239 is believed by many to be far too dangerous for use.

Although nuclear power plants do not produce air pollutants (because nothing is actually burned in the process of nuclear fission), these plants are also very expensive to build.

Disadvantageously, once a nuclear power plant crashes or otherwise becomes shut down, it generally takes at least about 24 hours to restart, leaving people and entities without electrical power during this lengthy period of time.

Nuclear safety is also a large issue, with disastrous nuclear power plant accidents having occurred at Pennsylvania's Three Mile Island generator, which increased cancer and leukemia rates for local residents, in Tokaimura, Japan, resulting in hazardous health and environmental effects, and at Chernobyl, causing massive health and environmental problems.

Several radioactive isotopes are created by the nuclear process, which have a very slow rate of radioactive decay, and are sometimes disposed of in bedrock. Currently, no safe method exists for the disposal of these hazardous elements.

Currently, efforts are being made to consolidate existing nuclear waste at one location within the United States. However, opponents of these efforts believe that trucks that are employed to transport the nuclear waste from one location to another are potential targets for terrorists.

For the foregoing reasons, a significant amount of societal opposition exists against the use of nuclear power plants for the production of electrical power.

Natural Gas Power Plants

Natural gas is an odorless and colorless gas that accumulates in the upper portions of oil and gas wells. Compared to coal and nuclear power plants, conventional natural gas-fueled power plants can be built at a relatively low cost. However, disadvantageously, these plants are extremely sensitive to increases in the price of fuel, which frequently occur as a result of problems with supply. Thus, when the cost of natural gas doubles, as has occurred in the past, the cost of electricity produced from conventional natural gas-fueled power plants increases dramatically.

Further, the burning of natural gas by conventional methods is generally only about 30% efficient (only about 30% of the energy value of the natural gas is actually used to convert water into steam).

Moreover, high levels of the criteria air pollutant NOx are often emitted into the atmosphere from conventional natural gas-fueled power plants.

Air Pollution

Air pollution often makes human beings, animals and flying life forms, such as birds, ill. It can cause burning eyes and noses, itchy, irritated throats, asthma and other difficulty breathing (as a result of damage to the lungs and/or breathing passageways). Some chemicals found in polluted air cause cancer, birth defects, brain and nerve damage and long-term injury to the lungs and breathing passageways. In the past, air pollutants have killed large quantities of human beings rapidly when released into the air. For example, in 1984, the release of methyl isocyanate from a pesticide manufacturing plant in Bhopal, India, killed approximately 4,000 people and injured more than 200,000 others.

Air pollution can also damage the environment. Trees, other vegetation, bodies of water and aquatic life forms have been harmed by air pollution. Further, air pollutants have thinned the protective ozone layer above the earth, which can result in undesirable changes in the environment, as well as a higher incidence of skin cancer and cataracts (eye damage) in human beings.

Air pollution can also damage property, making buildings and other structures dirty, and eating away stone, and can cause haze, reducing visibility in national parks and, sometimes, interfering with aviation.

According to a recent report written by the United States Public Interest Research Group, power plant air pollution is currently increasing in the state of Georgia, with a significant amount of the increased pollution coming from conventional coal-burning plants. Nationwide, Georgia experienced the fourth largest increase of the atmospheric pollutants sulfur dioxide ($SO_2$) and nitrogen dioxide ($NO_2$).

Current U.S. regulatory requirements prescribe the amounts of atmospheric emissions that are permitted in particular locations by given power-generating plants. Allowable emission threshold levels are continually being decreased, which is placing increasing pressure on power-generating plants to reduce emissions. However, most current electrical plants, particularly conventional coal-burning plants, regularly experience peak power overloads during which they exceed their regulated limits of toxic emissions, such as NOx and mercury.

The "1990 Clean Air Act" has as its goal the improvement of air quality in the United States. Although this Act is a federal law that covers the entire country, individual states perform a significant amount of the tasks involved in carrying out the Act. For example, a state air pollution agency may hold a hearing on a permit application by a power plant, or fine a company for violating prescribed air pollution limits. Under the Act, the EPA sets limits on the amount of a pollutant that can be in the air anywhere in the United States, with many provisions of the Act (or amendments thereto) assessing the impact of pollution sources based upon the potential annual emissions (usually expressed as tons per year, or tpy). This ensures that all Americans have the same basic health and environmental protections. While the Act permits states to have stronger air pollution controls, the states are not permitted to have weaker air pollution controls than those that are prescribed for the entire country. The U.S. government, via the EPA, assists the states by providing scientific research, expert studies, engineering designs and money to support clean air programs. The EPA's Clean Air Market program supplies emissions data for electric power plants.

The 1990 Clean Air Act introduced a nationwide permit system for air pollution control. Permits are issued by states (or by the EPA when a state fails to carry out the Act satisfactorily) to, for example, large sources, such as power plants, that release environmental pollutants into the air. The permits include information concerning the type of pollutants that are being emitted into the air, the amount that may be released, and the type of steps that the owner or operator of the source is taking to reduce pollution, including plans to monitor the pollution. The permit system simplifies and clarifies the obligations of businesses for cleaning up air pollution.

While the 1990 Clean Air Act enables the EPA to fine violators, the Act also provides economic incentives for cleaning up air pollution. For example, under sections 29 and 45 of the Internal Revenue Code, firms that produce unconventional fuels, or that generate electricity from certain renewable forms of energy, can claim a credit against their income taxes. The tax credits are essentially subsidies from the federal government (in the form of lower taxes) that have been enacted to promote energy security and efficiency, and to foster a cleaner environment (by encouraging the use of nonpolluting sources of energy). Many states also provide economic credits to power companies that use clean fuel.

Regulations associated with the 1990 Clean Air Act that should become effective in 2003 or 2004 will severely restrict the permitted level of emissions of the pollutant mercury. It is estimated that the energy industry alone will spend over 5 billion dollars to reduce its mercury output. Federal law also currently requires that companies in the electrical utility industry produce or purchase as much "green" (environmentally friendly) electricity as is possible or available prior to generating electricity via conventional methods.

Inefficiency of Conventional Power Generation

The conventional generation of electrical power and heat separately (as opposed to cogeneration, trigeneration, quad-generation and the like) is generally inherently inefficient, only converting on average about one third of a fuel's potential energy into usable energy. For example, traditional coal, oil or natural gas fired thermal generating stations generally do not convert more than about one third of the initial energy contained within the fuel into useful electricity. The remainder of the energy is discarded as waste heat.

Costs of Producing Energy

According to a report written by the Nuclear Energy Institute entitled "Nuclear Energy Surpasses Coal-Fired Plants as Leader in Low-Cost Electricity Production" (Washington, D.C., Jan. 9, 2001), in 1999, energy production costs (outlays for fuel, operations and maintenance) by conventional power plants averaged the following:

| Type of Power Plant | Average Cost |
|---|---|
| Nuclear Power Plants | 1.83 cents per kilowatt-hour |
| Coal-Burning Power Plants | 2.07 cents per kilowatt-hour |
| Natural Gas Power Plants | 3.52 cents per kilowatt-hour |
| Oil-Fired Power Plants | 3.18 cents per kilowatt-hour |

However, the above figure for nuclear power plants does not include the long-term costs associated with the disposal of radioactive waste and other harmful waste products.

The average electricity costs in Kentucky in 2001, which were 4.1 cents per kilowatt-hour, were lower than the average electricity costs for any other state in the United States. Some states, such as California and several of the New England states, have average electricity costs that are 2 to 2½ times the average electricity costs in Kentucky (up to about 10.25 cents per kilowatt-hour).

Additional information concerning the cost and quality of fuels that are currently employed in electric utility plants is present at the web site www.eia.doe.gov.

There is currently a significant need for safe, rapid, inexpensive, efficient and environmentally clean methods and apparatuses for producing electrical power, and for producing steam and combustion gas exhaust products that can be employed in the production of electrical power.

Waste Materials and Landfills

There is continuously an abundant supply of hydrocarbon waste materials on the earth. Every year, each person discards nearly 1600 pounds of trash, about 80% of which is placed into landfills, often resulting in unpleasant odors and in water pollution. Nearly 13 million tons of solid waste were dumped into Georgia landfills in the year 2000.

The decomposition rates for many of the waste materials that are currently being placed into landfills, most of which are lengthy periods of time, are set forth below.

| Decomposition Rate for some Waste Materials | |
|---|---|
| Waste Material | Decomposition Rate |
| Paper | 2–4 Weeks |
| Leaves | 1–3 Months |
| Orange Peels | 6 Months |
| Milk Carton | 5 Years |
| Plastic Bag | 10–20 Years |
| Plastic Container | 50–80 Years |
| Aluminum Can | 80 Years |
| Tin Can | 100 Years |
| Plastic Soda Bottle | 450 Years |
| Glass Bottle | 500 Years |
| Styrofoam | Never |

Scrap tires, plastic waste and textile and carpet waste are three categories of hydrocarbon waste materials that are often placed into landfills.

Scrap Tires

The estimates of the number of discarded scrap tires that are currently stockpiled at storage facilities across the United States range from 500 million to 3 billion. Currently, approximately 270 million tires (3.4 million tons of tires) are discarded as scrap tires each year in the United States, with approximately 800 million tires waiting to be placed into landfills. About 87% of these scrap tires are from passenger cars, with 13% being from light and heavy trucks, and other types of vehicles. Approximately 33 states have banned the placement of whole tires in landfills, and 12 states have banned the placement of partial scrap tires in landfills. About 30 states charge a fee to dispose of scrap tires. Sufficient methods for properly disposing of scrap tires do not currently exist.

In order to avoid paying tire disposal fees, or spending the time and effort required to properly and legally dispose of scrap tires, many scrap tires are illegally dumped from vehicles in open areas, along roadsides, and late at night. This practice is called "open dumping," "fly dumping," and "midnight dumping," Illegal dumping of scrap tires is a significant problem in large cities, in small towns and in rural areas, and poses serious health and environmental risks. Whole scrap tires can retain up to two gallons of water and, therefore, are ideal breeding grounds for mosquitoes, spiders, rodents and snakes, which can carry deadly diseases, such as encephalitis, denguefever and malaria. In addition, scrap tires are unsightly and present a fire hazard. Scrap tire piles are susceptible to fire from arson, lightning and even spontaneous combustion. Scrap tire pile fires are extremely polluting to the environment, and are difficult to extinguish. Removing scrap tire piles is time consuming and expensive. Often, additional scrap tires will be illegally piled at a site just after the site has been cleared of other illegally dumped scrap tires.

Additional information concerning scrap tires is available from the Scrap Tire Management Council (Washington, D.C.), which was established in 1990 by the North American Tire Manufacturers.

Plastic Waste

In the United States, approximately 75 billion pounds of plastic are produced each year. The average household generated about 38 pounds of PET plastic bottles in the year 2002. Approximately 19 million tons of plastic waste was generated in 1995, with an increasing amount of plastic waste having been generated since 1995. Unfortunately, the majority of plastic ends up in landfills. In 1992, the landfill volume consumed by soft drink bottles was 1.8 million cubic yards, with the landfilled soft drink bottles weighing 355 pounds per cubic yard. Currently, High-Density Polyethylene (HDPE) products, such as milk jugs and detergent bottles, contribute about 800 million pounds per year to our nation's landfills. When plastic is dumped into landfills, the decomposition process takes many years.

One cubic yard of landfill space can generally be saved by recycling any one of the following groups of Polyethylene Teraphthalate (PET) beverage bottles:

(a) 4,800 recycled 16-ounce bottles;
(b) 4,050 recycled 20-ounce bottles;
(c) 3,240 recycled 1-liter bottles;
(d) 2,430 recycled 2-liter bottles; or
(e) 1,350 recycled 3-liter bottles.

The recycling of 1 ton of PET containers generally saves 7.4 cubic yards of landfill space and, according to the EPA, the recycling of 1 pound of PET saves approximately 12,000 Btus of energy value.

Additional information concerning plastic waste products is present at the web sites www.envirosystemsinc.com and www.socplas.org, and is available from the Society of Plastics Industry, Inc. (Washington, D.C.).

Textile and Carpet Waste

The amount of carpet and carpeting ("carpet") that is reaching its end useful life, and is entering the waste stream, is steadily increasing. Land disposal, or land filling, is by far the most common disposal method for carpet, with about 96% of carpet being disposed of by this method. According to EPA statistics, approximately 14 billion pounds of textile and carpet waste is landfilled each year in the United States. National concerns about carpet disposal capacity, combined with the bulk of carpet, which makes it difficult and expensive to handle, have contributed to the search for alternative means for carpet disposal. While most of the components that make up carpet are recyclable or reusable, only about 4% of waste carpet currently is processed in this manner. Further, carpet takes over 50 years to begin to decompose, landfill space is diminishing and many landfills no longer accept carpet.

According to the Minnesota Office of Environmental Assistance, on Jan. 8, 2002, in Atlanta, Ga., a "Memorandum of Understanding for Carpet Stewardship" agreement was executed. This agreement establishes a 10-year schedule to increase the amount of reuse and recycling of post-consumer carpet, and to reduce the amount of waste carpet being placed into landfills. It is a voluntary initiative that encourages carpet manufactures to assume product stewardship (the responsibility for the lifecycle of carpet from the point-of-sale to disposal), which is the result of a two-year negotiation process between members of the carpet industry, representatives of government agencies at the federal, state and local levels, and non-governmental organizations. The carpet industry has established a third-party organization known as the Carpet America Recovery Effort (CARE) to achieve the national goals for the reuse and recycling of discarded carpet.

Additional information concerning the disposal of carpet, and information concerning carpet composition, is present at the web sites www.moea.state.mn.us, www.hillsinc.net and/or www.healthyflooring.org.

There is currently a need for methods and apparatuses that have the ability to recycle or otherwise eliminate scrap tires and plastic, carpet, textile and other waste materials in a safe, rapid, inexpensive, efficient and environmentally clean manner and, thereby, increase the available space in, and the lifespans of, landfills.

Disposal of Hazardous Materials

Hazardous materials include, but are not limited to: (a) infectious medical wastes; (b) items (needles and the like) that have been exposed to infectious diseases, such as the AIDS virus, or any of the various types of potentially deadly viral hepatitises or hantaviruses; (c) biological weapons, such as anthrax spores and other substances or materials that can cause diseases or ailments; (d) chemical warfare agents (and the rockets or other devices in which they are contained); (e) other weapons; and (f) hazardous air pollutants.

The following chemicals are classified as "nerve agents," which are the most toxic and rapidly acting of the known chemical warfare agents:

(a) VX—a human-manufactured, amber-colored chemical compound that is an oily liquid, and that is very slow to evaporate;
(b) Tabun (GA Nerve Agent)—a human-manufactured chemical compound that is clear, colorless and tasteless;
(c) Sarin (GB Nerve Agent)—a human-manufactured chemical compound that is odorless and quite volatile;

(d) Soman (GD Nerve Agent)—a human-manufactured compound that is a clear, colorless and tasteless liquid; and (e) Mustard (HD Nerve Gas)—a colorless and odorless liquid.

Most of these nerve agents were originally produced in a search for insecticides (agents that kill insects). However, because of their toxicity, these chemicals were evaluated for military use. Nerve agents have subsequently been used in wars, and by terrorists. They are known to currently be stored by several countries, including the United States. Mustard gas has been used in chemical warfare, and was made in large amounts during World Wars I and II. It was also reportedly used in the Iran-Iraq war during 1980–1988.

The proper and safe disposal of hazardous materials, which generally present a serious risk to the health of human beings, animals, flying life forms and/or aquatic life forms, currently presents a significant challenge worldwide. For example, at the Anniston Army Depot in Anniston, Ala., nearly 700,000 munitions weighing 2,254 tons have been stored for more than about 40 years in earth-covered, concrete-reinforced bunkers. These munitions include about 800 rockets containing large quantities, for example, 1.2 gallons each, of the nerve agent Sarin, a chemical compound so deadly that one drop on the skin can kill, and that had been leaking.

The United States has joined nearly 170 other nations in the signing of an international chemical weapons treaty that requires the military in each of the signing nations to eliminate its chemical warfare stockpile by April of 2007. This treaty requires that the United States destroy 31,496 tons of chemical munitions by the year 2007. The U.S. Department of Defense is required to destroy all remaining stocks of mustard gas by the year 2003. The proper disposal of these hazardous materials is very expensive for the U.S. military.

Recently, concerted efforts have been made to dispose of hazardous materials in a safe manner. In many cases, this has entailed the dumping of the hazardous materials into deep landfill zones. In other cases, the hazardous materials have been encased in protective containers, and then buried in landfills, or at sea. Certain hazardous materials are disposed of by burning them at trash dumps, and in commercial furnaces. However, depending upon the burning parameters, such destruction frequently is time-consuming, incomplete and produces dangerous levels of noxious environmental pollutants.

There is currently a need for safe, rapid, inexpensive and efficient methods and apparatuses for the complete destruction of hazardous materials (rendering them non-hazardous) without producing unacceptable levels of environmental pollutants.

Description of the Art

U.S. Pat. No. 3,779,212 ("the '212 patent") discloses a steam generating system that burns fuel in an atmosphere of pure oxygen to heat water in a heat exchanger for converting water to steam. In contrast with the processes and apparatuses of the present invention, which can use fuel that contains sulfur and/or nitrogen, such as scrap tires, and which can use waste materials as a fuel, the '212 patent states that the steam generating system described therein uses fuel that contains no sulfur or nitrogen, such as liquefied methane natural gas. Further, the '212 patent does not teach or suggest the use of waste materials as a fuel. The '212 patent states (column 4, lines 65–67) that, "As noted above, the fuel must not contain sulfur or nitrogen, as it is these elements which combine with other elements in the exhaust to produce pollutants." Moreover, the combustion process described in the '212 patent is different from the inventive processes. In the process described in the '212 patent, combustion of a fuel with an oxidizer only occurs one time, and only in one combustion chamber. It is likely that during this one combustion process, only an incomplete (partial) combustion of the fuel occurs, permitting environmental pollutants and/or hazardous materials to be present in the combustion gas exhaust product. The '212 patent does not teach or suggest more than one combustion reaction. In contrast, in the processes and apparatuses of the present invention, combustion occurs at least two, and preferably three (or more), different times in two or more different combustion chambers and/or areas. Thus, the fuel employed in the processes and apparatuses of the invention becomes disassociated separately at least two, and preferably three (or more), separate times, with a corresponding decrease generally in the quantity of environmental pollutants and/or hazardous materials being present in the combustion gas exhaust product produced by these processes and apparatuses.

U.S. Pat. No. 4,915,038 ("the '038 patent") discloses a method and apparatus (a sudden expansion burner) for incinerating waste and hazardous materials. Several differences exist between the methods and apparatuses of the invention and the methods and apparatus described in the '038 patent. First, the waste or hazardous material to be burned by the apparatus described in the '038 patent is entrained in air (column 1). Air passes entirely through the combustion chamber of the apparatus (column 2), and is employed as the oxidizer in the apparatus. The patent does not teach or suggest an apparatus that does not have air enter into it, or come into contact with reactants used therein, or an apparatus that does not use air as an oxidizer. Second, the apparatus described in the '038 patent only incinerates waste or hazardous materials that are fluidized or gaseous. The patent does not teach or suggest an apparatus that can incinerate solid waste or hazardous materials. Third, the waste and hazardous materials discussed in the '038 patent are not employed as a fuel. Rather, a fuel is employed in addition to the waste or hazardous materials. The patent does not teach or suggest an apparatus that can use waste or hazardous materials as the fuel. Fourth, the apparatus described in the '038 patent contains only one combustion chamber (column 1). The patent does not teach or suggest the use of more than one combustion chamber or area, the production of more than one combustion reaction, or the production of any incomplete combustion reactions. Fifth, the '038 patent does not teach or suggest the production of a superheated steam product or a dry saturated steam product.

U.S. Pat. No. 5,859,071 ("the '071 patent") discloses a blend of polymers formed from recycled carpet scrap, selected compatibilizing agents and/or a poly(ethylene-co-omylacetate). The '071 patent states that the blend of polymers can be formed into any of the commercial-shaped articles that are made from thermoplastic polymers (by injection molding), such as flexible floor mats that can be used in vehicles. The '071 patent does not teach or suggest the use of the polymer blend as a fuel, and does not discuss the generation of steam or power, or combustion gas generators.

U.S. Pat. No. 5,709,077 ("the '077 patent"), U.S. Pat. No. 5,970,702 ("the 702 patent") and U.S. Pat. No. 5,680,764 ("the '764 patent") disclose a gas generator for generating gas including steam and carbon dioxide from the combustion of a hydrocarbon gas with oxygen. U.S. Pat. No. 5,715,673 ("the '673 patent") and U.S. Pat. No. 5,956,937 ("the '937 patent") disclose large scale electrical power generation systems that use thermal energy from the combustion of a liquid or gaseous hydrocarbon fuel (propane, methane, natural gas or light alcohols) using liquid oxygen, and that are stated to be pollution-free, or to have low pollution.

Numerous differences exit between the generators and/or systems described by the '077 patent, the '702 patent, the '764 patent, the '673 patent and the '937 patent ("the Clean Energy patents") and the processes and apparatuses of the present invention.

First, in contrast with the Clean Energy patents, which only employ one combustion chamber, and one combustion reaction, the processes and apparatuses of the present invention employ two or more separate combustion chambers or areas, and two or more separate combustion reactions. The second and optional additional combustion reactions that are employed in the processes and apparatuses of the present invention result in a combustion gas exhaust product that is generally "cleaner" (contains a reduced quantity of ash and/or other "dirty" substances, materials or particulate matter) than a combustion gas exhaust product that would be produced if only one combustion reaction was performed (under the same conditions and using the same reactants, and amounts thereof).

Second, the Clean Energy patents describe the mixing of cooling water with hot combustion gases that are generated by a combustion reaction, thereby producing a gaseous mixture of steam and carbon dioxide that is delivered to a turbine as a turbine drive gas. Carbon dioxide that is subsequently received by a carbon dioxide recovery assembly (after being used to drive a turbine) can be collected for industrial use or discharged. In contrast with the generators and/or systems described in these patents, which do not produce a separate superheated steam product or dry saturated steam product, the processes and apparatuses of the present invention produce a separate superheated steam product or a dry saturated steam product.

Third, the processes and apparatuses of the invention may employ low grade fuels (fuels containing a significant quantity of one or more impurities) and solid fuels (as well as gaseous and liquid fuels) and a gaseous oxidizer (as well as a liquid oxidizer).

Fourth, in the processes and apparatuses of the invention, water is generally not mixed with, and does not otherwise come into contact with, combustion gases or combustion gas products that are generated by the combustion reactions. Further, steam (dry saturated steam, superheated steam, wet steam and/or other types of steam) produced for electrical power generation, or for other manufacturing or non-manufacturing processes and apparatuses, by the processes and apparatuses of the invention does not come into contact with combustion gases or combustion gas products produced in, or exiting from, these apparatuses.

Fifth, the major product produced by the processes and apparatuses of the invention is a superheated steam product or a dry saturated steam product that can be used to generate electrical power, not a product that is a mixture of steam and carbon dioxide. Thus, it is not necessary in the processes and apparatuses of the invention to separate carbon dioxide from steam, or to have a carbon dioxide recovery assembly present thereon or therein, as is described in the Clean Energy patents.

Sixth, corrosion and other damage to turbines is typically caused by contact with unburned fuel particles and/or ash that are generally present in combustion gas products produced by the incomplete combustion of low grade fuels and/or solid fuels. Eventually, such contact usually completely destroys the turbines. Unlike the systems described by the Clean Energy patents, the combustion gas exhaust products produced by the processes and apparatuses of the present invention generally do not come into contact with turbines or electrical power-generating equipment and, thus, do not cause components of turbines or electrical power-generating equipment to corrode, or to otherwise become damaged. Rather, it is the superheated steam product or dry saturated steam product of these processes and apparatuses that comes into contact with turbines (or with other electrical power-generating equipment). Combustion gas exhaust products produced by the processes and apparatuses of the present invention are generally kept separate from turbines and electrical-power generating equipment, and do not enter therein, advantageously permitting all types of fuels to be employed in these processes and apparatuses, including low grade fuels, solid fuels and fuels derived from waste materials.

U.S. Pat. No. 6,170,264 ("the '264 patent") discloses a generator for delivering power for power applications that is stated to have low, or no, pollution. Several differences exist between the processes and apparatuses of the invention and the generator described in the '264 patent. First, the '264 patent does not teach or suggest the use of waste materials as fuel. Rather, the patent describes the use of hydrogen, methane, propane, purified natural gas and light alcohols as the fuel (columns 3, 5 and 8). Second, the '264 patent does not teach or suggest a generator that does not permit air to enter into it. Rather, the patent describes the use of air, and an air constituent separation device that separates a portion of the nitrogen, but not any argon, out of the air (columns 4, 5, 7, 8, 21, 23, 25 and claims). Third, the '264 patent does not teach or suggest a generator that does not have water come into contact with combustion gases or combustion gas products produced therein. Rather, the '264 patent describes (columns 3, 8, 21 and 27) the dilution of combustion gases with water in a mixing section of the generator. Fourth, the '264 patent does not teach or suggest a generator that produces a combustion gas exhaust product that does not come into contact with a turbine or other electrical power-generating device. Rather, the patent describes (columns 3, 12, 21 and 22) the expansion of hot combustion gases produced by a generator in a turbine that powers an electric power-generating plant. Fifth, the '264 patent does not teach or suggest a generator that has more than one combustion chamber. Rather, the patent describes (columns 8 and 11) one complete combustion of fuel and oxidizer in a generator. Sixth, the '264 patent does not teach or suggest the production of a superheated steam product or a dry saturated steam product, or the exiting of a superheated steam product or dry saturated steam product from the generator separately from combustion gas products produced by the generator.

U.S. Pat. No. 6,247,316 ("the '316 patent") discloses an electric power generating facility that is stated to produce no, or low, pollution. The engine described in the '316 patent differs from the processes and apparatuses of the present invention in the same manners described hereinabove in connection with the '264 patent.

U.S. Pat. No. 6,206,684 ("the '684 patent") discloses a system for injecting combustible mixtures into a combustion chamber, including a steam generator injector designed to inject fuel, oxidizer and coolant water into a combustion chamber.

An article appearing in the Jun. 14, 2002 print edition of the Atlanta Business Chronicle entitled "Start-up will Turn Tires into Electricity" describes a Georgia start-up company, PR Power Co., that intends to produce electricity from old tires using a "plasma torch," which is stated to be like manufactured lightening, and which can burn as hot as 9,000° C., to vaporize tires down to their natural elements, mainly hydrocarbons and scrap steel. The gas emitted from the torching process is stored until it is needed to run turbines to produce electricity. Unlike the processes and apparatuses of the present invention, which produce thermal energy in a cost-effective manner, and which use an oxidizer such as oxygen, the process described in this newspaper article is stated to be more expensive than the production of energy by traditional coal or nuclear plants, and does not use oxygen. Further, in contrast with the processes and apparatuses of the present invention, which can use as a fuel any type of solid, liquid, gaseous or other material containing hydrogen, carbon or both hydrogen and carbon, the only type of fuel that the process described in the article employs is tires.

A June 2001 article entitled "Rocket Science" that appears on the Internet at www.memagazine.org describes the designing of a gas generator that burns methane and oxygen to produce $CO_2$ and water in the form of steam, and that is stated to have zero atmospheric emissions, by a group of retired Aerojet Corp. engineers that formed the company Clean Energy Systems. In contrast with the processes and apparatuses of the present invention, within the combustion chamber employed by Clean Energy Systems, the fuel and water are mixed together and are then directly injected into a turbine. If a solid fuel is used, and is not completely converted into a gas, it will have a detrimental effect on the blades of the turbine. In contrast, in the processes and apparatuses of the present invention, the combustion gas exhaust product generally never enters into a turbine or other electrical power-generating apparatus or system.

An article entitled "The Use of Scrap Tires in Cement Rotary Kilns" written by the Scrap Tire Management Counsel describes the use of tire derived fuel in kilns for the production of cement. In contrast with the processes and apparatuses of the present invention, this article does not teach or suggest the production of a superheated steam product, a dry saturated steam product or electrical power, apparatuses having two or more different combustion chambers or areas for the separate combustions of a fuel, or the use of an oxidizer other than air. Further, in contrast with the processes and apparatuses of the invention, which do not require the use of separate pollution control devices, the cement rotary kiln described in the article requires the use of a separate pollution control device.

SUMMARY OF THE INVENTION

In one aspect, the present invention provides processes and apparatuses for safely, rapidly, cost-effectively and efficiently producing and controlling high-energy, high purity superheated steam products or dry saturated steam products in an environmentally clean manner preferably using waste materials, such as the rubber from scrap tires, discarded carpet, used plastic soda bottles and/or Styrofoam coffee cups, or hazardous materials as a fuel. The resulting superheated steam products or dry saturated steam products can be employed to generate large quantities of electrical power without corroding or otherwise damaging turbines, condensers or other electrical power-producing equipment or devices.

Very advantageously, processes and apparatuses within the invention can simultaneously or consecutively: (a) produce a superheated steam product or dry saturated steam product that can be employed to produce electrical power when introduced into an electrical power-generating device or system; and (b) transform hazardous materials into non-hazardous materials.

The apparatuses of the invention comprise in combination:

(a) a means for receiving at least one fuel that contains the element hydrogen, the element carbon or the elements hydrogen and carbon, wherein the fuel may be a solid, liquid or gaseous fuel derived from a waste material, and wherein the fuel may contain sulfur or nitrogen;

(b) a means for receiving a liquid or gaseous oxidizer, wherein the oxidizer is not air;

(c) a means for metering the fuel into a first combustion chamber, wherein the fuel is at a temperature, at a pressure, and in an oxidizer/fuel mixture ratio with the oxidizer that can cause an incomplete combustion of the fuel in the first combustion chamber upon its ignition resulting in the production of an incomplete combustion product;

(d) a means for metering the oxidizer into the first combustion chamber, wherein the oxidizer is at a temperature, at a pressure, and in an oxidizer/fuel mixture ratio with the fuel that can cause an incomplete combustion of the fuel in the first combustion chamber upon its ignition resulting in the production of an incomplete combustion product;

(e) a first combustion chamber in which a first combustion of the fuel and the oxidizer can occur resulting in the production of an incomplete combustion product, wherein the first combustion chamber has one or more walls;

(f) a means for initiating a combustion of the fuel and the oxidizer that are metered into the first combustion chamber;

(g) a means for metering additional oxidizer into a second combustion chamber or area, wherein the additional oxidizer is at a temperature, at a pressure, and in an oxidizer/fuel mixture ratio with fuel present in the incomplete combustion product produced in the first combustion chamber that enters into the second combustion chamber or area that can cause either a second incomplete combustion of the fuel present in the second combustion chamber or area, or the complete combustion of the fuel present in the second combustion chamber or area;

(h) a means for metering the incomplete combustion product produced in the first combustion chamber into the second combustion chamber or area, wherein the incomplete combustion product produced in the first combustion chamber is at a temperature, at a pressure, and in an oxidizer/fuel mixture ratio with the additional oxidizer that enters into the second combustion chamber or area that can cause either a second incomplete combustion of the fuel present in the incomplete combustion product that enters into the second combustion chamber or area, or the complete combustion of the fuel present in the incomplete combustion product that enters into the second combustion chamber or area;

(i) a second combustion chamber or area in which a second combustion of the fuel can occur, wherein the second combustion chamber or area has one or more walls, and wherein the second combustion of the fuel can be either: (1) an incomplete combustion, wherein an incomplete combustion product is produced and enters into a third combustion chamber or area; or (2) a complete combustion, wherein a combustion gas exhaust product is produced and may exit the hydrocarbon combustion gas generator;

(j) optionally, a means for metering additional oxidizer into a third combustion chamber or area, wherein the additional oxidizer is at a temperature, at a pressure, and in an oxidizer/fuel mixture ratio with fuel present in an incomplete combustion product produced in the second combustion chamber or area that enters into the third combustion chamber or area that can cause either a complete or an incomplete combustion of the fuel present in the third combustion chamber or area;

(k) optionally, a means for metering an incomplete combustion product produced in the second combustion chamber or area into the third combustion chamber or area, wherein the incomplete combustion product produced in the second combustion chamber or area is at a temperature, at a pressure, and in an oxidizer/fuel mixture ratio with the additional oxidizer that enters into the third combustion chamber or area that can cause an incomplete or complete combustion of the fuel present in the incomplete combustion product that enters into the third combustion chamber or area;

(l) optionally, a third combustion chamber or area in which a third combustion of the fuel can occur, wherein the third combustion of the fuel can be an incomplete or complete combustion, wherein if the combustion is a complete combustion, a combustion gas exhaust product is produced and can exit the hydrocarbon combustion gas generator, and wherein the third combustion chamber or area has one or more walls;

(m) a means for a combustion gas exhaust product produced by the hydrocarbon combustion gas generator to exit the hydrocarbon combustion gas generator, wherein the combustion gas exhaust product does not come into contact with a turbine or other electrical power-generating device;

(n) a means for introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product, wherein the water does not come into contact with any combustion gases that are produced by the hydrocarbon combustion gas generator, wherein the superheated steam product or dry saturated steam product is maintained separate from the combustion gas exhaust product that is produced by the hydrocarbon combustion gas generator and wherein the superheated steam product or dry saturated steam product can be employed to produce electrical power when introduced into an electrical power-generating device or system; and (O) a means for the superheated steam product or dry saturated steam product to exit the hydrocarbon combustion gas generator separately from a combustion gas exhaust product that is produced by the hydrocarbon combustion gas generator.

Components (n) and (O) above may be optional when the apparatuses are not employed to produce a superheated steam product or a dry saturated steam product, for example, when they are only employed to transform hazardous materials into non-hazardous materials.

The processes of the invention for producing a superheated steam product or a dry saturated steam product comprise a combination of the following steps:

(a) metering at least one fuel including the element hydrogen, the element carbon or the elements hydrogen and carbon and a liquid or gaseous oxidizer into a first combustion chamber of a hydrocarbon combustion gas generator, wherein the fuel may be a solid, liquid or gaseous fuel derived from a waste material, and may contain sulfur or nitrogen, wherein the oxidizer is not air, wherein the fuel and the oxidizer are at a temperature, at a pressure, and in an oxidizer/fuel mixture ratio that can cause an incomplete combustion of the fuel in the first combustion chamber upon its ignition resulting in the production of an incomplete combustion product, and wherein the hydrocarbon combustion gas generator comprises:

(1) a means for receiving at least one fuel that contains the element hydrogen, the element carbon or the elements hydrogen and carbon;
(2) a means for receiving a liquid or gaseous oxidizer;
(3) a means for metering the fuel into the first combustion chamber;
(4) a means for metering the oxidizer into the first combustion chamber;
(5) a first combustion chamber in which a first combustion of the fuel can occur, wherein the first combustion chamber has one or more walls;
(6) a means for initiating a combustion of the fuel that is metered into the first combustion chamber;
(7) a means for metering additional oxidizer into a second combustion chamber or area;
(8) a means for metering the incomplete combustion product produced in the first combustion chamber into the second combustion chamber or area;
(9) a second combustion chamber or area in which a second combustion of the fuel can occur, wherein the second combustion chamber or area has one or more walls;
(10) optionally, a means for metering additional oxidizer into a third combustion chamber or area;
(11) optionally, a means for metering an incomplete combustion product produced in the second combustion chamber or area into a third combustion chamber or area;
(12) optionally, a third combustion chamber or area in which a third combustion of the fuel can occur, wherein the third combustion area has one or more walls;
(13) a means for a combustion gas exhaust product produced by the hydrocarbon combustion gas generator to exit the hydrocarbon combustion gas generator;
(14) a means for introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product; and
(15) a means for the superheated steam product or dry saturated steam product to exit the hydrocarbon combustion gas generator separately from a combustion gas exhaust product produced by the hydrocarbon combustion gas generator;

(b) initiating a combustion of the fuel that is present in the first combustion chamber;

(c) permitting the combustion of the fuel that is present in the first combustion chamber to occur for a period of time that permits the production of an incomplete combustion product;

(d) permitting the incomplete combustion product produced in the first combustion chamber to enter into a second combustion chamber or area of the hydrocarbon combustion gas generator;

(e) metering additional oxidizer into the second combustion chamber or area of the hydrocarbon combustion gas generator, wherein the additional oxidizer and the fuel that is present in the incomplete combustion product that enters into the second combustion chamber or area are at a temperature, at a pressure and in an oxidizer/fuel mixture ratio that causes either: (1) an incomplete combustion of the fuel to occur in the second combustion chamber or area, wherein an incomplete combustion product is produced and is permitted to enter into a third combustion chamber or area of the hydrocarbon combustion gas generator; or (2) a complete combustion of the fuel to occur in the second combustion chamber or area, wherein a combustion gas exhaust product is produced and can exit the hydrocarbon combustion gas generator;

(f) if an incomplete combustion product is produced in the second combustion chamber or area and is permitted to enter into the third combustion chamber or area of the hydrocarbon combustion gas generator, metering additional oxidizer into the third combustion chamber or area, wherein the additional oxidizer and the fuel present in the incomplete combustion product that enters into the third combustion chamber or area are at a temperature, at a pressure and in an oxidizer/fuel mixture ratio that can cause an incomplete or complete combustion of the fuel to occur in the third combustion chamber or area and, if the combustion is a complete combustion, the production of a combustion exhaust product;

(g) if a combustion exhaust product is produced in a third combustion chamber or area of the hydrocarbon combustion gas generator, permitting the combustion gas exhaust product to exit the hydrocarbon combustion gas generator;

(h) introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or dry saturated steam product, wherein the water does not come into contact with any combustion gases produced by the hydrocarbon combustion gas generator, wherein the superheated steam product or dry saturated steam product is maintained separate from the combustion gas exhaust product that is produced by the hydrocarbon combustion gas generator and wherein the superheated steam product or dry saturated steam product can be employed to produce electrical power when introduced into an electrical power-generating device; and (i) permitting the superheated steam product or dry saturated steam product to exit the hydrocarbon combustion gas generator separately from the combustion gas exhaust product produced by the hydrocarbon combustion gas generator;

wherein the combustion gas exhaust product produced by the hydrocarbon combustion gas generator does not come into contact with a turbine or other electrical power-generating device.

In another aspect, the present invention provides superheated steam products and dry saturated steam products produced by the above apparatuses and/or according to the above processes.

In yet another aspect, the present invention provides processes and apparatuses for transforming hazardous materials into non-hazardous materials in a safe, rapid, cost-effective, efficient and environmentally clean manner.

The apparatuses for transforming hazardous materials into non-hazardous materials comprise:

(a) a means for receiving at least one fuel that contains the element hydrogen, the element carbon or the elements hydrogen and carbon, wherein the fuel may be a solid, liquid or gaseous fuel derived from a waste material, and wherein the fuel may contain sulfur or nitrogen;

(b) a means for receiving a liquid or gaseous oxidizer, wherein the oxidizer is not air;

(c) a means for metering the fuel into a first combustion chamber, wherein the fuel is at a temperature, at a pressure, and in an oxidizer/fuel mixture ratio with the oxidizer that can cause an incomplete combustion of the fuel in the first combustion chamber upon its ignition resulting in the production of an incomplete combustion product;

(d) a means for metering the oxidizer into the first combustion chamber, wherein the oxidizer is at a temperature, at a pressure, and in an oxidizer/fuel mixture ratio with the fuel that can cause an incomplete combustion of the fuel in the first combustion chamber upon its ignition resulting in the production of an incomplete combustion product;

(e) a first combustion chamber in which a first combustion of the fuel and the oxidizer can occur resulting in the production of an incomplete combustion product, wherein the first combustion chamber has one or more walls;

(f) a means for initiating a combustion of the fuel and the oxidizer that are metered into the first combustion chamber;

(g) a means for metering additional oxidizer into a second combustion chamber or area, wherein the additional oxidizer is at a temperature, at a pressure, and in an oxidizer/fuel mixture ratio with fuel present in the incomplete combustion product produced in the first combustion chamber that enters into the second combustion chamber or area that can cause either a second incomplete combustion of the fuel present in the second combustion chamber or area, or the complete combustion of the fuel present in the second combustion chamber or area;

(h) a means for metering the incomplete combustion product produced in the first combustion chamber into the second combustion chamber or area, wherein the incomplete combustion product produced in the first combustion chamber is at a temperature, at a pressure, and in an oxidizer/fuel mixture ratio with the additional oxidizer that enters into the second combustion chamber or area that can cause either a second incomplete combustion of the fuel present in the incomplete combustion product that enters into the second combustion chamber or area, or the complete combustion of the fuel present in the incomplete combustion product that enters into the second combustion chamber or area;

(i) a second combustion chamber or area in which a second combustion of the fuel can occur, wherein the second combustion chamber or area has one or more walls, and wherein the second combustion of the fuel can be either: (1) an incomplete combustion, wherein an incomplete combustion product is produced and enters into a third combustion chamber or area; or (2) a complete combustion, wherein a combustion gas exhaust product is produced and can exit the hydrocarbon combustion gas generator;

(j) optionally, a means for metering additional oxidizer into a third combustion chamber or area, wherein the additional oxidizer is at a temperature, at a pressure, and in an oxidizer/fuel mixture ratio with fuel present in an incomplete combustion product produced in the second combustion chamber or area that enters into the third combustion chamber or area that can cause an incomplete or complete combustion of the fuel present in the third combustion chamber or area;

(k) optionally, a means for metering an incomplete combustion product produced in the second combustion chamber or area into the third combustion chamber or area, wherein the incomplete combustion product produced in the second combustion chamber or area is at a temperature, at a pressure, and in an oxidizer/fuel mixture ratio with the additional oxidizer that enters into the third combustion chamber or area that can cause an incomplete or complete combustion of the fuel present in the incomplete combustion product that enters into the third combustion chamber or area;

(l) optionally, a third combustion chamber or area in which a third combustion of the fuel can occur, wherein the third combustion of the fuel is an incomplete or complete combustion, wherein if the combustion is a complete combustion a combustion gas exhaust product is produced and can exit the hydrocarbon combustion gas generator, and wherein the third combustion area has one or more walls; and (m) a means for a combustion gas exhaust product produced by the hydrocarbon combustion gas generator to exit the hydrocarbon combustion gas generator, wherein the combustion gas exhaust product does not come into contact with a turbine or other electrical power-generating device;

wherein the hydrocarbon combustion gas generator has the ability to transform hazardous materials into non-hazardous materials.

The methods for transforming hazardous materials into non-hazardous materials comprise:

(a) metering a hazardous material including the element hydrogen, the element carbon or the elements hydrogen and carbon and a liquid or gaseous oxidizer into a first combustion chamber of a hydrocarbon combustion gas generator, wherein the hazardous material may contain sulfur or nitrogen, may be a solid, a liquid or a gas, and if a solid has a size that permits it to be metered into the first combustion chamber of the hydrocarbon combustion gas generator, wherein the oxidizer is not air, wherein the hazardous material and the oxidizer are at a temperature, at a pressure, and in an oxidizer/hazardous material mixture ratio that can cause an incomplete combustion of the hazardous material in the first combustion chamber upon its ignition resulting in the production of an incomplete combustion product, and wherein the hydrocarbon combustion gas generator comprises:

(1) a means for receiving at least one hazardous material that contains the element hydrogen, the element carbon or the elements hydrogen and carbon;

(2) a means for receiving a liquid or gaseous oxidizer;

(3) a means for metering the hazardous material into the first combustion chamber;

(4) a means for metering the oxidizer into the first combustion chamber;

(5) a first combustion chamber in which a first combustion of the hazardous material can occur, wherein the first combustion chamber has one or more walls;

(6) a means for initiating a combustion of the hazardous material that is metered into the first combustion chamber;

(7) a means for metering additional oxidizer into a second combustion chamber or area;

(8) a means for metering the incomplete combustion product produced in the first combustion chamber into the second combustion chamber or area;

(9) a second combustion chamber or area in which a second combustion of the hazardous material can occur, wherein the second combustion chamber or area has one or more walls;

(10) optionally, a means for metering additional oxidizer into a third combustion chamber or area;

(11) optionally, a means for metering the combustion product produced in the second combustion chamber or area into a third combustion chamber or area;

(12) optionally, a third combustion chamber or area in which a third combustion of the hazardous material can occur, wherein the third combustion chamber or area has one or more walls;

(13) a means for a combustion gas exhaust product produced by the hydrocarbon combustion gas generator to exit the hydrocarbon combustion gas generator;

(14) optionally, a means for introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product; and

(15) optionally, a means for a superheated steam product or a dry saturated steam product to exit the hydrocarbon combustion gas generator separately from a combustion gas exhaust product produced by the hydrocarbon combustion gas generator;

(b) initiating a combustion of the hazardous material that is present in the first combustion chamber;

(c) permitting the combustion of the hazardous material that is present in the first combustion chamber to occur for a period of time that permits the production of an incomplete combustion product;

(d) permitting the incomplete combustion product produced in the first combustion chamber to enter into a second combustion chamber or area of the hydrocarbon combustion gas generator;

(e) metering additional oxidizer into the second combustion chamber or area of the hydrocarbon combustion gas generator, wherein the additional oxidizer and material that is present in the incomplete combustion product that enters into the second combustion chamber or area are at a temperature, at a pressure and in an oxidizer/material mixture ratio that causes either: (1) an incomplete combustion of the material to occur in the second combustion chamber or area, wherein an incomplete combustion product is produced and is permitted to enter into a third combustion chamber or area of the hydrocarbon combustion gas generator; or (2) a complete combustion of the material to occur in the second combustion chamber or area, wherein a combustion gas exhaust product is produced and can exit the hydrocarbon combustion gas generator;

(f) if an incomplete combustion product is produced in the second combustion chamber or area and is permitted to enter into a third combustion chamber or area of the hydrocarbon combustion gas generator, metering additional oxidizer into the third combustion chamber or area, wherein the additional oxidizer and the material present in the incomplete combustion product that enters into the third combustion chamber or area are at a temperature, at a pressure and in an oxidizer/material mixture ratio that causes an incomplete or complete combustion of the material to occur in the third combustion chamber or area, and if the combustion is a complete combustion the production of a combustion gas exhaust product;

(g) if a combustion gas exhaust product is produced in a third combustion chamber or area of the hydrocarbon combustion gas generator, permitting the combustion gas exhaust product to exit the hydrocarbon combustion gas generator;

(h) optionally, introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product, wherein the water does not come into contact with any combustion gases produced by the hydrocarbon combustion gas generator, wherein the superheated steam product or dry saturated steam product is maintained separate from the combustion gas exhaust product that is produced by the hydrocarbon combustion gas generator and wherein the superheated steam product or dry saturated steam product can be employed to produce electrical power when introduced into an electrical power-generating device; and (i) optionally, permitting the superheated steam product or dry saturated steam product to exit the hydrocarbon combustion gas generator separately from the combustion gas exhaust product produced by the hydrocarbon combustion gas generator;

wherein the hazardous material becomes transformed into a non-hazardous material.

In another aspect, the present invention provides processes and apparatuses for recycling or otherwise eliminating hydrocarbon waste materials, such as those described hereinabove, in a safe, rapid, cost-effective, efficient and environmentally clean manner and, thereby, increasing the available space in, and the lifespans of, landfills. The apparatuses have the same components as the apparatuses described hereinabove.

The methods for recycling or eliminating hydrocarbon waste materials comprise:

(a) metering a waste material including the element hydrogen, the element carbon or the elements hydrogen and carbon and a liquid or gaseous oxidizer into a first combustion chamber of a hydrocarbon combustion gas generator, wherein the waste material may contain sulfur or nitrogen, may be a solid, a liquid or a gas, and if a solid has a size that permits it to be metered into the first combustion chamber of the hydrocarbon combustion gas generator, wherein the oxidizer is not air, wherein the waste material and the oxidizer are at a temperature, at a pressure, and in an oxidizer/waste material mixture ratio that can cause an incomplete combustion of the waste material in the first combustion chamber upon its ignition resulting in the production of an incomplete combustion product, and wherein the hydrocarbon combustion gas generator comprises:

(1) a means for receiving at least one waste material that contains the element hydrogen, the element carbon or the elements hydrogen and carbon;

(2) a means for receiving a liquid or gaseous oxidizer;

(3) a means for metering the waste material into the first combustion chamber;

(4) a means for metering the oxidizer into the first combustion chamber;

(5) a first combustion chamber in which a first combustion of the waste material can occur, wherein the first combustion chamber has one or more walls;

(6) a means for initiating a combustion of the waste material that is metered into the first combustion chamber;

(7) a means for metering additional oxidizer into a second combustion chamber or area;

(8) a means for metering the incomplete combustion product produced in the first combustion chamber into the second combustion chamber or area;

(9) a second combustion chamber or area in which a second combustion of the waste material can occur, wherein the second combustion chamber or area has one or more walls;

(10) optionally, a means for metering additional oxidizer into a third combustion chamber or area;

(11) optionally, a means for metering the combustion product produced in the second combustion chamber or area into a third combustion chamber or area;

(12) optionally, a third combustion chamber or area in which a third combustion of the waste material can occur, wherein the third combustion chamber or area has one or more walls;

(13) a means for a combustion gas exhaust product produced by the hydrocarbon combustion gas generator to exit the hydrocarbon combustion gas generator;

(14) a means for introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product; and

(15) a means for a superheated steam product or a dry saturated steam product to exit the hydrocarbon combustion gas generator separately from the combustion gas exhaust product produced by the hydrocarbon combustion gas generator;
(b) initiating a combustion of the waste material that is present in the first combustion chamber;
(c) permitting the combustion of the waste material that is present in the first combustion chamber to occur for a period of time that permits the production of an incomplete combustion product;
(d) permitting the incomplete combustion product produced in the first combustion chamber to enter into a second combustion chamber or area of the hydrocarbon combustion gas generator;
(e) metering additional oxidizer into the second combustion chamber or area of the hydrocarbon combustion gas generator, wherein the additional oxidizer and waste material that is present in the incomplete combustion product that enters into the second combustion chamber or area are at a temperature, at a pressure and in an oxidizer/waste material mixture ratio that causes either: (1) an incomplete combustion of the waste material to occur in the second combustion chamber or area, wherein an incomplete combustion product is produced and is permitted to enter into a third combustion chamber or area of the hydrocarbon combustion gas generator; or (2) a complete combustion of the waste material to occur in the second combustion chamber or area, wherein a combustion gas exhaust product is produced and can exit the hydrocarbon combustion gas generator;
(f) if an incomplete combustion product is produced in the second combustion chamber or area and is permitted to enter into a third combustion chamber or area of the hydrocarbon combustion gas generator, metering additional oxidizer into the third combustion chamber or area, wherein the additional oxidizer and the waste material present in the incomplete combustion product that enters into the third combustion chamber or area are at a temperature, at a pressure and in an oxidizer/waste material mixture ratio that causes an incomplete or complete combustion of the waste material to occur in the third combustion chamber or area, and if the combustion is a complete combustion the production of a combustion gas exhaust product;
(g) if a combustion gas exhaust product is produced in a third combustion area of the hydrocarbon combustion gas generator, permitting the combustion gas exhaust product to exit the hydrocarbon combustion gas generator;
(h) introducing water to one or more areas or components of the hydrocarbon combustion gas generator that are positioned in contact with, or in a sufficiently close proximity to, one or more exterior surfaces of one or more walls of one or more combustion chambers or areas to permit at least some of the water to become converted into a superheated steam product or a dry saturated steam product, wherein the water does not come into contact with any combustion gases produced by the hydrocarbon combustion gas generator, wherein the superheated steam product or dry saturated steam product is maintained separate from a combustion gas exhaust product that is produced by the hydrocarbon combustion gas generator and wherein the superheated steam product or dry saturated steam product can be employed to produce electrical power when introduced into an electrical power-generating device; and
(i) permitting the superheated steam product or dry saturated steam product to exit the hydrocarbon combustion gas generator separately from the combustion gas exhaust product produced by the hydrocarbon combustion gas generator;
wherein the waste material is eliminated.

In a further aspect, the present invention provides mixtures that can be employed as fuels in the processes and apparatuses described herein (and in different processes and apparatuses).

The mixtures have a weight percent of 100, contain the element hydrogen, the element carbon or the elements hydrogen and carbon, and contain two or more of the following components:
(a) from about 0 to about 99 weight percent of carpet;
(b) from about 0 to about 99 weight percent hydrogen;
(c) from about 0 to about 99 weight percent of polystyrene;
(d) from about 0 to about 99 weight percent of polyethylene terephthalate;
(e) from about 0 to about 99 weight percent of polyester polyethylene terephthalate;
(f) from about 0 to about 99 weight percent of high-density polyethylene;
(g) from about 0 to about 99 weight percent of low-density polyethylene;
(h) from about 0 to about 99 weight percent of polypropylene;
(i) from about 0 to about 99 weight percent of polyurethane;
(j) from about 0 to about 99 weight percent Nylon 6,6;
(k) from about 0 to about 99 weight percent Nylon 6;
(l) from about 0 to about 99 weight percent polyvinyl chloride; and
(m) from about 0 to about 99 weight percent tire rubber, wherein the mixtures have an ability to function as fuels in processes and apparatuses of the invention.

In still a further aspect, the present invention provides methods for producing mixtures that can be employed as fuels in the processes and apparatuses described herein (and in other processes and apparatuses).

The methods for producing the mixtures comprise:
(a) mixing two or more solid, liquid or gaseous materials together to produce a mixture, wherein the mixture contains the element hydrogen, the element carbon or the elements hydrogen and carbon; and
(b) permitting all solid materials that are employed to produce the mixture, or that are present in the mixture, to have a size that can be metered into a first combustion chamber of an apparatus of the invention;
wherein the mixture may be formed by separately metering each of the materials into a first combustion chamber of an apparatus of the invention and permitting the materials to become mixed in the first combustion chamber of the apparatus, and wherein the mixture has an ability to effectively function as a fuel in processes and apparatuses within the invention.

In the above methods, it is generally preferable that solids are mixed with other solids, liquids are mixed with other liquids and gases are mixed with other gases.

The processes and apparatuses of the present invention can advantageously produce a superheated steam product or a dry saturated steam product that can be employed to generate large quantities of electrical power using waste or non-waste materials containing the element hydrogen, the element carbon or the elements hydrogen and carbon in a cost-effective, environmentally clean manner without corroding or otherwise damaging turbines, condensers or other electrical power-producing equipment using readily-available solid, liquid and other waste or non-waste materials.

When the same fuels are employed, and in the same or similar quantities, or to produce the same or similar amounts of electrical power, the processes and apparatuses of the invention are generally significantly cleaner environmentally than fuel-burning processes and apparatuses for producing steam or electrical power that employ air, or that permit air to come into contact with fuel, oxidizer or water employed therein, with combustion gases or combustion gas products produced thereby, and/or with components thereof (combustion chambers and the like), including conventional processes for producing steam or electrical power, such as conventional coal- and natural gas-burning steam-production and electrical power-production processes. Most fuel-burning processes and apparatuses for producing steam or electrical power, such as conventional coal- and natural gas-burning steam-production and electrical power-production processes, employ air as an oxidizer, or otherwise permit air to enter into the systems. These systems generally are not designed to use oxygen, rather than air, as an oxidizer, and would explode if oxygen was used in this manner.

Further, when one or more fuels of the invention are employed in the processes and apparatuses of the invention, these processes and apparatuses generally become even more environmentally clean. Additionally, the fuels of the invention, whether employed in the processes and apparatuses of the invention, or employed in other combustion processes and apparatuses, generally result in products that are significantly cleaner environmentally than products produced by the same processes and apparatuses using other fuels, such as coal.

The processes and apparatuses of the invention can effectively eliminate waste materials containing the element hydrogen, the element carbon or the elements hydrogen and carbon, such as the rubber from scrap tires and discarded carpet, from the earth, thereby advantageously reducing the space required by these materials in landfills, and extending the lives of the landfills. Moreover, the processes and apparatuses of the invention should reduce acid rain and global warming.

The energy production cost of processes and apparatuses of the invention is preferably about 1.5 cents per kilowatt-hour or lower, and is often about 0.09 cents per kilowatt-hour with a tipping fee, and about 1.30 cents per kilowatt-hour in the absence of a tipping fee. Several different factors contribute to the cost effectiveness of the processes and apparatuses of the invention. First, revenue can be generated from the sale of electrical power generated by the steam products produced using these processes and apparatuses. Second, when waste materials are used as one or more of the fuels in these processes and apparatuses, revenue can be generated from waste disposal and/or tipping fees paid by entities that collect waste materials and pay such fees, such as the tire disposal fees paid by service stations that collect used tires from motorists. Third, if the waste materials contain parts that are not used for fuel, but that can be sold to others, such as the metal present in scrap tires, which currently sells for about $50.00 per ton, the processes and apparatuses of the invention provide yet another way to generate revenue. Fourth, the processes and apparatuses of the invention may result in federal and/or state energy income tax credits being awarded to entities that employ these processes and apparatuses in their production of electrical power (because such electrical power production would be performed in a manner that is friendly to the environment). Fifth, because no, or low quantities of, environmental pollutants and hazardous materials are generally produced by the processes and apparatuses of the invention, the costs associated with pollution control equipment and purchased credits for excess emissions can be completely avoided.

Processes and apparatuses of the present invention may also advantageously be employed to safely, rapidly, inexpensively, efficiently and completely destroy chemical warfare agents, and other hazardous materials, in an environmentally clean manner and without the placement of the hazardous materials in landfills or bodies of water.

BRIEF DESCRIPTION OF THE DRAWINGS

In FIG. 1, 5—5 is a cross sectional plane that represents the components of the generator shown in FIG. 5, 6—6 is a cross sectional plane that represents the components of the generator shown in FIG. 6, 8—8 is a cross sectional plane that represents the components of the generator shown in FIGS. 8 and 9—9 is a cross sectional plane that represents the components of the generator shown in FIG. 9.

FIG. 5 is a cross sectional view of the first oxidizer manifold 41, the first oxidizer manifold plate 40, the first oxidizer injector orifices 46, the first transfer injector plate 44, the first outer housing 50, the oxidizer transfer tube 49, the flame tubes 29 and the individual tubes of water that are present in the first tube assembly 71 of the hydrocarbon combustion gas generator shown in FIG. 1, looking from the first combustion chamber 70 towards the fuel inlet manifold 12 and taken along plane 5—5 of FIG. 1;

FIG. 7 is a detailed cross sectional view of the second superheated steam outlet 67, the second water inlet 62, the feed water manifold 64, the first water manifold plate 60, the fuel wear plate 63, the second fuel ports 65, the second fuel port tubes 66, the second oxidizer inlet 81, the second oxidizer manifold 82, the second oxidizer manifold plate 80, the second oxidizer injector orifices 85 and the second transfer injector plate 84 of the hydrocarbon combustion gas generator shown in FIG. 1;

FIG. 8 is a cross sectional view of the second oxidizer manifold 82, the second oxidizer injector orifices 85, the second transfer injector plate 84, the second fuel ports 65, the second fuel port tubes 66, the oxidizer transfer tube 49, the second outer housing 90 and the individual tubes of water that are present in the second tube assembly 101 of the hydrocarbon combustion gas generator shown in FIG. 1, with excess oxidizer leading towards the oxidizer transfer tube 49, looking from the second combustion chamber 100 towards the first combustion chamber 70 and taken along plane 8—8 of FIG. 1;

FIG. 10 is a detailed view of the second transfer injector plate 84, the second fuel ports 65 and the second oxidizer injector orifices 85 shown in FIG. 8;

FIG. 12 is a detailed view of the second transfer injector plate 84, the second oxidizer injector orifices 85, the second fuel ports 65 and the second fuel port tubes 66 shown in FIG. 7;

FIG. 13 is a detailed view of the second oxidizer injector orifices 85 shown in FIG. 7 and in FIG. 12;

DETAILED DESCRIPTION OF THE PREFERRED EMBODIMENTS

Figure 1:
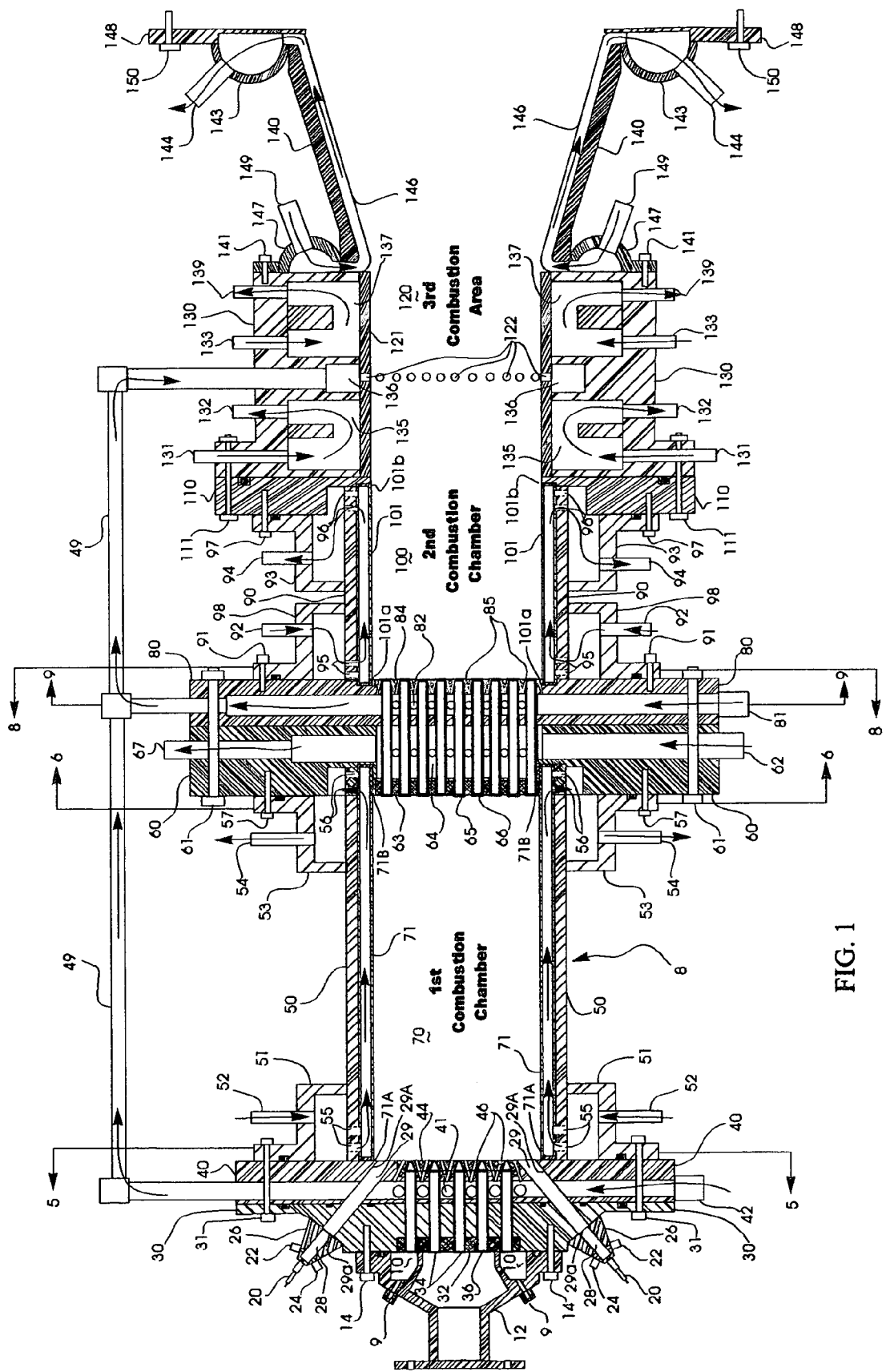
FIG. 1 is a cross sectional diagram showing a preferred embodiment of a hydrocarbon combustion gas generator of the present invention, and its various components. This illustration shows functional elements of the generator, including an ignition device, reactant inlets and manifolds, water inlets, superheated steam outlets, two combustion chambers and one combustion area.

The present invention may be understood more readily by reference to the following detailed description of the preferred embodiments of the invention.

Generally, the apparatuses of the present invention are hydrocarbon combustion gas generators that comprise: (a) one or more means for receiving a liquid or gaseous oxidizer, wherein the oxidizer is not air; (b) one or more means for receiving a solid, liquid, gaseous or blend fuel containing the element hydrogen, the element carbon or the elements hydrogen and carbon; (c) a means for metering the oxidizer and the fuel into a first combustion chamber in an oxidizer/fuel mixture ratio, and under conditions, that can cause an incomplete combustion of the fuel in the first combustion chamber upon its ignition, including inlet means and distribution means for the oxidizer and for the fuel; (d) one or more means for igniting the fuel and the oxidizer in the first combustion chamber; (e) a means for metering additional oxidizer and the combustion gas product produced in the first combustion chamber into a second combustion chamber or area in an oxidizer/fuel mixture ratio, and under conditions, that can cause either another incomplete combustion of the fuel in the second combustion chamber or area, or the complete combustion of the fuel in the second combustion chamber or area, including inlet means and distribution means for the additional oxidizer and for the combustion gas product produced in the first combustion chamber; (f) optionally, a means for metering additional oxidizer and the combustion gas product produced in the second combustion chamber or area into a third (or other) combustion area (or chamber) in an oxidizer/fuel mixture ratio, and under conditions, that can cause a complete combustion of the fuel in the third combustion chamber or area (or an incomplete combustion of the fuel in the third combustion chamber or area if one or more additional combustion chambers or areas is present in the hydrocarbon combustion gas generator), including inlet means and distribution means for the additional oxidizer and for the combustion gas product produced in the second combustion chamber or area; (g) a means for containing the combustion gas products produced in the first combustion chamber, in the second combustion chamber or area and in the optional third (or other) combustion chambers or areas in a controlled flow; (h) a means for a combustion gas exhaust product to exit the hydrocarbon combustion gas generator; (i) a means for introducing water to one or more areas or components of the hydrocarbon combustion gas generator that are positioned in contact with, or in a sufficiently close proximity to, one or more exterior surfaces of one or more walls of one or more combustion chambers or areas, wherein the water functions to cool the walls of one or more of the combustion chambers or areas, and thereby preserve the structural integrity of the combustion chambers or areas, and wherein at least some of the water becomes transformed into a superheated steam product or a dry saturated steam product that does not contact, and is maintained separate from, the combustion gas exhaust product (and other combustion gases produced by the hydrocarbon combustion gas generator) that exits the hydrocarbon combustion gas generator after a fuel has been completely combusted, including water inlet means and water distribution means; (j) a means for a superheated steam product or a dry saturated steam product to exit the hydrocarbon combustion gas generator separately from the combustion gas exhaust product (or from other combustion gases produced by the hydrocarbon combustion gas generator), including superheated steam product or dry saturated steam product outlet means; and (k) optionally, various means for attaching various components of the hydrocarbon combustion gas generator together.

If a hydrocarbon combustion gas generator has more than three combustion chambers or areas, the hydrogen combustion gas generator will generally also have additional components and conditions that correspond with those described above. For example, if the hydrocarbon combustion gas generator has four combustion chambers or areas, it should also have a means for metering additional oxidizer, and a means for metering a combustion product produced in the third combustion chamber or area, into the fourth combustion chamber or area. The combustion product and additional oxidizer that are metered into the fourth combustion chamber or area should be in an oxidizer/fuel mixture ratio, and under conditions, that can cause a complete combustion of the fuel in the fourth combustion chamber or area. A combustion gas exhaust product should be permitted to exit from the fourth combustion chamber or area.

Generally, a combustion gas exhaust product resulting from a complete combustion of a fuel (or of some other material, such as a waste material or a hazardous material)

will exit from the last (most downstream) combustion chamber or area that is present in a hydrocarbon combustion gas generator of the invention.

Definitions

For purposes of clarity, the terms and phrases used throughout this specification and the appended claims are defined in the manner set forth below.

The phrase "acid rain" as used herein means any form of wet precipitation that has a pH value of less than about 5.6.

The phrase "aft end" as used herein in relation with a hydrocarbon combustion gas generator of the invention, or with any of the components thereof, means that end of the hydrocarbon combustion gas generator, or of a component thereof, that is closer to the location in which a combustion gas exhaust product exits the hydrocarbon combustion gas generator. When viewing the accompanying drawings, the aft end will be the right end of the hydrocarbon combustion gas generator of the invention, or of the components thereof.

The phrases "austenitic steel" and "austenitic stainless steel" as used herein mean steels that are generally non-magnetic and non heat-treatable, and that are usually annealed and cold worked. They generally have excellent corrosion and heat resistance qualities with good mechanical properties over a wide range of temperatures. Austenitic steel grades include CH-20, CK-20 and CN-7M.

The term "boiler" as used herein means a closed vessel in which water under pressure is transformed into steam, which may be employed in various plants and/or apparatuses, by the application of heat released in the process of combustion. The heat is transferred to the boiler water through radiation, conduction and/or convection. The relative percentage of each is dependent upon the type of boiler, the designed heat transfer surface and the particular fuel employed. In a boiler, the chemical energy present in the fuel employed is converted into heat, and it is the function of the boiler to transfer this heat to the contained water in the most efficient manner possible. The principal types of boilers that are generally used in industrial applications are: (a) fire-tube boilers, which pass the products of combustion gas through tubes that are surrounded by water; and (b) water tube boilers, which pass the products of combustion gas around tubes that contain water, and that are interconnected to common channels or headers, and eventually to a steam outlet for distribution to a plant system. Boilers are generally constructed primarily of carbon steel. Additional information concerning boilers is present at the web sites www.epri.com, www.nrc.gov, asme.pinetec.com, www.epri.com, www.ornl.gov, www.azom.com and www.sppusa.com.

The abbreviation "Btu" as used herein means British Thermal Unit, which is a precise measure of energy (the amount of energy required to raise the temperature of 1 pound of water 1 degree Fahrenheit), work and quantity of heat, and is a common unit of electric power consumption. 1 Btu=1,054.8 joules (J), and 3412 Btus=1 kilowatt-hour. Additional information concerning Btus, and fuels containing different quantities of Btus, is present at the web site www.eia.doe.gov, and is available from The National Energy Information Center (Washington, D.C.).

The terms "carpet" and "carpeting" as used herein mean a product made from fibers that are generally bonded to a primary and/or secondary backing material, usually with an adhesive. Manufacturers make carpet from different face fibers. The most common face fibers, and their respective percentage of the carpet market, are nylon (57%), polypropylene (Olefin) (36%), polyester (7%) and wool (0.4%).

The term "cogeneration" as used herein means the simultaneous production of thermal energy and electrical or mechanical power from the same fuel in the same facility. It is also referred to as "combined heat and power," and can be produced by a combined heat and power system (CHP). With a cogeneration fuel-fired thermal generating station, it is possible to capture and harness initial energy contained within the fuel employed in the station that is not converted into electrical power, and that would otherwise be discarded as waste heat, for example, using a waste heat recovery boiler to capture the heat. The captured heat can be used for process heat (steam) in many industries, or as lower temperature heat suitable for space heating in buildings. It can be used to satisfy heating requirements, to provide cooling using advanced absorption cooling technology, and to generate additional electrical power with a steam turbine. Cogeneration can, thus, significantly increase the efficiency of a fuel. This increase in fuel efficiency can translate into lower costs, and fewer pollutant emissions, than the conventional alternative of generating electrical power and heat separately. Cogeneration systems often employ internal combustion engines, gas turbine generators, gas turbines, steam turbines, recuperators, heat exchangers, heat recovery steam generators (HRSG), self-contained or other cooling systems, inlet-air filtration systems and/or exhaust silencers. The steam turbines employed generally contain a boiler, a turbine, a heat exchanger and a pump. Heat recovery steam generators produce process steam (or hot water) by recovering a large share of the energy contained in an exhaust gas stream. The exhaust gas is cooled to extract useful heat. One method of cogeneration is to use the waste heat produced from a power plant to warm nearby buildings. A state of the art review of cogeneration is present at the United Nations Economic and Social Commission for Asia and Pacific web site www.unescap.org.

The phrase "combustion efficiency" ($n_c$ or $E_c$) as used herein means a measurement (in percent) that indicates the ability of an apparatus or system, such as a piece of heating equipment, to convert a particular fuel into useable heat energy over a specific period of time during the operation of the apparatus or system. For fuel-fired systems, this phrase is defined as the ratio of the fuel energy input minus the flue gas losses (dry flue gas, incomplete combustion and moisture formed by combustion of hydrogen) to the fuel energy input. In the United States, fuel-fired combustion efficiencies are reported on the basis of the higher heating value of the fuel. Other countries, however, report fuel-fired combustion efficiencies based upon the lower heating value of the fuel. The combustion efficiency of a fuel-fired system will generally be higher than the thermal efficiency. Combustion efficiency test instruments that can measure combustion efficiencies are commercially available. A complete combustion efficiency (100%) is one in which all (100%) of the energy available in a fuel is extracted. Combustion efficiency calculations assume that there is a complete fuel combustion. Additional information concerning combustion efficiency is present at the web sites www.bacharach-training.com and www.pnl.gov.

The phrase "criteria air pollutant" as used herein means a common air pollutant (generally found all over the United States) that can injure health, harm the environment and/or cause property damage, and that is regulated by the EPA using criteria (scientific guidelines that are based upon the health and/or environmental effects of the air pollutant) as the basis for setting permissible levels. Criteria air pollutants include CO, NOx, $SO_2$ and particulate matter.

The phrase "downstream" as used herein means leading towards the aft end of a hydrocarbon combustion gas generator of the present invention, or of a component thereof.

The phrase "dry saturated steam product" as used herein means a product that contains only dry saturated steam or a combination of dry saturated steam and one or more other forms of steam, such as superheated steam.

The phrase "dry steam" as used herein means steam that does not contain water molecules or mist.

The term "emission" as used herein means the release of one or more environmental pollutants into the air from a source, such as an electrical power plant.

The phrases "Engineered Fuel" or "EF Fuel" as used herein mean fuels of the present invention, and include, but are not limited to, EF-1, EF-2, EF-3, EF-4, EF-5, EF-6, EF-7, EF-8, EF-9, EF-10, EF-11, EF-12, EF-13, EF-14, EF-15, EF-16, EF-17 and EF-18. These fuels may be employed in the processes and/or apparatuses of the present invention, and/or in other processes and/or apparatuses that employ fuel.

The phrases "environmentally clean" or "environmentally cleaner" as used herein in connection with processes, apparatuses and fuels of the present invention (and with systems or plants employing these processes, apparatuses and fuels) mean that, without requiring pollution control equipment, one or more (such as all) of the products produced using the processes, apparatuses and/or fuels of the invention, such as superheated steam products, dry saturated steam products and/or combustion gas exhaust products:
  (a) produces or contains no environmental pollutants or hazardous materials;
  (b) produces or contains no hazardous materials, and only produces or contains the environmental pollutant $CO_2$ (i.e., it does not produce or contain any other environmental pollutants);
  (c) produces smaller quantities of hazardous materials in comparison with nuclear power plants or systems that produce the same amount of energy or electrical power;
  (d) produces or contains smaller quantities of one or more environmental pollutants and/or hazardous materials in comparison with the quantities of environmental pollutants and/or hazardous materials produced by, or contained in, one or more products produced by one or more fuel-burning processes, apparatuses and/or systems for producing steam, energy or electrical power that:
    (i) employ air therein, or that permit air to come into contact with fuel, oxidizer and/or water employed therein, with combustion gases produced thereby, and/or with components thereof (such as conventional coal-burning steam production systems and plants, conventional coal-burning electrical power production systems and plants, conventional natural gas-burning steam production systems and plants and conventional natural gas-burning electrical power production systems and plant); and
    (ii) are capable of producing the same amount of superheated steam product, dry saturated steam product, other forms of steam, thermal or other energy or electrical power and/or employ the same fuel and the same quantity of the fuel.

The phrases "environmental pollutants" and "pollutants" as used herein mean any element, chemical compound, gas, solid, liquid, substance, material, or blend or other combination thereof, that has the ability to contaminate (make less pure or clean), and/or cause damage or destruction to, any part of the environment (air, water, soil and the like), and includes air pollutants, such as criteria air pollutants, water pollutants and soil pollutants. Environmental pollutants may, or may not, also be hazardous materials. Environmental pollutants include, but are not limited to, oxides of sulfur (SOx), such as sulfur dioxide ($SO_2$), oxides of nitrogen (NOx), such as nitric oxide (NO), nitrogen dioxide ($NO_2$), nitrous oxide ($N_2O$), carbon monoxide (CO), carbon dioxide ($CO_2$), hydrochloric acid (HCl), methane ($CH_4$), volatile organic compounds (VOCs), dioxin, ammonia ($NH_3$), benzene, hydrogen fluoride, hydrogen sulfide, poly-aromatic hydrocarbons (PAH), hexachlorobutadiene, ethylene dibromide, mercury, arsenic, uranium and thorium, and isotopes thereof, and radioactive products produced by the decay of uranium and thorium, such as radium, radon, polonium, bismuth and lead, particulate matter and other radioactive chemicals or substances.

The phrase "exhaust system" as used herein means one or more components of an apparatus through which one or more combustion gas exhaust products are discharged, with or without other products (into the atmosphere, or into another system or apparatus, such as a $CO_2$ recovery system).

The term "exterior" as used herein means a part or surface that is, or is facing, outside (away from the interior). For example, the exterior surface of a sidewall of a combustion chamber or area faces away from the inside of the combustion chamber or area.

The phrase "feed water" as used herein means water that is fed into an apparatus, system, plant or the like from one or more outside or other sources, such as a river or city water main. Feed water is generally pretreated in the manner described herein, and governed by the following mass balance equation (in pounds or kilograms):

$$\text{Feed Water }(FW)=\text{Make-up Water }(MW)+\text{Return Condensate }(RC)$$

wherein Make-up Water (MW) represents water that is added to the apparatus, system or plant to replace water that has left or exited from the apparatus, system or plant, and wherein Return Condensate (RC) represents water that has been transformed from a gas (steam) to a liquid, and that is returned to the apparatus, system or plant for use therein.

The phrases "ferritic steel" and "ferritic stainless steel" as used herein mean magnetic steels that contain chromium but not nickel, and the structure of which consists largely of ferrite. These steels generally have good heat and corrosion resistance, in particular with the use of seawater, and good resistance to stress corrosion cracking. Although their mechanical properties are generally not as strong as the austenitic grades, they generally have better decorative appeal. Ferritic steel grades include CB-30 and CC-50.

The phrase "footprint" as used herein means the size of a site used or required for a combustion apparatus, system or plant, or an electrical power-generating apparatus, system or plant.

The phrase "forward end" as used herein in relation with a hydrocarbon combustion gas generator of the invention, or with any of the components thereof, means that end of the hydrocarbon combustion gas generator, or of a component thereof, that is closer to the location in which one or more fuels enter into the hydrocarbon combustion gas generator. When viewing the accompanying drawings, the forward end will be the left end of the hydrocarbon combustion gas generator of the invention, or of the components thereof.

The term "fuel" as used herein means any substance or material that is consumed to produce energy, including wood, coal, natural gas, kerosene or oil that is burned to produce heat. Different types of fuel will generally have the ability to produce different amounts of energy as a result of their differing energy contents (different numbers of Btus per pound of fuel). One practical method for comparing different fuels is to convert them into Btus. Generally, the higher the Btu value is for a particular fuel, the more energy the fuel will have the capacity to produce.

The phrase "fuel rich" as used herein means that a mixture of fuel and oxidizer contains more fuel than can be 100% combusted by available oxidizer. A person of skill in the art can readily determine whether a mixture of a particular fuel and of a particular oxidizer is fuel rich (or fuel lean or stoichiometric).

The phrase "global warming" as used herein means the phenomenon in which the density in the atmosphere of gases, such as carbon dioxide, rises and, in turn, causes the air temperature to rise.

The abbreviation "HAN" as used herein means hydroxylamine nitrate, which is commercially available from Pechiney Chemicals Division (Stamford, Conn.). Although HAN has the appearance of water, it is significantly more dense than water.

The phrase "hazardous air pollutants" (also known as "toxic air pollutants") as used herein means those air pollutants that are known or suspected to cause serious health problems. Section 112 of the 1990 Clean Air Act, and the web site www.epa.gov/ttn/atw/pollsour, currently identify approximately 188 pollutants as hazardous air pollutants. A database that includes emission estimates for these 188 hazardous air pollutants from sources, as defined in the 1990 Clean Air Act, is present at the web site www.epa.gov/oar/oaqps/peg_caa/pegcaain.

The phrase "hazardous material" as used herein means any solid, liquid and/or gaseous element, chemical compound, substance or material, or blend or other combination thereof, such as entrained particles or slurries, that presents one or more health risks (risk of ailment, illness, disease, injury and/or death) or other dangers to human beings, animals, aquatic life forms (fish, whales, sea turtles and the like) and/or flying life forms (birds, bats and the like), including, but not limited to, hazardous air pollutants, chemical warfare agents (VX, Tabun, Sarin, Soman, Mustard Gas and the like), volatile organic compounds, infectious medical wastes, needles and other items that have come into contact with infectious diseases, such as the AIDS virus or one of the various types of viral hepatitises or hantaviruses, anthrax spores, biological weapons, other weapons, carcinogenic agents, mutagenic agents and/or radioactive agents. Such health risks or dangers include cancer, difficulties (including an inability) in becoming pregnant or having children, birth defects or ailments, nervous system problems and death due to accidental or non-accidental releases of, or exposure to, hazardous materials. Hazardous materials may, or may not, also be environmental pollutants.

The abbreviation "HCGG" as used herein means a hydrocarbon combustion gas generator of the present invention.

The abbreviation "HDPE" as used herein means High-Density Polyethylene, which is a type of plastic resin that is commonly used to package household products, such as milk, detergent, oil, toys and plastic bags. Milk jugs and detergent bottles are HDPE products that are present in the waste stream.

The term "hydrocarbon" as used herein means the inclusion of both of the elements carbon and hydrogen and, optionally, containing other elements, such as nitrogen, chlorine, sulfur, oxygen and other elements listed in the Periodic Table of the Elements.

The phrases "hydrocarbon material" and "hydrocarbon-based material" as used herein mean any solid, liquid or gaseous chemical compound, substance or material, or blend or other combination thereof, including waste and non-waste items, that contains both carbon and hydrogen and, optionally, one or more other elements, such as nitrogen, chlorine, sulfur, oxygen and other elements listed in the Periodic Table of the Elements, and/or components, such as particulate matter, moisture and the like.

The phrase "interface" as used herein means a surface, or portion thereof, that forms a common boundary between adjacent or otherwise connected regions, bodies or substances (i.e., the location at which two items touch or meet).

The term "interior" as used herein means a part or surface that is, or is facing, inside (away from the exterior). For example, the interior surface of a sidewall of a combustion chamber or area faces towards the inside of the combustion chamber or area.

The term "igniter" as used herein means a device, assembly or system that releases heat and, thereby, initiates a reaction of one or more fuels and one or more oxidizers.

The term "kilowatt-hour" and the abbreviation "kWh" as used herein mean the total energy developed by a power of one kilowatt (one thousand watts) acting for one hour, and are a common unit of electric power consumption. Generally, 1 kWh=3412 Btu per pound.

The phrases "Low-Density Polyethylene" and "LDPE" as used herein mean a type of plastic resin that is commonly used to make various types of film, such as shrink wraps for baked goods and meat, plastic bags, trash bags, grocery sacks and garment bags.

The phrase "lower portion" as used herein in relation with a hydrocarbon combustion gas generator of the invention, or with a component thereof, means that portion of the hydrocarbon combustion gas generator, or of a component thereof, that is closer to the combustion chambers or areas present in the hydrocarbon combustion gas generator.

The abbreviation "LOX" as used herein means liquid $O_2$, which is a dense form of oxygen. It generally results from the application of high pressure to gaseous oxygen, and has the appearance of water.

The term "machined" as used herein means that a device, apparatus, component or part, or portion thereof, is produced with the use of a machine. For example, a pocket that is machined into a metal fuel metering block is a pocket that is produced in the metal fuel metering block with the use of a machine (a machine that has the ability to form pockets in metal).

The abbreviation "MAOP" as used herein means maximum allowable operating pressure.

The term "manifold" as used herein means a structure, such as a pipe or chamber, that contains one or more separate or interconnecting feed paths or other openings, which may produce any of a series of numerous different patterns (like a snowflake), and which may have a variety of different shapes (circular or ring-shaped, oval-shaped, square-shaped, rectangular-shaped, triangular-shaped, etc.), for receiving a gaseous, liquid and/or solid (in a size reduced form) substance or material, such as a fuel, an oxidizer, water, steam or the like, directly or indirectly from one or more supply or other sources, such as a fuel, oxidizer, water, steam or other storage tank, and/or for distributing or otherwise supplying the substance or material to an apparatus, or to a component thereof, such as to a combustion chamber of a hydrocarbon combustion gas generator of the invention.

The terms "Maximum Available Control Technology" and "MACT" as used herein mean known, high level, pollution control technology and equipment for reducing the release of pollutants by sources.

The phrase "to meter" as used herein means to permit a substance or material, whether a solid, liquid, gas, or a blend or other combination thereof, to flow or otherwise travel from one location to another location, and/or from one component of an apparatus or system to another component of an apparatus or system, at a specified rate, for example, at 10 pounds per second.

The phrase "mixed plastics" as used herein includes, but is not limited to, plastic resins other than those specifically named herein, co-mingled plastics (a combination of two, three, four or more types of plastics) and layered multi-material.

The term "monitoring" as used herein means the measurement of air pollution. The EPA, state and local agencies measure the types and amounts of pollutants in community air. Continuous Emission Monitoring Systems (CEMS) are commercially-available machines that may be installed on a source, such as an electrical power plant, to make continuous measurements of environmental pollutant release into the air.

The phrase "non-hazardous material" as used herein means one or more solid, liquid and/or gaseous materials or substances, or blends or other combinations thereof, that do not present a health risk (risk of ailment, illness, disease, injury and/or death) or other danger to human beings, animals, aquatic life forms and/or flying life forms (other than insects).

The phrases "O/F ratio" and "O/F mixture ratio" as used herein mean the ratio of oxidizer to fuel in a mixture of oxidizer and fuel that is employed in a particular area or component of a hydrocarbon combustion gas generator of the invention (or of another apparatus or system), such as a first combustion chamber, a second combustion chamber or area, a third combustion chamber or area or a fourth combustion chamber or area, in an ignition device or system, or in a particular step of a method. The O/F ratio may be varied in a manner known by those of skill in the art to render a mixture of oxidizer and fuel "fuel rich," "fuel lean" or "stoichiometric" in any of one or more combustion chambers or areas of a hydrocarbon combustion gas generator of the invention (or otherwise).

The phrase "megawatt" as used herein means one million watts ($10^6$) watts.

The phrase "particulate matter" as used herein means solid particles (or a mixture of solid particles and liquid droplets or other materials or substances) that generally range in size from fine particles (less than about 2.5 micrometers in diameter) to coarse particles (larger than about 2.5 micrometers in diameter), and that are environmental pollutants and/or hazardous materials. Particulate matter, such as PM-10 (fine particulates) and PM-2.5 (ultrafine particulates), is generally emitted from conventional coal- and other fuel-burning electrical power plants, and often carries heavy metals and/or cancer-causing organic compounds into the lungs of human beings and animals, thereby increasing the incidence and severity of respiratory diseases. Particulate matter includes dust, smoke, soot, ash (coal ash, fly ash and other types of ash), the non-combustible material present in coal and other tiny bits of solid materials that are released into, and/or move around in, the air. Ultrafine particulates are primarily nitrates and sulfates formed from NOx and SOx emissions.

The phrase "peak use times" as used herein means times in which a sufficient supply of electrical power does not exist to meet the demand for electrical power.

The term "plastic" as used herein means any of a wide variety of complex organic compounds that are generally produced by polymerization, and capable of being molded, extruded, cast into various shapes and/or films and/or drawn into filaments used as textile fibers, and includes, but is not limited to, the plastics specifically named or otherwise discussed herein. Plastics are derived from oil and natural gas, and often have properties similar to organic materials that are naturally grown, such as wood, horn and rosin. To prepare plastic, natural gas or crude oil components are generally converted into monomers, such as ethylene, propylene, butene or styrene. These monomers are then chemically bonded into chains (polymers), such as polyethylene, polypropylene, polybutylene, polystyrene, polymethylpentene, polyurethane, polyvinyl chloride, unsaturated polyesters or epoxies, which have carbon atoms as their backbone, hydrogen atoms bonded along the carbon backbone and, possibly, other elements. Each monomer generally yields a plastic resin having different properties and characteristics. Combinations of monomers produce copolymers having further property variations. The resulting resins may be molded or formed to produce many different types of plastic products, and may have additives added thereto (antioxidants, colorants, foaming agents, plasticizers and the like). Thermoset plastics (those that solidify irreversibly when heated) include mattresses, cushions, insulation, ski boots, toys, boat hulls, varnish, furniture, glues, coating for electrical circuits and helicopter blades. Thermoplastics (polymers that soften when exposed to heat and return to their original condition when cooled to room temperature) include packaging, electrical insulation, milk, soda and water bottles, packaging film, house wrap, agricultural film, carpet fibers, automotive bumpers, microwave containers, external prostheses, sheathing for electrical cables, floor and wall coverings, siding, credit cards and automobile instrument panels. The different plastics used in various parts of an automobile include polycarbonate, nylons, polyethylene, terephthalate, acrylonitrile-butadiene-styrene, unsaturated polyesters as sheet-molding compound and polyurethane. Additional information concerning plastics, and their methods of manufacture, is present at the web site www.plasticsresource.com.

The term "plurality" as used herein means more than one, for example, 2, 3, 4, 5, 6, 7, 8, 9, 10, 15, 20, 25, 30, 35, 40, 50, 60, 70, 100, 200, 1000 and the like.

The phrase "pollution control equipment" as used herein means devices, equipment, apparatuses, subsystems, systems and/or the like that can be installed by a source, such as a conventional coal-burning electrical power plant, to maintain pollutants at a particular level, such as at a level set by the EPA for particular pollutants. Pollution control equipment includes $SO_2$ and/or NOx emission controls, steam scrubbers, SCRs, electrostatic precipitators, fabric filter clean-up devices and baghouses for removing particulate matter. Such equipment is generally installed at all conventional coal-burning plants.

The terms "Polyethylene Teraphthalate," "PET" and "PETE" as used herein mean a type of plastic resin that is commonly used to package household products, such as soda and water, and in some waterproof packaging. Most plastic soft drink bottles are made of this material.

The terms "Polypropylene" and "PP" as used herein mean a type of plastic resin that is commonly used in refrigerated containers, some bags, most bottle tops, some carpets and some food wraps. It is commonly used to make appliances, pipe, battery cases, luggage, drinking straws and cereal box liners.

The terms "Polystyrene," "Styrofoam" and "PS" as used herein mean a type of plastic resin that is commonly used to package household products, such as meat and items that need to be protected. It is used in cups, plates, trays, throwaway utensils and clamshells, and keeps cold foods and drinks cold, and warm foods and drinks warm.

The terms "Polyvinyl Chloride" and "PVC" as used herein mean a white granular powder that is fabricated by processing methods into plastic products having a wide variety of applications, such as containers, food wrap, vegetable oil bottles and blister packages.

The phrase "power parks" as used herein means groups of homes or communities that generate their own energy using, for example, solar panels, wind turbines, fuel cells or conventional natural gas generators, that can be almost entirely self sufficient, relying on the grid only in the event that additional outside electrical power is needed, and that have the ability to disconnect from the larger network entirely if a regional electrical power crash threatens to knock them off line along with larger electrical power consumers.

The phrase "power grid" as used herein means a system of electrical power transmission lines, transformers and switching stations that link generators and cities in a complex web that is designed to send electrical power where it is needed.

The phrases "Process Engineered Fuel" and "PEF" as used herein mean a fuel product that is manufactured from post-use paper and plastics derived from residential, commercial and industrial sources, which are used as an industrial fuel, and which generally contains 70–90% paper with the remaining percentage being plastic. Process Engineered Fuel is usually present in a densified form, such as pellets, and is often derived from source-separated feedstocks. In comparison with Refuse Derived Fuel, Process Engineered Fuel is more refined, has a lower ash content, has a lower moisture content and has a higher heating value, which is due to its plastics content. Process Engineered Fuel can generally be used in existing energy facilities, without a need for dedicated plants. There is, thus, generally a larger pool of potential combustors for Process Engineered Fuel than for Refuse Derived Fuel. Further, when Process Engineered Fuel is employed, the significant capital investment for existing facilities will generally have already been made, which should improve the economics of Process Engineered Fuel utilization. Additional information concerning Processes Engineered Fuel, and its manufacture, is present at the web site www.plasticsresource.com.

The terms "Refuse Derived Fuel" and "RDF" as used herein mean a fuel that generally consists of minimally processed municipal solid waste, and that is usually in a shredded form. Refuse Derived Fuel generally has a zero or negative market value, and is most often burned on site using dedicated municipal solid waste combustors.

The phrase "scrap tire" as used herein means a tire that is no longer used for its original purpose.

The term "source" as used herein means any place or object, such as an electrical power plant, a chemical plant, a dry cleaner or a motor vehicle, from which one or more environmental pollutants are released.

The phrase "stainless steels" as used herein means high-alloy steels that generally have superior corrosion resistance in comparison with other steels because they contain large amounts of chromium (generally from 4–30%, and usually around 10%). Stainless steels can be divided into three basic groups based on their crystalline structure: austenitic, ferritic and martensitic.

The term "steam" as used herein means the vapor phase of water.

The phrase "steam purity" as used herein means the amount of solid, liquid or vaporous contamination (non-water components) that is present in a steam, and is generally reported as total solids in parts per billion (ppb). Steam contamination can cause superheater overheating, corrosion and/or failure, steam line and expansion joint cracking, turbine control valve sticking, turbine blade deposits and erosion, turbine disk cracking and the contamination of products and conditioned air. Operating pressures of up to 1,500 psig, and steam temperatures of up to 1,100° F., are available providing steam purity as low as 5 parts per billion entrained solids. Steam scrubbing equipment that can provide the desired steam purity for a particular application is commercially available from ABCO Industries (Abilene, Tex.).

The phrase "steam quality" as used herein means the amount of moisture that is present in the steam. It is the weight of dry steam in a mixture of steam and water droplets, and is generally reported as a percentage. If the steam contains no moisture, it is dry, and the steam is 100% quality. For example, both superheated steam and dry saturated steam are dry, and are 100% quality steam. Steam quality relates to steam purity because liquid droplets that may be present in steam often contain dissolved solids, potentially causing steam contamination. The moisture by itself can also be harmful. AECL Research (Manitoba, Canada) has developed an instrument that can measure steam quality and mass flowrate.

The terms "stoichiometric" or "stoichiometric combustion" as used herein mean the ideal combustion process during which a fuel is burned completely. If there are unburned fuel components in a combustion gas exhaust product, the combustion process is uncompleted. These phrases are described in more detail hereinbelow.

The phrases "stoichiometric ratio" and "stoichiometric oxidizer to fuel mixture ratio" as used herein mean that, in a combustion process, a perfect, correct or ideal ratio of oxidizer to fuel is obtained. A stoichiometric oxidizer to fuel mixture ratio may be employed to produce a stoichiometric combustion reaction, with this ratio depending upon the particular fuel and the particular oxidizer that are chosen for use. For example, if the fuel employed is methane and the oxidizer employed is oxygen, a stoichiometric oxidizer to fuel mixture ratio would be two to one by gas volume (or four to one by weight). A stoichiometric oxidizer to fuel mixture ratio for a particular oxidizer and fuel may readily be determined by those of skill in the art.

The phrase "superheated steam" as used herein means a 100% dry, high-quality steam that is at any temperature above that of saturated steam at the corresponding pressure. This phrase is discussed in greater detail hereinbelow. The primary objective in most steam superheating applications is to improve steam quality and eliminate the "carryover" of liquid water and mist. Steam superheaters are commercially available from ABCO Industries (Abilene, Tex.) or Peerless Manufacturing Company (Dallas, Tex.).

The phrase "superheated steam product" as used herein means a product that contains only superheated steam or a combination of superheated steam and one or more other forms of steam, such as dry saturated steam.

The phrase "thermal efficiency" as used herein means the ratio of heat absorbed by water (or by water and steam) or air to the heat value of the energy consumed. It is a measure of the rate at which heat exchange surfaces transfer heat to the transfer medium (generally water or air). The thermal efficiency is calculated by determining the flue gas losses as a percent of fuel burned [$E_c$=1−flue gas losses]. A complete thermal efficiency is often not achievable due to stack loss, boiler shell losses and like factors. Different types of heat movement impact thermal efficiency. Conductive/convective heating surfaces (also referred to as secondary or indirect heating surfaces) include all surfaces exposed only to hot combustion gases. Radiant heating surfaces (also called direct or primary heating surfaces) consist of heat exchanger surfaces that are directly exposed to radiant heat from a flame. Radiant heat transfer is generally more effective than conductive/convective heat transfer, and is the type of heat transfer that occurs in a boiler or forced air system. Additional information concerning thermal efficiency is present at the web sites www.bacharach-training.com and www.pnl.gov.

The terms "Tire Derived Fuel" and "TDF" as used herein mean fuel that is derived from whole or processed scrap tires. It includes the rubber portion of tires that has been ground, or shredded (chipped), for example, to a size of two inches or smaller, by conventional grinding or shredding methods. Generally, Tire Derived Fuel is a compact and consistent composition, and has a low moisture content.

The term "trigeneration" as used herein means the simultaneous production of three different forms of energy from the primary energy source, namely, heating, cooling and electrical power generation. It is also referred to as "combined heating, cooling and power generation." A typical trigeneration facility consists of a cogeneration plant and a vapor absorption chiller that produces cooling by making use of some of the heat recovered from the cogeneration system. The products of a trigeneration system are generally steam, hot water, chilled water and electricity. Information concerning trigeneration is present at the United Nations Economic and Social Commission for Asia and Pacific web site www.unescap.org.

The phrase "upper portion" as used herein in relation with a hydrocarbon combustion gas generator of the invention, or with a component thereof, means that portion of the hydrocarbon combustion gas generator, or of a component thereof, that is further away from any of the combustion chambers or areas present in the hydrocarbon combustion gas generator.

The phrase "upstream" as used herein means leading towards the forward end of a hydrocarbon combustion gas generator of the present invention, or of a component thereof.

The terms "volatile organic compounds" and "VOCs" as used herein mean carbon-containing compounds that are released from burning fuel (gasoline, oil, wood, coal, natural gas and the like), solvents, paints, glues and other products, and that generally produce vapors readily. Volatile organic compounds include gasoline, benzene (and other industrial chemicals), toluene, xylene (and other solvents), methylene chloride, methyl chloroform and tetrachloroethylene (perchloroethylene). In addition to causing ozone (smog) effects, many VOCs cause serious illnesses, such as cancer, and are harmful to plants.

The terms "watt" and "W" as used herein mean a unit of power in the International system equal to one joule per second.

The phrase "wet steam" as used herein means steam that contains water molecules or mist (moisture) that has not evaporated. As a result of the liquid water and/or mist present therein, wet steam is often corrosive to metal parts, such as the metal blades on a steam or other turbine, and can create performance problems in sterilizers, autoclaves, turbines and similar apparatuses. Wet steam also has a lower thermal transfer efficiency in comparison with superheated steam. To improve steam quality, wet steam can be superheated to create superheated steam using a conventional circulation heater. For example, steam at 90 psig has a saturation temperature of 331° F. Raising the temperature of 90 psig steam to from about 340° F. to about 350° F. will produce superheated steam (100% high quality steam). An increase in temperature of between 100° F. to 200° F. is usually more than adequate to transform a wet steam into a superheated steam, regardless of the pressure. Higher temperatures may be necessary if there are excessive pipe and equipment losses. However, unless there are conditions that require high steam temperatures, increasing the temperature more than about 20° F. to about 30° F. above saturation temperature is generally not recommended because increasing the steam temperature without increasing the steam pressure does not significantly increase the heat content or heat transfer characteristics of the steam. Commercially-available computer programs, such as those described hereinbelow, and readily-available steam graphs, provide the temperature increase (to provide heat energy) that should be used at a particular pressure to transform wet steam into superheated steam. More information concerning wet steam, and its transformation into superheated steam, is present at the web sites www.armstrong-intl.com and www.gebetz.com.

The term "zone" as used herein means a point, line or area in which oxidizer and fuel intersect, mix, ignite and/or travel together, for example, in or through a combustion chamber and/or area.

The plastics and plastic resins described above are discussed in detail at the web sites www.domme.ntu.ac.uk, www.napcor.com and www.plasticsresource.com.

A discussion about various types of steels, including stainless steels, is present at the web site www.efunda.com.

Fuel

One or more fuel supply control means permits the initiation, termination and/or regulation of one or more supplies of fuel, which may be the same or different, which may be solid, gaseous, liquid or a combination or other blend of more than one solid, gas and/or liquid, and which may be compatible or incompatible, to the apparatuses of the invention. The fuel supply control means may include a fuel line that is attached to a source of fuel and a pump, or any other suitable system for achieving the same results.

Any hydrocarbon material, hydrocarbon-based material or other material that contains the element hydrogen, the element carbon or the elements hydrogen and carbon, or blend or other combination thereof, whether solid, liquid, gaseous or a blend or other combination thereof, that is capable of burning may be used in any weight percent (from 0% to 100%) as a fuel, or as a component in a fuel blend or other mixture, in the processes and apparatuses of the present invention. Such materials include, but are not limited to, Process Engineered Fuel, Engineered Fuel, Refuse Derived Fuel, Tire Derived Fuel, hydrocarbon and other non-waste materials and hydrocarbon and other waste materials. Such materials may be hazardous materials or non-hazardous materials, and may contain sulfur and/or nitrogen. The fuels may or may not contain one or more additives, such as anti-fungal substances or agents or anti-freeze substances or agents.

Examples of non-waste materials that may be employed include, but are not limited to, wood, coal, methane, other natural gas, gasoline, diesel fuel, kerosene, fuel oils (any of the different grades), hydrogen, ethane, butane, propane, alcohol, items or products that are made using plastics, mixed plastics and/or plastic resins that are not waste materials, or a blend or other mixture of any of the foregoing materials.

Examples of hydrocarbon waste materials include, but are not limited to, the non-metal components of scrap tires, carpet scraps and discarded carpeting, garbage and other household or residential waste, Styrofoam products (coffee cups, bowls, plates, "to go" boxes, and the like), commercial waste, municipal waste (including light, heavy and other fractions thereof), industrial waste, used cooking oils (from restaurants, homes and the like), used manufacturing oils, used motor oils, wood waste, agricultural waste (animal excrement, the discarded guts or parts of animals or aquatic life forms, including feathers, bones, skin, fat, organs, fish heads, fish tails, corn stalks, pecan and other nut shells, orange and other fruit peels, and the like), human excrement, paper and paper mill waste (used paper products, paper-pulp effluent, bark and the like), lumber mill waste (hog fuel, sawdust, wood shavings, slabs, trimmings and the like), sugar mill waste (bagasse and the like), oil-refinery residues, automobile industry waste (plastic vehicle bumpers, carpeting and the like), harbor-dredged muck and other plastic or mixed plastic waste items, and blends or other mixtures thereof, including used or discarded water, milk and soda bottles, non-bottle plastic packaging, and other items or products that are made using plastics, mixed plastics and/or plastic resins and that are used, discarded and/or no longer desired.

Hydrocarbon waste materials that are in an abundant supply may vary from country to country. For example, a hydrocarbon waste material that is in an abundant supply in India is cow feces.

In the United States, solid residential, commercial and industrial waste is collected and transported to central disposal sites and/or landfills where the waste may be separated into different fractions, shredded and/or otherwise processed. The web site www.wasteinfo.com provides a Directory and Atlas of Solid Waste Disposal Facilities that provides the name, type and address of more than 6,000 operating landfills, transfer stations, mixed waste facilities and incinerators that are sources of waste materials.

The energy or heating value of different materials differ, as is shown for some of these materials in the following table:

Energy Value of Different Materials

| Type of Material | Approximate Energy Content of Fuel |
|---|---|
| Natural Gas | 21,500 Btus per pound |
| Coal | 6,900 to 14,350 Btus per pound |
| Propane | 21,669 Btus per pound |
| Methane | 23,875 Btus per pound |
| Butane | 21,321 Btus per pound |
| Hydrogen | 61,095 Btus per pound |
| Gasoline | 20,503 Btus per pound |
| Diesel Fuel | 19,400 Btus per pound |
| Kerosene | 19,940 Btus per pound |
| #6 Grade Fuel Oil | 18,740 Btus per pound |
| Wet Wood | 4,000 Btus per pound |
| Dry Wood | 7,000 Btus per pound |
| Typical Wood Waste | 9,000 Btus per pound |
| Typical Waste Cardboard | 6,800 Btus per pound |
| Discarded Carpet | 14,000 Btus per pound |

-continued

Energy Value of Different Materials

| Type of Material | Approximate Energy Content of Fuel |
|---|---|
| Carpet Scraps | 15,522 Btus per pound |
| Conventional Refuse Derived Fuel | Less than 6,500 Btus per pound |
| Scrap Tires | 15,000 Btus per pound |
| Tire-Derived Fuel | 12,000 to 16,000 Btus per pound |
| Polyethylene | 19,900 Btus per pound |
| Polystyrene | 17,800 Btus per pound |
| Polyethylene Terephthalate | 10,933 Btus per pound |
| High-Density Polyethylene | 18,690 Btus per pound |
| Low-Density Polyethylene | 18,490 Btus per pound |
| Polypropylene | 19,400 Btus per pound |
| Polyvinyl Chloride | 8,500 Btus per pound |
| Process Engineered Fuel | 7,000 to 16,000 Btus per pound |

The energy value of coal depends upon the type and quality of the coal.

It is preferred that a fuel that is employed in the processes and apparatuses of the present invention have an energy value ranging from about 3,000 to about 55,000 Btus per pound, and more preferably from about 8,000 to about 40,000 Btus per pound, with about 32,000 Btus per pound being most preferred.

In order to minimize or eliminate the quantity of environmental pollutants and/or hazardous materials that may be present in the combustion gas exhaust products produced by the processes and apparatuses of the present invention, it is preferable that the materials that are used as a fuel, or as a component of a fuel blend or other mixture, in these processes and apparatuses do not: (a) contain substances or elements, such as sulfur, sulfides and/or nitrogen, that can form, or can combine with other substances or elements to form, environmental pollutants and/or hazardous materials, such as NOx, NO, $NO_2$, $N_2O$, SOx, $SO_2$, HCl and CO; (b) contain metals, metal parts or elements listed in the Periodic Table of Elements that are environmental pollutants and/or hazardous materials, such as arsenic, lead, mercury, plutonium, radon or uranium, or contain small quantities of the foregoing substances and/or elements; and (c) produce particulate matter, such as ash, when combusted, or produce small quantities of particulate matter. In view of the above, when possible, it is preferable that hydrocarbon materials other than coal, nylon 6, nylon 6,6 and the rubber from scrap tires be employed as materials that are used as fuels, or as components of fuel blends or other mixtures, in the processes and apparatuses of the invention. (Nylon 6, nylon 6,6 and the rubber from scrap tires each contain some nitrogen.)

The above-described substances, elements and/or metals may not be present in the materials initially, or may be initially present, but removed from the materials by known methods, such as fuel cleansing methods, prior to using the materials in the processes and/or apparatuses of the invention. For example, when scrap tires are employed as a fuel or fuel component in the processes and apparatuses of the invention, it is preferable that all metal first be removed from the scrap tires (to prevent the existence of, or minimize the quantities of, metals in the combustion gas exhaust product).

If the fuels (or fuel components) and oxidizers employed in the methods and apparatuses of the invention contains no (O weight percent) sulfur, the combustion gas exhaust products produced by these methods and apparatuses will generally not contain sulfur, or any sulfur-containing compounds, such as SOx or $SO_2$. Likewise, if the fuels (or fuel components) and oxidizers employed in the methods and apparatuses of the invention contains no (O weight percent) nitrogen, the combustion gas exhaust products produced by these methods and apparatuses will generally not contain nitrogen, or any nitrogen-containing compounds, such as NOx, NO, $NO_2$ or $N_2O$. Further, if the combustion gas exhaust products produced by the methods and apparatuses of the invention do contain nitrogen and/or sulfur, these components of the combustion gas exhaust products can be scrubbed out therefrom, using conventional pollution control equipment. Moreover, if the fuels (or fuel components) and oxidizers employed in the methods and apparatuses of the present invention contain no elements listed in the Periodic Table of Elements that are hazardous materials, the combustion gas exhaust products produced by these methods and apparatuses will generally not contain elements listed in the Periodic Table of Elements that are hazardous materials.

Any of the many different types of wood can be employed as fuels, or in a fuel blend or other mixture, in the methods and apparatuses of the invention. As is shown in the table set forth below, which provides the weight percent of the components that are present in several different types of wood, and the energy value of the woods, many types of wood do not contain sulfur or nitrogen.

Analysis of Typical Dry Wood

| Type of Wood | % C | % H2 | % S | % O2 | % N2 | % Ash | Btus per Pound |
|---|---|---|---|---|---|---|---|
| White Cedar | 48.80 | 6.37 | 0 | 44.46 | 0 | 0.36 | 8,400 |
| Cypress | 54.98 | 6.54 | 0 | 38.08 | 0 | 0.40 | 9,870 |
| Pine, Pitch | 59.00 | 7.19 | 0 | 32.68 | 0 | 1.13 | 11,320 |
| Pine, White | 52.55 | 6.08 | 0 | 41.25 | 0 | 0.12 | 8,900 |
| Pine, Yellow | 52.60 | 7.02 | 0 | 40.07 | 0 | 0.31 | 9,610 |
| White Ash | 49.73 | 6.93 | 0 | 43.04 | 0 | 0.30 | 8,920 |
| Beech | 51.64 | 6.26 | 0 | 41.45 | 0 | 0.65 | 8,760 |
| White Birch | 49.77 | 6.49 | 0 | 43.45 | 0 | 0.29 | 8,650 |
| Elm | 50.35 | 6.57 | 0 | 42.34 | 0 | 0.74 | 8,810 |
| Hickory | 49.67 | 6.49 | 0 | 43.11 | 0 | 0.73 | 8,670 |
| Black Oak | 48.78 | 6.09 | 0 | 44.98 | 0 | 0.15 | 8,180 |
| Red Oak | 49.49 | 6.62 | 0 | 43.74 | 0 | 0.15 | 8,690 |
| White Oak | 50.44 | 6.59 | 0 | 42.73 | 0 | 0.24 | 8,810 |
| Poplar | 51.64 | 6.26 | 0 | 41.45 | 0 | 0.65 | 8,920 |

The analyses of some different types of wood that contain small quantities of nitrogen and/or sulfur are set forth in the table below.

Analysis of Typical Dry Wood

| Type of Wood | % C | % H2 | % S | % O2 | % N2 | % Ash | Btus per Pound |
|---|---|---|---|---|---|---|---|
| Douglas Fir | 52.3 | 6.3 | 0 | 40.5 | 0.1 | 0.8 | 9,050 |
| Western Hemlock | 50.4 | 5.8 | 0.1 | 41.4 | 0.1 | 2.2 | 8,620 |
| Redwood | 53.5 | 5.9 | 0 | 40.3 | 0.1 | 0.2 | 9,040 |
| Maple | 50.64 | 6.02 | 0 | 41.74 | 0.25 | 1.35 | 8,580 |

Hog fuel, which may be employed as a fuel, or as a component of a fuel blend or other mixture, in the processes and apparatuses of the invention, is a byproduct of lumber production, and generally includes saw dust, wood shavings, slabs and trimmings. Depending upon the source of the lumber, hog fuel often contains no nitrogen or sulfur, or contains only small quantities of nitrogen and/or sulfur. The table set forth below shows the weight percent of components contained in three different types of typical hog fuels.

Analysis of Typical Hog Fuels

| Type of Hog Fuel | % C | % H2 | % S | % O2 | % N2 | % Ash | Btus Per Pound |
|---|---|---|---|---|---|---|---|
| Western Hemlock | 50.4 | 5.8 | 0.1 | 41.4 | 0.1 | 2.2 | 8,620 |
| Douglas Fir | 52.3 | 6.3 | 0 | 40.5 | 0.1 | 0.8 | 9,050 |
| Pine Sawdust | 51.8 | 6.3 | 0 | 41.3 | 0.1 | 0.5 | 9,130 |

Bagasse, which may also be employed as a fuel, or as a component of a fuel blend or other mixture, in the processes and apparatuses of the invention, is a waste product produced when sugar is extracted from cane. Depending upon the country or state in which the bagasse is produced, bagasse often contains no nitrogen or sulfur, or contains only small quantities of nitrogen and/or sulfur. The table set forth below shows the weight percent of components contained in bagasse produced in six different locations.

Analysis of Typical Bagasse

| Location | % C | % H2 | % S | % O2 | % N2 | % Ash | Btus Per Pound |
|---|---|---|---|---|---|---|---|
| Cuba | 43.15 | 6.00 | 0 | 47.95 | 0 | 2.90 | 7,985 |
| Hawaii | 46.20 | 6.40 | 0 | 45.90 | 0 | 1.50 | 8,160 |
| Java | 46.03 | 6.56 | 0 | 45.55 | 0.18 | 1.68 | 8,681 |
| Mexico | 47.30 | 6.08 | 0 | 45.30 | 0 | 1.32 | 8,740 |
| Peru | 49.00 | 5.89 | 0 | 43.36 | 0 | 1.75 | 8,380 |
| Puerto Rico | 44.21 | 6.31 | 0 | 47.72 | 0.41 | 1.35 | 8,386 |

Typical residential solid waste (having magnetic metals removed therefrom), which may also be used as a fuel, or as a component of a fuel blend or other mixture, in the processes and apparatuses of the invention, contains the ranges of weight percents of the components shown in the table set forth below, which include only small quantities of nitrogen and/or sulfur.

Analysis of Typical Solid Residential Waste

| % H2O | % C | % H2 | % S | % O2 | % N2 | % Cl | % Ash | Btus Per Pound |
|---|---|---|---|---|---|---|---|---|
| 19.7–31.3 | 23.4–42.8 | 3.4–6.3 | 0.1–0.4 | 15.4–31.9 | 0.2–0.4 | 0.1–0.9 | 9.4–26.8 | 3,100–6,500 |

For several reasons, the processes and apparatuses of the present invention preferably use a fuel that is made of a waste material, such as carpet scraps, discarded carpeting and/or plastic milk, water and/or soda bottles.

First, the use of waste materials as the fuel in the processes and apparatuses of the invention advantageously decreases the space in landfills present in the earth that would otherwise be occupied by such waste materials, thereby extending the lifespans of the landfills and decreasing the amount of waste materials that are placed into the earth, some of which do not degrade.

Second, unlike coal and some other non-waste materials, waste materials are generally in an abundant supply, and will continue to be in an abundant supply.

Third, unlike natural gas, which is expensive and, thus, when used as a fuel to produce electrical power (via any method or apparatus) increases the costs of producing the electrical power, waste materials may generally be obtained free of charge and, thus, lower the costs of producing electrical power.

Carpet manufactures will generally deliver used and scrap carpet to others free of charge, rather than paying landfill fees to dispose of the used or scrap carpet in landfills. The "Memorandum of Understanding for Carpet Stewardship" agreement that was signed in 2002 provides carpet manufacturers with a further incentive for delivering used and scrap carpet to others that can use these waste materials, such as in the processes and apparatuses of the present invention, free of charge.

Fourth, unlike most fuels, the use of waste materials in the processes and apparatuses of the present invention should provide an additional source of revenue to users of these processes and apparatuses in the form of waste disposal fees, recycling fees, tipping fees and/or end user fees (fees paid to the user for accepting, removing, disposing of and/or otherwise recycling the waste materials). The receipt of these fees results in the fuels or fuel components employed in the processes and apparatuses of the invention having a negative cost (with the user of these processes and apparatuses being paid to use the fuel or fuel component), rather than a positive cost (with the user paying for the fuel or fuel component). Having a negative cost associated with the fuels or fuel components employed in the processes and apparatuses of the invention advantageously has the effect of lowering the cost of producing electrical power.

Whole scrap tires are generally in a high supply and in a low demand. Currently, all states in the United States pay from about $1.00 to about $3.00 per scrap tire of a recycling, or tipping, fee. Thus, if 1,000,000 scrap tires are removed from a scrap tire collection site at this tipping fee, this would result in the generation of from about 1 to about 3 million dollars in revenue.

The receipt of tipping or similar fees for the use of waste materials as the fuels or fuel components in the processes and apparatuses of the invention in comparison with the use of non-waste materials, such as coal or natural gas, is very beneficial financially. For example, when coal is used as a fuel in the processes and apparatuses of the invention (or in any method or apparatus for producing electrical power), no waste disposal or tipping fees are generated. Further, the coal must be purchased, currently at a cost of about $50.00 per ton. Because the coal must be purchased, and does not generate any waste disposal or tipping fees, the use of coal as a fuel significantly increases the costs associated with the production of electrical power.

Solid fuels (in a size reduced form) are preferred for use in the processes and apparatuses of the present invention, with discarded carpeting, carpet scraps, plastic milk, water and soda bottles, and a blend of tire rubber and carpeting and/or carpet scraps being preferred, all of which are readily available. The use of each of these types of materials as fuels will reduce the load of landfills, and increase their lifespans.

Scrap tires are mainly composed of hydrocarbons and scrap steel, and generally contain low quantities of nitrogen. Eighty percent of scrap tires is generally composed of carbon and oxygen. Scrap tires generally have a lower percent of sulfur than most coals. The sulfur present in scrap tires ranges from 1.24 to 1.30 percent by weight, whereas the sulfur present in coal ranges from 1.1 to 2.3 percent by weight or higher, depending upon the type and quality of the coal.

Scrap tires typically contain synthetic rubber (27 weight percent for passenger tires, and 14 weight percent for trucks), natural rubber (14 weight percent for passenger tires and 27 weight percent for trucks), sulfir and sulfur compounds, silica, phenolic resin, oil (aromatic, naphthenic and/or paraffinic), fabric (polyester, nylon, etc.), petroleum waxes, pigments (zinc oxide, titanium dioxide, etc.), carbon black (28% for both passenger tires and trucks), fatty acids, inert materials and steel (14–15% for both passenger tires and trucks). Specific compounds that are used in tires include natural rubber, styrene-butadiene rubber, isobutylene-isoprene rubber, carbon black (grade N110), carbon black (grade N330), carbon black (grade N765), processing oil, antioxidant, antioxidant wax, stearic acid, zinc oxidant, accelerator (high), accelerator (middle), accelerator (low) and sulfur. In addition, there are approximately 2.5 pounds of steel belts and bead wire in a passenger car tire. This material is made from high carbon steel with a nominal tensile strength of about 2,750 MN/m2.

Generally, a tire that becomes a scrap tire is originally manufactured from several separate components, such as tread, innerliner, beads, belts and the like. The following components, and percent weights thereof, generally account for the rubber employed to make a new radial passenger tire:

| Rubber Percent by Weight in a New Radial Passenger Tire | |
| --- | --- |
| Component | Percent by Weight |
| Tread | 32.6% |
| Base | 1.7% |
| Sidewall | 21.9% |
| Bead Apex | 5.0% |
| Bead Insulation | 1.2% |
| Fabric Insulation | 11.8% |
| Insulation of Steel Cord | 9.5% |
| Innerliner | 12.4% |
| Undercushion | 3.9% |
| Total | 100% |

A typical scrap passenger tire weighs about 20 pounds, whereas a typical scrap truck tire weighs about 100 pounds. Additional information concerning scrap tires is present at the web site www.rma.org.

When using scrap tires as a fuel, or as a component of a fuel blend or other mixture, in the processes and apparatuses of the present invention, it is preferable to use the hydrocarbon material present in the scrap tires, which can be processed by conventional methods into ground (or other size reduced forms) rubber, and not the scrap steel (so that heavy metals, such as arsenic, barium, cadmium, chromium, lead, mercury, selenium and/or silver do not become present in the combustion gas exhaust or other products produced by these process and apparatuses). However, the scrap steel can be sold to generate additional revenue. The resulting hydrocarbon material can generally be vaporized by the processes and apparatuses of the invention into its most basic atomic or molecular structures, primarily the non-polluting and non-hazardous hydrogen, carbon and oxygen gases, and water vapor. It is also preferred that the scrap tires employed to produce a fuel or fuel component be clean, water-free and vermin-free. Various forms of Tire Derived Fuel are commercially available from sources known by those of skill in the art.

Plastics are derived from petroleum and natural gas, and have a very high energy content. Plastic resins (PET, HDPE, PS, LDPE, PP, PETE, PEF, PVC, mixed plastics and the like), such as those employed in plastic milk, water and soda bottles, generally have the highest energy value in modern waste-to-energy incineration processes and apparatuses. Thus, plastics are preferred solids for use as fuels and fuel components in the processes and apparatuses of the present invention.

Carpet can be divided into two major categories, which include woven and non-woven (composite textile) carpets. The four main fibers used in carpet today include nylon, polypropylene (olefin), polyester and wool, with other fibers including cotton and acrylic. The yarn used in forming the pile of a tufted carpet can be made of nylon, acrylics, wool, cotton and the like, with nylon 6 and nylon 6,6 being the most commonly used fiber material for the carpet face itself. The three major types of carpet pad are produced from foam, fiber (man-made or synthetic) and rubber, with the most common type of carpet pad being rebond pad, which is made from scraps of foam used in furniture. Most carpets have a primary and a secondary backing, which are generally made from plastic. Latex glue is generally placed between the carpet backings in order to hold the tufts of carpet fiber together. Automobile carpet generally contains fiber-forming polymers, predominantly nylon 6 and nylon 6,6, polypropylene, polyethylene, polyester, acrylics, ethylene-vinyl acetate copolymer, filled ethylene-vinyl acetate copolymer and $BaSO_4$. Carpet waste generally contains more than one polymeric material. Ethylene-vinyl acetate copolymer is a major component of carpet scrap. Further information concerning carpet composition is present at the web site www.carpet-discounts.com.

Sources for carpet scraps, carpet waste and carpet include Allied, Allied Signal, Anso, BASF, Crush Resister, Worry-free, Zeftron, Antron, DuPont, HomeSelect, Legacy, Lumena, Luxura, Monsanto, ProSelect, Stain Master, Tactesse, Timbrelle, Ultron VIP, WearDated, Hoechst, Trevira, Resistron ISF, Resistron, Permalon, Amoco, Genesis and Marquesa Lana.

A typical carpet scrap that can be employed as a fuel, or as a component of a fuel blend or other mixture, for use in the processes and apparatuses of the present invention has an energy value of about 15,522 Btus per pound and comprises: (a) from about 10 to about 24 ounces per square yard of the face component nylon 6 or nylon 6,6; (b) from about 3 to about 4 ounces per square yard of the primary backing polypropylene or polyester; (c) from about 8 to about 12 ounces per square yard of the precoat poly(ethylene-co-vinyl acetate) or low density polyethylene; and (d) from about 30 to about 136 ounces per square yard of the back coat filled poly(ethylene co-vinyl acetate).

A preferred formulation of fuel derived from carpet scrap material for use in the processes and apparatuses of the invention comprises from about 0 to about 35% nylon 6 and/or nylon 6,6, from about 0 to about 55% polypropylene, from about 0 to about 35% polyester, from about 0 to about 18% polyethylene, from about 0 to about 36% ethylene-vinyl acetate copolymer and from about 0 to about 60% filler.

Fuels employed in the processes and apparatuses of the invention that are produced from one or more solid materials preferably have particle sizes ranging from about 37 to about 2,000 microns, and more preferably ranging from about 149 to about 400 microns. In the granulation or other size reduction of solid materials, the particle size of the resulting granulates is important because it influences the quality of the combustion processes that occur in the processes and apparatuses of the invention, and permits the size-reduced particles to be reformulated into a fuel, a fuel blend or a fuel mixture that may contain one or more other substances. It has been determined that materials having particle sizes of about 30 microns and below are often explosive (spontaneously combust). Thus, materials having such particle sizes are not generally recommended for use in the processes and apparatuses of the invention. Mesh particle sizes that are larger than about 2,300 microns should also be avoided because they can cause feeding problems in the fuel injectors present in the apparatuses. Thus, plastic, rubber and other solid materials should be granulated to fine particle sizes having the above-described particle sizes in order to allow the size-reduced particles to be properly reformulated into a fuel.

The following table shows approximate particle sizes (in U.S. mesh, inches and microns) of one or more solids, and the approximate percent distribution of the one or more solids having the indicated particle sizes, that are preferred for use in fuels or fuel components that are employed in the processes and apparatuses of the invention (in any combination):

Particle Sizes and Percent Distribution in Solid Fuels or Fuel Components

| U.S. Mesh | Inches | Microns | Percent Distribution |
| --- | --- | --- | --- |
| 10 | 0.0787 | 2,000 | 0–5% |
| 12 | 0.0661 | 1,680 | 0–5% |
| 14 | 0.0555 | 1410 | 0–15% |
| 16 | 0.0469 | 1190 | 0–15% |
| 18 | 0.0394 | 1000 | 0–25% |
| 20 | 0.0331 | 841 | 0–45% |
| 25 | 0.028 | 707 | 0–50% |
| 30 | 0.0232 | 595 | 0–50% |
| 35 | 0.0197 | 500 | 0–50% |
| 40 | 0.0165 | 400 | 0–50% |
| 45 | 0.0138 | 354 | 0–99% |
| 50 | 0.0117 | 297 | 0–99% |
| 60 | 0.0098 | 250 | 0–99% |
| 70 | 0.0083 | 210 | 0–99% |
| 80 | 0.007 | 177 | 0–99% |
| 100 | 0.0059 | 149 | 0–99% |
| 120 | 0.0049 | 125 | 0–99% |
| 140 | 0.0041 | 105 | 0–99% |
| 170 | 0.0035 | 88 | 0–99% |
| 200 | 0.0029 | 74 | 0–99% |
| 230 | 0.0024 | 63 | 0–99% |
| 270 | 0.0021 | 53 | 0–99% |
| 325 | 0.0017 | 44 | 0–75% |
| 400 | 0.0015 | 37 | 0–50% |

The solid materials can be size reduced using known procedures, and the resulting particles can be separated into the desired size ranges by screening.

The following table shows the approximate particle sizes (in U.S. mesh, inches and microns) of one or more solids, and the approximate percent distribution of the one or more solids having the indicated particle sizes, that are most preferred for use in fuels and fuel components that are employed in the processes and apparatuses of the invention (in any combination):

Particle Sizes and Percent Distribution in Solid Fuels or Fuel Components

| U.S. Mesh | Inches | Microns | Percent Distribution |
| --- | --- | --- | --- |
| 40 | 0.0165 | 400 | 1% |
| 45 | 0.0138 | 354 | 2% |

-continued

| Particle Sizes and Percent Distribution in Solid Fuels or Fuel Components | | | |
|---|---|---|---|
| U.S. Mesh | Inches | Microns | Percent Distribution |
| 50 | 0.0117 | 297 | 5% |
| 60 | 0.0098 | 250 | 5–10% |
| 70 | 0.0083 | 210 | 35–40% |
| 80 | 0.007 | 177 | 35–40% |
| 100 | 0.0059 | 149 | 10% |

The fuels (or fuel mixtures) that are the most preferred for use in the processes and apparatuses of the invention, and that may be employed in different combustion (and other) processes and apparatuses as well, are inventive fuels or fuel blends that are generally derived from solid materials, such as rubber from scrap tires, carpeting or other plastics, and are sometimes combined with a separate hydrogen component, which has a large energy content and, thus, which can raise the energy value of the final fuel product. These fuels and/or fuel blends are designated as "Engineered Fuels" or "EF Fuels" herein.

The table set forth below shows the formulations (the approximate weight percent range of individual components) for eighteen different Engineered Fuels of the invention (designated EF-1 to EF-18), and the energy content of each of the eighteen Engineered Fuels (in terms of the largest and smallest possible number of Btus per pound of fuel that will generally be present, depending upon the specific weight percent of each component employed in the fuel). For those Engineered Fuels that do not contain a separate hydrogen component, the fuel may be fed into the apparatuses of the invention via one (or more than one) fuel inlet (or other fuel supply control means). However, for those Engineered Fuels, such as EF-10 and EF-11, that contain a separate hydrogen component (which may be in addition to hydrogen contained in other components of the fuel), the separate hydrogen component should be fed into the apparatuses of the invention via a fuel inlet (or other fuel supply control means) that is separate from the fuel inlet (or other fuel supply control means) in which the other fuel components are fed into the apparatuses. However, the separated fuels or fuel components will generally be present together in the first combustion chamber of the apparatus. The web site www.scent3.com contains information about hydrogen, a colorless, odorless and tasteless gas, and methods for producing and storing hydrogen. Example 2 hereinbelow provides an analysis of the components of the separate combustion gas exhaust products that are produced using these eighteen Engineered Fuels in an apparatus of the present invention under certain circumstances.

The term "carpet" as used in the table set forth below refers to the typical carpet scrap described hereinabove, but can also include any other type of carpet scrap or other carpet waste. The other listed components, such as polypropylene and nylon 6,6, are in addition to any of the components, such as polypropylene and nylon 6,6, that may be present in the carpet component of the fuel, fuel blend or other mixture. The phrase "tire rubber" as used in the table refers to the non-metal components of scrap tires that have been size reduced. The weight percents described below are preferred values.

Eighteen Engineered Fuels

| Component | EF-1 | EF-2 | EF-3 | EF-4 |
|---|---|---|---|---|
| Carpet | 5–40% | 5–15% | 40–60% | 5–25% |
| Polystyrene | 0% | 5–10% | 5–10% | 0% |
| Polyethylene Terephthalate | 0% | 5–25% | 5–15% | 10–50% |
| High-Density Polyethylene | 10–40% | 30–55% | 15–35% | 25–35% |
| Low-Density Polyethylene | 1–5% | 5–20% | 0% | 1–5% |
| Polypropylene | 5–35% | 10–30% | 5–7% | 10–25% |
| Highest Possible Energy Value (Btus per Pound) | 19,121 | 19,291 | 15,920 | 18,038 |
| Lowest Possible Energy Value (Btus per Pound) | 15,740 | 17,307 | 15,749 | 15,360 |

| Component | EF-5 | EF-6 | EF-7 | EF-8 | EF-9 |
|---|---|---|---|---|---|
| Carpet | 10–25% | 50–60% | 30–50% | 5–15% | 5–15% |
| Polystyrene | 0% | 0% | 0% | 5–10% | 0% |
| Polyester Polyethylene Terephthalate | 0% | 13–15% | 0% | 10–20% | 0% |
| High-Density Polyethylene | 40% | 23–35% | 50–70% | 20–30% | 4–25% |
| Low-Density Polyethylene | 10–20% | 2% | 0% | 5–10% | 5% |
| Polypropylene | 10–20% | 0% | 0% | 10–20% | 25–35% |
| Nylon 6,6 | 5% | 0% | 0% | 0% | 0% |
| Nylon 6 | 5% | 0% | 0% | 0% | 0% |
| Tire Rubber | 0% | 0% | 0% | 10–25% | 15–30% |
| Highest Possible Energy Value (Btus per Pound) | 18,892 | 16,660 | 18,691 | 17,243 | 19,121 |
| Lowest Possible Energy Value (Btus per Pound) | 18,211 | 16,034 | 17,786 | 16,628 | 17,991 |

| Component | EF-10 | EF-11 | EF-12 | EF-13 | EF-14 |
|---|---|---|---|---|---|
| Carpet | 27–48% | 10–30% | 0% | 0% | 0% |
| Hydrogen | 23–38% | 10–30% | 0% | 0% | 0% |
| Polystyrene | 0% | 0% | 5% | 10% | 5% |
| Polyester Polyethylene Terephthalate | 0% | 30–50% | 10% | 5% | 5–10% |
| High-Density Polyethylene | 25–40% | 10–30% | 35–45% | 40–55% | 35–50% |
| Low-Density Polyethylene | 0% | 0% | 10–20% | 10–20% | 10–20% |
| Polypropylene | 0% | 0% | 10–30% | 10–30% | 10–30% |
| Polyurethane | 0% | 0% | 0% | 5% | 0% |
| Nylon 6,6 | 0% | 0% | 0% | 0% | 5–10% |
| Highest Possible Energy Value (Btus per Pound) | 31,680 | 27,781 | 18,857 | 19,180 | 19,140 |
| Lowest Possible Energy Value (Btus per Pound) | 26,033 | 19,167 | 18,850 | 19,172 | 18,377 |

| Component | EF-15 | EF-16 | EF-17 | EF-18 |
|---|---|---|---|---|
| Carpet | 0% | 0% | 5–15% | 10–40% |
| Polystyrene | 5–20% | 0% | 5–12% | 1–15% |
| Polyester Polyethylene Terephthalate | 5–50% | 20–30% | 10–20% | 3–25% |
| High-Density Polyethylene | 15–60% | 25–50% | 10–30% | 10–17% |
| Low-Density Polyethylene | 5–25% | 0% | 10–15% | 5–20% |
| Polypropylene | 5–60% | 30–45% | 5–20% | 5–15% |
| Polyurethane | 0% | 0% | 4–15% | 3–30% |
| Nylon 6,6 | 0% | 0% | 0% | 3–10% |

-continued

| Component | EF-15 | EF-16 | EF-17 | EF-18 |
|---|---|---|---|---|
| Nylon 6 | 0% | 0% | 0% | 2–5% |
| Polyvinyl Chloride | 0% | 0% | 2–10% | 2–5% |
| Tire Rubber | 0% | 0% | 5–20% | 2–20% |
| Highest Possible Energy Value (Btus per Pound) | 19,490 | 18,305 | 17,170 | 17,026 |
| Lowest Possible Energy Value (Btus per Pound) | 16,130 | 17,432 | 15,974 | 15,975 |

As a result of its high energy content, the most preferred Engineered Fuel for use in the processes and apparatuses of the present invention is the EF-10 fuel.

The manufacturers of hydrocarbon materials that subsequently become waste products that are difficult to dispose of, such as carpet manufacturers and automobile manufacturers, could advantageously use one or more apparatuses of the present invention for their on-site electrical power generation, using their own waste products as the sources of fuel, or of fuel components. These manufacturers could also sell excess electrical power that is generated back to local power grids in accordance with federal mandates. By becoming more environmentally responsible, these manufacturers could also significantly enhance their relationship with the public.

Preparation of Fuels and Fuel Components from Solid Materials

The Engineered Fuels of the present invention, and other fuels derived from solid hydrocarbon materials, can generally be made from one or more hydrocarbon solid materials, freeing them of glass and/or metal components and then size reducing them into smaller particles that preferably have a uniform size using known crushing, ambient temperature grinding, cryogenic grinding, shear cutting, granulating, pelletizing, dicing, pulverizing, high speed impact shattering or other methods. If desired, the raw materials employed to produce the fuels or fuel components may be dried to lower, or otherwise control, the moisture content. A second grinder may be employed to further processes these materials. Quality control is the last step in this manufacturing process.

The solid fuels employed in the processes and apparatuses of the invention may involve the use of wastes commingled material production plastic rubber and carpet having different demanding specifications. The product being recycled may consist of several dissimilar materials, such as a metal-plated or fabric-reinforced plastic. These materials are preferably released from one another, so that they can be separated into individual materials for use in a fuel. Several types of known manufacturing processes have been developed specifically for processing commingled plastics. These processes are generally categorized into extrusion processes and cryogenic and ambient grinding processes. Each of these processes is capable of producing products from a wide variety of homogeneous mixtures of waste plastics and rubbers.

Cryogenic Grinding Processes

In most operations of cryogenic grinding, liquid nitrogen is employed to cool a material during size reduction. Grinding tough, thermoplastic materials at cryogenic temperatures generally produces plastics that are brittle enough to be ground to very fine particle sizes. The use of liquid nitrogen in the cryogenic grinding process controls and regulates the heat of the grinding mill, and allows higher material throughputs at any time of year. Organic materials generally have an increased risk of explosion when very fine particles combine. The use of nitrogen to inert the atmosphere during the grinding process minimizes safety hazards associated with explosions.

The temperature of the liquid nitrogen employed in cryogenic grinding processes is generally about $-320°$ F. at atmospheric pressure. Most plastics and rubber compounds freeze at their glass transition temperature of about $-80°$ F. At temperatures below the glass transition temperature, the plastics and rubber change from an elastic material to one that is brittle and easy to grind using impacting methods. The use of cryogenic temperatures can be applied at any stage of size reduction for most plastics and rubber. The choice of feed material for a cryogenic stage depends on the feed material available and the characteristics of the desired products. Typically, the size of the feed material is a 2-inch, or smaller sized, chip.

The feed material chips are fed at a constant rate into a heat exchanger where they are cooled by direct contact with the liquid nitrogen. The most efficient pre-cooler utilizes countercurrent heat exchange where the liquid nitrogen is sprayed onto the plastics and/or rubbers near the exit end of the pre-cooler. The liquid nitrogen is vaporized as it cools the plastics and/or rubbers, and the cold nitrogen vapor is passed back toward the feed end where it is further warmed by the plastics and/or rubbers. The warm nitrogen gas is vented to a safe location while the cold plastics and/or rubbers are fed to a grinding mill.

The temperature of the frozen plastics and/or rubbers exiting the pre-cooler is generally controlled to a temperature ranging from about $-150°$ F. to about $-320°$ F. The choice of temperature depends upon the intensity of grinding to be performed in a subsequent step. Typical refrigeration efficiencies for plastics and/or rubbers cooled to about $-150°$ F. is 0.5 pounds of liquid nitrogen for each pound of plastics and/or rubbers. Fully pre-cooling to about $-320°$ F. increases the nitrogen consumption to from about 0.65 to about 0.75 pounds per pound of plastics and/or rubbers. The product particle size is generally somewhat finer when colder temperatures are employed.

The cold plastics and/or rubbers are ground, for example, with a hammer mill, producing a plastics and/or rubbers product ranging from about 4 mesh down to very fine powder. Preferred granulators employed in cryogenic grinding processes typically employ both shear cutting and high speed impact shattering principles to reduce the size of the starting solid material. While ductile materials are reduced in size basically by the shear cutting action, materials that are relatively brittle are pulverized by the high speed impact shattering. Any metal remaining in the size-reduced product can generally be separated out from the product using magnets, conveyed to a collection hopper and sold as a by-product. Any fiber that may be entrapped with the metal may be fluffed in a mill and removed by aspiration and screening. Remaining plastics and/or rubbers may be heated in a dryer (to remove moisture that may have been added to the material during the cryogenic grinding process), and then separated into the desired particle size ranges by screening.

If additional very fine powder is desired, generally 30 mesh or smaller, a secondary high intensity grinding process may be used. The feed material for this process is preferably clean, 4-mesh size plastics and/or rubbers particles.

The process described above would generally also be employed for clean industrial and post-consumer scrap, except that no metal or fiber removal steps would generally by necessary, and only one cryogenic grinding stage would generally be necessary. Liquid nitrogen requirements for these materials are about 0.75 pounds of nitrogen per pound of material and higher, depending upon the mesh size desired for the resulting particles. New mills are being developed to economically produce 80 mesh size, and finer, particles.

In order to further size reduce plastics and/or rubbers, ambient and/or wet grinding technologies may be employed after a cryogenic grinding of the material.

The output from cryogenic grinding processes vary, depending upon the size of the grinder, particle mesh sizes produced, and the chilling process employed. Outputs of about 3000–6000 pounds per hour are typical.

Generally cryogenic grinding equipment includes a materials chiller, typically a screw conveyor, liquid nitrogen flow controls, a data acquisition system and mill controls.

There are several advantages of using a cryogenic grinding process. One clear advantage of cryogenic grinding is the cleanliness of the process. Further, the cryogenic grinding process is very effective for separating fiber and steel from plastics and/or rubbers. Although the cost of cryogenic ground plastics and/or rubbers is usually from about $0.01–0.03 per pound higher at equal particle mesh sizes in comparison with ambient ground plastics and/or rubbers, ambient ground plastics and/or rubbers particle sizes are usually limited to 40 mesh or larger.

The key benefits in the use of cryogenic grinding processes to produce the products described above in comparison with other processes include improved production throughput rates, improved quality (due to reduction in heat history or distortion), finer particle sizes (due to ease of particle fracture), cleaner and easier liberation and separation of mixed component scrap, and reduced specific energy consumption (grinding energy per unit of product processed) related to the size reduction step. Benefits of cryogenic grinding processes also include smaller particles, regular particle size, efficiency of the process, improved surface morphology, effective temperature control and an inert atmosphere.

The cryogenic grinding process produces fairly smooth fracture surfaces, and generates little or no heat. This results in less degradation of the resulting plastics and/or rubbers products. In addition, when scrap tires are size reduced by this method, almost all fiber and steel are advantageously removed from the rubber, resulting in a high yield of usable product with little loss of rubber. Further, the price of liquid nitrogen has recently been significantly lowered, resulting in this size reduction process becoming more cost effective.

The use of liquid nitrogen to cool a material takes advantage of the refrigeration afforded by liquid nitrogen for one of the following reasons: (a) to remove the heat of grinding to prevent melting, distortion, or discoloration of polymeric materials during processing; (b) to embrittle a polymer to enable it to be size-reduced more effectively, or to obtain selective embrittlement when two or more components exist; or (c) to liberate multi-component materials by using different rates of thermal expansion/contraction caused by exposure to the low temperatures of liquid nitrogen.

Additional information concerning cryogenic grinding is present at the web site http://www.pallmannpulverizers.com/psrhg.htm.

Ambient Temperature Grinding Process

In the ambient temperature grinding process, a conventional high powered plastics and/or rubbers cracker mill is used to shear and grind plastics and rubbers into small particles. It is common to produce 10 to 30 mesh particle sized material using a relatively large crumb. Several cracker mills are often used in series. Typical yields of ground material are about 2,000–2,200 pounds per hour for 10 to 20 mesh particle sized material, and about 1200 pounds per hour for 30 to 40 mesh particle sized material. The finer the desired particle, the longer the plastics and/or rubbers are permitted to run in the mill. In addition, multiple grinds can be used to reduce the particle size of the plastics and/or rubbers. The lower practical limit for the process is the production of 40 mesh particle sized material. Any fiber and extraneous material should be removed using an air table, and metal is removed using a magnetic separator. The resulting material is fairly clean.

The ambient temperature grinding process produces a material having an irregular jagged particle shape. In addition, the process generates a significant amount of heat in the plastics and/or rubbers (or other) feed material during processing. Excess heat can degrade the resulting plastics and/or rubbers product which, if not cooled properly, can combust during storage.

Ambient temperature grinding mills generally contain a primary shredded, a second shredder, a granulator, a liberator and a classifier.

When scrap tires are size reduced by an ambient temperature grinding process, the scrap tires are generally shredded and then fed into a grinding mill. After grinding, the resulting material is separated into steel, textile and rubber granulates. The granulation can be classified into different particle sizes.

Comparison of the Two Processes

The following table compares the physical properties of materials sized reduced with cryogenic processes in comparison with ambient temperature grinding processes:

| Physical Property | Ambient Temperature Grinding Process | Cryogenic Process |
| --- | --- | --- |
| Specific Gravity | Same | Same |
| Particle Shape | Irregular | Regular |
| Fiber Content | 0.5% | None |
| Steel Content | 0.1% | None |
| Cost | Comparable | Comparable |

The following table compares the approximate weight percent particle size distribution resulting from the size reduction of two different samples of ground rubber, with one sample being size reduced by a cryogenic grinding processes and with the other sample being size reduced by an ambient temperature grinding process:

| Particle Size | Ambient Temperature Grinding Process | Cryogenic Grinding Process |
| --- | --- | --- |
| 30 Mesh Particle Size | 2% | 2% |
| 40 Mesh Particle Size | 15% | 10–20% |
| 60 Mesh Particle Size | 60–75% | 35–40% |
| 80 Mesh Particle Size | 15% | 35–40% |
| 100 Mesh Particle Size | 5% | 20% |
| Pan | 5–10% | 2–10% |

Once the various solids to be employed in a fuel have been sized reduced to the desired particle sizes, the size reduced particles can be mixed together in any commercially available mixer. It is preferable that the mixture of the different plastics, rubbers and/or other materials, and the different particle sizes thereof, be as homogeneous as possible. However, if one or more of the plastics, rubbers or other materials to be employed in a fuel cannot be mixed in a homogeneous manner, they can be separated into two (or more) groups and injected from two different areas of the apparatuses of the invention to achieve a homogenous mix in a combustion chamber present in the apparatuses.

Further, any liquid or gaseous hydrocarbon fuel (or other fuel having the characteristics described herein) can be employed along with fuel components derived from solid materials to achieve a higher energy value of the total fuel employed in the processes and apparatuses of the invention (a higher number of Btus per pound). When they are compatible with one another, fuels or fuel components derived from plastics, rubbers or other solid materials can be mixed with a liquid, gaseous, jelled or other type of fuel or fuel component prior to entering into an apparatus of the invention. However, even if various fuels or fuel components are not compatible with each other, they may still be employed together in the processes and apparatuses of the invention. For example, incompatible fuels or fuel components may be kept separate from each other outside and inside of the apparatuses, and then separately injected into a first combustion chamber present in the apparatuses, where they can mix with each other, and with the oxidizer chosen for use. Those of skill in the art know which different fuels and fuel components are compatible or not compatible with each other.

Oxidizer

One or more of the same or different oxidizers are employed in the processes and apparatuses of the present invention to cause and/or maintain a combustion of a fuel, when ignited and in the presence of the fuel. The oxidizers aid in the conversion of the energy present in the fuel to heat energy.

One or more oxidizer supply control means permit the initiation, termination and/or regulation of one or more supplies of oxidizer, which may be the same or different, to the apparatuses of the invention. The oxidizer supply control means may include an oxidizer line that is attached to a source of oxidizer and a pump, or any other suitable system.

Nitrogen constitutes about 76.9 weight percent of air. Thus, when air is employed as an oxidizer in a combustion process, the nitrogen that is present in the air also becomes present in the combustion gas exhaust product produced by the combustion process. This nitrogen can combine with oxygen that is present in combustion gases and/or combustion gas exhaust products, or in the air in which combustion gas exhaust products are released, resulting in the release into the atmosphere of significant quantities of environmental pollutants, such as the criteria air pollutant NOx, as well as NO, $NO_2$ and $N_2O$. Thus, the processes and apparatuses of the present invention do not use air as an oxidizer (and generally do not otherwise allow air to contact the fuels, oxidizers, water, other coolants, combustion gases or other substances that may be present in the systems, or to enter into the systems). Preferably, the oxidizer employed in the processes and apparatuses of the invention does not contain any nitrogen. In comparison with the use of air as an oxidizer, by reducing or eliminating the nitrogen present in the oxidizer employed in the processes and apparatuses of the invention, the amount of the criteria air pollutant NOx, as well as NO, $NO_2$, $N_2O$ and other nitrogen-containing environmental pollutants produced in combustion gas exhaust products is reduced, or completely eliminated, resulting in low, or no, quantities of nitrogen emissions in the production of steam or electrical power.

Liquid or gaseous oxidizers that are not air, and that preferably do not contain any nitrogen, are employed as the oxidizers in the processes and apparatuses of the invention. These oxidizers have a purity that preferably ranges from about 90% to about 100% (they contain only from about 0% to about 10% impurities), and that more preferably ranges from about 95% to about 100%, for example about 95.5% or about 99.5%, and that is most preferably about 100%. Liquid oxidizers, such as LOX, O, $O_3$ (ozone), hydrogen peroxide ($H_2O_2$) and hydroxylamine nitrate (HAN), are preferred for use in the processes and apparatuses of the invention. However, the oxidizers may be gaseous oxidizers or compressed oxygen. Because of their inexpensive costs and clean nature, the more preferred oxidizers for use in the processes and apparatuses of the present invention are LOX, which may currently be purchased for as low as about 2¢ per pound, and hydrogen peroxide, which currently may be purchased for about $5.00 per pound. Pure (100%) LOX is the most preferred oxidizer for use in the processes and apparatuses of the invention.

Because the entry of oxidizer into the apparatuses of the present invention at any one or more points of entry may be regulated by the user, the entry of oxidizer into these apparatuses at any of these locations may be terminated at any time. This feature advantageously provides the user with the ability to terminate the combustion process of the fuel in the apparatuses, either in the first combustion chamber, in the second combustion chamber, and/or in another combustion chamber or area, at any time.

The oxidizer employed in the methods and apparatuses of the present invention can be obtained, for example, from air via commercially available cryogenic air separation plants or hydrogen electrolysis separation plants. (The electrolysis of water produces pure hydrogen and oxygen.)

The electrical power produced by the processes and apparatuses of the present invention may be used to produce liquid $O_2$ inexpensively (at a cost of from about 1 to about 1.5 cents per pound), and in large quantities (thousands of pounds per day).

Alternatively, Air Products (Allentown, Pa.) manufacturers PRISM® Oxygen VSA (Vacuum Swing Adsorption) systems for the on-site generation of oxygen. These systems, which can be compact, employ a molecular sieve that selectively recovers oxygen from the air.

Oxidizers that may be employed in the processes and apparatuses of the present invention are also commercially available from Airgas, Inc. (Radnor, Pa.), Praxair, Inc. (Danbury, Conn.), Air Liquide America L.P. (Houston, Tex.), Degussa (New Zealand), FMC Industrial Chemicals (Philadelphia, Pa.) and ATOFINA Chemicals (Philadelphia, Pa.). Information regarding these oxidizers is present at the web sites www.degussa-huels.co.na, www.fmcchemicals.com, www.atofinachemicals.com, www.praxair.com and www.us.airliquide.com.

The amount of oxidizer that is introduced into each of the chambers and/or areas of the apparatuses of the invention will have an effect upon the amount of heat that is generated in each of these chambers and/or areas, with more oxidizer generally resulting in more heat. The amount of oxidizer that is present in, or introduced into, each of the chambers and/or areas of the apparatuses of the present invention other than the final chamber and/or area will preferably be an amount of oxidizer that maintains the mixture of oxidizer and fuel in a "fuel rich" mixture. The amount of oxidizer that is present in, or introduced into, the last combustion chamber or area of the apparatuses of the invention will preferably be an amount of oxidizer that produces a stoichiometric combustion reaction.

When using an oxidizer in the methods and apparatuses of the present invention, it is recommended that safety standards promulgated by the Office of Safety and Mission Assurance be followed. These standards are present in "Safety Standards for Oxygen and Oxygen Systems, National Aeronautics and Space Administration" (Washington, D.C., 1996).

Mixing of Fuel and Oxidizer in Combustion Chambers and/or Areas

The particular oxidizers and fuels, or fuel components, chosen for use in the processes and apparatuses of the invention may result in variations of characteristics such as the relative chemical reactivity, the ease and speed of fuel vaporization, the ignition temperature, the diffusion of hot gases, volatility and/or surface tension. However, those of skill in the art can readily choose combinations of one or more oxidizers and one or more fuels or fuel components that will achieve the results desired.

In order to cause oxidizers and fuels or fuel components that enter into a first combustion chamber of the apparatuses of the invention to become mixed well, rather than remaining in separate pockets or otherwise separated, it is preferable that the oxidizers and fuels become vortexed in the first combustion chamber or area, thereby causing the oxidizers and/or the fuels or fuel components (and preferably both) to spin. Such vortexing also permits the oxidizers and fuels or fuel components to remain in the first combustion chamber or area for a longer residence time, and permits the fuels or fuel components to absorb more heat energy from the combustion reaction than would occur in the absence of vortexing.

The vortexing of the oxidizer and fuel in the first (or other) combustion chamber can be achieved, or enhanced, in a variety of different manners. Such vortexing may be achieved, for example, by injecting streams of an oxidizer into a first combustion chamber at one or more of the same or different angles (in any direction that causes the oxidizer to travel into the first combustion chamber). Such angles preferably range from above about 0 degrees to below about 180 degrees in relation to the face of a plate (or other component) in which oxidizer injector orifices are drilled or are otherwise placed, which would otherwise inject the oxidizer straight into the first combustion chamber, and more preferably range from about 10 degrees to about 90 degrees, with about 70 degrees being most preferred. Alternatively, or additionally, streams of a fuel or fuel component may be injected into a first (or other) combustion chamber at one or more of the same or different angles (in any direction that causes the fuel to travel into the first combustion chamber). Such angles preferably also range from above about 0 degrees to below about 180 degrees in relation to the face of the plate (or other component) in which the fuel port orifices are drilled or are otherwise placed, and more preferably range from about 10 degrees to about 90 degrees, with about 70 degrees being most preferred.

Figure 4:
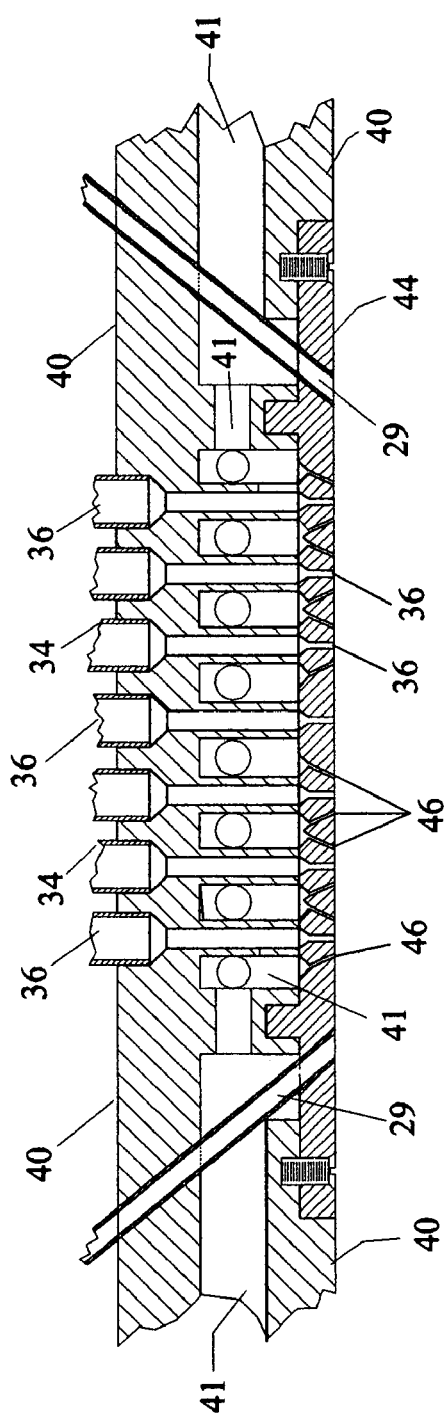
FIG. 4 is a detailed cross sectional view of the first oxidizer manifold 41, the first oxidizer manifold plate 40, the first oxidizer injector orifices 46, the first fuel ports 34, the first fuel port tubes 36, the flame tubes 29 and the first transfer injector plate 44 of the hydrocarbon combustion gas generator apparatus shown in FIG. 1.
Figure 11:
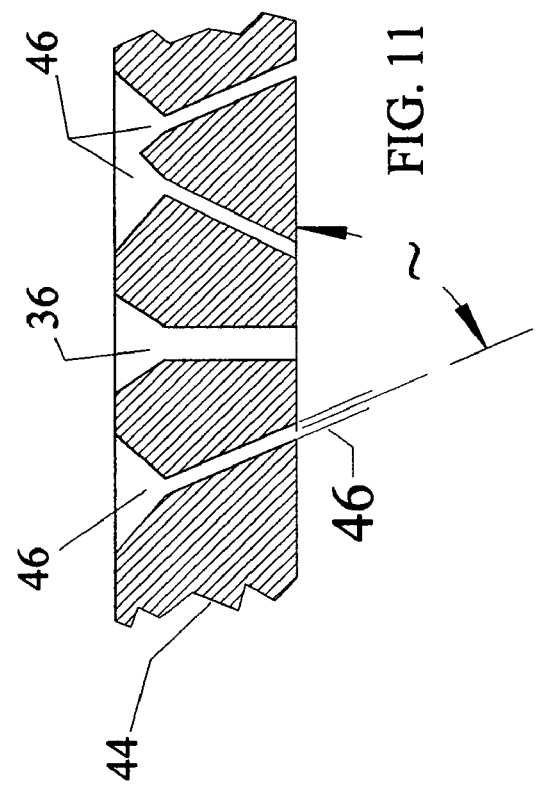
FIG. 11 is a detailed view of the first transfer injector plate 44, the first oxidizer injector orifices 46 and the first fuel port tubes 36 shown in FIG. 4.

It is preferable that both the oxidizer and the fuel be injected into the first combustion chamber or area in angled manners, resulting in one or more points of impingement between the streams of fuel and oxidizer (one or more points, lines and/or areas of intersection of the oxidizer and fuel streams within the first combustion chamber). As a result of the angles that the fuel and oxidizer streams are entering into the first combustion chamber, the streams of fuel and oxidizer may form a variety of different stream patterns, for example, a doublet impinging stream pattern (one or more separate intersections of one stream of fuel and one stream of oxidizer), a triplet impinging stream pattern (one or more separate intersections of one stream of fuel and two streams of oxidizer), as is shown in FIG. 4 and FIG. 11, a self-impinging stream pattern (one or more separate intersections of two streams of fuel or two streams of oxidizer) or other stream patterns. Alternatively, the fuel and/or oxidizer may be injected into the first combustion chamber in a nonimpinging "shower head" stream pattern (with both the fuel and the oxidizer being injected straight into the first combustion chamber, such as the manner in which water travels out of a shower head into a shower). These various patterns can be achieved, for example, by drilling or otherwise placing oxidizer injector orifices into an oxidizer manifold at desired angles, and/or by drilling or otherwise placing fuel port orifices into a fuel metering block at desired angles.

Parameters that may be varied widely and readily by those of skill in the art in connection with both the injection of one or more oxidizers and fuels or fuel components into the first combustion chamber (and into other combustion chambers or areas) of the apparatuses of the invention in order to achieve desired results include sizes of injector orifices, patterns formed by injector orifices, angles of impingement, angles of the resultant momentum, the distance of the impingement locus from the injector face, the number of injector orifices per unit of injector face surface, the flow per unit of injection orifice and the distribution of orifices over the injector face (in a nonimpinging manner, in an unlike impinging manner or in a like-impinging manner).

Configurations of oxidizer and/or fuel injectors that may be employed include non-impinging, unlike-impinging and like-impinging configurations. Non-impinging oxidizer and fuel injector elements include: (a) coaxial or concentric injection elements, which will generally have a slower-moving central stream of liquid oxidizer surrounded by a higher velocity concentric sheet of gaseous fuel; (b) showerheads, providing directly axial, or near-axial, non-impinging streams of reactants; (c) fan formers, which provide sprays of reactants in cones or fans; and (d) slots and sheets, which contain narrow two-dimensional slots. Unlike-impinging oxidizer and fuel injector elements include: (a) unlike doublets, which direct a stream of one reactant against a different stream of another reactant, producing a fan-shaped spray made up of the mixture of two impinging streams; (b) unlike triplets, in which a symmetrical unlike injection element consists of an axial central stream of one of the reactants (either the fuel or the oxidizer) and two symmetrically-impinging outer streams of the other reactant; (c) quadlets; and (d) pentads (or other groupings of streams). Like-impinging oxidizer and fuel injector elements include: (a) like doublets, with two streams of the same reactant being angled together to an impact point, producing a fan-shaped spray of droplets; (b) like impending triplets, with three streams of the same reactant being angled together to a common impingement point; and (c) similar larger groupings of streams.

Different fuel and/or oxidizer orifices, and orifice sizes, can be employed to achieve desired injection pressures, injection velocities, flows and/or oxidizer to fuel mixture ratios. For a given thrust F, and a given exhaust velocity c, the total reactant flow $m=F/c$. Orifice types that can be employed include sharp-edged orifices, short tube with rounded entrance orifices, short tube with conical entrance orifices, short tube with spiral effect orifices and/or sharp edged cone orifices. With these (and other) types of orifices, the orifice diameters will generally vary depending upon the size of the apparatuses, and preferably range from about 0.0015 to about 6 inches, and more preferably range from about 0.01 to about 1.0 inches.

In order to cause additional oxidizer, and unburned fuel present in the incomplete combustion product produced in the first combustion chamber, that enter into a second combustion chamber or area of the apparatuses of the invention to become mixed well (rather than remaining separated), it is preferable that the oxidizer and unburned fuel become vortexed in the second combustion chamber or area, thereby causing the oxidizer and/or the unburned fuel (and preferably both) to spin. Such vortexing also permits the oxidizer and the unburned fuel to remain in the second combustion chamber or area for a longer residence time, and permits the unburned fuel to absorb more heat energy from the combustion reaction than would occur in the absence of vortexing. The vortexing of the oxidizer and the unburned fuel in the second combustion chamber or area (and in any optional additional combustion chambers and/or areas) can be achieved, or enhanced, in the same manners, and at the same angles, described above in connection with the first combustion chamber. It is preferable that both the oxidizer and the combustion product produced in the first combustion chamber be injected into the second combustion chamber at an angle. This can be achieved by drilling or otherwise placed oxidizer injector orifices into an oxidizer manifold at the desired angles, and by drilling or otherwise placing fuel port orifices into a fuel wear plate at the desired angles.

Although it is preferable that the vortexing processes described above, which employ turbulence and/or diffusion to achieve the mixing of fuel with oxidizer, occur in each of the combustion chambers and/or areas employed in the apparatuses of the invention, such vortexing is not necessary.

Water

One or more water supply control means permits the initiation, termination and/or regulation of one or more supplies of water to the apparatuses of the invention. The water supply control means may include one or more water feed lines that are attached to one or more sources of water and a pump, or any other suitable system.

Feed water enters the apparatuses of the invention at one or more locations and circulates around, but not in, the combustion chambers and/or areas of the apparatuses. Generally, water does not enter into the combustion chambers and/or areas of the apparatuses. The temperature of the water at each of these locations preferably ranges from about ambient temperature to about 260° F., and more preferably ranges from about 212° F. to about 250° F., with about 250° F. being most preferred. The water functions to cool the various components of the apparatuses, such as the sidewalls of the combustion chambers and/or areas, which become hot, so that these components maintain their structural integrity while being exposed to very high temperatures. In the absence of this water (or of other cooling agents or methods), some of the components of the apparatuses may lose their structural integrity at the high temperatures employed. During this cooling process, circulating water becomes transformed into a superheated steam product or a dry saturated steam product. Because the superheated steam product or dry saturated steam product is generally collected for use in the generation of electrical power (with an electrical power-generating apparatus or system), additional water (make-up water) is generally added to apparatuses to replace the water that becomes transformed into the superheated steam product or dry saturated steam product (using the mathematical equation set forth herein in the definition of "feed water"). Some of the water originally employed in the apparatuses of the invention (condensate and/or water that is not transformed into steam) can be collected and routed back to the apparatuses for further use therein.

The water employed in the apparatuses of the invention preferably circulates through a plurality of tubes that form one or more tube assemblies, which preferably form the sidewalls (or a portion of the sidewalls) of each of the combustion chambers and/or areas of the apparatuses. The tubes are preferably circular or oval in shape, but may be square, rectangular, triangular or in any other suitable shape. The more tubes that are employed for the circulation of the water, the larger the surface area of these tubes that will be present in the apparatuses. The larger the surface area of these tubes that is present in the apparatuses, the faster the water will cool the various components of the apparatuses that the water is near (by removing heat from the components), or comes into contact with, allowing the various components of the apparatuses to be exposed to more heat than would otherwise be possible without losing their structural integrity, and the faster the water will be transformed into a superheated steam product or dry saturated steam product that may be employed to produce electrical power (or for some other use).

The number of tubes that are preferably present in each of the one or more tube assemblies present in the apparatuses of the invention will generally be based upon the outer diameter of the tubes and the internal diameter of one or more outer housings that will generally be adjacent to the outside of the tube assemblies. The outer diameter of the tubes present in each tube assembly will generally determine the number of tubes that can be assembled around the internal circumference of a corresponding outer housing. For example, if an outer housing that is adjacent to a tube assembly has an internal diameter of about 14.725 inches, and if the individual tubes present in the tube assembly have an outer diameter of about 0.625 inches, approximately 58 tubes would be employed in the tube assembly (to line the internal diameter of the outer housing). The number of tubes that is preferable for use in a particular tube assembly in connection with a particular combustion chamber or area of an apparatus of the present invention may readily be determined by a person of ordinary skill in the art. The gas laws discussed below, and the web site www.rotronic-usa.com, may be employed as an aid in making this determination.

Water vapor can generally be considered as an ideal gas. By definition, an ideal gas follows the laws described below.

Boyle's Law states that, at a constant temperature, the product of the volume and pressure of a given amount of gas is a constant:

$$\text{pressure} \times \text{volume} = \text{constant}.$$

The value of the constant depends upon the amount of gas that is in the volume.

The Ideal Gas Law states that the product of the volume and pressure of a given amount of gas is proportional to absolute temperature:

$$\text{pressure} \times \text{volume} = n \times R \times T,$$

wherein n is the number of moles of gas, R the molar gas constant and T is the temperature. The constant R is equal to 0.08206 atm×liter/°K×mole or 8.30928 Pa×m3/°K×mole.

The pH of the water employed in the processes and apparatuses of the invention will preferably range from about 8.5 to about 12.7, and will more preferably range from about 10.5 to about 11.5.

An external treatment of the water that is employed in the processes and apparatuses of the present invention to improve its quality prior to its use may include clarification, filtration, softening, dealkalization, demineralization, deareation and/or heating, all processes which are known by those of skill in the art.

Depending upon the type of water that is available at the location of use of the processes and apparatuses of the invention (hard water, soft water, fresh water, salt water, and the like), it may be desirable to add commercially-available chemicals, such as phosphates, chelates, carbonates, sulfites (sodium sulfate and the like), alkalinity builders, amines (diethylhydroxylamine and the like) and/or polymers, to the water prior to use in an amount, and in a manner, known by those of skill in the art to reduce or remove impurities, such as the minerals calcium and iron, chemicals and organic matter, from the water and, thereby, reducing or preventing corrosion of components of the apparatuses. Calcium and magnesium hardness, migratory iron, migratory copper, colloidal silica and other contaminants should preferably be reduced to a minimum or removed. It is also preferable to remove oxygen, carbon dioxide and other noncondensable gases from the feed water. If permitted to remain in the water, such substances could possibly cause deposits to be formed in water transport tubes, causing the thickness of these tubes to increase, and water passageways to have a smaller diameter. The water passageways could eventually become completely clogged. Such results could cause the apparatuses of the invention to become less efficient (to require a higher amount of pressure to produce the same amount of heat), to malfunction or to completely cease functioning. AmSolv® (Lancaster, Tex.) markets a variety of industrial water treatment compounds that may be employed to inhibit scale and corrosion, and to otherwise treat water prior to use in the processes and/or apparatuses of the invention.

Further information concerning guidelines for water quality in modern industrial boilers, which are applicable to the water employed in the processes and apparatuses of the present invention, are provided by the American Society of Mechanical Engineers at the web site www.gc3.com. These criteria were established to assure the reliable and safe operation of boilers.

Combustion Processes

Combustion is a process that involves a chemical transformation between one or more fuels and one or more oxidizers in an exothermic (heat-releasing) chemical reaction. It is the rapid oxidation (combination with oxygen) of the fuel, resulting in the release of usable heat and the production of a visible flame. Combustion chemistry relates chemical potential energy to heat resulting from chemical reactions, and thermodynamics relate the heat to work.

Because most fuels contain carbon (which has 12.011 g/mol), hydrogen (which has 1.0079 g/mol) and sometimes sulfur, combustion with oxygen (which has 15.9994 g/mol) generally consists of the following three equations, which indicate reactants to the left of the arrow and combustion products to the right of the arrow:

carbon+oxygen→carbon dioxide+heat hydrogen+oxygen→water vapor+heat sulfur+oxygen→water vapor+heat Analysis of the combustion products proceeds on the basis of conservation of matter, with the amounts of each element being the same on both sides of the reaction equation.

Stoichiochemistry is the chemistry of mass balance in chemical reactions. Perfect combustion ("chemically correct" or "stoichiometric combustion") is obtained by mixing and burning exactly the right proportions of fuel and oxygen so that no reactants are left over (so that there is a complete combustion reaction in which there is no excess fuel or oxidizer). If too much oxidizer (or not enough fuel) is supplied, the mixture will be "fuel lean." If too much fuel (or not enough oxygen) is supplied, the mixture will be "fuel rich." A fuel rich mixture generally results in an "incomplete combustion" because all of the fuel particles combine with some oxygen, but they cannot get enough oxygen to burn completely. For example, if two atoms of carbon (instead of one) are mixed with two atoms of oxygen, the carbon atoms may share the available oxygen, but neither has enough to become carbon dioxide ($CO_2$). Instead, they may form carbon monoxide (CO), a compound that will burn to carbon dioxide if given more oxygen subsequently.

Environmental pollutants that are often generated in combustion processes include CO, $SO_2$, NOx, SOx, $NO_2$, $N_2O$, VOCs, hydrocarbons and particulate matter. The CO and the hydrocarbons are generally the products of an incomplete combustion. The $SO_2$ and the SOx are generally emitted as a consequence of burning fuels that contain sulfur compounds. The NOx, $NO_2$ and $N_2O$ are generally emitted as a consequence of the reaction of nitrogen compounds contained in a fuel with oxygen, or of a fuel with air. The particulate matter formation can be a consequence of a high ash content in the fuel.

Stoichiochemistry provides a chemical equation to calculate the amount of oxidizer, such as $O_2$, that is needed for a complete combustion of a particular fuel. Assuming the chemical formula for a fuel is:

$$C_aH_bO_cN_dS_e + a_s(O_2 + 3.76\ N_2) \rightarrow n_1CO_2 + n_2H_2O + n_3N_2 + n_4SO_2$$

wherein $a_s$ is the stoichiometric molar $O_2$-fuel ratio (with $O_2$ having a molecular weight of 32.000), and $n_1$ is the number of moles of the species in the product. From the law of the conservation of atoms:

$a = n_1$ $b = 2n_2$ $c + 2a_s = 2n_1 + n_2 + 2n_4$ $d + 7.52a_s = 2n_3$ $e = n_4$ $a_s = a + b/4 - c/2 + e$ $d/2 + 3.76\ (a+b/4-c/2+e) = n_3$

The stoichiometric oxygen-fuel ratio $A_s$ (mass) is:

$A_s = 32.000\ (4.76\ a_s)/(12.0a+1.0b+16.0c+14.0d+32.0e)$

Mole fraction of fuel $y_s = 1/(1+4.76\ a_s)$

Mass fraction of fuel $x_s = 1/(1+A_s)$

Equivalence ratio $\emptyset = A_s/A = (F/A)_{actual}/(F/A)_s$ $\emptyset < 1$ fuel lean mixtures of $A/F > A_s$ $\emptyset = 1$ stoichiometric mixtures of $A/F = A_s$ $\emptyset > 1$ fuel rich mixtures of $A/F < A_s$ The value of $A_s$ is assigned 15.0. However, the $A_s$ value can vary slightly. For example, this value is 14.30 for diesel, 17.12 for natural gas and 15.27 for gasoline. A fuel rich mixture has A/F<15 (usually between 10 and 12), and a fuel lean mixture has A/F>15 (usually between 17 and 21). For maximum power output, the preferred power mixture is a fuel rich mixture that has an A/F=12.

The same equations can be employed for different fuels and different oxidizers, substituting the molecular weight of the particular oxidizer chosen in place of the 31.998 value employed above for $O_2$. Further, commercially-available computer software programs may be employed to make the calculations described above (and below).

In the processes and apparatuses of the invention, the mass flow rates of reactants times burn time generally provides the total required mass of each reactant. The O/F mixture ratio (the ratio of oxidizer to fuel mass flow rates) may be determined using the following equation:

$$r = \frac{\dot{m}_o}{\dot{m}_f}$$

wherein the • above the m indicates the rate of m, or dm/dt, in kg/s. From the O/F mixture ratio, the total mass flow rate of reactant may be calculated as follows:

$$\dot{m} = \dot{m}_o + \dot{m}_f$$

The fractional flow rates of each component may be calculated using the following equations:

$$\dot{m}_o = \frac{r}{r+1} \cdot \dot{m}, \quad \dot{m}_f = \frac{1}{r+1} \cdot \dot{m}$$

The volumetric flow rates can be calculated from the mass flow rates by dividing their densities, which are known. For example, LOX has a density of 1.2 g/cm$^3$.

Additional information concerning combustion reactions, combustion chemistry and combustion analyses is present at the web sites www.innovatia.com, dbhs.wvusd.k12.ca.us/Mole/CombustionAnalysis.html, www.newton.dep.anl.gov, cesimo.ing.ula.ve/GAIA/CASES/MEX/tema7.html, www.osc.edu and www.uwm.edu.

Combustion Chambers and/or Areas

Figure 2:
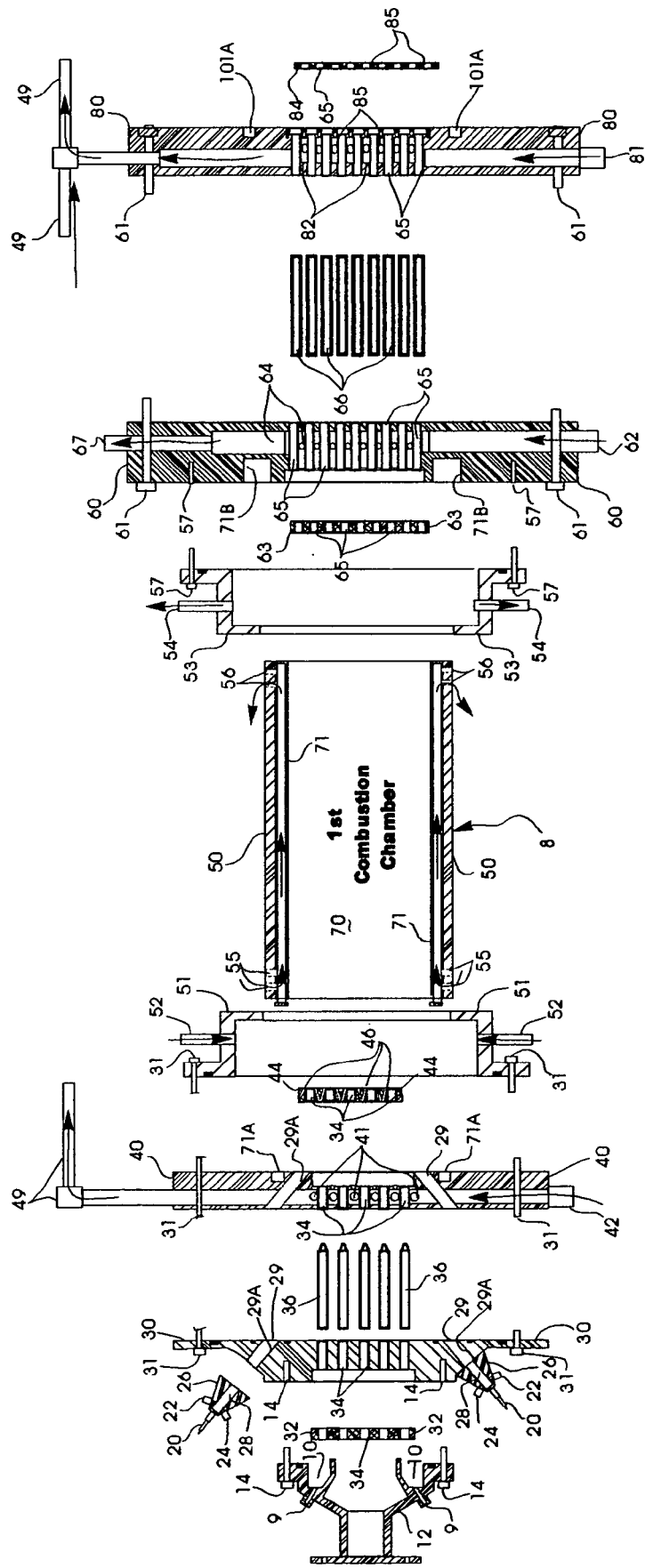
FIG. 2 is an exploded cross sectional diagram showing a portion of the hydrocarbon combustion gas generator shown in FIG. 1 that extends from the fuel inlet manifold 12 to the second transfer injector plate 84.
Figure 3:
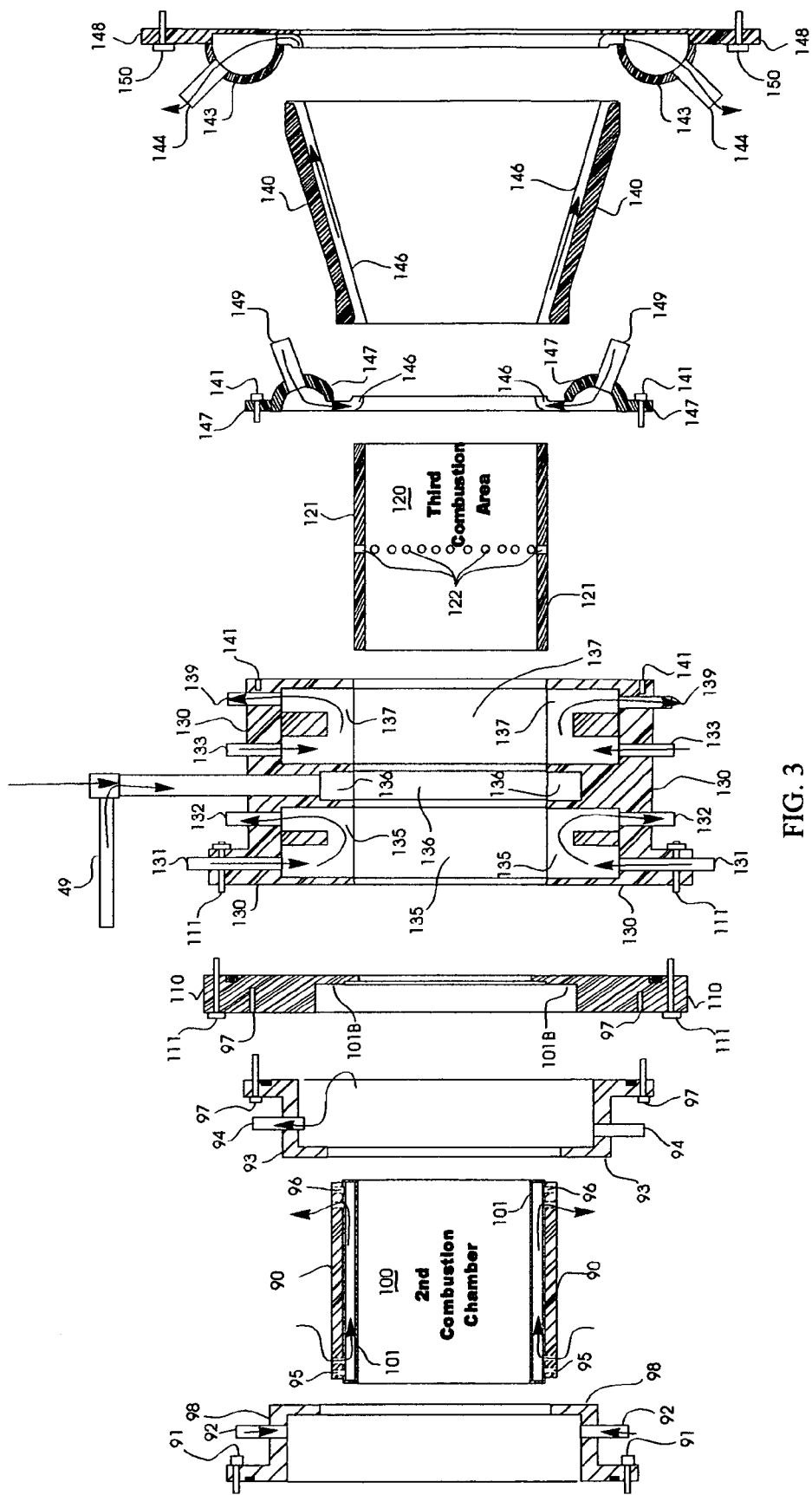
FIG. 3 is an exploded cross sectional diagram showing a portion of the hydrocarbon combustion gas generator shown in FIG. 1 that extends from the second water manifold 98 to the sixth superheated steam outlet 148.

The combustion chambers and/or areas employed in the apparatuses of the present invention, in which one or more combustion reactions occur, preferably have a hollow interior, and an exterior that faces away from the hollow interior. These combustion chambers and areas are preferably round, elongated, cylindrical hollow tubes that have an open forward end and an open aft end, and that have sidewalls formed by tube assemblies. However, they may be of any other suitable shape, such as oval, round, triangular, square or a coned shape. Further, the forward and/or aft end of the combustion chambers and/or areas may be closed by one or more other components of the apparatuses, as is shown in FIG. 1, FIG. 2 and FIG. 3. For example, in FIG. 1 and FIG. 2, the forward end of the first combustion chamber becomes closed with a first transfer injector plate and a first oxidizer manifold plate, with its aft end becoming closed with a fuel wear plate and a first water manifold plate.

At least two, and preferably three (or more), separate combustion processes occur during the processes, and in the apparatuses, of the invention, with a first partial combustion of fuel occurring in a first combustion chamber (or area), with a second partial (or a first complete) combustion of fuel occurring in a second combustion chamber (or area) and, optionally, when a complete combustion reaction has not occurred in a second combustion chamber (or area), with a third complete combustion occurring in a third combustion chamber (or area). It is possible to add additional combustion chambers (or areas) to the apparatuses of the invention, or to add additional combustion reactions to the processes of the invention. Because the fuel employed in the methods and apparatuses of the invention will likely become more disassociated into its constituent atoms, thereby decreasing the quantity of environmental pollutants present in exiting combustion gas exhaust products, such as CO, the production of which is reduced when a more complete burning of a fuel occurs, when three (or more), rather than two, separate combustion processes occur, it is preferable that three (or more) separate combustion reactions occur during such use. The last combustion reaction (in the last combustion chamber or area employed) should result in a complete combustion of the fuel, and each prior combustion reaction (in each prior combustion chamber or area) should result in an incomplete combustion of the fuel.

As is discussed hereinabove, it is preferred that the fuels, or fuel components, and oxidizers that are employed in the processes and apparatuses of the invention be introduced into the first and additional combustion chambers or areas of the apparatuses at angles that tend to induce a swirling (vortexing) effect in the combustion chambers or areas, which promotes a mixing of the fuels, or fuel components, and the oxidizers that is more thorough than would be otherwise (with no vortexing).

When using the apparatuses of the invention, or carrying out the methods of the invention, it is preferable that combustion, which first occurs in the first combustion chamber, occur over the entire length of the apparatuses (in each of the combustion chambers and/or areas present), rather than only in some of the combustion chambers or areas present in the apparatuses. It is also preferable that, in each of the two or more combustion chambers (or areas) present in the apparatuses, the combustion reaction occurs over the entire length of the combustion chambers (or areas), rather than over smaller portions thereof.

Further, it is preferable that at least about 97% percent of the fuel (or fuel blend or other mixture), and more preferably all (100%) of the fuel, that is employed in the processes and apparatuses of the invention is burned, with the high temperatures employed in these processes and apparatuses permitting the fuel to disassociate from molecules into atoms, such as H and O, with the remaining molecules being $H_2O$ and $CO_2$ (so that the combustion gas exhaust product that exits the last combustion chamber or area of the apparatuses will contain atoms and molecules that preferably are not environmental pollutants and/or hazardous materials, such as CO, NOx, $NO_2$, $N_2O$, SOx and/or $SO_2$). $CO_2$ can be captured, resulting in a reduction of the quantity of emissions of environmental pollutants, and used in the manner described herein.

It is recommended that care be employed in the processing of the combustion gas exhaust product that is produced in the last combustion chamber or area of the apparatuses of the invention, which may be extremely hot (at a temperature often ranging from about 2,500° F. to about 5,500° F., and more usually ranging from about 3,700° F. to about 5,000° F.). This combustion gas exhaust product may be permitted to escape into the atmosphere. Alternatively, it may be subjected to a cooling process, for example, in an exhaust heat recovery steam (or other) generator, or in a similar apparatus. The atoms that may be present in the combustion gas exhaust product (depending upon the type of fuels or fuel components that are employed), when cooled to a temperature below about 230° F., may reassociate into molecules. Some of these molecules, such as carbon monoxide, may be dangerous. Others may cause corrosion to metal components. Thus, it is preferable that the temperature of the combustion gas exhaust product be maintained at about 230° F. or higher.

The combustion reactions that occur in each of the combustion chambers and/or areas employed in the apparatuses of the invention produce large heat releases. Thus, in order to prevent damage to the various combustion chambers or areas (the potential melting of metal and/or loss of structural integrity), it is preferable that the sidewalls of each of the combustion chambers and areas employed in the apparatuses be actively cooled, for example, using water or another suitable coolant or method. In the apparatuses of the invention, it is preferable that water be employed as a coolant to achieve this result. The water, however, is not injected into any of the combustion chambers or areas, and does not come into contact with the fuel or oxidizer reactants, or with the combustion gas exhaust product. Rather, the water may be present in tubes contained in tube assemblies that generally form the sidewalls (or portions thereof) of the combustion chambers and/or areas.

Ignition Devices

One or more means for initiating a combustion reaction of a combustible mixture of one or more fuels, or fuel components, and oxidizers to produce the release of heat, which may be the same or different, may be employed in the processes and apparatuses of the invention.

The release of chemical energy stored in fuels, or fuel components, with the use of one or more oxidizers can be initiated by a number of different methods, or using a number of different igniters, known by those of skill in the art. The selection of one or more suitable ignition systems depends upon the nature and phase of the fuels, or fuel components, and oxidizers employed, system safety and like considerations. However, all ignition methods and devices have one overriding goal in common, which is the rapid and reliable ignition of incoming fuels, or fuel components, and oxidizers before the accumulation of reactive material. Fuels and oxidizers entering one or more combustion chambers or areas that are not promptly ignited can cause explosive mixtures to form and detonate.

The igniters employed in the processes and apparatuses of the invention may derive power from an outside source, or from a limited quantity of internally stored energy.

Once ignited, fuel and oxidizer will generally remain ignited. Thus, although it is possible, it is not necessary to maintain the operation of an ignition source throughout the operation of the processes and apparatuses of the invention.

Igniters that may be employed in the processes and apparatuses of the invention, with or without the use of catalysts, and that may be built into, mounted to or otherwise attached to, the apparatuses of the invention, include, but are not limited to: (a) pyrotechnic igniters (electrically initiated slow-burning pyrotechnic torches that typically have a burn duration in the range of from about 2 to about 10 seconds); (b) hyperbolic igniters (igniters that ignite spontaneously when fuel and oxidizer first meet); (c) spark plugs (igniters that produce a spark); (d) spark-torch igniters (igniters in which small amounts of fuel and oxidizer are fed into an igniter combustor, and are ignited by electric sparks, with the flame output being channeled to the required area and, in turn, igniting the fuel and oxidizer employed in the main combustion processes); (e) combustion-wave igniters (igniters having branched outputs providing multipoint ignition sources from a single precombustor, and having an electric spark that initiates combustion in a premix chamber); and (f) resonance igniters (igniters that use a flow of pressurized gaseous fuel to create resonance heating that will start igniter reactants, causing igniter exhaust, with or without oxidizer augmentation, that is employed to ignite fuel and oxidizer as they enter a combustor).

Non-Polluting Products

Advantageously, the methods and apparatuses of the present invention produce products, such as a superheated steam product, a dry saturated steam product and/or a combustion gas exhaust product, that are generally environmentally clean. These products each generally contain no (0 weight percent), or low quantities (preferably less than about 40 weight percent, more preferably less than about 30 weight percent, still more preferably less than about 20 weight percent, still more preferably less than about 10 weight percent, and still more preferably less than about 5 weight percent) of environmental pollutants and/or hazardous materials.

When one or more of the products produced by the methods and apparatuses of the present invention do contain some quantity of one or more environmental pollutants and/or hazardous materials, such as $CO_2$, the amount of these one or more environmental pollutants and/or hazardous materials will generally be significantly reduced in comparison with fuel-burning processes and apparatuses for producing steam or electrical power that employ air, or that permit air to come into contact with fuel, oxidizer or water employed therein, with combustion gases or combustion gas products produced thereby, and/or with components thereof (combustion chambers and the like), including conventional processes for producing steam or electrical power, such as conventional coal- and natural gas-burning steam-production and electrical power-production processes, when: (a) the same fuel, and the same amount of that fuel, is combusted; (b) the same fuel is combusted, and the same amount of steam, electrical power or energy is produced; or (c) one of the fuels of the invention is employed in the processes or apparatuses of the invention. In situation (c), the emissions of environmental pollutants and/or hazardous materials will generally be lower than in situations (a) and (b) as a result of the use of one of the fuels of the invention. However, in each of situations (a), (b) and (c), the amount of the one or more environmental pollutants and/or hazardous materials will generally be reduced by at least about 50%, and more usually by at least about 75%, and still more usually by at least about 90%. Example 1 hereinbelow shows a 97% reduction of $CO_2$ when EF-15 fuel and LOX are employed in an apparatus of the invention in comparison with the use of coal in a conventional coal-burning plant.

The type and quantity of any environmental pollutants and/or hazardous materials produced by the methods and apparatus of the present invention generally depends upon the purity of the fuels, or fuel components, and oxidizers employed, the type of the fuels, or fuel components, employed, the number and type (incomplete or complete) of combustion reactions that occur and the characteristics of the particular process or apparatus employed, and may readily be determined by those of skill in the art. However, regardless of the foregoing variables, the quantity of environmental pollutants and/or hazardous materials produced by the methods and apparatus of the present invention will generally be significantly lower than the quantity of environmental pollutants produced by fuel-burning processes and apparatuses for producing steam or electrical power that employ air, or that permit air to come into contact with fuel, oxidizer or water employed therein, with combustion gases or combustion gas products produced thereby, and/or with components thereof (combustion chambers and the like).

The superheated steam product or dry saturated steam product that may be produced by the methods and apparatuses of the present invention, which are generally two of the major products that may be produced by these methods and apparatuses, usually do not contain any (0%) environmental pollutants or hazardous materials.

Further, the combustion gas exhaust product produced by the processes and apparatuses of the invention, which is generally the other of the two separate products produced by these methods and apparatuses, will often contain only water and carbon dioxide and, possibly, some metals (if metals were present in the fuel or fuel components initially). The combustion of the fuels, or fuel components, and oxidizers at the high temperatures, and in the multiple combustion reactions, described herein generally causes environmental pollutants that would otherwise be present in the combustion gas exhaust products to be eliminated (or to be significantly reduced). For example, if the rubber from scrap tires is employed as the only fuel in the processes and apparatuses of the invention, the rubber will generally be converted into water and carbon dioxide.

Figure 14:
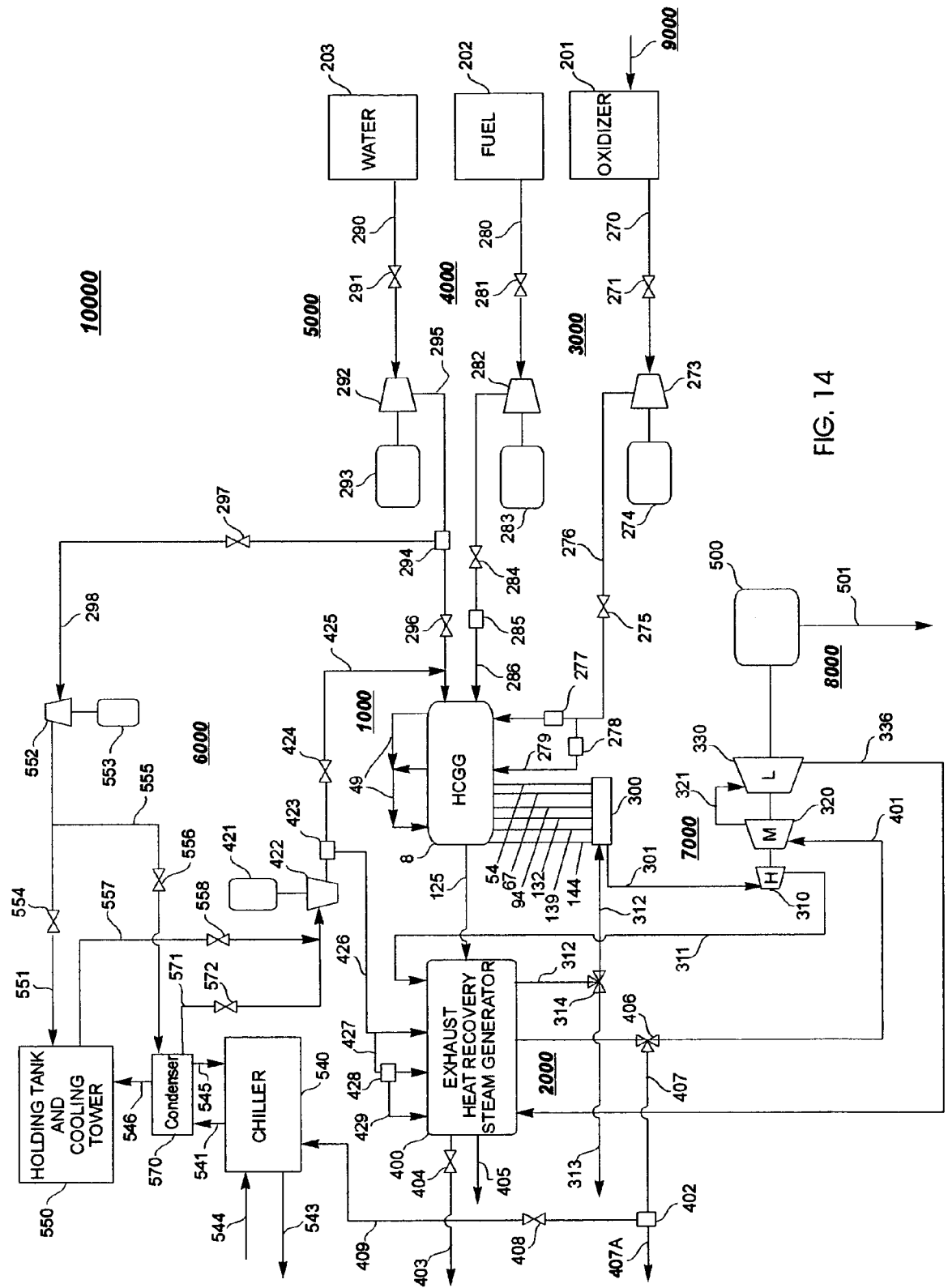
FIG. 14 is a schematic drawing showing an embodiment of the invention, its elements and connectivity that constitute an efficient, non-polluting trigeneration steam energy generating plant employing a hydrocarbon combustion gas generator of the present invention. Reactants are shown being introduced to the system from sources that may be either on-site or adjacent production facilities, or from storage facilities.

Moreover, the additional (separate) steam that may be generated through heat transfer from combustion gas exhaust products produced by the processes and apparatuses of the invention, for example, if they are permitted to enter into a boiler, or into an exhaust heat recovery steam generator, as is shown in FIG. 14, rather than being released into the atmosphere, generally do not contain any (contain 0%) environmental pollutants. This is because, in contrast with many other methods and apparatuses for producing steam, power or energy, the combustion gas exhaust products produced by the processes and apparatuses of the present invention generally do not come into contact with the steam.

If any environmental pollutants and/or hazardous materials are produced by the methods and/or apparatuses of the present invention, they will generally be present in the combustion gas exhaust product produced in the last combustion chamber or area, for example in the second combustion chamber if a third combustion area is not employed, and will generally depend upon the elements that are present in the particular fuels or fuel components employed. The amount of such environmental pollutants and/or hazardous materials will generally be below the amount of environmental pollutants and/or hazardous materials present in a combustion gas exhaust product produced by the combustion of the same (or a different) fuel, and the same amount thereof, in a conventional fuel-burning apparatus, facility or process, such as a conventional coal-burning power plant or a conventional boiler, many of which employ air as the oxidizer and/or burn fuel incompletely, as measured in pounds of pollutant per million standard cubic feet of fuel fired, in tons per year, in emission factor rating, or by any other suitable method. Such amount generally ranges from about 0 to about 5 weight percent, and preferably ranges from about 0 to about 3 weight percent, and still more preferably ranges from about 0 to about 1 weight percent. For example, if natural gas is employed as the fuel in a process or apparatus of the invention, the only components that will generally be present in the combustion gas exhaust product produced will be the molecules of water vapor ($H_2O$) and $CO_2$. The water vapor is non-hazardous and non-polluting, and the $CO_2$, which is not a criteria air pollutant, can be captured and used in the manner described herein.

Further, depending upon the fuels or fuel components employed, the methods and apparatuses of the present invention generally do not produce, or significantly reduce the quantity of, NOx or mercury (in the combustion gas exhaust product that exits the last combustion chamber or area of the apparatuses of the invention or elsewhere). These methods and apparatuses can generally achieve up to a 100% reduction in the emissions of these environmental pollutants or hazardous materials in comparison with conventional methods for producing energy, electricity or steam (any type) that generate environmental pollutants and/or hazardous materials, such as coal-burning power plants.

Moreover, depending upon the fuels or fuel components employed, the methods and apparatuses of the invention generally either do not produce, or significantly reduce the quantity of, other environmental pollutants and hazardous materials (in the combustion gas exhaust product that exits the last combustion chamber or area and elsewhere), including NO, $NO_2$, $N_2O$, $NH_3$, SOx, $SO_2$, CO, HCl, $CH_4$, volatile organic compounds, benzene, hydrogen fluoride, hydrogen sulfide, poly-aromatic compounds, hexachlorobutadiene, ethylene dibromide, dioxin, arsenic, uranium, thorium, radium, radon, polonium, bismuth and lead, other carcinogenic, mutagenic and/or radioactive substances and particulate matter in comparison with other methods and apparatuses for producing energy, electricity or steam (any type) that generate environmental pollutants and/or hazardous materials, such as conventional coal-burning power plants. For example, in comparison with a conventional coal-burning power plant, the methods and apparatuses of the present invention will generally reduce the emissions of the foregoing environmental pollutants and hazardous materials by at least about 50 percent, and will preferably reduce the emissions of these environmental pollutants and hazardous materials by at least about 75 percent, and will still more preferably reduce the emissions of these environmental pollutants and hazardous materials by from about 90 to about 100 percent. Thus, the amount of air pollution produced by the processes and apparatuses of the present invention is generally significantly reduced or eliminated in comparison with the air pollution caused by other conventional methods for producing energy, electricity or steam, such as the methods employed by conventional coal-burning power plants.

The combustion gas exhaust product produced in the final (last) combustion chamber or area by the methods and apparatuses of the invention is generally environmentally clean, and will preferably contain an amount of environmental pollutants and/or hazardous materials that range from about 0 to about 30 weight percent, that more preferably ranges from about 0 to about 7 weight percent, and that still more preferably range from about 0 to about 1 weight percent of the combustion gas exhaust product. Further, some environmental pollutants, such as $CO_2$ and $SO_2$, that may be produced by the processes and apparatuses of the present invention, depending upon the fuel or fuel components that are employed, may generally be recovered using conventional methods and equipment and sold to various companies that use such chemicals to generate revenue. For example, when hydrogen is employed as the fuel in the processes and apparatuses of the invention, the only products that will generally be present in the combustion gas exhaust product will be heat and water. Thus, the combustion gas exhaust product will generally have 0% environmental pollutants and hazardous materials. The superheated steam product or dry saturated steam product will generally also have 0% environmental pollutants and hazardous materials.

Many energy-producing companies use coal as the fuel in their processes and apparatuses. A typical 500-megawatt coal-burning power plant produces 3.5 billion kilowatt-hours of electrical power per year, which is enough to power a city of about 140,000 people. To produce this amount of electrical power, the power plant needs to burn about 1.43 million tons of coal per year. The table below provides a comparison between the amounts of the environmental pollutants and/or hazardous materials sulfur dioxide, nitrogen oxides, carbon dioxide, carbon monoxide, arsenic, lead, cadmium, small particles (in particulate matter), ash and sludge produced per year by a coal-burning power plant that burns 1.43 million tons of coal per year and that would be predicted to be produced, based upon a theoretical analysis, by an apparatus of the present invention that produces the same amount of electrical power using a fuel of the invention designated EF-10, which may have an energy value of about 31,680 Btus per pound.

Pollutants from Burning 1.43 Million Tons of Fuel

| Pollutant | Coal-Burning Power Plant | Apparatus of the Invention |
|---|---|---|
| Sulfur Dioxide ($SO_2$) | 10,000 Tons | 0 Tons |
| Nitrogen Oxides (NOx) | 10,200 Tons | 0 Tons |
| Carbon Dioxide ($CO_2$) | 3,700,000 Tons | 243,646 Tons |
| Carbon Monoxide (CO) | 720 Tons | 0 Tons |
| Arsenic | 225 Pounds | 0 Pounds |
| Lead | 114 Pounds | 0 Pounds |
| Cadmium | 4 Pounds | 0 Pounds |
| Small Particles (in Particulate Matter) | 500 Tons | 0 Tons |
| Ash | 125,000 Tons | 0 Tons |
| Sludge | 193,000 Tons | 0 Tons |
| Total | 4,039,763 Tons | 243,646 Tons |

This table shows that, when the same amount of electrical power is produced, the processes and apparatuses of the present invention produce no sulfur dioxide, no nitrogen oxides, no carbon monoxide, no arsenic, no lead, no cadmium, no particulate matter, no ash, no sludge and a significantly smaller quantity of the pollutant carbon dioxide (about 15 times less), and reduce the total amount of environmental pollutants and/or hazardous materials produced by about 94%, in comparison with a conventional coal-burning power plant.

In contrast with many conventional methods for producing electrical power, the apparatuses of the present invention do not generally require the use of any pollution control devices or systems, such as an air pollution control device (APCD), to maintain the products of the apparatuses (superheated steam product, dry saturated steam product, combustion gas exhaust product and steam products produced using the combustion gas exhaust product) environmentally clean.

Capture, Separation and Use of $CO_2$

If $CO_2$ is produced by the processes and/or apparatuses of the present invention, for example, in the combustion gas exhaust product, up to about 90% (or higher) of the $CO_2$ can, optionally, be captured and separated from other components, such as $H_2O$, using conventional methods and equipment, for example, chemical absorption using a solvent, such as monoethanolomine, physical absorption, cryogenic distillation and/or membrane separation techniques. The Wittemann Company, LLC (Palm Coast, Fla.), for example, markets $CO_2$ recovery systems and equipment that extract $CO_2$ from products, such as off-gases, and clean the $CO_2$ to a desired or required purity level using techniques such as sulfur, activated carbon and NOx removal techniques, scrubbing, dehydration, liquefaction and stripping. The resulting $CO_2$ may then be liquefied and employed in the cryogenic grinding process described herein. Alternatively, the $CO_2$ may be sold to a variety of end-users, such as the microalgae production, brewing, soft drink, distillery, food, refrigeration, inerting applications and/or industrial gas industries, thus, both reducing atmospheric emissions of $CO_2$ and producing an additional source of revenue. In addition, the $CO_2$ may advantageously be used to produce dimethylcarbonate (DMC), which has a large estimated market potential, and which offers the environmental benefit of replacing phosgene. The $CO_2$ could also be sequestered by storing it, for example, in various underground storage media, including the ocean, aquifiers and depleted oil and gas wells, or in above ground media, including insulated tanks, or by injecting the $CO_2$ into coal formations.

$CO_2$ capture and/or separation equipment may, optionally, be attached to the apparatuses of the present invention (generally at the aft end of the apparatuses, where the combustion gas exhaust products exit the apparatuses), or otherwise installed thereon.

Conversion of Water to a Superheated or Dry Saturated Steam Product

The processes and apparatuses of the present invention convert water that is introduced into the apparatuses outside of the combustion chambers and/or areas into a superheated or dry saturated steam product that may contain superheated steam, dry saturated steam and/or both types of steam at one or more locations. The superheated steam, dry saturated steam and/or combination of the two steams can exit the apparatuses of the invention at one or more locations (through one or more superheated steam exit means) and travel into a central or other superheated steam product collection device. The superheated steam and dry saturated steam can, optionally, be separated using conventional steam separation equipment, and can be used (each one separately or together) to produce electrical power, for example, in a steam turbine. Generally, when superheated steam and dry saturated steam travel towards a turbine (or other electrical power generating device) together, the metal passageways leading to the turbine withdraw some of the Btus of energy away from the superheated steam and dry saturated steam, causing both types of steam to drop in temperature. However, the superheated steam generally gives these Btus of energy back to the dry saturated steam.

Water can exist as a solid, liquid or gas (vapor). Which state water is in depends upon the heat energy content of the water, and the space in which the water is confined, with definite relationships existing between temperature, pressure and specific volume of water. Under normal atmospheric temperature conditions, water is a liquid. However, if heat is added to the water, the heat will raise the temperature of the water. The amount of heat necessary to raise the temperature of one pound of water one degree Fahrenheit is one Btu. The heat that is added to water to raise the temperature of the water is called the "sensible heat." Once sufficient sensible heat is contained in the water to reach the maximum temperature for the existing pressure, more heat added will change the water from a liquid to a vapor (gas). Then, the water is called steam. At 0 psig, if 970 Btus are added to one pound of water, one pound of steam is produced. That 970 Btus of heat added to the water to make steam is called "latent heat." When sufficient heat has been added for all of the water to become steam, the steam is said to be dry and saturated (dry saturated steam). In a vessel at atmospheric (0 psig) pressure, one pound of water will have a total heat content of 1150 Btus.

As a result of its unique qualities, steam is the most widely produced form of heat energy and work energy transfer medium in existence. Steam has a high usable heat content. A small amount of steam can give up a large amount of latent heat at a constant pressure. Thus, the steam is valuable as a heat transfer medium in processes in which temperature can be controlled. Also, steam is produced from a plentiful and relatively cheap raw material, water. Moreover, when water changes to a vapor, it is colorless, odorless and tasteless, so that it can be used in processes that are sensitive to these factors. Additionally, water can be used over and over again to produce additional steam, thereby permitting almost the entire amount of heat used in producing steam to be transferred to the process, and preserving the water. Further, the steam may be distributed and controlled with distribution pipes and heat exchange equipment because of the constant, repeatable characteristic relationship of pressure, temperature and volume.

If 1 kg (mass) of water (which is 1 liter, by volume) is all converted into steam, the result will be exactly 1 kg (mass) of steam. However, the volume occupied by a given mass depends upon its pressure. At atmospheric pressure, 1 kg of steam occupies nearly 1.673 cubic meters (m3). At a pressure of 1 bar abs, that same 1 kg of steam will only occupy 0.1943 m3. The volume of 1 kg of steam at any given pressure is termed its "specific volume" (Vg).

Steam often carries tiny droplets of water with it. When this occurs, the steam cannot be described as dry saturated steam. As long as water is present, the temperature of saturated steam will correspond with the figure indicated in conventional steam tables for a particular pressure. However, if heat transfer continues after all of the water has been evaporated, the steam temperature will again rise (from additional heat being added to the steam). The resulting steam is called "superheated steam." The temperature rise of steam above saturated steam temperature at a given pressure is called its "superheat temperature." Superheated steam can be at any temperature above that of saturated steam at the corresponding pressure. For example, if steam at 100 psig is allowed to superheat above its 338° F. saturation temperature to 438° F., it is said to have 100" of superheat (438–38=100). This extra 100° F. rise in temperature can be achieved with only a small increase in heat content (60 Btus per pound). A pound of this superheated steam can rise in temperature at the rate of only 0.6 Btu/° F., compared to the 1 Btu/pound ° F. of water. Only 4.8% of the total heat is superheat, but the temperature is much higher.

Steam quality is described by its "dryness fraction," which is the proportion of completely dry steam present in the steam being considered. The steam becomes "wet" if water droplets in suspension are present in the steam space, carrying no specific enthalpy of evaporation. "Wet steam" has a heat content substantially lower than that of dry saturated steam at the same pressure. The small droplets of water in wet steam have weight, but occupy negligible space. The volume of wet steam is, therefore, less than that of dry saturated steam.

Volume of Wet Steam=Volume of Dry Saturated Steam*Dryness Fraction

The dryness fraction of the steam generally depends upon the particular steam production apparatus design and capacity.

Superheated steam has several important properties that make it ideal for work and mass transfer.

First, by definition, superheated steam is totally dry steam, and follows the known gas laws. This is beneficial because, when water carryover occurs in a combustion apparatus, such as a boiler or generator, although the water can be removed from the steam (with steam separators and/or steam traps present in steam outlets), the separation of water from steam can still be complex. However, if a small amount of superheat is added to the steam, the water carryover can be vaporized to absolutely dry steam. In this way, the damage potential of wet steam, which can be extremely destructive to turbines and other power generating equipment, can be removed.

Second, although superheated steam drops in temperature as it gives up its superheat, superheated steam can lose heat without condensing. When superheated steam gives up some of its enthalpy, it does so by virtue of a fall in temperature. No condensation will occur until the saturation temperature of the steam has been reached. Saturated steam, in contrast, cannot lose heat without condensing. Saturated steam readily condenses on any surface that is at a lower temperature than the saturated steam, and gives up the enthalpy of evaporation, which is the greater proportion of its energy content. Thus, as saturated steam passes through long distribution mains, it loses some heat through the pipe and the insulation, resulting in some of the saturated steam condensing therein. The resulting water, if not removed, can cause erosive damage to piping, valves, heat exchange equipment, turbines and similar equipment. In contrast, no condensate exists in distribution mains that contain superheated steam. Further, steam that is slightly superheated can be transported through very long lines without losing sufficient heat to condense, thereby eliminating the danger of damage.

As steam pressure rises, the total heat available rises. If pressure is reduced through valves, there is extra heat available in the lower pressure steam. The pressure reduction causes a small amount of superheat to exist in this steam.

The primary reason for producing superheat in the processes and apparatuses of the present invention is to achieve a safe and efficient transfer or work energy in a wide variety of applications requiring the generation of powerful forces, such as pumps, engines, turbines and other power generating equipment. As steam enters a turbine, it is permitted to expand to do work through increased velocity while releasing its heat. In contrast, saturated steam will condense as its heat is lost. Condensate in a turbine will reduce the space available for steam to enter. This reduces the work energy availability, and it can cause damage to the turbine, especially when it exits at a high speed. Consequently, superheated steam is preferred for use in the above-described applications. Superheated steam can expand, giving off its excess heat without condensing. Depending upon the efficiency of work energy desired, and the power requirements, the superheat may or may not be permitted to condense in the turbine. In high speed light rotor turbines, the fragility of the rotor vanes, and the velocities of steam passage, often require dry steam operation. In either case, turbine operation using superheated steam is more efficient than using dry saturated steam (less steam is required to produce the same result when superheated steam is employed in comparison with dry saturated steam).

Because superheated steam may not be present in the apparatuses of the invention at start-up (when the apparatuses are first turned on), manually opening (or other) valves can be employed at this point in the operation to remove water (because time is generally available to open and close the valves). However, emergencies such as superheater loss and bypass could require operation of the apparatuses on saturated steam. During such potential unscheduled shutdowns, no time may be available for manually opening valves. Thus, various types and sizes of steam traps, such as conventional bimetal traps, piston-type traps, float traps and/or inverted bucket traps, may, optionally, be employed to drain condensate instead. In the system shown in FIG. 14, these steam traps may be positioned at any one or more of a wide variety of locations to insure the production and transport of the highest quality of steam. A person of skill in the art could readily determine desirable locations for such stream traps. A properly sized and tight shut-off inverted bucket steam trap is preferred for superheat conditions. The condensate load to a steam trap used on superheat can vary widely from heavy start-up loads to virtually no load.

During start-up, very large lines may be started from cold conditions. At low pressures, only saturated steam may be in water lines and water tubes (until the line temperature can be increased). This is preferably accomplished over time in order not to stress the lines, which will generally be less than about 5 minutes. Typical start-up loads can be calculated as follows:

$$C = \frac{W \cdot (t_1 - t_2) \cdot 114}{H}$$

where:
C=amount of condensate (in pounds);
W=total weight of pipe (in pounds);
$t_1$=steam temperature (in ° F.);
$t_2$=ambient temperature (in ° F.); and
H=latent heat of steam (in Btus per pound).

With respect to the H variable, for long warm-up times, the total heat of saturated steam at the superheated steam supply pressure minus the sensible heat of saturated steam at the average pressure during the warm-up time involved should be used.

The chemical energy that is contained in the hydrocarbon or other fuels, or fuel components, that are employed in the apparatuses of the invention becomes converted into heat energy when the fuels are burned. That heat energy becomes transmitted through the sidewalls of combustion chambers and/or areas present in the apparatuses to water that is preferably present in tube assemblies. The temperature of the water is raised by this addition of heat energy until its saturation point is reached (until the water boils). The heat energy that has been added to the water, and which has had the effect of raising the temperature of the water, is known as the "liquid enthalpy." At the point of boiling (at about 212° F.), the water is termed "saturated water." Heat transfer continues to occur between the sidewalls of the combustion chambers and/or areas and the water. The additional enthalpy produced by this heat transfer generally does not increase the temperature of the water. Rather, it evaporates the water, which changes the state of the water into steam. The enthalpy that produces this change of state without a change of temperature is known as the "enthalpy of evaporation."

As a result of the release of a high-quality heat energy superheated or dry saturated steam product produced by the high temperature combustion processes that occur in the different combustion chambers and/or areas of the apparatuses of the invention, and of the water that circulates near each of these combustion chambers and/or areas, the apparatuses transform the water into an efficient, high-energy and high-purity superheated or dry saturated steam product, generally at least at the locations of each of the different combustion chambers and/or areas, as is shown in FIG. 1. The temperatures employed in the processes and apparatuses of the present invention are so hot that the water generally becomes converted into a superheated or dry saturated steam product instantaneously, or almost instantaneously. The superheated or dry saturated steam product produced is then channeled through one or more superheated steam product exit means to one or more superheated steam product collection devices. From these collection devices, the superheated or dry saturated steam product is generally transported to electrical power generation devices, such as steam turbines, where the energy in the form of superheated steam and/or dry saturated steam is converted into mechanical energy. The mechanical energy drives the power generation device which, in turn, produces electricity.

The amount of superheated or dry saturated steam product produced by the processes and apparatuses of the present invention will vary, depending upon the size of the particular apparatus employed. An apparatus of the invention having a size as is described in Example 1 hereinbelow is capable of producing from about 18,880 to about 36,500 pounds per hour of dry saturated steam, and from about 16,320 to about 31,100 pounds per hour of superheated steam, at the temperatures and pressures described in Example 1, and preferably produces about 36,466 pounds per hour of dry saturated steam and about 31,062 pounds per hour of superheated steam. This amount of dry saturated steam and superheated steam could generate about 10 megawatts of electricity per hour.

The weight percents of superheated steam and dry saturated steam that are present in each superheated or dry saturated steam product produced by the processes and apparatuses of the invention will generally depend upon the particular temperatures and pressures employed, and can be readily manipulated by those of skill in the art using, for example, conventional temperature and/or pressure relief valves at one or more various locations on the apparatuses.

The superheated or dry saturated steam product produced by the processes and apparatuses of the invention generally contains from about 0 to about 100 weight percent of dry saturated steam, and from about 0 to about 100 weight percent of superheated steam. Because dry saturated steam condenses as its heat is lost, it is preferable that the product that is produced by these processes and apparatuses contain 100 weight percent superheated steam, rather than 100 weight percent dry saturated steam or a combination of superheated steam and dry saturated steam. If the superheated or dry saturated steam product produced by the processes and apparatuses of the invention does contain dry saturated steam, it is preferable that the weight percent of the dry saturated steam in the superheated steam product does not exceed about 76 weight percent (with the remainder of the 100 weight percent generally being superheated steam), and more preferably not exceed about 30 weight percent (with the remainder of the 100 weight percent generally being superheated steam). The dry saturated steam can be separated from the superheated steam using conventional steam separation equipment. If any water and/or wet steam is initially present in the products produced by the processes and/or apparatuses of the invention, the water and/or wet steam can be separated from the dry saturated steam and/or superheated steam using conventional equipment, such as defecators.

Additional information concerning superheated steam, dry saturated steam and steam superheaters generally is present at the web sites www.armstrong-intl.com, www.gebetz.com, www.forbesmarshall.com and www.abcoboilers.com.

Steam Produced by the Combustion Gas Exhaust Product

The hot combustion gas exhaust product that exits the last combustion chamber or area of the apparatuses of the invention is preferably attached to another source of water, such as a conventional boiler, or an exhaust heat recovery steam generator, as is shown in FIG. 14, where the combustion gas exhaust product can be cooled to a temperature of about 230° F. or higher and, thereby, produce a separate steam product (separate from the superheated or dry saturated steam product produced by the apparatuses), which may contain wet steam, saturated steam, dry saturated steam, superheated steam or any other type of steam, or any combination in any weight percent of any of the foregoing types of steam. The various types of steam that are present in this steam product may then be separated from each other using conventional steam separating equipment, so that the different types of steam can be separately used in various applications. Any superheated steam or dry saturated steam produced will generally be used in the same manner described above in connection with the superheated or dry saturated steam product produced by the apparatuses of the invention. Any wet steam produced will preferably be transported to an overflow area, where it can go through a condenser and be permitted to condense. It can then be discharged to a holding pond (or otherwise), or recirculated back into the hydrocarbon combustion gas generator and used as make-up water. Alternatively, the wet steam can be separately sold to manufacturers or others that employ wet steam in processes that they perform, such as the owners or captains of ships, food manufacturers, paper manufacturers and pharmaceutical manufacturers.

The heat energy produced by the processes and apparatuses of the invention may also be employed for steam absorption, water chilling, drying, heating and like processes, including quadgeneration (the simultaneous or consecutive generation of power, steam, chilled water and/or hot water, or of another mix of products).

The purity of the steam product (steam purity) that may be produced using the combustion gas exhaust product that exits the final combustion chamber or area of the apparatuses of the invention is preferably below about 1.0 ppm total solids, and is more preferably below about 0.1 ppm total solids.

A combustion gas exhaust product produced by an apparatus of the invention having a configuration as is shown in FIG. 1, and being a free-standing unit that is approximately 10 to 14 feet long, 2 to 3 feet wide and 5 feet high, and that is diverted to an exhaust heat recovery steam generator, such as is shown in FIG. 14, can generate from about 10 to about 15 megawatts of electricity (in addition to the electricity that can be generated by the superheated or dry saturated steam product that is produced by the apparatus). Combustion gas exhaust products that are produced by larger apparatuses of the invention, and that are diverted to exhaust heat recovery steam generators, could produce quantities of electrical power that are greater than about 10 to about 15 megawatts of electricity (in addition to the electricity that could be generated by the superheated steam or dry saturated products produced by the apparatuses).

Size, Type and Transportability of Apparatuses

The apparatuses of the present invention can be produced in any desired or convenient size and/or shape capable of producing desired results, and may be scaled in size to properly fit a wide variety of industrial applications, such as the generation of electrical power independent from the power grid, stand-by emergency electrical power, for example, during a failure of the power grid, use during peak use times, portable remote site electrical power, steam train electrical power, ocean-traveling vessel electrical power and similar applications. The apparatuses may be employed to provide electrical power to individual users with especially large requirements, such as factories and hospitals, in power parks, and inside and/or outside of buildings (or of other partially or completely enclosed structures).

The apparatuses of the invention, which may generally be produced within a period of about 90 days or less, and which preferably have no, or few, moving parts, may be compact, and can advantageously be freestanding (stand-alone) generation systems or supplemental generation systems (supplemental to, or integrated with, some other type of a system or apparatus) for the efficient production of a sufficient amount of reliable electrical power for peak power demand and uninterruptible electrical users. The apparatuses may be easily installed and serviced, with removable parts being easily replaced, are compatible with conventional electrical generating systems, and can be retrofit into existing power generation systems having burned-out or obsolete boilers.

A preferred hydrocarbon combustion gas generator of the invention, which could generally produce from about 5 to about 30 megawatts (mw) of electricity per day, is a freestanding unit that is approximately 10 to 14 feet long, 2 to 3 feet wide and 5 feet high (including 3-foot legs), and that is placed on a slab of concrete (or other durable material) that is approximately 10 feet long and 10 feet wide. Such a hydrocarbon combustion gas generator would require from about 3.75 to about 100 times less space than that of conventional electrical power producing plants, while producing approximately the same amount of electrical power as conventional power producing plants. For example, in order to produce about 25 megawatts of energy per day, coal, natural gas, nuclear, wind and geothermal power plants, and a plant containing the above-described hydrocarbon combustion gas generator of the invention ("HCGG Plant"), would generally require the number of acres shown in the table below. This table also shows the number of times more space (in acres) that the conventional power producing plants would require in comparison with a plant containing the hydrocarbon combustion gas generator of the invention.

Power Plants that Produce 25-Megawatts of Energy per Day

| Type of Power Plant | Number of Acres Required by Plant | Number of Times More Space Required |
|---|---|---|
| HCGG | 2.0 Acres | — |
| Coal | 47.5 Acres | 23.75 Times Larger |
| Natural Gas | 7.5 Acres | 3.75 Times Larger |
| Nuclear | 25 Acres | 12.5 Times Larger |
| Wind | 425 Acres | 212.5 Times Larger |
| Geothermal | 200 Acres | 100 Times Larger |

The above table shows that this hydrocarbon combustion gas generator of the invention, which could co-generate electricity and wet steam, would require significantly less space in comparison with many conventional electrical power producing plants, while producing approximately the same amount of electrical power as the conventional power producing plants.

One, two, three, four, five or more of the apparatuses of the invention can, optionally, be placed with one another in a series. For example, three 15 megawatt hydrocarbon combustion gas generators could be lined up (or otherwise positioned) in a series, so that 45 megawatts of energy could be produced, rather than 15 megawatts.

As would be readily understood by a person of skill in the art, the sizes of the various components of the apparatuses of the invention may vary widely, depending upon the sizes of the entire apparatuses.

Advantageously, the apparatuses of the invention are easily transportable from one location to another location by, for example, truck, train, ship, barge or via some other suitable means for transportation.

Because most of the mechanical parts of ships, such as their engines, are powered by energy in the form of steam, the apparatuses of the invention could be used on ships to permit the ships to remain away from land for longer periods of time than would otherwise be possible. Further, all of the hydrocarbon waste materials generated on the ships could be used as fuels, or fuel components, in the apparatuses, thereby providing a means for reducing these hydrocarbon waste materials without returning to land, or dumping them into the water, and eliminating or reducing the need for fuel to be brought to the ship from land.

Lack of Corrosion

Because the combustion gas exhaust products that are produced by the processes and apparatuses of the present invention do not generally exit into (or otherwise come into contact with) turbines, condensers or other electrical power-generating equipment, and because the processes and apparatuses of the invention generally produce from about 90 to about 99 weight percent dry steam (dry saturated steam and/or superheated steam), rather than wet steam, these processes and apparatuses advantageously do not generally cause corrosion (the dissolving and/or wearing away of parts, such as metal blades, and/or the production of a build-up of substances, such as rust, on or in the parts) or other damage or destruction to turbines, condensers and other electrical power generating equipment, or to components thereof.

Ease and Speed of Start-Up

Many conventional fuel-burning, steam producing and/or power generating devices, apparatuses, systems and/or plants, such as nuclear power plants, require lengthy periods of time, for example, at least 24 hours, and complex procedures, to become fully operational after they are turned "on" (or otherwise have their operation commenced), either initially and/or after a scheduled or emergency shut down or crash. In contrast, the apparatuses of the present invention generally only require a time period of about 30 minutes or less, and more usually a time period of about 5 minutes or less, and often a time period of about 10 seconds or less, and procedures that are not complex, to become fully operational after they are turned "on." Thus, the apparatuses of the present invention are capable of producing products that can be employed in the generation of electrical power while having virtually no, or only small time periods of, interruption of electrical power service, likely resulting in a significant savings of money, time and/or inconvenience for individual and business users of electrical power.

Amount of Electrical Power Produced

The apparatuses of the present invention are preferably stand-alone generators that are capable of running 24 hours per day for 7 days per week. Additionally, it is preferable to have more than one (two, three, four, five, six or more) apparatuses of the invention present and running at one location at the same time.

The processes and apparatuses of the present invention will preferably produce from about 5 to about 600 megawatts of electrical power per day, such as 5, 10, 15, 20, 25, 30, 35, 40, 45, 50, 55, 60 or 95 megawatts of electrical power per day, and will more preferably produce from about 100 to about 200 megawatts of electrical power per day. Thus, for example, running at about a 60% cycle (a 60% capacity), a 10-megawatt apparatus of the invention would be capable of producing about 6 megawatts of electrical power per day. When more than one apparatus of the invention is present and running at one location at the same time, by increasing the output of the other apparatuses, the other apparatuses can maintain the entire system running at 100% in the event that one or more of the apparatuses develops a problem and goes off line.

To be as efficient as possible, and to produce the cleanest products as possible by the processes and apparatuses of the invention, it is preferable that, during the entire processes of the invention, and in all parts of the apparatuses of the invention, air is not permitted to enter the systems, and heat escaping from the systems is minimized.

The processes and apparatuses of the present invention have a combustion efficiency that generally ranges from about 50% to about 100% (producing thermal energy using at least about 50%, and up to 100%, of the Btus present in the particular fuel or fuel components employed therein), and that more preferably ranges from about 70% to about 100%, that still more preferably ranges from about 90% to about 100%, that even more preferably ranges from about 95% to about 100%, and that most preferably ranges from about 97% to about 100%. In other words, for every 100 Btus that are present in the fuels or fuel components employed in these processes and apparatuses, preferably at least about 50 Btus, and most preferably at least about 100 Btus, are converted to thermal energy (with the remainder of the 100 Btus not being converted to thermal energy, but becoming waste heat instead). In contrast, the combustion efficiency of conventional coal-burning power plants peaks at about 33%, with about 67% of the potential energy of the coal becoming waste heat. The combustion efficiency of conventional natural gas-burning power plants is about 35–50%, with about 50–65% percent of the potential energy of the natural gas becoming waste heat.

The processes and apparatuses of the present invention have a thermal efficiency that generally ranges from about 50% to about 87%, and that more preferably ranges from about 65% to about 87%, that still more preferably ranges from about 75% to about 87%, that even more preferably ranges from about 80% to about 87%, and that most preferably ranges from about 84% to about 87%. In contrast, the thermal efficiency of power plants is about 34%. The heat rate of these plants is about 10,000 Btus of fuel heat burned per kilowatt hour (kWh) of electricity produced. Further, in contrast with the apparatuses of the invention, these plants are generally slow to start-up or to change output while operating.

Profitability of Processes and Apparatuses

The processes and apparatuses of the present invention are capable of generating revenue for users of these processes and apparatuses by one or more of several different manners:

(a) by receiving waste disposal (or other) fees for disposing of hydrocarbon waste materials that are used as fuels or fuel components;

(b) by selling the scrap metal obtained from scrap tires (when scrap tires are employed as fuels or fuel components);

(c) by selling the electrical power produced; and/or (d) by capturing and selling various components that may be contained in combustion gas exhaust products produced (the final combustion gas products produced), such as $CO_2$, $SO_2$, nitrogen or ash.

When ash is added to concrete, the ash generally makes the concrete stronger. Thus, ash may be separated out of combustion gas exhaust products produced by the processes and apparatuses of the invention in a manner known by those of skill in the art, and then sold to concrete production plants.

Nitrogen that may be present in combustion gas exhaust products (depending upon the types of fuels or fuel components that are employed in the processes and apparatuses of the invention) can be sold to carpeting manufacturers, which often spray nitrogen onto carpeting to make the carpeting brittle.

Costs of Producing Electrical Power

Depending upon the type of fuels or fuel components that are employed, the processes and apparatuses of the present invention can often produce electrical power at an overall cost that does not exceed about 4.0 cents per kilowatt-hour, and that more preferably does not exceed about 1.7 cents per kilowatt-hour, and that still more preferably does not exceed about 1.3 cents per kilowatt-hour. When waste materials are employed as fuels or fuel components, and tipping fees and/or other revenue-generating fees are obtained by the user of the waste materials, such cost will generally be further reduced, and significantly reduced in comparison with the costs of producing electricity via other methods, such as via conventional coal-burning, natural-gas, fuel cell or nuclear energy power plants. Under these circumstances, processes and apparatuses within the present invention are capable of producing electrical power at an overall cost that ranges from about 0.003 to about 0.009 cents per kilowatt-hour.

Currently, the cost of one kilowatt-hour of electrical power in the state of Georgia is about 6.2 cents. Thus, for example, if the processes and apparatuses of the present invention produce electrical power at a cost of about 1.5 cents per kilowatt-hour, a profit of 4.7 cents per kilowatt-hour would be achieved.

The low overall costs per kilowatt-hour of producing electrical power that may be achieved using the processes and apparatuses of the invention, which are generally less than the overall costs per kilowatt-hour of producing electrical power via other methods and apparatuses, are generally a result of the following: (a) the high combustion efficiency that may be achieved by the processes and apparatuses of the invention; (b) the use of fuels, or fuel components, such as carpet scraps, that are readily available and are free of charge; (c) the receipt of waste disposal (recycling) fees for the use of certain hydrocarbon waste materials, such as scrap tires, as fuels or fuel components in the apparatuses; (d) the revenue generated by the sale of electricity; (e) the revenue generated by the sale of components of waste materials, such as the metal from scrap tires, to other markets; and/or (f) the revenue generated by the sale of combustion gas exhaust product components, such as ash, nitrogen, $CO_2$ or $SO_2$, to other markets. In addition, in view of the foregoing, via the operation of a power plant containing one or more apparatuses of the present invention, a power plant owner or investor will likely recoup an investment in the power plant within a period of from about 3 to about 5 years.

Cogeneration, Trigeneration and Quadgeneration

The processes and apparatuses of the present invention can be used in a cogeneration system, in a trigeneration system, in a quadgeneration system and in similar systems, or can be used in a conventional manner to generate heat and electrical power separately.

Temperatures, Pressures and Times

The processes and apparatuses of the invention produce a superheated steam product or a saturated steam product under conditions (oxidizer, fuel and water flow rates, temperatures at different locations, pressures at different locations and the like) that may vary depending upon, for example, the size of the particular apparatus employed, whether one or more apparatuses are employed together, the combustion efficiency desired, the diameters of the water, fuel and oxidizer inlets and outlets, the diameters of the superheated steam product outlets, and the like. The conditions may be varied to accomplish desired objectives in a manner known by those of skill in the art. Information concerning many of these variables may be readily determined using the web site www.oit.doe.gov/bestpractices/steam/generate.shtml.

Purging of Apparatuses

It is preferable that both prior to and after an operation of the apparatuses of the invention, the apparatuses are purged with an inert gas, such as gaseous nitrogen. The purging of the apparatuses in this manner should provide safety checks that: (a) no components of the apparatuses, such as fuel or oxidizer feed lines, are obstructed; (b) all of the components of the apparatuses are functioning properly; (c) the interiors of the apparatuses are clean (free from debris, such as fuel or oxidizer residue, waste vapors and the like); and/or (d) no leaks are present.

Destruction of Hazardous Materials

Depending upon the type of hazardous materials, the processes and apparatuses of the present invention may also be employed to safely, rapidly, inexpensively, efficiently and completely destroy certain hazardous materials (by rendering these materials non-hazardous) either without producing undesired environmental pollutants, or with the production of environmental pollutants at a level that is below the level of environmental pollutants produced by conventional methods for destroying hazardous materials, and without the need for placing the hazardous materials in landfills, bodies of water or other types of receptacles.

When hazardous materials, such as those containing carcinogens, and chemical warfare agents, that do not contain elements listed in the Periodic Table of Elements that are hazardous materials, such as mercury or arsenic, are used as fuels or fuel components in the processes and apparatuses of the invention, or are otherwise combusted thereby, the hazardous materials will generally be completely destroyed by being disassociated into non-hazardous components. For example, when polyvinyl chloride, which contains carcinogens, is used as a fuel in the processes and apparatuses of the invention, the resulting products (a superheated steam product, a saturated steam product, a combustion gas exhaust product and/or a separate steam product produced using the combustion gas exhaust product) will generally not contain any carcinogens. As another example, when VX is used in the processes and apparatuses of the invention, it will likely no longer be deadly.

The transformation of hazardous materials into non-hazardous materials by the processes and apparatuses of the invention appears to result from a combination of the use of high temperatures and pressures, and of a lack of air in the processes and apparatuses. (The processes and apparatuses of the invention use temperatures that are approximately two times hotter that the temperatures employed in most coal-burning power plants.) Thus, the processes and apparatuses of the invention can be used by, for example, the military and health industries, to transform hazardous materials, such as cancer producing substances, into non-hazardous materials.

The hazardous materials that are to be transformed into non-hazardous materials in accordance with the processes and apparatuses of the invention can serve as the fuels or fuel components in these processes and apparatuses, with no additional fuels or fuel components being necessary. However, one or more additional fuels, or fuel components, may optionally also be employed.

Materials

The various components of the apparatuses of the present invention may be manufactured using a wide variety of different metals or ceramic materials. However, the metals and ceramic materials employed preferably have good mechanical characteristics, an ability to resist oxidation, corrosion and stress, and an ability to withstand the high temperatures described herein. Unless otherwise specified herein, all of the various components (or other parts) of the apparatuses of the invention are preferably made of ferritic and/or austenitic steel.

Combustion chambers and/or areas and heat exchangers employed in the processes and apparatuses of the invention may be formed from any suitable high temperature, thermally-conductive, metals, such as steel alloyed with nickel, chromium, cobalt, or nickel or copper alloys, such as BeCu, Cu, Ag-Cu, or a combination of these materials, or can be lined with a conventional refractory material, such as molybdenum, tungsten, tantalum, or the like, for high steam temperatures.

All of the materials, components and equipment that are employed to carry out the processes of the invention, and that are employed to make the apparatuses of the invention, and all of the materials, components and equipment that are employed in the examples, are commercially available from sources known by those of skill in the art. Sources for these items include, for example, Pechiney Chemicals Division (Stamford, Conn.), Praxair, Inc. (Danbury, Conn.), Airgas, Inc. (Radnor, Pa.), Air Liquide America L.P. (Houston, Tex.), Air Products (Allentown, Pa.), AECL Research (Manitoba, Canada), ABCO Industries (Abilene, Tex.), Babcock & Wilcox Company, (Barberton, Ohio), Energy Recovery International (Lincoln, Nebr.), Peerless Manufacturing Company (Dallas, Tex.), Emerson (St. Louis, Mo.), Abbey Systems (Salt Lake City, Utah), MPR Associates, Inc. (Alexandria, Va.), Degussa (New Zealand), FMC Industrial Chemicals (Philadelphia, Pa.), ATOFINA Chemicals (Philadelphia, Pa.), EGC Enterprise Incorporated (Carden, Ohio), Castles Metals (Franklin Park, Ill.), Haynes International, Inc. (Kokomo, Ind.), Armstrong International, Inc. (Three Rivers, Mich.), Quality Water Treatment, Inc. (St. Louis, Mo.), Thermidaire Corporation (Canada), Pace Chemicals Ltd. (British Columbia, Canada), D.W. Davies & Co., Inc. (Racine, Wis.), Banks Engineering (Tulsa, Okla.), AmSolv® (Lancaster, Tex.), Heil Engineered Systems (Brookfield, Wis.), Solar Turbines, Inc. (Dan Diego, Calif.) and The Wittemann Company, LLC (Palm Coast, Fla.).

Variations

Specific processes and apparatuses within the scope of the invention include, but are not limited to, the processes and apparatuses discussed in detail herein and/or illustrated in the drawings contained herein.

Contemplated equivalents of the processes and apparatuses described herein and/or illustrated in the drawings contained herein include processes and apparatuses that otherwise correspond thereto, and that have the same general properties and/or components thereof, wherein one or more simple or other variations, deletions or additions of steps, temperatures, pressures, other conditions, components and/or materials are made.

Preferred Embodiments of the Invention

For the purpose of illustrating the processes, apparatuses, uses and methods of manufacture of the present invention, there are shown in the drawings, which form a material part of this disclosure, various cross sectional, exploded, sectional, schematic and other views of a preferred embodiment of an apparatus of the invention, and of a use of this apparatus in a trigeneration system.

The various components or parts of the preferred embodiment of the apparatuses of the invention may be generally arranged in the manner shown in the drawings, or described hereinbelow, or otherwise. The present invention is not limited to the precise arrangements, configurations, dimensions, instrumentalities, components, angles, reactant or product flow directions or conditions shown in these drawings, or described hereinbelow. These arrangements, configurations, dimensions, instrumentalities, components, angles, reactant or product flow directions and/or conditions may be otherwise, as circumstances require or are desired. For example, fewer or additional fuel inlets, fuel chambers, first fuel ports, first fuel port tubes, second fuel ports, second fuel port tubes, oxidizer inlets, first oxidizer injector orifices, second oxidizer injector orifices, hot oxidizer orifices, igniters, tube assemblies, water tubes, outer housings, other housings, feed water inlets, superheated steam product outlets, combustion gas exhaust outlets, flame tubes, gaskets, o-rings, plates, manifolds, attachment devices, temperature sensing means (for regulating the temperatures in each of the combustion chambers and/or areas, and in other locations of the apparatuses), pressure sensing means (for regulating the pressures in each of the combustion chambers and/or areas, and in other locations of the apparatuses) and/or other components or parts may be employed. Further, these components and parts may be arranged in a wide variety of different manners or patterns. One, two, three, four or more additional combustion chambers and/or areas may also be added. The location of the various components or parts of the apparatuses, and the means employed for attaching one or more components, parts and/or areas of the apparatuses to one or more other components, parts and/or areas of the apparatuses, may also be varied. Moreover, rather than attaching various components, parts and/or areas of the apparatuses together, one or more components, parts and/or areas of the apparatuses may be machined or otherwise formed from one piece of metal or other material. For example, the sixth superheated steam product outlet may be attached to the third superheated steam product exit manifold by any suitable means for attaching these two components of the apparatuses together. Alternatively, the sixth superheated steam product outlet and the third superheated steam product exit manifold may be manufactured in one piece from one piece of material. Still further, various components, parts and/or areas of the apparatuses may be either permanently, or removably, attached with other components, parts and/or areas of the apparatuses, and may be movable or not movable. Removably attached components and parts are often preferable because such components and parts may generally be replaced in a simpler and more cost effective manner in the event that they become worn, damaged or destroyed.

Description of a Preferred Apparatus

A specific and preferred embodiment of the apparatuses of the invention will now be described with reference to the drawings. In these drawings, all references, numbers and descriptions relating to superheated steam products are equally applicable to dry saturated steam products.

Referring to FIGS. 1–13, there is shown in FIGS. 1, 2 and 3 a preferred apparatus of the invention, which is a hydrocarbon combustion gas generator ("generator") that is indicated generally by the number 8. The generator has two separate combustion chambers (a first combustion chamber 70 and a second combustion chamber 100), as well as a third combustion area 120, where three separate combustion reactions occur (a first incomplete combustion reaction, a second incomplete combustion reaction and a third complete combustion reaction). Oxidizer and fuel reactants flow generally from left to right in the generator shown in FIG. 1, FIG. 2 and FIG. 3 (from upstream to downstream, and from the forward end to the aft end of the generator), which does not contain any moving parts or components.

FIGS. 4–13 show cross sectional and/or detailed views of some of the individual components of the generator 8 shown in FIG. 1, FIG. 2 and FIG. 3.

As is shown in FIG. 1, FIG. 2 and FIG. 3, many of the components, parts and/or areas of the generator 8 are preferably present at more than one location in, or on, the generator 8, both above and below the various combustion chambers and/or areas. Thus, all discussions set forth herein regarding one component, part and/or area of the generator shall refer to all of the same type of components, parts and/or areas that may be present in, or on, the generator. For example, all discussions in connection with a first water manifold 51 apply to both of the first water manifolds 51 shown in FIG. 1 (one shown above the first combustion chamber 70 and one shown below the first combustion chamber 70).

The first combustion chamber 70 and the second combustion chamber 100 are each preferably cylindrical hollow tubes having sidewalls formed by tube assemblies and/or tubes and open forward and aft ends. The forward ends of the first combustion chamber 70 and the second combustion chamber 100 are defined by other components of the generator 8 (a first oxidizer manifold plate 40 and a second transfer injector plate 84, respectively). The aft end of the first combustion 70 chamber is formed by another component of the generator 8 (a fuel wear plate 63). The aft end of the second combustion 100 chamber is open (has no wall or other barrier), and is connected with the open (containing no wall or other barrier) forward end of the third combustion area 120. The third combustion area 120 is also preferably a cylindrical hollow tube. The aft end of the third combustion area 120 is also open (contains no wall or other barrier), allowing combustion gas exhaust product produced in the generator 8 to exit out of the generator 8 (to the atmosphere, to an exhaust heat recovery steam generator, to a boiler or the like), and is positioned in a manner that angles away from the forward end of the third combustion area 120 (towards the outside environment), and away from the generator 8.

One or more fuels, or fuel components, and oxidizers are injected into the forward end of the first combustion chamber 70 in suitable O/F mixture ratios, and under the right temperature, pressure and other conditions, to yield a first stable partial (incomplete) combustion of the fuels, or fuel components, present therein. The combustion gas product produced in the first combustion chamber 70 as a result of the first combustion reaction flows under pressure into the second combustion chamber 100, where additional oxidizer is injected into the second combustion chamber 100, in a suitable O/F mixture ratio, and under the right temperature, pressure and other conditions, to yield a second stable partial (incomplete) combustion of the fuels, or fuel components, present therein. The combustion gas product produced in the second combustion chamber 100 as a result of the second combustion reaction flows under pressure into the third combustion area 120, where additional oxidizer is injected into the third combustion area 120, in a suitable O/F mixture ratio, and under the right temperature, pressure and other conditions, to yield a stable and final complete combustion of the fuels, or fuel components, in the third combustion area 120 of the generator 8.

The sidewalls of the first combustion chamber 70, the second combustion chamber 100 and third combustion area 120 are formed by separate tube assemblies or tubes (a first tube assembly 71, a second tube assembly 101, a tube 121 and a third tube assembly 146, respectively) that contain (with the exception of the tube 121) one or more, and preferably multiple, tubes containing circulating water (or another suitable fluid). Preferably, the circulating water is conducted in a heat exchanging relationship with each of the combustion gas products that are produced during the three different combustion reactions. Heat present in combustion gas products generated during the three separate combustion processes becomes transferred through the tube assemblies and tube that form the sidewalls of the first combustion chamber 70, the second combustion chamber 100 and the third combustion area 120, thereby transforming the circulating water into a superheated or dry saturated steam product (preferably at a plurality of different locations of the generator 8). The superheated or dry saturated steam product produced is then collected in a conventional, and preferably central, collection device (not shown) or other utilization device. The superheated or dry saturated steam product collection device may be connected with a steam turbine, or other electrical power generating (or other) device or system, for the subsequent production of electrical power using the superheated or dry saturated steam product. A hot combustion gas exhaust product produced in the third combustion area 120 exits the third combustion area 120, where it may be released into the atmosphere, or used for the production of an additional, separate steam product (a steam product that may contain more than one type of steam, such as wet steam, saturated steam, dry saturated steam and/or superheated steam). Conventional steam separation equipment can be employed to separate the various types of steam that may be present in this separate steam product. Superheated steam and/or dry saturated steam separated out from this separate steam product may be transported to the same, or a different, collection or utilizing device.

One or more liquid, solid and/or gaseous fuels, fuel components or fuel mixtures, such as sized reduced tire rubber obtained from the grinding of the rubber from scrap tires into a fine powder, is drawn from one or more sources of fuel, such as a fuel storage tank, through one or more suitable fuel supply control means, such as a flow control device regulated by a pump, or other suitable device, into a fuel inlet manifold 12, or into another means for receiving one or more fuels, fuel components or fuel mixtures. The flow control device employed may be a pressure regulator, a cavitating fluid venturi control, a temperature sensing transducer, a pressure sensing transducer or other similar device known by those of skill in the art. At its forward end, the fuel inlet manifold 12 preferably has a means for securely connecting the fuel inlet manifold 12 with the flow control device, such as a flange (FIG. 1 and FIG. 2) or other suitable connection device. The means for connecting the fuel inlet manifold 12 with the flow control device is preferably a flange, which preferably contains one or more (1, 2, 3, 4, 5, 6, 7, 8, 9, 10, etc.) bolt holes, which are preferably equally spaced, permitting the uniform distribution of pressure over the fuel inlet manifold 12. Although it is preferred that the bolt holes be equally spaced, they may be arranged in a wide variety of different spatial orientations. The size of the bolt holes will depend upon the size of high strength bolts (or other fasteners) that are to be inserted into the bolt holes, which will generally be employed with accompanying washers and nuts, to attach the forward end of the fuel inlet manifold 12 to the flow control device. It is preferably that the flange have a larger number of bolt holes when higher pressures are employed. The size, number and spatial distribution of the bolt holes will preferably be the same as, and aligned with, bolt holes that are present on the area of the flow control device that is connected with the fuel inlet manifold 12. A person of ordinary skill in the art can readily determine the size, number and spatial distribution of bolt holes that would be desirable for a particular fuel inlet manifold 12, and a particular generator 8. Any suitable means or device for securely connecting the fuel inlet manifold 12 with the flow control device may be employed, which also includes welding, socket head screws, pressure, pinning, riveting, epoxies (or other adhesives), gluing, chemical bonding, heat sealing and other similar methods and/or devices known by those of skill in the art.

The flow rate of the one or more fuels, fuel components or fuel mixtures that enter the fuel inlet manifold 12 (or that enter the generator 8 at one or more other locations) will generally be dependent upon several variables, including the density of the particular fuels, fuel components or fuel mixtures employed, the O/F mixture ratios employed, the diameter of the fuel flow control device employed, the pressure of the fuels, fuel components or fuel mixtures and the amount of heat energy produced by the generator 8. The O/F mixture ratio employed in the first combustion chamber 70 (and in the other combustion chambers and areas) will also be dependent upon several variables, such as the particular fuels, fuel components or fuel mixtures and oxidizers employed. Depending upon the chemical composition of the particular fuels, fuel components, or fuel mixtures employed, certain fuels will require more or less oxidizer to consume the fuel. However, the flow rate of the fuels, fuel components or fuel mixtures that enter into the fuel inlet manifold 12 should be a rate that permits a "fuel rich" mixture of fuel and oxidizer to be present in the first combustion chamber 70. Such a rate, and a desirable O/F mixture ratio, may readily be determined by those of skill in the art.

As is shown in FIG. 1 and in FIG. 2, one or more additional fuels, fuel components or fuel mixtures may be drawn from one or more sources of fuel and travel into one or more separate, optional, fuel inlets 9, or another means for receiving one or more fuels, fuel components or fuel mixtures. The fuel inlets 9 preferably have one or more passageways, or other means for permitting the flow of the fuels, fuel components or fuel mixtures, that are separated from the fuels, fuel components or fuel mixtures present in the fuel inlet manifold 12, and that lead towards, and are adjacent with, the forward ends of one or more separate, optional, fuel chambers 10, or other means for housing and maintaining these fuels, fuel components or fuel mixtures separate from the other fuels, fuel components or fuels mixtures that are present in the fuel inlet manifold 12. Such a configuration permits the dual, but separated, entry, storage and injection (simultaneously or at different times) into the first combustion chamber 70 of the generator 8 of one or more additional hydrocarbon or other fuels, fuel components or fuel mixtures, which additional fuels, fuel components or fuel mixtures may be incompatible or compatible, and in the same or in a different state (solid, liquid, gas, slurry, blend, etc.), with the fuels, fuel components or fuel mixtures that are chosen for use in the fuel inlet manifold 12. A second, third or other additional fuel, fuel component or fuel mixture could enhance the energy value of the first fuel, fuel component or fuel mixture. The additional fuels, fuel components or fuel mixtures may enter into the fuel inlets 9, and be injected into the first combustion chamber 70 of the generator 8, in the same (or in a different) manner as is described in connection with the fuels, fuel components or fuel mixtures that enter into the fuel inlet manifold 12.

For example, if it is desired to use two fuels or fuel components in the generator 8, and the fuels or fuel components chosen for use are gasoline and Styrofoam coffee cups (in a size-reduced form), the two fuels or fuel components would generally not be compatible because the gasoline would melt the Styrofoam particles, preventing the particles from being properly injected into the first combustion chamber 70. As another example, if it is desired to use two fuels or fuel components in the generator 8, and the fuels or fuel components chosen for use are hydrogen peroxide and a PET soda or water bottle (in a size-reduced form), the two fuels or fuel components, if permitted to come into contact with each other, would undesirably spontaneously combust. The configuration of the generator 8 shown in FIG. 1 and FIG. 2 would allow the foregoing incompatible fuels and/or fuel components to each be employed in the generator 8 at the same time. As a third example, a size-reduced plastic could be employed as one fuel or fuel component in the fuel inlet manifold 12 while hydrogen is employed as a second fuel or fuel component in the fuel inlets 9 and fuel chambers 10, providing the combination of fuels or fuel components in the first combustion chamber 70 having an energy value of about 40,000 Btus per pound of fuel, which is higher than the energy value that would have been present if the size-reduced plastic was employed as the only fuel or fuel component.

Alternatively, a liquid, gaseous or solid coolant, such as water, a fuel, an oil, steam, a powder or any other substance or material, or a combination thereof, that has suitable cooling properties can enter one or more of the fuel inlets 9 from a source of coolant. A conventional "film cooling" technique can be used by injecting the coolant from the fuel inlets 9 into one or more fuel chambers 10 in a radial manner, causing coolant to travel down first fuel port tubes 36 present in the generator 8, thereby cooling the first fuel port tubes 36.

The one or more fuel chambers 10, which function as a second fuel manifold within the fuel inlet manifold 12, may be drilled into the fuel inlet manifold 12, preferably at the aft end, or placed into the fuel inlet manifold 12 in any other suitable manner. The fuel inlets 9 may be connected with a source of fuel in the same manner described for the fuel inlet manifold 12. They may be attached to the fuel inlet manifold 12 by any suitable means for securely attaching them to the fuel inlet manifold 12, such as is described herein in connection with the attachment of the fuel inlet manifold 12 with the flow control device.

The aft end of the fuel inlet manifold 12 is preferably attached to the forward end of a fuel metering block 30 with a means for securely attaching these two areas of the generator 8 together, such as one or more (1, 2, 3, 4, 5, 6, 7, 8, 9, 10, etc.) first attachment devices 14. Alternatively, the aft end of the fuel inlet manifold 12 can be welded to the forward end of the fuel metering block 30. Any suitable means or device for securely attaching the fuel inlet manifold 12 to the fuel metering block 30 may be employed, which includes the methods and devices described hereinabove in connection with the attachment of the fuel inlet manifold 12 with the flow control device, and other similar methods or devices known by those of skill in the art.

Preferably, the aft end of the fuel inlet manifold 12 contains a connection device, such as the connection device described hereinabove for the forward end of the fuel inlet manifold 12, that preferably has one or more bolt holes drilled therein (in the manner described hereinabove in connection with the flange of the fuel inlet manifold 12). The first attachment devices 14 may be any devices that are suitable for securely attaching the two components of the generator 8 together, such as high strength bolts with nuts and accompanying lock washers as needed, socket head screws and other similar devices known by those of skill in the art. The number of first attachment devices 14 may be varied in a manner known by those of skill in the art to provide a secure attachment of the fuel inlet manifold 12 to the fuel metering block 30.

The aft end of the fuel metering block 30 is preferably attached to a first oxidizer manifold 41, a first oxidizer manifold plate 40 and a first water manifold 51 with a means for securely attaching these four areas of the generator 8 together, such as one or more second attachment devices 31. The second attachment devices 31 may be any devices that are suitable for securely attaching or otherwise fastening these areas of the generator 8 together, such as those described hereinabove in connection with the first attachment devices 14. Preferably, the aft end of the fuel metering block 30, the first oxidizer manifold 41, the first oxidizer manifold plate 40 and the forward end of the first water manifold 51 each have one or more bolt holes drilled therein (preferably in the manner described hereinabove in connection with the flange of the first fuel inlet 12). The number of second attachment devices 31, such as high strength bolts with nuts and accompanying lock washers, may be varied in a manner known by those of skill in the art to provide a secure attachment of the fuel metering block 30 with the first oxidizer manifold 41, the first oxidizer manifold plate 40 and the first water manifold 51. The aft end of the fuel metering block 30 is attached to the forward end of the first oxidizer manifold 41, and the aft end of the first oxidizer manifold 41 is attached to the forward end of the first oxidizer manifold plate 40. The aft end of the first oxidizer manifold plate 40 is attached to the forward end of the first water manifold 51.

As is shown in FIG. 2, the fuel metering block 30 has a pocket preferably machined into its forward end. This pocket should be of a size (length and width) that permits an injector wear plate 32 to fit securely into the forward end of the fuel metering block 30.

The fuel metering block 30, a first oxidizer inlet 42 and the first oxidizer manifold plate 40 preferably each have one or more flame tube mounting holes 29a present therein, preferably at an angle (at an angle that leads from one or more means for initiating a combustion of one or more fuels, fuel components or fuel mixtures and one or more oxidizers that are metered into the first combustion chamber 70, such as one or more igniters 20, towards the center of the first combustion chamber 70). The flame tube mounting holes 29a preferably have approximately the same diameter as one or more flame tubes 29 that are preferably inserted into these flame tube mounting holes 29a, and that extend from the aft end of the mixing chamber 28 through the fuel metering block 30, the first oxidizer inlet 42 and the first oxidizer manifold plate 40, permitting flames to travel from the igniters 20 to the first combustion chamber 70. The flame tubes 29 are inserted into these flame tube mounting holes 29a, and are preferably spaced equally (with equal distances between them) through these components of the generator 8. However, they may be spaced and/or positioned in any other suitable manner. Gaskets or similar devices are preferably placed between the aft end of the fuel inlet manifold 12 and the forward end of the fuel metering block 30, and between the aft end of the fuel metering block 30 and the forward end of the first oxidizer manifold plate 40 to prevent the leakage of gases, heat or other substances in these areas. Optionally, an o-ring groove can be machined into one or more of these components, such as the aft end of the fuel metering block 30, permitting the insertion of an o-ring therein. The o-ring depth and width should be based upon the maximum allowable operating pressure (MAOP). The O-rings and/or gaskets employed at all locations on the generator 8 are preferably made of high temperature and pressure materials, which are known by those of skill in the art.

The injector wear plate 32 is preferably designed to allow one or more, and preferably a plurality of, first fuel port tubes 36, or other means for metering fuel into the first combustion chamber 70, to be removably inserted into one or more, and preferably a plurality of, first fuel ports 34. The size of the first fuel ports 34 and of the first fuel port tubes 36 can be varied widely in a desired manner, depending upon the type of fuels, fuel components or fuel mixtures employed, and of the sizes of the particles employed in solid fuels, fuel components or fuel mixtures. The first fuel ports 34 are drilled, or otherwise made, by conventional methods through the injector wear plate 32, the fuel metering block 30, the first oxidizer manifold plate 40 and the first transfer injector plate 44, providing a series of hollow orifices (first fuel ports 34) that extend through each of these components of the generator 8, leading from the aft end of the fuel inlet manifold 12 to the forward end of the first combustion chamber 70.

The forward end of the first transfer injector plate 44 is attached to the aft end of the first oxidizer manifold plate 40. Any suitable means or device for securely, but preferably removably, attaching the first transfer injector plate 44 to the first oxidizer manifold plate 40 may be employed, which includes the methods and devices described hereinabove in connection with the attachment of the fuel inlet manifold 12 with the flow control device, and other similar methods or devices known by those of skill in the art.

The number of first fuel ports 34 employed in the generator 8 will preferably be the same number as the number of first fuel port tubes 36 employed, and can be varied widely in a manner known by those of skill in the art according to the type of fuel, and the O/F mixture ratio selected. The diameter of the first fuel ports 34 should be a diameter that permits the first fuel port tubes 36 to be easily removably inserted into the first fuel ports 34, and to fit securely within the first fuel ports 34 during the operation of the generator 8. The first fuel port tubes 36 inserted into the first fuel ports 34 should allow an oxidizer to fuel ratio (O/F ratio) that will permit the mixture of the one or more fuels, fuel components or fuel mixtures and one or more oxidizers that mix in the first combustion chamber 70 to be fuel rich. Because one or more oxidizers will preferably circulate through the fuel metering block 30 around the first fuel port tubes 36, the first fuel ports 34 and the first fuel port tubes 36 (and other components of the generator 8 that come into contact with oxidizers) should preferably be made of austenitic steel, which is compatible with (will not be deteriorated by) most oxidizers. The first fuel port tubes 36 are inserted into the forward end of the injector wear plate 32, and through the fuel metering block 30, the first oxidizer manifold plate 40 and the transfer injector plate 44.

As a result of pressure that is applied to the fuel, the fuel becomes metered from the forward end to the aft end of the fuel inlet manifold 12, and then from the forward end to the aft end of each of the first fuel port tubes 36 present in the generator 8, where the pressure causes the fuel to be injected from each of the first fuel port tubes 36 into the forward end of the first combustion chamber 70.

One or more oxidizers, such as LOX, is drawn from one or more sources of oxidizer, such as oxidizer storage tanks, through suitable flow control devices by a pump, or other suitable device, into a first oxidizer inlet 42, or into another means for receiving oxidizer, which should preferably be made of austenitic steel. The flow control device may be the same type of flow control device described hereinabove in connection with the sources of fuels, fuel components and fuel mixtures. The flow rate of the oxidizer that enters the first oxidizer inlet 42 may be varied in a manner known by those of skill in the art for achieving a fuel rich mixture of fuel and oxidizer in the first combustion chamber 70. The oxidizer that enters the first oxidizer inlet 42 is preferably cool, and preferably has a temperature ranging from about −297° F. to about 80° F., and more preferably ranging from about −180° F. to about −150° F., with about −50° F. being most preferred.

Figure 5:
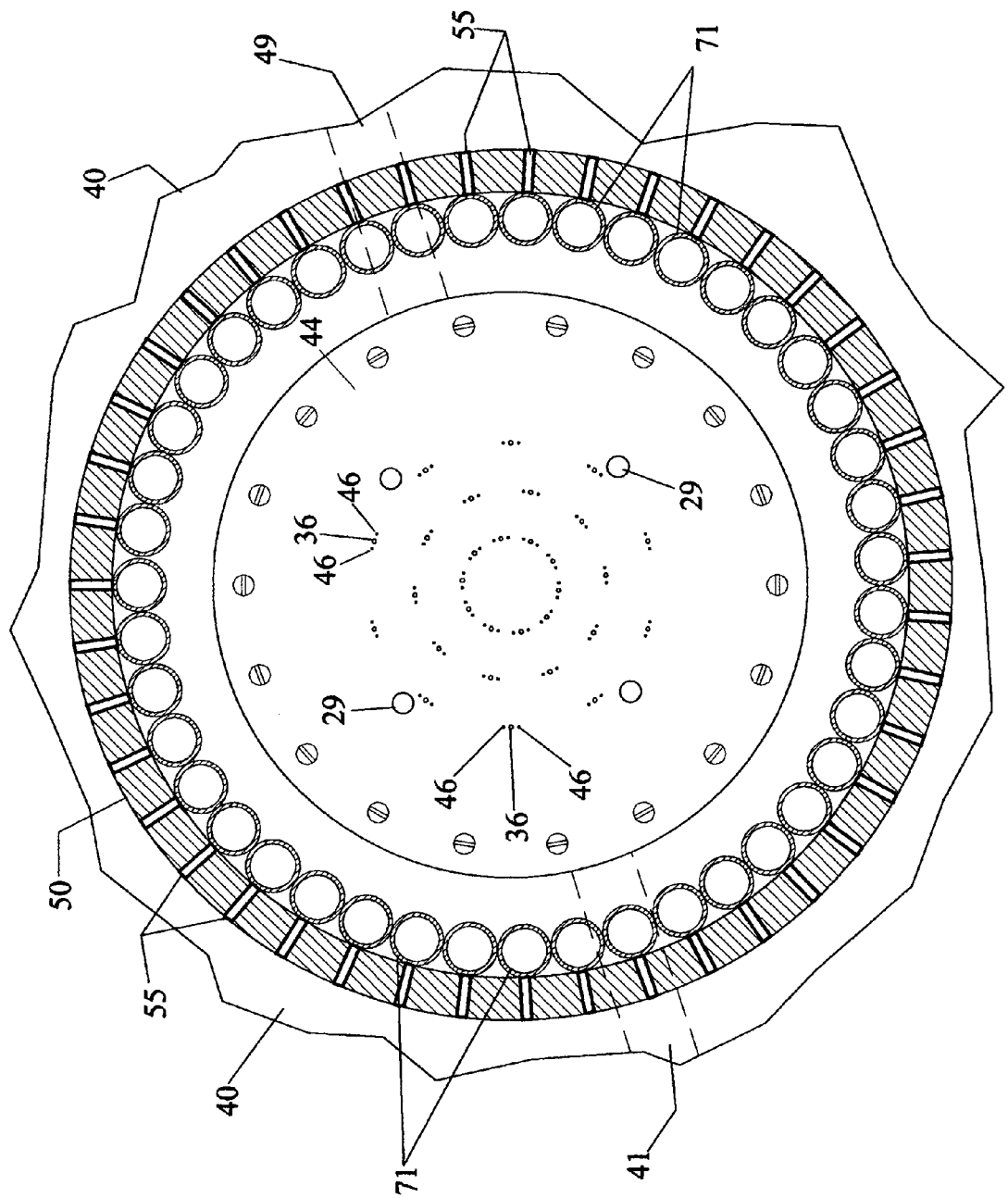

The oxidizer flows into the first oxidizer inlet 42 under pressure, with this pressure causing the oxidizer to flow upwards into the first oxidizer manifold 41, or into another means for metering oxidizer into the first combustion chamber 70. The first oxidizer manifold 41 is located between the fuel metering block 30 and the first oxidizer manifold plate 40. The first oxidizer manifold 41, which is preferably made of austenitic steel, directs the oxidizer through one or more first oxidizer injector orifices 46 that are present in the aft end of the first oxidizer manifold 41, and around the first fuel port tubes 36 preferably in a radial manner. The first fuel port tubes 36 and/or the first oxidizer injector orifices 46 are preferably oriented in the generator 8 in an angled manner that causes the fuel and oxidizer being metered into the first combustion chamber 70 to form one or more points of impingement, as is shown in FIG. 4, FIG. 5 and FIG. 11. Pressure causes the oxidizer to be injected from the first oxidizer injector orifices 46 through aligned holes that are present in the first transfer injector plate 44 into the first combustion chamber 70, where the oxidizer mixes with the one or more fuels, fuel components or fuel mixtures that are also metered therein for the first combustion reaction. A triplet impinging stream pattern would be formed from the fuel and the oxidizer being injected into the first combustion chamber 70 by the first fuel port tubes 36 and the first oxidizer injector orifices 46 shown in FIG. 4 and in FIG. 11. The first oxidizer injector orifices 46 are also preferably made of austenitic steel. The number of first oxidizer injector orifices 46 employed in the generator 8 may depend upon the type of oxidizer employed and the O/F mixture ratio desired. The optimal number of first oxidizer injector orifices 46 for a particular oxidizer and a particular O/F mixture ratio may be readily determined by a person of skill in the art.

The oxidizer has a dual purpose when it is present in the first oxidizer manifold 41. It travels into the first combustion chamber 70 for a first, partial, combustion reaction of the fuel. Additionally, it cools the aft side of the first transfer injector plate 44, which becomes hot from the first combustion reaction that occurs in the first combustion chamber 70. The first transfer injector plate 44, which is also preferably made of austenitic steel, transfers heat that is generated by the first combustion process to excess oxidizer that does not enter into the first oxidizer injector orifices 46, causing this excess oxidizer to become hot (generally turning a liquid oxidizer into a gas). The excess hot oxidizer preferably flows under pressure into an oxidizer transfer tube 49, or into another means for receiving excess oxidizer, which is also preferably made of austenitic steel, and then is preferably directed under pressure to the third combustion area 120. Alternatively, the oxidizer flowing in the oxidizer transfer tube 49 may be vented (released into the atmosphere), or may travel to another combustion chamber or area. The oxidizer that travels to the third combustion area 120 will generally be in a semi-liquid/gas state (if the oxidizer employed is a liquid) or in a gaseous state (if the oxidizer employed in a gas) as a result of the transference of heat from the first transfer injector plate 44 to this oxidizer.

The fuel is metered through the first fuel port tubes 36, and the oxidizer is metered through the first oxidizer injector orifices 46, at a desired O/F mixture ratio, and each preferably at an angle, which permits a vortex to be formed from the flow of the fuel and the flow of the oxidizer. Incoming fuel and oxidizer, which causes a fuel-rich mixture of fuel and oxidizer in the first combustion chamber 70, is then ignited by the one or more igniters 20 (two shown in FIG. 1), causing the first, partial, combustion of the fuel in the first combustion chamber 70. While the order may be varied, it is preferable that the igniter 20 is operating, producing a spark that causes a ball of flame to extend from the forward end of the igniter 20 through the flame tube 29 into the first combustion chamber 70, prior to the metering of the fuel and oxidizer into the first combustion chamber 70. It is also preferable that the fuel is metered into the first combustion chamber 70 prior to the oxidizer being metered into the first combustion chamber 70.

The one or more igniters 20 that are preferably employed in the generator 8 have an igniter housing 26 that is preferably securely attached to the forward end of the fuel metering block 30 by a suitable means for attaching these two components of the generator 8 together, such as by welding, or by other means for attachment described herein.

The one or more igniters 20 employed in the generator 8 are preferably electronic igniter systems that comprises: (a) an igniter housing 26 (for housing the various components of the igniter 20); (b) an igniter fuel inlet 22 (for permitting fuel from a source of fuel to enter into the igniter 20); (c) an igniter oxidizer inlet 24 (for permitting oxidizer from a source of oxidizer to enter into the igniter 20, and which is preferably made of austenitic steel); (d) a mixing chamber 28 (for the fuel and oxidizer employed in the igniter 20 to mix); and (e) a flame tube 29 (for a flame to propagate from the igniter into the first combustion chamber 70). The flame tube 29 preferably extends from the forward end of the igniter 20 to the forward end of the first combustion chamber 70. The aft end of the igniter housing 26 is preferably attached to the forward end of the fuel metering block 30.

The igniter fuel inlet 22 and igniter oxidizer inlet 24 are preferably each connected with one or more sources of fuel and oxidizer, respectively, such as fuel and oxidizer storage tanks (not shown), and are each securely attached to the forward end of the igniter housing 26. One or more fuels and oxidizers for use in the igniters 20 are pumped (or otherwise caused to flow) into the igniter fuel inlet 22 and into the igniter oxidizer inlet 24, respectively. The fuels and oxidizers employed in the igniter may be the same or different from the fuels and oxidizers described herein in connection with the fuels and oxidizers employed generally in the generator 8.

From two to four electronic igniters 20 are preferably employed, with each igniter preferably causing a flame to propagate from the forward end to the aft end of the flame tube 29, with the flame then entering into the first combustion chamber 70. Preferably, the flow of oxidizer and the flow of fuel employed in the igniters 20 will intersect in the central area of the mixing chamber 28. Also, preferably, the various flames flowing from the various flame tubes 29 will intersect at one or more common point, lines or areas in the first combustion chamber 70.

The fuel and oxidizer that flow into the mixing chambers 28 of the igniters 20 are preferably ignited by a spark caused electronically in the igniters 20. The flames produced by the ignition of the mixture of fuel and oxidizer then propagates down the flame tubes 29 into the first combustion chamber 70. Once fuel and oxidizer are metered into the first combustion chamber 70 by the first fuel port tubes 36 and the first oxidizer injector orifices 46, respectively, the resulting mixture of fuel and oxidizer present in the first combustion chamber 70 will ignite, initiating the first, partial, combustion process in the first combustion chamber 70. Once the combustion reaction commences in the first combustion chamber 70, the operation of the igniters 20 is preferably terminated, so that sparks will no longer be produced, and the flow of oxidizer into the mixing chambers 28 is terminated. One or more internal of external thermal sensors, or other like devices known by those of skill in the art, may be employed at various locations in or on the generator 8 to detect the initiation of the combustion process in the first combustion chamber 70, and to send a signal that causes the igniters 20 to be turned off, and the flow of oxidizer and/or fuel into the mixing chambers 28 to be terminated.

The temperature and pressure employed in the first combustion chamber 70 are regulated in a manner that permits an incomplete combustion (a partial or incomplete burning) of the one or more fuels, fuel components or fuel mixtures present therein. The oxidizers and the fuels that enter the first combustion chamber 70 are preferably mixed, and burned, at temperatures and pressures that cause them each to be at least partially vaporized into a gaseous state, or to otherwise remain in a gaseous state, during this first combustion process. The temperature in the first combustion chamber 70 can readily be controlled by those of skill in the art by the selection of an O/F mixture ratio that corresponds with the particular types of fuels, fuel components or fuel mixtures employed therein (with different fuels generally having different energy-producing capabilities or energy values) to achieve this result. The pressure in the first combustion chamber 70 can be regulated by controlling the pressures of the fuels and oxidizers that are metered into the first combustion chamber 70 from the first fuel port tubes 36 and the first oxidizer injector orifices 46, respectively, and the diameters of the ports from which they are metered into the first combustion chamber 70. The temperature in the first combustion chamber 70 preferably ranges from about 1,200° F. to about 5,800° F., and more preferably ranges from about 2,600° F. to about 2,800° F. The pressure in the first combustion chamber 70 preferably ranges from about 500 psig to about 1,500 psig, and more preferably ranges from about 600 psig to about 900 psig.

Using commercially-available computer programs, and other readily-available information, those of skill in the art can readily vary the temperatures and pressures employed in each of the various components and/or areas of the apparatuses of the invention, such as the first combustion chamber 70, the second combustion chamber 100 and the third combustion area 120, to achieve a desired result (an incomplete combustion of fuel, a complete combustion of fuel, etc.). Information, illustrations and mathematical equations describing and/or illustrating various aspects of combustion and heat transfer processes (including information concerning relationships between fuel, oxidizer and combustion chamber pressures and temperatures, fuel and oxidizer flow rates and O/F mixture ratios), and about various metals that are generally suitable for use in combustion apparatuses, is present in the books: (a) Dieter K. Huzel et al., *Modern Engineering for Design of Liquid Propellant Rocket Engines* (Volume 27, Progress in Astronautics and Aeronautics, American Institute of Aeronautics and Astronautics, Washington, D.C. 1992); and (b) George P. Sutton, *Rocket Propulsion Elements, an Introduction to the Engineering of Rockets* (Sixth Edition, John Wiley & Sons, Inc., New York, 1992). In addition, information, illustrations and mathematical equations describing and/or illustrating the operation, components, features and/or mathematical equations employed in the operation of conventional industrial steam generators and boilers is present at the web sites www.gc3.com and www.dekker.com, and in the books: (a) V. Ganaphthy, *Industrial Boilers and Heat Recovery Steam Generators, Design, Application and Calculations* (Marcel Dekker, Inc., New York, N.Y., 2003); (b) V. Ganaphthy, *Steam Plant Calculations Manual, Second Edition, Revised and Expanded* (Marcel Dekker, Inc., New York, N.Y., 1994); and (c) V. Ganaphthy, *Steam Power Plants* (Marcel Dekker, Inc., New York, N.Y., 1987).

Commercially-available thermochemical computer software, such as GUIPEP software, CQE™ software, GNOCIS™ software, PEOA GNOCIS™ software, CET software (Chemical Equilibrium with Transport Properties, NASA TM4557), Smart Process® software (Emerson, St. Louis, Mo.), POWERlink RTU software (Abbey Systems, Salt Lake City, Utah), FASTFLOW and CONDENS computer programs (MPR Associates, Inc., Alexandria, Va.) may also be employed to determine the various temperatures, pressures and fuel and oxidizer flow rates that should be employed at various locations of, or in various components in, the apparatuses of the invention for one or more particular fuels, fuel components or fuel mixtures and oxidizers. These computer programs can also provide detailed analyses of the components, including environmental pollutants and/or hazardous materials, that may be present in the combustion gas exhaust product that exits the exhaust system of the apparatuses when using one or more particular fuels, fuel components or fuel mixtures and one or more particular oxidizers. Information concerning these computer programs is available at the web sites www.westinghousepc.com, www.abbey.co.nz, www.mpr.com and www.lanl.gov.

The GUIPEP computer software is primarily a chemical equilibrium solver. It balances the chemical equations relating reactants and products by a method known as "minimization of Gibbs free energy." The reactants are transformed adiabatically and irreversibly to reactions product constituents in the amounts fixed by equilibrium relations, chamber pressure, and mass balance at a reaction temperature fixed by the available energy of reaction. The resulting set of products provides the basis for computation of thermodynamic properties from which performance parameters are determined by an iterative process to account for changing product properties and composition.

The amount of time that the one or more fuels, fuel components or fuel mixtures remain in the first combustion chamber 70 is an amount of time that permits them to undergo an incomplete (partial) combustion, which often occurs in a time period ranging from about 0.025 to about 10 seconds. However, the amount of time that the fuels, fuel components or fuel mixtures (or mixtures with oxidizer) remains in any of the combustion chambers or areas of the generator 8 may vary depending upon the temperature that is present in a particular combustion chamber or area, the velocity that the fuels, fuel components or fuel mixtures are injected into the chamber or area, the length of the chamber or area and the amount of vortexing that occurs to the fuels, fuel components or fuel mixtures in the chamber or area. The higher the temperature is, the faster the velocity of the fuel is, the shorter the length of the chamber or area and the less vortexing that occurs to the fuel, the shorter a period of time that the fuel (or fuel components or fuel mixtures and oxidizer) will generally remain in a particular combustion chamber or area.

All of the materials present in the first combustion chamber 70 are generally maintained under turbulent conditions, and are caused to go into a state of flux by the combustion reaction that occurs in the first combustion chamber 70. When a fuel or fuel component employed in the first combustion chamber 70 is a solid, the solid fuel or fuel component will generally be converted at least partially into a combustion gas therein by this process. The vortexing that preferably occurs to the combustion gas product that is generated in the first combustion chamber 70 will generally, and advantageously, permit the fuels, fuel components or fuel mixtures to have a more homogeneous mix with the one or more oxidizers, and the combustion gas product to remain longer in the first combustion chamber 70 than would occur without such vortexing, or than would typically occur in a conventional boiler or steam generator.

In the first combustion chamber 70, the hydrocarbons present in the one or more fuels, fuel components or fuel mixtures will generally be more complex than they will be in the second combustion chamber 100, where they undergo another incomplete (partial) combustion reaction, or in the third combustion area 120, where they undergo yet a third combustion reaction. For the same reasons, the hydrocarbons present in the one or more fuels, fuel components or fuel mixtures will also generally be more complex in the second combustion chamber 100 than they will be in the third combustion area 120, where they are disassociated (broken down) further.

A combustion gas product produced in the first combustion chamber 70 results from an incomplete (partial) combustion of the fuel present in the first combustion chamber 70. The amount of fuel that is combusted in the first combustion chamber 70 preferably ranges from greater than about 0% to less than about 100%, and more preferably ranges from about 20% to about 70%, and is most preferably about 50%. It generally contains combustion gases and partially burned fuel, which continues to be fuel rich, and which may contain environmental pollutants and/or hazardous materials (depending upon the type of fuels, fuel components or fuel mixtures that are employed) at this stage of the process as products of this incomplete combustion reaction (because only one, incomplete combustion of the fuel has occurred at this stage of the process), as well as oxidizer.

A fuel wear plate 63, which is shown in detail in FIG. 2, that is adjacent to the aft end of the first combustion chamber 70 is preferably designed to allow one or more, and preferably a plurality of, second fuel port tubes 66, or other means for metering fuel into the second combustion chamber 100, to be removably inserted into one or more, and preferably a plurality of, second fuel ports 65, which are shown in detail in FIG. 6, FIG. 7, FIG. 8, FIG. 9, FIG. 10 and FIG. 12. The fuel wear plate 63 is preferably made of a very hard metal, such as one of the commercially-available A-2, A-7, H-13 or S-7 metals, permitting wear and abrasion resistance, as well as resistance to tempering at elevated temperatures. This component of the generator 8 is designed to be removed and replaced as needed. Using conventional methods, the second fuel ports 65 are drilled through, or otherwise placed into, the fuel wear plate 63, a first water manifold plate 60 that has its forward end attached to the aft end of the fuel wear plate 63, a feed water manifold 64 that has its forward end attached to the aft end of the first water manifold plate 60, a second oxidizer manifold 82 that has its forward end attached to the aft end of the feed water manifold 64, a second transfer injector plate 84 that has its forward end attached to the aft end of the second oxidizer manifold 82, and a second oxidizer manifold plate 80 that has its forward end attached to the aft end of the second transfer injector plate 84, providing one or more hollow orifices (second fuel ports 65) that extend through each of these components of the generator 8, leading from the aft end of the first combustion chamber 70 to the forward end of the second combustion chamber 100. The size and number of the second fuel ports 65 and second fuel port tubes 66 may be varied widely in the manner described hereinabove in connection with the first fuel ports 34 and the first fuel port tubes 36. The number of second fuel ports 65 will preferably be the same as the number of second fuel port tubes 66 desired, and can be varied in a manner known by those of skill in the art according to the type of fuels, fuel components or fuel mixtures and the O/F mixture ratio employed. The diameter of the second fuel ports 65 should be a diameter that permits the second fuel port tubes 66 to be easily removably inserted into the second fuel ports 65, and to remain secure in the second fuel ports 65 during the operation of the generator 8. The second fuel port tubes 66 inserted into the second fuel ports 65 should also allow an O/F ratio that will permit the mixture of the one or more fuels, fuel components or fuel mixtures and the one or more oxidizers that mix together in the second combustion chamber 100 to be fuel rich. Because oxidizer will preferably circulate around the second fuel port tubes 66, the second fuel ports 65 and the second fuel port tubes 66 should also be made of austenitic steel. The second fuel port tubes 66 are removably inserted into the forward end of the fuel wear plate 63 and extend through the various components described above through the second transfer injector plate 84. The first water manifold plate 60 preferably has a flange containing equally spaced bolt holes for its attachment to the second oxidizer manifold plate 80.

The combustion gas product produced in the first combustion chamber 70 is moved by the pressure present therein, which is caused by the combustion process that occurs therein, from the forward end to the aft end of the first combustion chamber 70. It then becomes metered from the forward end to the aft end of the second fuel port tubes 66 and into the second combustion chamber 100. The second fuel port tubes 66 preferably cause the speed of the combustion gas product produced in the first combustion chamber 70 to increase, depending upon the diameter of the second fuel port tubes 66. However, the fuel rich combustion gas product that enters into the second combustion chamber 100 often enters the second combustion chamber 100 at a linear velocity of more than about 3284 feet per second pounds.

The combustion gas product that enters the second combustion chamber 100 is preferably supplied, and mixed, with one or more additional oxidizers, which may be the same as or different from the one or more oxidizers that entered into the first combustion chamber 70, and which are ready to cause another combustion reaction, this time in the second combustion chamber 100 (by the spontaneous combustion of the fuel that is present in the combustion gas product), in an amount that causes a second incomplete (partial) combustion of the fuel present in the second combustion chamber 100, and that preferably maintains the fuel and oxidizer in a fuel rich mixture. The O/F mixture ratio employed in the second combustion chamber 100 will also generally be dependent upon several variables, such as the particular fuel and oxidizer employed. Depending upon the chemical composition of the particular one or more fuels, fuel components or fuel mixtures employed, certain fuels will require more or less oxidizer to consume the fuel. The amount of additional oxidizer that is mixed with the fuel that enters into the second combustion chamber 100, and a desirable O/F mixture ratio, may readily be determined by those of skill in the art.

The additional oxidizer, such as LOX, that is added in the second combustion chamber 100 is drawn from a source of oxidizer, such as an oxidizer storage tank, through a suitable flow control device by a pump, or other suitable device, into a second oxidizer inlet 81, or into another means for receiving additional oxidizer, which is preferably made of austenitic steel. The flow control device may be one of those described hereinabove in connection with the fuel inlet manifold 12, or a similar device known by those of skill in the art. The flow rate of the additional oxidizer that enters the second oxidizer inlet 81 may be varied in a manner known by those of skill in the art for achieving a fuel rich mixture of fuel and oxidizer in the second combustion chamber 100. The additional oxidizer that enters into the second oxidizer inlet 81 is also preferably cool, and preferably has a temperature as described hereinabove for the oxidizer that enters into the first oxidizer inlet 42.

The additional oxidizer enters the second oxidizer inlet 81 under pressure, with this pressure causing the oxidizer to flow into the second oxidizer manifold 82 (shown in detail in FIG. 9), or into another means for metering additional oxidizer into the second combustion chamber 100, which is located between the feed water manifold 64 and the second transfer injector plate 84 (shown in detail in FIG. 10), and preferably around the second fuel port tubes 66 in a radial manner. The second oxidizer manifold 82, which is preferably made of austenitic steel, directs the additional oxidizer through one or more second oxidizer injector orifices 85 that are present in the aft end of the second oxidizer manifold 82. Pressure causes the additional oxidizer to be injected from the second oxidizer injector orifices 85, which are also preferably made of austenitic steel, into the second combustion chamber 100, where it mixes with fuel present therein (or that enters into the second combustion chamber 100) for the second combustion reaction. The number of second oxidizer injector orifices 85 desired will depend upon the types of the one or more oxidizers, and the O/F mixture ratio, employed. The optimal number of second oxidizer injector orifices 85 for one or more particular oxidizers, and for a particular O/F ratio, may be readily determined by a person of skill in the art. The second fuel ports 65, the second fuel port tubes 66 and the second oxidizer injector orifices 85 are shown in detail in FIG. 7, in FIG. 8, in FIG. 9, in FIG. 10 and/or in FIG. 12. The second oxidizer injector orifices 85 are shown in greater detail in FIG. 13.

The oxidizer has a dual purpose when it is present in the second oxidizer manifold 82. It provides oxidizer to the second combustion chamber 100 for a second, partial, combustion reaction of the fuel. Additionally, it cools the aft side of the second transfer injector plate 84, which becomes hot from the second combustion reaction that occurs in the second combustion chamber 100. The second transfer injector plate 84 is also preferably made of austenitic steel, and transfers heat that is generated by the second combustion process to excess oxidizer that does not enter into the second oxidizer injector orifices 85, causing this excess oxidizer to become hot (generally turning a liquid oxidizer into a gas). This excess hot oxidizer flows under pressure into the oxidizer transfer tube 49, and then is directed under pressure into the third combustion area 120. Alternatively, the oxidizer flowing in the oxidizer transfer tube 49 may be vented (released into the atmosphere), or may be directed to a different combustion chamber or area (when more than three combustion chambers or areas are employed in the generator 8). The oxidizer that flows to the third combustion area 120 will generally be in a semi-liquid/gas state (if the oxidizer employed is a liquid) or in a gaseous state (if the oxidizer employed in a gas) as a result of the transference of heat from the second transfer injector plate 84 to this oxidizer.

A second superheated steam product outlet 67, or another means for a superheated or dry saturated steam product to exit the generator 8, is preferably aligned with the feed water manifold 64, or with another means for circulating water around the second fuel port tubes 66 and providing forward and aft end cooling of the second fuel ports 65, and with a second water inlet 62, or with another means for receiving water in the generator 8. The cooling water becomes transformed into a superheated or dry saturated steam product, and then exits the generator 8 through the second superheated steam product outlet 67, or through another means for permitting superheated or dry saturated steam to exit the generator 8. The second superheated steam product outlet 67 is attached with the water manifold plate 60 by any suitable means for securely attaching these components of the generator 8 together, such as by welding, or using a flanged, JIC or AN fitting, and preferably by welding. The aft end of the water manifold plate 60 is preferably attached to the forward end of the second oxidizer manifold plate 80 with a means for securely attaching these areas of the generator 8 together, such as one or more third attachment devices 61, which may be the same as described hereinabove in connection with the first attachment devices 14. The first water manifold plate 60 and the second oxidizer manifold plate 80 preferably each have one or more bolt holes drilled therein (in the manner described hereinabove in connection with the flange of the fuel inlet manifold 12) that are aligned with each other. The third attachment devices 61 may be any devices that are suitable for securely attaching the above areas of the generator 8 together, for example, high strength bolts with nuts and accompanying lock washers. The number of third attachment devices 61 may be varied widely in a manner known by those of skill in the art to provide a secure attachment of these areas of the generator 8 together.

Figure 9:
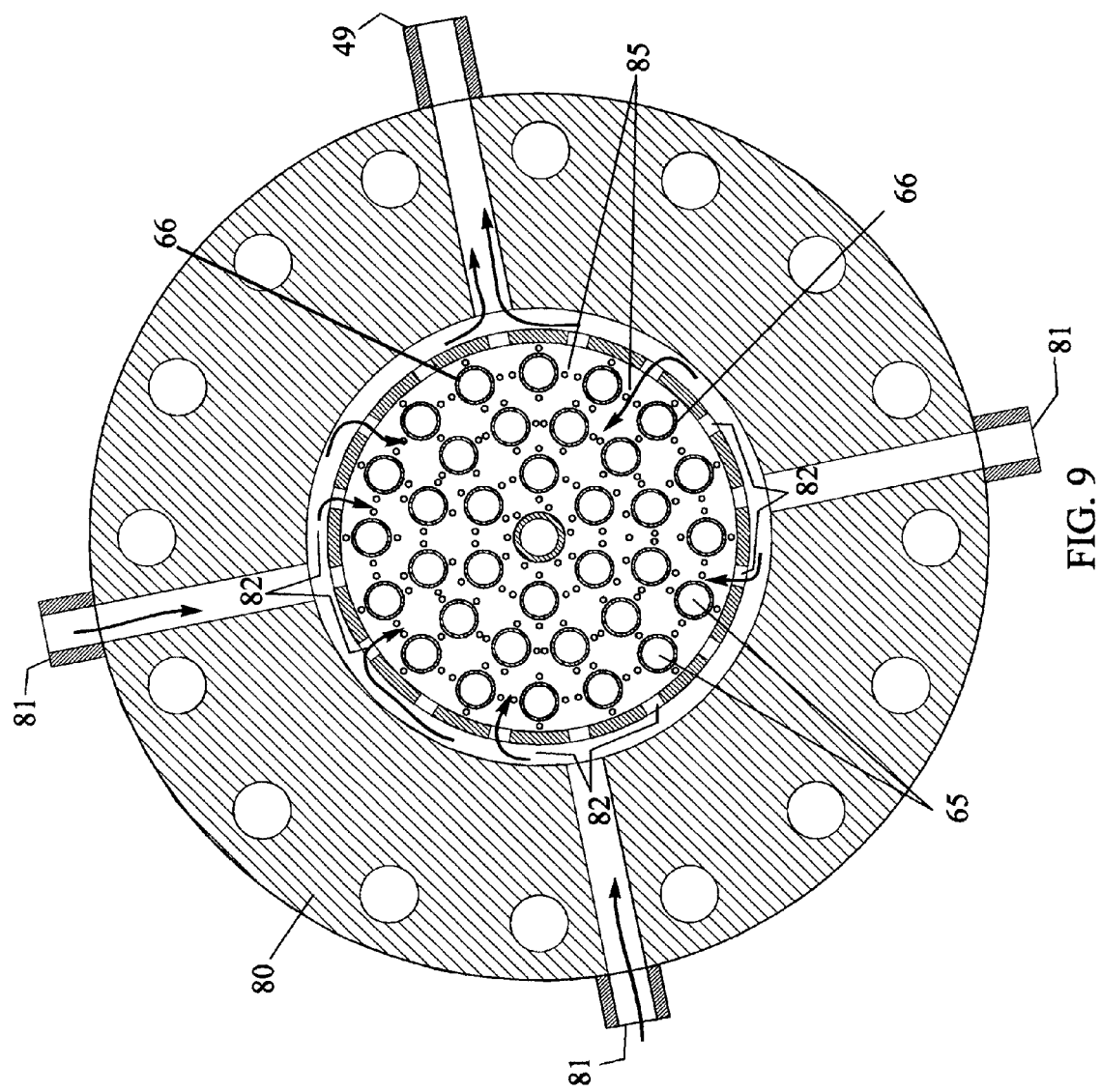
FIG. 9 is cross sectional view of the second oxidizer manifold 82, the second oxidizer manifold plate 80, the second oxidizer inlet 81, the second oxidizer injector orifices, the second fuel ports 65, the second fuel port tubes 66 and the oxidizer transfer tube 49 of the hydrocarbon combustion gas generator shown in FIG. 1, looking from the first combustion chamber 70 towards the second combustion chamber 100 and taken along plane 9—9 of FIG. 1.

The combustion gas product produced in the first combustion chamber 70 is metered through the second fuel port tubes 66. As is shown in FIG. 9, the additional oxidizer entering one or more second oxidizer inlets 81 is preferably metered in a manner that permits a radial distribution of the additional oxidizer around the second fuel port tubes 66, and then through the second oxidizer injector orifices 85 (preferably at the same rate and volume for all of the second oxidizer injector orifices 85) at a desired O/F mixture ratio, and each preferably at an angle, which permits a vortex to be formed from the fuel flow and the oxidizer flow. The incoming fuel present in the combustion gas product becomes mixed with the additional oxidizer, preferably resulting in a fuel-rich mixture of fuel and oxidizer in the second combustion chamber 100. The fuel then undergoes a second, partial, combustion in the second combustion chamber 100 at the specified O/F ratio (but preferably more complete in comparison with the first combustion process that occurred in the first combustion chamber 70). (If a third combustion process is not employed during the processes of the invention, the second combustion process may, alternatively, be a complete combustion process (described hereinbelow).) While the order may be varied, it is preferable that the combustion gas product containing the fuel is metered into the second combustion chamber 100 prior to the oxidizer being metered into the second combustion chamber 100.

The combustion gas product produced in the second combustion chamber 100 as a result of this second combustion reaction will preferably continue to be fuel rich, and will preferably contain a smaller quantity of environmental pollutants and/or hazardous materials in comparison with the combustion gas product produced in the first combustion chamber 70 (as a result of the fuel undergoing a second, separate, combustion reaction). The combustion gas product resulting from the second incomplete (but almost complete) combustion process that occurs in the second combustion chamber 100 then moves under pressure from the forward end to the aft end of the second combustion chamber 100. It then moves into to the third combustion area 120.

The temperature and pressure employed in the second combustion chamber 100 are regulated in a manner that permits a second, incomplete combustion (a separate, additional partial or incomplete burning) of the fuel present therein (in the combustion gas product). The additional oxidizer and the fuel are mixed, and burned, at temperatures and pressures that cause them each to be further vaporized (vaporized to a greater degree than the vaporization that occurred in the first combustion chamber 70) during this second combustion reaction. The temperature in the second combustion chamber 100 can readily be controlled by those of skill in the art by the selection of an O/F mixture ratio that corresponds with the particular type of fuel employed therein to achieve this result. The pressure in the second combustion chamber 100 can be regulated by controlling the pressure of the fuel and oxidizer that are metered into the second combustion chamber 100, and the diameters of the second fuel port tubes 66 and the second oxidizer injector orifices 85, respectively, from which they are metered into the second combustion chamber 100. The temperature in the second combustion chamber 100 preferably ranges from about 3,000° F. to about 5,800° F., and will more preferably range from about 4,000° F. to about 4,500° F. The pressure in the second combustion chamber 100 preferably ranges from about 300 psig to about 1,500 psig, and will more preferably range from about 500 psig to about 1,000 psig. The combustion reaction that occurs in the second combustion chamber 100 will preferably be close to stoichiometric (from about 85% to about 95% of stoichiometric) in its combustion pressure, but will preferably not achieve stoichiometric combustion (100%) at this stage of the process. Using commercially-available computer programs, and other readily-available information, those of skill in the art can readily vary the temperatures and pressures employed in the second combustion chamber 100 to achieve a further incomplete combustion of the fuel present therein.

The amount of time that the fuel remains in the second combustion chamber 100 is preferably an amount of time that permits the fuel to undergo an additional incomplete (partial) combustion in the second combustion chamber 100, which will generally occur in a time period ranging from about 0.025 to about 10 seconds. However, the amount of time that the fuel remains in the second combustion chamber 100 will vary depending upon the temperature that is present in the second combustion chamber 100 and the velocity that the fuel is injected into the second combustion chamber 100. The higher the temperature is, and the faster the velocity of the fuel is, the shorter a period of time that the fuel will remain in the second combustion chamber 100.

All of the materials present in the second combustion chamber 100 are also generally maintained under turbulent conditions, and are caused to go into a state of flux by the combustion reaction that occurrs therein. When one or more of the fuels, fuel components or fuel mixtures employed is a solid, the solid will generally be further converted into a combustion gas therein by this process. The vortexing that preferably occurs to the combustion gas product that is present in the second combustion chamber 100 will preferably, and advantageously, permit the fuel present in the combustion gas product to have a more homogeneous mix with the additional (and other) oxidizer, and the combustion gas product to remain longer in the second combustion chamber 100 than would occur without such vortexing, or than would typically occur in a conventional industrial or other boiler or steam generator. In the second combustion chamber 100, the substances that may be present in the fuel that is generally contained in the combustion gas product (along with one or more combustion gases) will generally be more complex than they would be in the third combustion area 120, where they undergo yet a third combustion reaction and are disassociated (broken down) further.

A combustion gas product produced in the second combustion chamber 100 results from another incomplete (partial) combustion of the fuel that has entered into the second combustion chamber 100 (the percentage of the total fuel employed that was not combusted in the first combustion chamber 70). The amount of fuel that is combusted in the second combustion chamber 100 generally ranges from greater than about 0% to less than about 100%, and preferably ranges from about 20% to about 70%, with about 40% being most preferred. For example, if 50% of the total fuel employed in the hydrocarbon combustion gas generator 8 is combusted in the first combustion chamber 70, it is preferred that 40% of the remaining 50% of fuel is combusted in the second combustion chamber 100 (leaving 20% of the total fuel employed in the generator 8 unburned). The combustion gas product produced in the second combustion chamber 100 preferably contains partially burned fuel, which continues to be fuel rich, and may contain some environmental pollutants and/or hazardous materials at this stage of the process as products of an incomplete combustion (because a complete combustion of the fuel has not yet occurred at this stage of the process), depending upon the type of fuels, fuel components or fuel mixtures and oxidizers that are employed. (If a third combustion area 120 is not employed in an apparatus of the invention, the percentage of fuel combusted in the second combustion chamber 100 will generally be higher than it would be if a third combustion area 120 is employed, and will preferably be the same as is described hereinbelow in connection with the third combustion area 120.)

The combustion gas product produced in the second combustion chamber 100 is moved by the high pressure that is present therein, and that is caused by the combustion process that occurs therein, from the forward end to the aft end of the second combustion chamber 100. It then is moved by the high pressure into the third combustion area 120, where it is moved from the forward end to the aft end of the third combustion area 120. The fuel rich combustion gas product that enters into the third combustion area 120 preferably enters at a linear velocity of more than about 0.178 feet per second pounds.

The combustion gas product that enters into the third combustion chamber 120 is then preferably supplied, and mixed, with one or more additional oxidizers, which may be the same as, or different from, other oxidizers employed in the generator 8, and which are ready to cause a third combustion reaction, this time in the third combustion area 120 (by the spontaneous combustion of the fuel present therein), in an amount that functions to cause a third, and preferably final and complete, combustion of the fuel that is present in the third combustion area 120. The third combustion area 120 functions in a manner similar to an "afterburner" of a jet. The O/F mixture ratio employed in the third combustion area 120 will also generally be dependent upon several variables, such as the particular one or more fuels, fuel components or fuel mixtures and oxidizers employed. Depending upon the chemical composition of the particular one or more fuels, fuel components or fuel mixtures employed, certain fuels will require more or less oxidizer to consume the fuel. The amount of additional oxidizer that is mixed with the fuel in the third combustion area 120, and a desirable O/F mixture ratio, may readily be determined by those of skill in the art.

The additional oxidizer that is supplied to the third combustion area 120 is preferably the excess oxidizer that did not flow into the first oxidizer manifold 41 or into the second oxidizer manifold 82, and that entered into the oxidizer transfer tube 49, and was not vented. However, additional oxidizer can be supplied to the third combustion area 120 (or to other areas or components of the generator 8) in a different manner, such as the manner described hereinabove in connection with the first oxidizer inlet 42 and the second oxidizer inlet 81. The additional oxidizer will usually be hot, and will preferably have a temperature ranging from about −180° F. to about 110° F. It will have been heated by absorbing heat from the first transfer injector plate 44 and the second transfer injector plate 84, where it functions as a coolant for these plates, and will usually be at least partially in a gaseous form.

The additional hot oxidizer moves under pressure into the aft end of the oxidizer transfer tube 49, which is present within a third outer housing 130. The lower portion of the third outer housing 130 is adjacent to the outside of a tube 121, which is preferably hollow, and which preferably forms the sidewalls of the aft end of the second combustion chamber 100 and the forward end of the third combustion chamber 120.

The additional oxidizer then passes under pressure from the aft end of the oxidizer transfer tube 49, which is preferably drilled or otherwise machined into the third outer housing 130, into a hot oxidizer manifold 136, or another means for metering additional oxidizer into the third combustion area 120, which is also present in the third outer housing 130. The additional oxidizer preferably flows in a radial manner into the hot oxidizer manifold 136, which is preferably made of austenitic steel, and which preferably sits securely (if fitted) within, or is machined into, the third outer housing 130. The upper portion of the hot oxidizer manifold 136 is positioned adjacent to the aft end of the oxidizer transfer tube 49, and the lower portion of the hot oxidizer manifold 136 is positioned adjacent to the outside of the tube 121. Pressure causes the additional oxidizer to be injected by the hot oxidizer manifold 136 and flow preferably in a radial manner around a series of one or more, and preferably a plurality of, hot oxidizer orifices 122 that are preferably evenly spaced in one or more rows (or other configurations) in the tube 121. The hot oxidizer orifices 122 are preferably aligned with the hot oxidizer manifold 136. The number and diameter of the hot oxidizer orifices 122, which can be drilled, or otherwise machined, into the tube 121, is dependent upon the final combustion gas product O/F mixture ratio selected. The optimal number, diameter and spatial orientation of the hot oxidizer orifices 122 for one or more particular oxidizers, and a particular O/F mixture ratio, may be readily determined by a person of skill in the art.

Pressure then cause the additional oxidizer to enter into the hot oxidizer orifices 122. The additional oxidizer is then injected (preferably by being sprayed) under pressure from the hot oxidizer orifices 122 into the third combustion area 120 (in a straight or angled manner), where it mixes with the fuel present therein, causing a third combustion reaction (by spontaneous combustion of the fuel), and a final complete combustion of the fuel that is present in the third combustion chamber 120. The flow rate of the additional oxidizer that enters the hot oxidizer manifold 136 may be varied in a manner known by those of skill in the art for achieving a stoichiometric combustion reaction in the third combustion area 120.

The incoming fuel present in the combustion gas product produced in the second combustion chamber 100 becomes mixed with the additional oxidizer, preferably resulting in a stoichiometric mixture of fuel and oxidizer in the third combustion area 120, and causing a vortex to be formed from the fuel flow and oxidizer flow in the third combustion area 120. The fuel then undergoes a third, and preferably complete, combustion of the fuel remaining in the third combustion area 120 at the specified O/F ratio. While the order may be varied, it is preferable that the combustion gas product containing the fuel is metered into the third combustion area 120 prior to the additional oxidizer being metered into the third combustion area 120.

A combustion gas product produced in the third combustion area 120 results from a complete (or almost complete) combustion of the fuel that has entered into the third combustion area 120 (the percentage of the total fuel employed that was not combusted in the first combustion chamber 70 or in the second combustion chamber 100). The amount of fuel that is combusted in the third combustion area 120 generally ranges from greater than about 0% to about 100%, and preferably ranges from about 50% to about 100%, with about 100% being most preferred. The goal is to have from about 95% to about 100%, and preferably 100%, of the fuel that is employed in the generator 8 combusted by this point in the process (when the third combustion area 120 is the last combustion chamber or area employed in the generator 8). For example, if 50% of the total fuel employed in the generator 8 is combusted in the first combustion chamber 70, and 40% of the remaining 50% of fuel is combusted in the second combustion chamber 100, it is preferred that all of the remainder of the fuel becomes combusted in the third combustion area 120 (leaving 0% of the total fuel employed in the generator 8 unburned, and achieving a 100% combustion efficiency). The combustion gas product produced in the third combustion area 120 preferably contains completely (100%) burned fuel and, thus, preferably does not have any products of incomplete combustion, such as environmental pollutants and/or hazardous materials (or has small quantities of such products).

The temperature and pressure employed in the third combustion area 120 are regulated in a manner that permits a final complete combustion (a separate, additional, complete burning) of the fuel present therein, which is present in a combustion gas product. The additional oxidizer and fuel are mixed, and burned, at temperatures and pressures that cause them each to be further vaporized (vaporized to a greater degree than the vaporization that occurred in the second combustion chamber 100) during this third combustion reaction. The temperature in the third combustion area 120 can readily be controlled by those of skill in the art by the selection of an O/F mixture ratio that corresponds with the particular types of fuels, fuel components or fuel mixtures employed therein to achieve this result. The pressure in the third combustion area 120 can be regulated by controlling the pressure of the fuels, fuel components or fuel mixtures and oxidizers that enter into the third combustion area 120. The temperature in the third combustion area 120 preferably ranges from about 3,000° F. to about 5,800° F., and will more preferably range from about 4,500° F. to about 5,500° F. The pressure in the third combustion area 120 preferably ranges from about 300 psig to about 1500 psig, and will more preferably range from about 500 psig to about 900 psig. The combustion process that occurs in the third combustion area 120 will preferably occur at a stoichiometric ratio O/F mixture ratio. Using commercially-available computer programs, and other readily-available information, those of skill in the art can readily vary the temperatures and pressures employed in the third combustion area 120 to achieve a complete combustion of the fuel present therein.

The amount of time that the fuel remains in the third combustion area 120 is an amount of time that permits the fuel to undergo a final and preferably complete combustion in the third combustion area 120, which will generally occur in a time period ranging from about 0.025 to about 10 seconds. However, the amount of time that fuel remains in the third combustion area 120 will vary depending upon the temperature that is present in the third combustion area 120 and the velocity that the fuel is injected into the third combustion area 120. The higher the temperature is, and the faster the velocity of the fuel is, the shorter a period of time that the fuel will remain in the third combustion area 120.

All of the materials present in the third combustion area 120 are also generally maintained under turbulent conditions, and are caused to go into a state of flux by the combustion reaction that occurrs therein. When the one or more fuels, fuel components or fuel mixtures employed is a solid, the solid will generally be further converted into a combustion gas therein by this process. The vortexing that preferably occurs to the combustion gas product that is present in the third combustion area 120 will generally, and advantageously, permit the fuel present in the combustion gas product to have a more homogeneous mix with the additional (and other) oxidizer, and the combustion gas product to remain longer in the third combustion area 120 than would occur without such vortexing, or than would typically occur in a conventional industrial or other boiler or steam generator. In the third combustion area 120, the substances present in the fuel will generally be less complex than they will be in the second combustion chamber 100, where they undergo yet a third combustion reaction and are disassociated (broken down) further. (If one or more solid fuels or fuel components are employed in the generator 8, the solid particles contained in the fuels or fuel components will likely be eroded in the first combustion chamber 70, and then further eroded in the second combustion chamber 100, and then still further eroded in the third combustion area 120, usually turning fully into a gas in the third combustion area 120.) The combustion gas exhaust product resulting from the third combustion reaction moves under pressure from the forward end to the aft end of the third combustion area 120. Under the pressure caused by the third combustion reaction, the combustion gas exhaust product then exits the generator 8, flowing out of the aft end of the third combustion area 120, which is open (does not have a wall or other closure at its aft end that causes the third combustion area 120 to be enclosed). The combustion gas exhaust product can be released into the atmosphere, for example, through a conventional smokestack, with the emission of no, or minimal amounts of, environmental pollutants and/or hazardous materials. Alternatively, it can be employed in another subsystem or system, such as a boiler or an exhaust heat recovery steam generator, to produce additional steam or other useful products.

The combustion gas exhaust product that exits out of the third combustion area 120, which will generally be very hot, will generally contain a smaller quantity of environmental pollutants and/or hazardous materials in comparison with the combustion gas product produced in the second combustion chamber 100 (as a result of undergoing a third, separate, and preferably complete combustion reaction), and will most preferably contain no environmental pollutants and/or hazardous materials. The temperature of the combustion gas exhaust product will generally range from about 2,000° F. to about 5,500° F., and will more usually range from about 2,700° F. to about 5,000° F. As a result of this high temperature, and as a result of the one or more fuels, fuel components or fuel mixtures employed in the generator 8 having undergone three separate combustion reactions by this stage of the process, the combustion gas exhaust product will generally be environmentally clean. It will preferably not contain any (0%) environmental pollutants and/or hazardous materials, or will contain minimal amounts of environmental pollutants and/or hazardous materials. Preferably, the combustion gas exhaust product will only contain non-polluting and harmless atoms that have disassociated from molecules that were initially present in the fuels, fuel components or fuel mixtures employed in the generator, such as H, C, O and Cl, and/or molecules that are not environmental pollutants and/or hazardous materials, such as $H_2O$, rather than molecules that are environmental pollutants (particularly criteria air pollutants) and/or hazardous materials, such as CO, NOx, $N_2O$, $NO_2$, SOx, $SO_2$, HCl and particulate matter. Depending upon the type of one or more fuels, fuel components or fuel mixtures employed, the combustion gas exhaust product produced after a complete combustion reaction in the processes and apparatuses of the invention may contain only water vapor ($H_2O$) and $CO_2$ (a non-criteria air pollutant that may be captured and used as described herein).

Depending upon the type of one or more fuels, fuel components or fuel mixtures employed in the processes and apparatuses of the invention, the combustion gas exhaust product may contain some ash. The level of ash that is present in the combustion gas exhaust product preferably ranges from about 0% to about 2%, with 0% (no ash) being most preferred. For example, if natural gas is employed as the only fuel in a process or apparatus of the invention, the combustion gas exhaust product should not contain any ash. Alternatively, if tire rubber (in a size reduced form) is employed as the only fuel, some ash will likely be present in the combustion gas exhaust product. As another example, if one pound of coal that has an energy value of 13,346 Btus per pound is combusted in a conventional coal-burning process, the potential energy produced should be about 31,017 kJ/kg, and the combustion gas exhaust product produced should contain approximately 73.98% carbon, 4.85% hydrogen, 6.41% oxygen, 1.76% nitrogen, 1.59% sulfur, 6.23% ash and 5.23% moisture. In contrast, if one pound of tire derived fuel is combusted in accordance with a process and/or apparatus of the present invention, the potential energy produced should be about 36,023 kJ/kg, and the combustion gas exhaust product produced should contain approximately 83.87% carbon, 7.09% hydrogen, 2.17% oxygen, 0.024% nitrogen, 1.23% sulfur, 4.78% ash and 0.62% moisture.

As is shown in FIG. 14, the combustion gas exhaust product can exit from the third combustion area 120 (of from another combustion chamber or area) of the generator 8 into an exhaust heat recovery steam generator containing water that can cool the hot combustion gas exhaust product, thereby converting the water to a steam product, which should also be environmentally clean. This steam product may contain varying percentages of wet steam, dry saturated steam, superheated steam and/or other types of steam, which can be separated from each other using conventional steam separation equipment, and can be separately used to perform various functions.

If the combustion gas exhaust product is cooled by a heat exchanger or similar device or apparatus (rather than being vented into the atmosphere), the temperature of the combustion gas exhaust product will generally be lowered to a temperature ranging from about 200° F. to about 300° F. However, at this lower temperature, atoms that may be present in the combustion gas exhaust product may have the ability to recombine to produce a series of different molecules, some of which may be environmental pollutants and/or hazardous materials, such as CO, NOx, $N_2O$, $NO_2$, SOx, $SO_2$ and/or HCl. Thus, care should be taken to properly isolate and dispose of those molecules that may be harmful or deadly, such as CO, and/or which may be environmental pollutants, which can be accomplished in a conventional manner known by those of skill in the art.

Feed water is preferably supplied to the generator 8 at the forward end of the first combustion chamber 70 from a source of water (not shown), such as a water storage tank, through a suitable flow control device by a pump to a first water inlet 52, or to another means for receiving feed water. The first water inlet 52 is attached to an upper portion of the first water manifold 51 by a means for securing these two areas of the generator 8 together, such as by welding, at an area between the forward end and the aft end of the first water manifold 51. Any suitable means or device for securely attaching the first water inlet 52 to the first water manifold 51 may be employed, which includes the methods and devices described hereinabove in connection with the attachment of the fuel inlet manifold 12 with the flow control device, and other similar methods or devices known by those of skill in the art. The flow control device may be the same as that described hereinabove in connection with the fuel inlet manifold 12. The water is preferably preheated (adding enthalpy thereto), having a temperature described hereinabove under the heading "Water," and aids the first combustion chamber 70 in maintaining its structural integrity when it is exposed to high temperatures. The water flow rate at this point in the process (and throughout the processes and apparatuses of the invention) is generally dependent upon several factors, such as the temperature present in the generator 8, the pressure of the water and the amount of superheated steam product or dry saturated steam product that is to be produced in a certain amount of time, for example 100 pounds of superheated steam product or dry saturated steam product per hour. A desirable water flow rate can readily be determined by a person of skill in the art.

The forward end of the first water manifold 51 is preferably attached to the aft end of the first oxidizer manifold plate 40 in the manner described hereinabove. The forward end of the first water manifold 51 preferably has one or more equally spaced bolt holes drilled therein for attachment with the first oxidizer manifold plate 40 using high strength bolts with accompanying nuts and washers. The bolt holes may be drilled in the manner, and in the number and spatial orientation, described hereinabove in connection with the fuel inlet manifold 12. The aft end of the first water manifold 51 is preferably attached with a first outer housing 50, preferably by welding. Any suitable means or device for securely attaching the first water manifold 51 to the first outer housing 50 may be employed, which includes the methods and devices described hereinabove in connection with the attachment of the fuel inlet manifold 12 with the flow control device, and other similar methods or devices known by those of skill in the art. The first outer housing 50 functions as a frame or structure that protects the first tube assembly 71 (provides mechanical hoop stregnth to the first tube assembly 71), and provides a structure to which a flange or other attachment device may be attached. Other outer housings described herein, such as the second outer housing 90 and the fourth outer housing 140, function in a similar manner.

The water flows under pressure through the first water inlet 52 into the first water manifold 51, or into another means for regulating a supply of water to the first tube assembly 71 and controlling water pressure. The first water manifold 51 permits a supply of water to be readily available to, and enter into, the first tube assembly 71, and maintains a preferably constant water pressure. The other water manifolds described herein function in a similar manner. The water then becomes forced under the pressure towards the first combustion chamber 70, and then into one or more first water inlet passageways 55 that are present in the first outer housing 50, and that are preferably drilled radially therein. The number of first water inlet passageways 55 that are present in the first outer housing 50 should be the same as the number of first water inlet passageways 55 that are present in the first tube assembly 71. The first water inlet passageways 55 in the first outer housing 50 are preferably located along the first combustion chamber 70 in an area located within the first water manifold 51. The water flows under pressure from the first water inlet passageways 55 located in the first outer housing 50 and into, and through, the first water inlet passageways 55 located in the one or more individual tubes that are present in the first tube assembly 71, which forms the sidewalls of the first combustion chamber 70.

Figure 6:
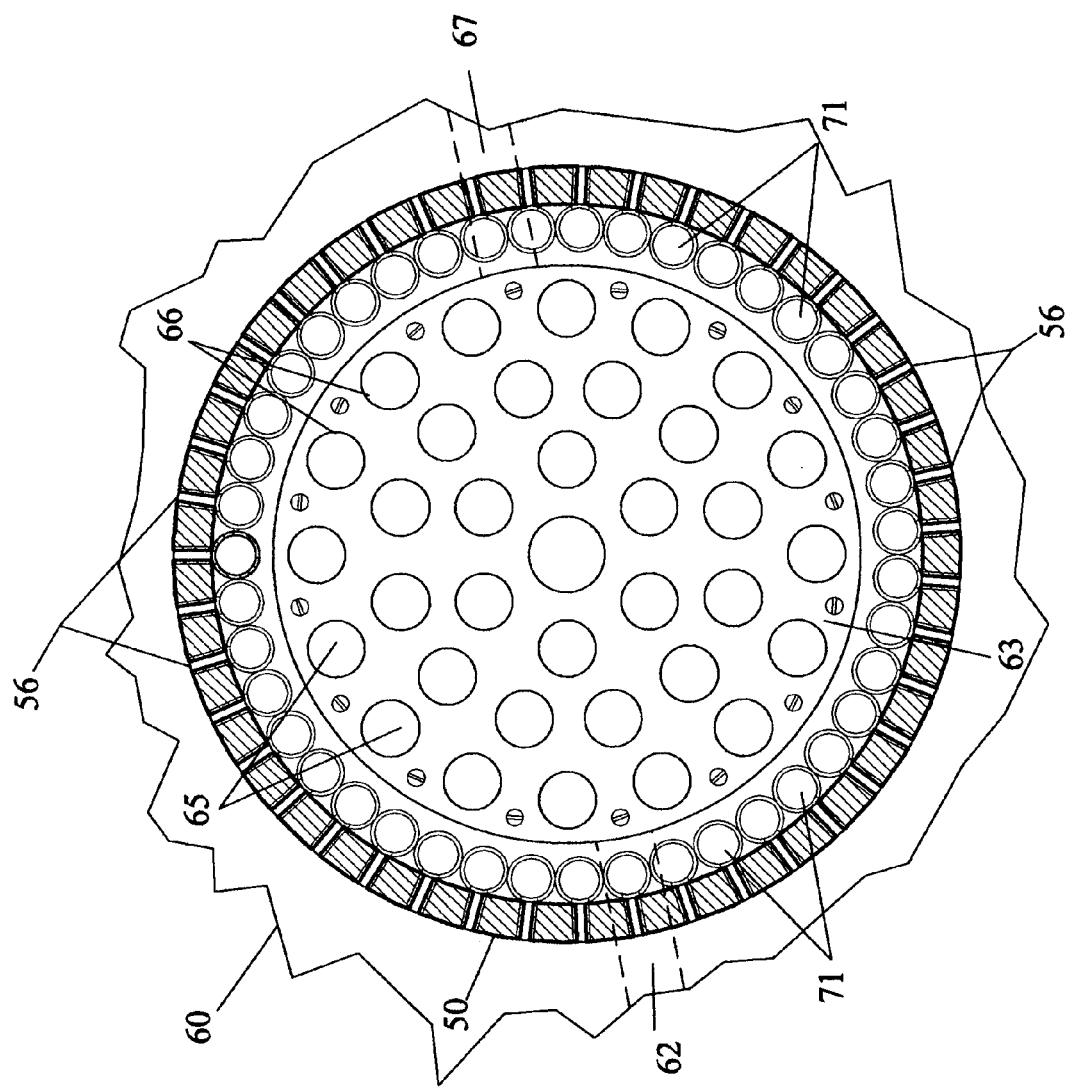
FIG. 6 is a cross sectional view of the first water inlet 62, the first water manifold plate 60, the first outer housing 50, the second fuel ports 65, the second fuel port tubes 66, the fuel wear plate 63, the second superheated steam outlet 67 and the individual tubes of water that are present in the first tube assembly 71 of the hydrocarbon combustion gas generator shown in FIG. 1, looking from the first combustion chamber 70 towards the second combustion chamber 100 and taken along plane 6—6 of FIG. 1.

The first tube assembly 71, which is shown in detail in FIG. 5 and FIG. 6, contains one or more hollow tubes that are preferably connected by a means for securely connecting the tubes together, for example, by welding. It is preferable to have a plurality of hollow tubes in the first tube assembly 71 (and in all of the other tube assemblies) so that the apparatus can continue to properly operate in the event that a leak (or other problem) occurs in one or more of the tubes. Generally, the more hollow tubes that are present in the first tube assembly 71 (and in all of the other tube assemblies employed in the generator 8), the more surface area that the water will contact, the faster that the water will become transformed into a superheated steam product, and the fewer problems that will occur if one of the tubes develops a problem. Any suitable means or device for connecting the hollow tubes together may be employed, which includes the methods and devices described hereinabove in connection with the attachment of the fuel inlet manifold 12 with the flow control device, and other similar methods or devices known by those of skill in the art. These hollow tubes (and the other hollow tubes described herein in connection with other tube assemblies) are preferably concentric in nature, but may be otherwise as desired. The tubes can be circular or oval in shape, or in any other suitable shape. Alternatively, the outside surface of a piece of tubing can be channeled and slid into the first outer housing 50, creating a water steam passageway (a channel wall configuration).

The forward end of each of the individual tubes comprising the first tube assembly 71 preferably has a first water inlet passageway 55 that corresponds to, and is aligned with, one or more first water inlet passageways 55 that are present in the first outer housing 50, and the aft end of each of the individual tubes preferably has a first superheated steam product exit passageway 56 that corresponds to, and is aligned with, one or more first superheated steam product exit passageways 56 that are present in the first outer housing 50. The first tube assembly 71 is preferably in the shape of a concentric tubular shell, but may be in any other suitable shape. The outside of the first tube assembly 71 may optionally, but preferably, be covered or wrapped with a high temperature material to more uniformly transfer the pressure load to the first outer housing 50 in a manner known by those of skill in the art. This high temperature material should have the ability to withstand a temperature of up to about 1000° F., and functions as an insulation for the first outer housing 50 and the first tube assembly 71, permitting a more efficient energy management of the gas energy produced in the first combustion chamber 70.

The aft end of the first oxidizer manifold plate 40 preferably has a groove 71a machined into it, in which the forward end of the first tube assembly 71 can be inserted. The groove 71a should be of a size that permits the forward end of the first tube assembly 71 to fit securely within it. A central area of the forward end of the first water manifold plate 60 also preferably has a groove 71b machined into it, in which the aft end of the first tube assembly 71 can be inserted. The groove 71b should be of a size that permits the aft end of the first tube assembly 71 to fit securely within it. Any suitable means or device for securely attaching the first oxidizer manifold plate 40 to the first tube assembly 71, and the first tube assembly 71 to the first water manifold plate 60, may be employed, which includes the methods and devices described hereinabove in connection with the attachment of the fuel inlet manifold 12 with the flow control device, and other similar methods or devices known by those of skill in the art. The first tube assembly 71 is inserted into, and securely fitted within, the first outer housing 50, preferably extending past both the forward end and the aft end of the first outer housing 50 at a length on the forward end that is equal to the depth of the groove 71a that is machined into the aft end of the first oxidizer manifold plate 40 (to allow the first tube assembly 71 to be inserted into it), and at a length on the aft end that is equal to the depth of the groove 71b that is machined into the forward end of the first water manifold plate 60 (to allow the first tube assembly 71 to be inserted into it). Each of these areas is preferably sealed with a gasket or similar device.

The first tube assembly 71, the second tube assembly 101, the third tube assembly 146 and the tube 121, are preferably removably attached to the generator 8, permitting these components of the generator 8 to be easily replaced, for example, by sliding them in and out of the generator 8.

The heat from the hot combustion gas product produced in the first combustion chamber 70 (resulting from a first combustion process) transfers from the inside of the first combustion chamber 70 into the adjacent first tube assembly 71. This heat transforms the water present in the individual tubes present in the first tube assembly 71 into a superheated steam product or a dry saturated steam product.

The superheated steam product or dry saturated steam product that is produced in the first tube assembly 71 (and that is produced at all other steps in the processes of the invention, and in all other areas of the apparatuses of the invention) is preferably under a pressure ranging from about 300 psig to about 4,500 psig, and more preferably ranging from about 2,600 psig to about 3,600 psig, with about 3,000 psig being still more preferred, and has a temperature preferably ranging from about 500° F. to about 1,150° F., and more preferably ranging from about 750° F. to about 1,100° F., with about 800° F. being still more preferred.

The superheated steam product or dry saturated steam product, which is present in the individual tubes present in the first tube assembly 71, flows under pressure into one or more first superheated steam product exit passageways 56 that are present in the first tube assembly 71, and then out of the first tube assembly 71 into one or more first superheated steam product exit passageways 56 that are preferably drilled radially, or otherwise placed, into the first outer housing 50, and that are aligned with the first superheated steam product exit passageways 56 that are present in the first tube assembly 71. The first superheated steam product exit passageways 56 that are present in the first outer housing 50 are preferably located along the first combustion chamber 70 in an area within the first superheated steam product exit manifold 53. The number of first superheated steam product exit passageways 56 that are drilled into the first outer housing 50 should be the same as the number of tubes, and as the number of first superheated steam product exit passageways 56, that are present in a first tube assembly 71. The superheated steam product or dry saturated steam product then flows under pressure away from the first combustion chamber 70 and into a first superheated steam product exit manifold 53, which preferably has its forward end attached to the aft end of the first outer housing 50 with a means for securely attaching these two areas of the generator 8 together, for example, by welding. Any suitable means or device for securely attaching the first superheated steam product exit manifold 53 to the first outer housing 50 may be employed, which includes the methods and devices described hereinabove in connection with the attachment of the fuel inlet manifold 12 with the flow control device, and other similar methods or devices known by those of skill in the art. The aft end of the first superheated steam product exit manifold 53 is preferably attached to the forward end of the first water manifold plate 60 with a means for securely attaching these two areas of the generator 8 together, for example, with one or more fourth attachment devices 57, such as high strength bolts and accompanying nuts and washers as needed. The fourth attachment devices 57 may be the same as that described hereinabove for the first attachment devices 14. The aft end of the first superheated steam product exit manifold 53 preferably has a connection device, such as that described hereinabove in connection with the fuel inlet manifold 12, having one or more equally spaced bolt holes drilled into it, permitting the insertion of high strength bolts therein. The superheated steam product or dry saturated steam product then passes under pressure from the first superheated steam product exit manifold 53 further away from the first combustion chamber 70 and into a first superheated steam product outlet 54, which is preferably positioned at an upper portion of the first superheated steam product exit manifold 53, between its forward end and its aft end. The superheated steam product or dry saturated steam product then flows out of the first superheated steam product outlet 54 (and out of the generator 8) into a conventional superheated steam product collection device (not shown), such as a steam drum that may optionally contain centrifugal separators and/or scrubbers, or other suitable device. A conventional superheated steam product collection device will generally have a mechanical separation device that will separate any water or wet steam that may be present along with the superheated steam product or dry saturated steam product from the superheated steam product or dry saturated steam product. Centrifugal separators and scrubbers are designed to process large volume flows, and a broad range of liquids. They may be of many different designs, and return moisture droplets to water, while allowing dry steam to pass out of a drum.

Feed water is supplied from a source of water (not shown), which may be the same or different source of water that is used to supply feed water to the first water inlet 52, such as a second water storage tank, through a suitable flow control device by a pump to a second water inlet 62 that is preferably located below the second fuel port tubes 66 at a lower portion of a central area of the generator 8. The second water inlet 62 is preferably located between the fuel wear plate 63 and the second oxidizer inlet 81. The flow control device may be the same as that described hereinabove in connection with the fuel inlet manifold 12. The water, which preferably has a temperature in the range described hereinabove in connection with the first water inlet 52, flows under pressure towards an area of the generator 8 that is located between the first combustion chamber 70 and the second combustion chamber 100. The water flows under pressure into a feed water manifold 64, which preferably extends from the aft end of the first combustion chamber 70 to the forward end of the second combustion chamber 100, and around the second fuel port tubes 66, which have hot combustion gas flowing therethrough. This water functions to cool the fuel wear plate 63, the forward end of which is adjacent to the aft end of the first combustion chamber 70, which becomes hot from the combustion gas product that exits from the first combustion chamber 70 and travels towards the second combustion chamber 100. The mixture of water, wet steam and a superheated steam product or dry saturated steam product that results from this cooling process flows from the feed water manifold 64 towards the upper portion of the generator 8 and out of the second superheated steam product outlet 67 (and out of the generator 8) into a conventional superheated steam product collection device (not shown). The second superheated steam product outlet 67 is preferably aligned with the second water inlet 62, and located above the feed water manifold 64 (at the upper portion of the generator 8). (The superheated steam product collection device is preferably a central superheated steam product collection device that is employed to collect the superheated steam product or dry saturated steam product from the first superheated steam product outlet 54, and from all other parts of the generator 8 from which superheated steam products or dry saturated steam products exit.)

Feed water is supplied to the generator 8 preferably in an area near the forward end of the second combustion chamber 100 from a source of water (not shown), which may be the same or different source of water that is used to supply feed water to the first water inlet 52 or the second water inlet 62, such as a third water storage tank, through a suitable flow control device by a pump to a third water inlet 92. The third water inlet 92 is preferably attached to an upper portion of a second water manifold 98 with a suitable means for securing these two areas of the generator 8 together, such as by welding, at an area between the forward end and the aft end of the second water manifold 98. Any suitable means or device for securely attaching the third water inlet 92 to the second water manifold 98 may be employed, which includes the methods and devices described hereinabove in connection with the attachment of the fuel inlet manifold 12 with the flow control device, and other similar methods or devices known by those of skill in the art. The flow control device may be the same type of device as is described hereinabove in connection with the fuel inlet manifold 12. The water, which preferably has a temperature in the range described hereinabove in connection with the first water inlet 52, aids the second combustion chamber 100 in retaining its structural integrity.

The forward end of the second water manifold 98 is preferably attached to the aft end of the second oxidizer manifold plate 80 with a means for securely attaching these two areas of the generator 8 together, for example, with one or more fifth attachment devices 91, such as high strength bolts and accompanying nuts and washers as needed. The fifth attachment devices 91 may be the same as that described hereinabove in connection with the first attachment devices 14. The forward end of the second water manifold 98 preferably has a connection device, such as that described hereinabove in connection with the fuel inlet manifold 12, having one or more equally spaced bolt holes drilled into it, permitting the insertion of high strength bolts therein. The aft end of the second water manifold 98 is preferably attached to a second outer housing 90 with a means for securely attaching these two areas of the generator 8 together, preferably by welding. Any suitable means or device for securely attaching the second water manifold 98 to the second outer housing 90 may be employed, which includes the methods and devices described hereinabove in connection with the attachment of the fuel inlet manifold 12 with the flow control device, and other similar methods or devices known by those of skill in the art.

The water flows under pressure through the third water inlet 92 into the second water manifold 98, or into another means for regulating a supply of water to a second tube assembly 101 and controlling water pressure. The water then becomes forced under pressure towards the second combustion chamber 100, and then into one or more second water inlet passageways 95 that are present in the second outer housing 90, and that are preferably drilled radially therein. The number of second water inlet passageways 95 that are present in the second outer housing 90 should be the same as the number of second water inlet passageways 95 that are present in the second tube assembly 101. The second water inlet passageways 95 in the second outer housing 90 are preferably located along the second combustion chamber 100 in an area located within the second water manifold 98.

The second tube assembly 101 preferably forms the sidewalls of a portion of the second combustion chamber 100 (preferably about two thirds of the sidewalls, leading from the second oxidizer manifold plate 80 towards the aft end of the second combustion chamber 100). The water flows under pressure from the second water inlet passageways 95 located in the second outer housing 90 and into, and through, the second water inlet passageways 95 located in the one or more individual tubes that are present in the second tube assembly 101. The second tube assembly 101 is shown in detail in FIG. 8.

The tubes that are present in the second tube assembly 101 are preferably connected with a means for connecting these tubes together, which may be the same as described hereinabove in connection with the first tube assembly 71. The tubes are preferably concentric in nature, but may be otherwise as desired, and can be circular or oval in shape, or in any other suitable shape. Alternatively, the outside surface of a piece of tubing can be channeled and slid into the second outer housing 90, creating a water steam passageway (a channel wall configuration).

The forward end of each of the individual tubes comprising the second tube assembly 101 preferably has a second water inlet passageway 95 that corresponds to, and is aligned with, one or more second water inlet passageways 95 that are present in the second outer housing 90, and the aft end of each of the individual tubes preferably has a second superheated steam product exit passageway 96 that corresponds to, and is aligned with, one or more superheated steam product exit passageways 96 that are present in the second outer housing 90. The second tube assembly 101 is preferably in the shape of a concentric tubular shell, but may be in any other suitable shape.

The outside of the second tube assembly 101 is preferably adjacent to the inside of the second outer housing 90. The outside of the second tube assembly 101 may optionally, but preferably, be covered or wrapped with a high temperature material in the manner described hereinabove in connection with the first tube assembly 71, permitting a more efficient energy management of the gas energy produced in the second combustion chamber 100.

The aft end of the second oxidizer manifold plate 80 preferably has a groove 101a machined into it, in which the forward end of the second tube assembly 101 can be inserted. The groove 101a should be of a size that permits the forward end of the second tube assembly 101 to fit securely within it. A central area of the forward end of a second water manifold plate 110 also preferably has a groove 101b machined into it, in which the aft end of the second tube assembly 101 can be inserted. The groove 101b should be of a size that permits the aft end of the second tube assembly 101 to fit securely within it. Any suitable means or device for securely attaching the second oxidizer manifold plate 80 to the second tube assembly 101, and the second tube assembly 101 to the second water manifold plate 110, may be employed, which includes the methods and devices described hereinabove in connection with the attachment of the fuel inlet manifold 12 with the flow control device, and other similar methods or devices known by those of skill in the art. The second tube assembly 101 is inserted into, and securely fitted within, the second outer housing 90, preferably extending past both the forward end and the aft end of the second outer housing 90 at a length on the forward end that is equal to the depth of the groove 101a that is machined into the aft end of the second oxidizer manifold plate 80 (to allow the second tube assembly 101 to be inserted into it), and at a length on the aft end that is equal to the depth of the groove 101b that is machined into the forward end of the second water manifold plate 110 (to allow the second tube assembly 101 to be inserted into it). Each of these areas is preferably sealed with a gasket or other suitable device.

The heat from the hot combustion gas product produced in the second combustion chamber 100 (resulting from a second combustion process) transfers from the inside of the second combustion chamber 100 and into the adjacent second tube assembly 101. This heat transforms the water present in the individual tubes present in the second tube assembly 101 into a superheated steam product or a dry saturated steam product. The superheated steam product or dry saturated steam product that is produced in the second tube assembly 101 preferably has a pressure and a temperature in the ranges described hereinabove in connection with the first tube assembly 71.

The superheated steam product or dry saturated steam product, which is present in the individual tubes present in the second tube assembly 101, flows under pressure into one or more second superheated steam product exit passageways 96 that are present in the second tube assembly 101, and then out of the second tube assembly 101 into one or more second superheated steam product exit passageways 96 that are preferably drilled radially, or otherwise placed, into the second outer housing 90, and that are aligned with the second superheated steam product exit passageways 96 that are present in the second tube assembly 101. The second superheated steam product exit passageways 96 that are present in the second outer housing 90 are preferably located along a portion of the second combustion chamber 100 in an area within the second superheated steam product exit manifold 93. The number of second superheated steam product exit passageways 96 that are drilled into the second outer housing 90 should be the same as the number of tubes, and of the number of second superheated steam product exit passageways 96, that are present in the second tube assembly 101. The superheated steam product or dry saturated steam product then flows under pressure away from the second combustion chamber 100 and into a second superheated steam product exit manifold 93, which preferably has its forward end attached to an area between the forward end and the aft end of the second outer housing 90 with a means for securely attaching these two areas of the generator 8 together, which may be the same as described hereinabove in connection with the forward end of the first superheated steam product exit manifold 53. The aft end of the second superheated steam product exit manifold 93 is preferably attached to the forward end of the second water manifold plate 110 with a means for securely attaching these two areas of the generator 8 together, which may be the same as that described 184' hereinabove in connection with the aft end of the first superheated steam product exit manifold 53, for example, with one or more sixth attachment devices 97, such as high stregnth bolts and accompanying nuts and washers as needed. The sixth attachment devices 97 may be the same as that described hereinabove for the first attachment devices 14. The aft end of the second superheated steam product exit manifold 93 preferably has a connection device, such as that described hereinabove in connection with the fuel inlet manifold 12, having one or more equally spaced bolt holes drilled into it, permitting the insertion of high strength bolts therein. The superheated steam product or dry saturated steam product then passes under pressure from the second superheated steam product exit manifold 93 further away from the second combustion chamber 100 and into a third superheated steam product outlet 94, which is preferably positioned at an upper portion of the second superheated steam product exit manifold 93, between its forward end and its aft end. The superheated steam product or dry saturated steam product then flows out of the third superheated steam product outlet 94 (and out of the generator 8) into a conventional superheated steam product collection device (not shown).

Feed water is supplied to the generator 8 at a location near the aft end of the second combustion chamber 100 from a source of water (not shown), which may be the same or different source of water that is used to supply feed water to the other water inlets (52, 62 and 92), such as another water storage tank, through a suitable flow control device by a pump to a fourth water inlet 131. The flow control device may be the same type of device as is described hereinabove in connection with the fuel inlet manifold 12.

The fourth water inlet 131, a third water manifold 135 and a fourth superheated steam outlet 132 are preferably drilled, or otherwise machined, into a third outer housing 130, preferably at a location between the aft end of the second water manifold plate 110 and the forward end of the hot oxidizer manifold 136. The lower portion of the third water manifold 135 is preferably adjacent to the outside of a tube 121 that preferably extends from the aft end of the second tube assembly 101 to the forward end of a third tube assembly 146, and that preferably forms the sidewalls of a portion of the aft end of the second combustion chamber 100 (preferably about one third of the second combustion chamber 100) and a portion of the forward end of the third combustion area 120 (preferably about one third of the third combustion area 120). The fourth water inlet 131 is located at an upper portion of the generator 8, and has its aft end leading into the upper portion of the forward end of the third water manifold 135. The upper portion of the aft end of the third water manifold 135 leads into the lower portion of the fourth superheated steam product outlet 132.

The aft end of the second water manifold plate 110 is attached to a portion of the forward end of the third outer housing 130 by a means for securely attaching these two areas of the generator 8 together, for example, using one or more seventh attachment devices 111, such as high strength bolts with accompanying nuts and washers as needed. The seventh attachment devices 111 may be the same as described hereinabove in connection with the first attachment devices 14. Any suitable means or device for securely attaching the second water manifold plate 110 to the third outer housing 130 may be employed, which includes the methods and devices described hereinabove in connection with the attachment of the fuel inlet manifold 12 with the flow control device, and other similar methods or devices known by those of skill in the art.

Feed water, which preferably has a temperature in the range described hereinabove in connection with the first water inlet 52, flows under pressure through the fourth water inlet 131 towards the second combustion chamber 100 into the upper portion of the forward end of the third water manifold 135, which is preferably machined into the third outer housing 130. The water becomes heated by the transference of heat from the combustion gas product produced in the second combustion chamber 100 and/or in the third combustion area 120 through the tube 121, the third outer housing 130 and the third water manifold 135, thereby transforming the water into a superheated steam product or dry saturated steam product.

The fourth water inlet 131 preferably has a baffle (not shown) that diverts the superheated steam product produced from the feed water to the aft side of the third water manifold 135, allowing the superheated steam product or dry saturated steam product to travel away from the tube 121 and exit from the fourth superheated steam product outlet 132 into a superheated steam collection device (not shown). The feed water circulates around the tube 121 preferably in a radial manner, and functions as a coolant to cool the tube 121, which become hot from the combustion gas product produced in the second combustion chamber 100 and/or in the third combustion area 120.

Feed water is supplied to the generator 8 at a location near the forward end of the third combustion area 120 from a source of water (not shown), which may be the same or different source of water that is used to supply feed water to the other water inlets (52, 62, 92 and 131), such as another water storage tank, through a suitable flow control device by a pump to a fifth water inlet 133. The flow control device may be the same type of device as is described hereinabove in connection with the fuel inlet manifold 12.

The fifth water inlet 133, a fourth water manifold 137 and a fifth superheated steam product outlet 139 are preferably also drilled, or otherwise machined, into the third outer housing 130 at a location between the aft end of the hot oxidizer manifold 136 and the forward end of a fifth water manifold 147. The lower portion of the fourth water manifold 137 is preferably also adjacent to the upper portion of the tube 121. The fifth water inlet 133 is preferably located at an upper portion of the generator 8, and has its aft end leading into the upper portion of the forward end of the fourth water manifold 137. The upper portion of the aft end of the fourth water manifold 137 leads into the lower portion of the fifth superheated steam product outlet 139.

The water, which preferably has a temperature in the range described hereinabove in connection with the first water inlet 52, flows under pressure through the fifth water inlet 133 towards the third combustion area 120 into the upper portion of the forward end of the fourth water manifold 137, where it becomes heated by the transference of heat from the combustion gas product produced in the third combustion area 120 through the tube 121, the third outer housing 130 and the fourth water manifold 137, thereby transforming the water into a superheated steam product or dry saturated steam product.

The fifth water inlet 133 preferably also has a baffle (not shown) that diverts the superheated steam product or dry saturated steam product produced from the water to the aft side of the fourth water manifold 137, allowing the superheated steam product or dry saturated steam product to travel away from the tube 121 and exit from the fifth superheated steam product outlet 139 into a superheated steam collection device (not shown). The feed water preferably circulates around the tube 121 in a radial manner, and functions as a coolant to cool the tube 121, which become hot, as described hereinabove.

Feed water is supplied to the generator 8 at a location near the aft end of the third outer housing 130 from a source of water (not shown), which may be the same or different source of water that is used to supply feed water to the other water inlets (52, 62, 92, 131 and 133), such as another water storage tank, through a suitable flow control device by a pump to a sixth water inlet 149. The sixth water inlet 149 is preferably located downstream from the fourth water manifold 137, preferably at a location in which a combustion gas exhaust product starts to exit from the third combustion area 120 (and from the generator 8). The forward end of the sixth water inlet 149 is preferably attached to an area between the forward end and the aft end of the fifth water manifold 147 by a suitable means for securely attaching these two areas of the generator 8 together, such as by welding. Any suitable means or device for securely attaching the sixth water inlet 149 to the fifth water manifold 147 may be employed, which includes the methods and devices described hereinabove in connection with the attachment of the fuel inlet manifold 12 with the flow control device, and other similar methods or devices known by those of skill in the art. The flow control device may be the same type of device as is described hereinabove in connection with the fuel inlet manifold 12. The temperature of the water is preferably as described hereinabove in connection with the first water inlet 52.

An upper portion of the fifth water manifold 147 is preferably attached to the aft end of the third outer housing 130 by a means for securely attaching these two areas of the generator 8 together, for example, using one or more eighth attachment devices 141, such as high strength bolts with accompanying nuts and washers as needed. The eighth attachment devices 141 may be the same as described hereinabove in connection with the first attachment devices 14. The upper portion of the fifth water manifold 147, and the aft end of the third outer housing 130, each preferably have one or more aligned, equally spaced bolt holes drilled therein for the insertion of high strength bolts therein. The bolt holes may be drilled in the manner, and in the number and spatial orientation, described above in connection with the fuel inlet manifold 12. The lower portion of the fifth water manifold 147 is preferably attached to the forward end of a fourth outer housing 140 by a means for securely attaching these two areas of the generator 8 together, such as by welding. Any suitable means or device for securely attaching the fifth water manifold 147 to the fourth outer housing 140 may be employed, which includes the methods and devices described hereinabove in connection with the attachment of the fuel inlet manifold 12 with the flow control device, and other similar methods or devices known by those of skill in the art.

The water flows under pressure through the sixth water inlet 149 towards the aft end of the third outer housing 130 into the fifth water manifold 147, filling the fifth water manifold 147 with water. The water then becomes forced under pressure towards the third combustion area 120 into the forward end of the third tube assembly 146, which forms the sidewalls of a portion of the third combustion area 120 from which a combustion gas exhaust product exits. The outside of the third tube assembly 146 is preferably adjacent to the inside of the fourth outer housing 140.

The third tube assembly 146 contains one or more hollow tubes that are preferably connected with a means for connecting the tubes together, for example, by welding. Any suitable means or device for connecting the tubes together may be employed, which includes the methods and devices described hereinabove in connection with the attachment of the fuel inlet manifold 12 with the flow control device, and other similar methods or devices known by those of skill in the art. The hollow tubes are preferably concentric in nature, but may be otherwise as is desired. The tubes can be circular or oval in shape, or in any other suitable shape. Alternatively, the outside surface of a piece of tubing can be channeled and slid into the fourth outer housing 140, creating a water steam passageway (a channel wall configuration).

The forward end of each of the individual tubes comprising the third tube assembly 146 preferably has a water inlet and the aft end of each of the individual tubes preferably has a superheated steam product outlet. The third tube assembly 146 is preferably in the shape of a conical cone (with the forward end having a smaller diameter than the aft end), but may be in any other suitable shape. The third tube assembly 146 preferably extends away from the tube 121 (and from the third combustion area 120), as is shown in FIG. 1, at an angle that preferably ranges from about 12 degrees to about 18 degrees.

The outside of the third tube assembly 146 may optionally, but preferably, be covered or wrapped with a high temperature material in the manner described hereinabove for the first tube assembly 71, permitting a more efficient energy management of the gas energy produced in the third combustion area 120.

The heat from the hot combustion gas exhaust product produced in the third combustion area 120 (resulting from a third combustion process) becomes transferred from inside of the third combustion area 120 into the third tube assembly 146. This heat transforms the water that is present in the individual tubes present in the third tube assembly 146 into a superheated steam product or a dry saturated steam product. The superheated steam product or dry saturated steam product that is produced in the third tube assembly 146 preferably has a pressure and a temperature in the ranges described hereinabove in connection with the first tube assembly 71.

The water that enters into the sixth water inlet 149 acts as a coolant to cool the third tube assembly 146, which becomes hot from the combustion gas exhaust product produced in the third combustion area 120.

The superheated steam product or dry saturated steam product that becomes present in the individual tubes present in the third tube assembly 146 flows under pressure out of the superheated steam product outlets present in the tubes, and out of the third tube assembly 146, away from the third combustion area 120 into the lower portion of a third superheated steam product exit manifold 143, which preferably has its forward end adjacent to the aft end of the third tube assembly 146, and which is preferably located at the aft end of the third combustion area 120 (and of the generator 8). The forward end of the third superheated steam product exit manifold 143 is also preferably located in a close proximity with the lower portion of an exhaust plate 148. The lower portion of the exhaust plate 148 is preferably welded to the aft end of the fourth outer housing 140, functions as an interface for the combustion gas exhaust product that exits the generator 8, and preferably diverts the combustion gas exhaust product into a device that can utilize the heat present in the combustion gas exhaust product, for example, an exhaust heat recovery steam generator (shown in FIG. 14), or to the atmosphere.

The superheated steam product or dry saturated steam product flows under pressure from the lower portion to the upper portion of the third superheated steam product exit manifold 143, which has its upper end attached to an area located between the lower portion and the upper portion of the exhaust plate 148. It has its lower end attached to the exhaust plate 148 with a means for securely attaching these two areas of the generator 8 together, for example, which may be by welding. It has its upper end attached to the exhaust plate 148 with a means for securely attaching these two areas of the generator 8 together, for example, by welding. Any suitable means or device for securely attaching the superheated steam exit manifold 143 to the third tube assembly 146, and the superheated steam exit manifold 143 to the exhaust plate 148, may be employed, which include the methods and devices described hereinabove in connection with the attachment of the fuel inlet manifold 12 with the flow control device, and other similar methods or devices known by those of skill in the art.

The aft end of the third combustion area 120 may be left open, thereby permitting a combustion gas exhaust product produced by the generator 8 to be released into the atmosphere. Alternatively, the exhaust plate 148 may, optionally, be attached to an exhaust heat recovery steam generator (shown in FIG. 14), or similar device, with a means for securely attaching the exhaust plate 148 to a flange or similar structure present on the exhaust heat recovery steam generator, for example, using one or more ninth attachment devices 150. The ninth attachment devices 150 may be the same as the first attachment devices 14, such as high stregnth bolts with accompanying nuts and washers as needed. The upper portion of the exhaust plate 148 preferably has one or more equally spaced bolt holes drilled into it, which are aligned with similarly sized and spaced bolt holes present on an area of the exhaust heat recovery steam generator that can be connected with the exhaust plate 148, permitting the insertion of high strength bolts therein.

The superheated steam product or dry saturated steam product then passes under pressure from the third superheated steam exit manifold 143 further away from the third combustion area 120 and into a sixth superheated steam product outlet 144, which is preferably located at an upper portion of the third superheated steam exit manifold 143, between its forward end and its aft end. The superheated steam product or dry saturated steam product then flows out of the sixth superheated steam product outlet 144 (and out of the generator 8) into a superheated steam collection device (not shown).

Employment of a Hydrocarbon Combustion Gas Generator in a Trigeneration System Referring now to FIG. 1 and to FIG. 14, there is shown in FIG. 14 a schematic drawing of a preferred and specially configured application of a hydrocarbon combustion gas generator of the present invention. FIG. 14 shows the employment of a hydrocarbon combustion gas generator subsystem of the invention, which is generally indicated by the number 1000, in a non-polluting trigeneration steam energy generating plant, which is generally indicated by the number 10000. The trigeneration steam energy generating plant 10000 also comprises an exhaust heat recovery steam generator subsystem 2000, an oxidizer subsystem 3000, a fuel subsystem 4000, a water management subsystem 5000, a heat rejection subsystem 6000, a power turbine subsystem 7000, an electrical power generator subsystem 8000 and an oxidizer manufacturing subsystem 9000. The hydrocarbon combustion gas generator ("generator") shown in FIG. 14, which is generally indicated by the number 8, produces different types of steam (a superheated steam product or dry saturated steam product, medium pressure steam and low pressure steam) that can be separately used in many different existing industrial applications, as well as in new industrial applications, and in the on-site, non-polluting, steam electrical power generation.

The oxidizer subsystem 3000, fuel subsystem 4000 and water management subsystem 5000 provide (feed), and control the flow of, oxidizer and fuel reactants, and water, that are employed in the generator 8.

The oxidizer employed in the oxidizer subsystem 3000 is obtained by an oxidizer manufacturing subsystem 9000. Liquid oxygen (LOX) may be employed as the oxidizer, and may be produced by an air separation unit (ASU) via liquefaction of atmospheric air and the subsequent separation of the LOX therefrom by continuous cryogenic distillation. The LOX is then removed from the cryogenic distillation system and stored as a cryogenic liquid in a bulk oxidizer storage tank 201.

The oxidizer subsystem 3000 includes a first LOX feed line 270 that feeds the LOX through a first valve 271 to a LOX pump 273, which is powered by a LOX pump drive unit 274. The LOX pump 273 delivers high pressure LOX into a second LOX feed line 276 and through a second valve 275 that is connected to the second LOX feed line 276 with a tee (not shown). One side of the tee leads to a LOX vaporizer system 277 that leads to the generator 8 (to the first oxidizer inlet 42 shown in FIG. 1), and that contains, for example, pressure regulators, a cavitating fluid venturi control and/or temperature and pressure sensing transducers. The other side of the tee leads to an oxygen pressure and flow management system 278 connected with a third LOX feed line 279 that leads to the generator 8 (to the second oxidizer inlet 81 shown in FIG. 1).

The LOX that enters the LOX vaporizer system 277 becomes expanded to a gaseous state. The vaporized gaseous oxygen is then conducted from the LOX vaporizer system 277 to the generator 8. (As is shown in FIG. 1, the vaporized gaseous oxygen enters the first oxidizer inlet 42 under high pressure and flows toward the first oxidizer manifold 41, where it is injected into the first combustion chamber 70 of the generator 8. Excess oxidizer flows under high pressure to the oxidizer transfer tube 49, and then to the hot oxidizer manifold 136, where the gaseous oxygen is injected into the third combustion area 120.)

The LOX that enters the other side of the tee flows to the oxygen pressure and flow management system 278 which contains, for example, pressure regulators, a cavitating fluid venturi control and/or temperature and pressure sensing transducers. The LOX remains in a liquid state, and is conducted from the oxygen pressure and flow management system 278 to the generator 8. (As is shown in FIG. 1, the LOX enters the second oxidizer inlet 81 that supplies LOX to the second oxidizer manifold 82. The LOX is then injected into the second combustion chamber 100. Excess oxidizer flows under high pressure to the oxidizer transfer tube 49, and then to the hot oxidizer manifold 136, where the gaseous oxygen is injected into the third combustion area 120.)

The fuel employed in the fuel subsystem 4000 may be in a liquid, solid or gaseous state, and is obtained from a bulk fuel storage tank 202. The fuel system 4000 includes a first fuel feed line 280 that feeds the fuel through a third valve 281 to a fuel pump 282, which is powered by a fuel pump drive unit 283. The fuel pump 282 delivers high pressure fuel through a fourth valve 284. The fuel is then conducted into a fuel pressure and flow management system 285 that contains, for example, pressure regulators, a cavitating fluid venturi control and/or temperature and pressures sensing transducers. The fuel is conducted from the fuel pressure and flow management system 285 through a second fuel feed line 286 to the generator 8. (As is shown in FIG. 1, the fuel is discharged into the fuel inlet manifold 12 of the generator 8.)

Referring to FIG. 1, a suitable igniter 20 is used to ignite the oxygen and fuel mixture that is flowing into the first combustion chamber 70 of the generator 8.

The generator 8 efficiently combusts the injected reactants under controlled conditions, producing a high pressure, high temperature gaseous mixture of combustion fuel gases. It converts the chemical energy that is present in the fuel into thermal (heat) energy that becomes transferred to surrounding tubes containing water, thereby converting the water present in the tubes into a superheated steam product or saturated steam product. A separate hot combustion gas exhaust product is also produced by the generator 8, which can be released from the generator 8 through a first combustion gas exhaust line 125 (FIG. 14) to an exhaust heat recovery steam generator 400 that is present in the exhaust heat recovery subsystem 2000. Combustion gas exhaust produced in the exhaust heat recovery subsystem 2000 exits the trigeneration steam energy generating plant 10000 via a second combustion gas exhaust line 405.

As is shown in both FIG. 1 and FIG. 14, water that enters into the generator 8 is converted into a superheated steam product or saturated steam product by the time it exits through superheated steam product outlets present in the generator 8 (shown as 54, 67, 94, 132, 139 and 144 in both FIG. 1 and FIG. 14) to a central superheated steam drum 300. The high pressure superheated steam product or saturated steam product is then delivered from the central superheated steam drum 300 to the power turbine subsystem 7000 (FIG. 14). Superheated steam product or saturated steam product exits the power turbine subsystem 7000 and is delivered to a high pressure power turbine 310 via a first superheated steam product discharge line 301.

Thermal control of the combustion processes employed in the generator 8 can be accomplished by controlling the cooling water flow rate and the heat input rate in connection with each of the combustion chamber water inlets (shown as 52, 62, 92, 131, 133 and 149 in FIG. 1, and not shown in FIG. 14) via a second water feed line 295 that leads to the generator 8 from the water management subsystem 5000. Make-up feed water (water that is employed to replenish water that has been used in the generator 8) is supplied by a make-up water line 425, which provides cooling water to the generator 8 from the heat rejection subsystem 6000. For example, if 100 pounds of water is present at the start up of the generator 8 (when it is turned "on" and its operation is commenced), and 10 pounds of water is used by the generator 8, 10 pounds of water will be supplied to the generator 8 by the make-up water line 425.

The water management subsystem 5000 maintains the proper water balance in the generator 8 by maintaining a proper quantity of cooling water that is provided to the generator 8. The water employed in the water management subsystem 5000 is obtained from a bulk water storage tank 203. The water management subsystem 5000 includes a first water feed line 290 that feeds the water through a fifth valve 291 to a high pressure water pump 292, which is powered by a water pump drive unit 293. The water pump 292 conducts high pressure water through a first water pressure and flow management system 294 that contains, for example, pressure regulators, a cavitating fluid venturi control and/or temperature and pressures sensing transducers. The water is conducted from the first water pressure and flow management system 294 through a sixth valve 296 into the water inlets (shown as 52, 62, 92, 131, 133 and 149 in FIG. 1, and not shown in FIG. 14) of the generator 8, providing thermal control of the combustion processes.

At its start up, the generator 8 uses water that flows into it from the water management subsystem 5000 (for steam water). At this stage of the process, the water is generally at ambient temperature, and is pumped at a high pressure from the high pressure water pump 292 to the water inlets of the generator 8 (shown as 52, 62, 92, 131, 133 and 149 in FIG. 1, and not shown in FIG. 14). However, when the generator 8 is filled with a sufficient amount of water to permit its proper operation, the first water pressure and management system 294 will close the sixth valve 296, and divert cooling circulation water away from the generator 8.

Water that is diverted away from the generator 8 flows towards the heat rejection subsystem 6000 through a seventh valve 297 into a first water line 298, and then to a first cooling water pump 552, which is powered by a first cooling water pump drive unit 553. The cooling water is circulated through the first cooling water pump 552 and can be diverted into a holding tank and water cooling tower 550, to a water condenser 570 and/or to a water chiller 540. Circulating water can be discharged from the first cooling water pump 552 through an eighth valve 554 into a second water line 551 that leads to the inlet side of the holding tank and water cooling tower 550. Additionally, circulating water can be discharged from the first cooling water pump 552 through a third water line 555 to a ninth valve 556 and into the cold water inlet side of the water condenser 570. The water condenser 570 also allows cooling water to be discharged through a fourth water line 545 to the inlet side of the water chiller 540.

At its start up, there is generally a sufficient amount of water available to operate the generator 8. However, to ensure that a sufficient amount of water is available during the start-up, shut-down (termination of operation) and other operations of the generator 8, the heat rejection subsystem 6000 is employed. The heat rejection subsystem 6000 acts as a water reservoir, as well as a receiver for excess water generated by the generator 8 during its operation.

In addition to the first cooling water pump 552 and the other components described above, the heat rejection subsystem 6000 contains a second cooling water pump 422, which is driven by a second cooling water pump drive unit 421, a second water pressure and flow management system 423 and a third water pressure and flow management system 428. Each of the second and third water pressure and flow management systems 423 and 428 can contain, for example, pressure regulators, cavitating fluid venturi controls and/or temperature and pressure sensing transducers. The heat rejection subsystem 6000 provides make-up water that is preferably preheated (water that has enthalpy added to it) for use in the exhaust heat recovery steam generator 400. The exhaust heat recovery steam generator 400 receives heated make-up water from the water condenser 570 and from the holding tank and water cooling tower 550. Heated make-up water is pumped from the water condenser 570 through a fifth water line 571 and then through a tenth valve 572 to the second cooling water pump 422. The heated make-up water is then discharged into the second water pressure and flow management system 423. A twelfth water line 557 carries feed water from the water holding tank and cooling tower 550 through a fourteenth valve 558 to the second cooling water pump 422.

The second water pressure and flow management system 423 can discharge heated make up water through a sixth water line 426 to the high pressure inlet (not shown) of the exhaust heat recovery steam generator 400. Heated make-up water that does not flow into the exhaust heat recovery steam generator 400 from the sixth water line 426 is discharged through a seventh water line 427 into the third water pressure and flow management system 428. The third water pressure and flow management system 428 discharges heated medium pressure make-up water to a medium pressure water inlet (not shown) present on the exhaust heat recovery steam generator 400, and discharges heated low pressure make-up water through an eighth water line 429 to a low pressure water inlet (not shown) present on the exhaust heat recovery steam generator 400. Further, heated high pressure make-up water can be discharged through the second water pressure and flow management system 423 through an eleventh valve 424 into the make-up water line 425 which leads to the generator 8 (and enters into the second water feed line 295).

The power turbine subsystem 7000 converts the output energy produced by the generator 8 into mechanical energy that can drive the electrical power generator subsystem 8000. The power turbine subsystem 7000 contains three electrical power generation turbines, the high pressure power turbine 310, a medium pressure power turbine 320 and a low pressure power turbine 330, which are pressure staged for optimum efficiency, and which maximize the use of the energy produced by the generator 8. The power turbine subsystem 7000 also contains three turbine exhaust steam lines, a high pressure exhaust steam line 311, a medium pressure exhaust steam line 321 and a low pressure exhaust steam line 336, as well as a turbine reheated line 401. The high pressure exhaust steam line 311 leads from the high pressure power turbine 310 to the exhaust heat recovery steam generator 400, while the low pressure exhaust steam line 336 leads from the low pressure power turbine 330 to the exhaust heat recovery steam generator 400. The turbine reheated line 401 leads from the exhaust heat recovery steam generator 400 to the medium pressure power turbine 320. The assembly of the high pressure power turbine 310 and the high pressure exhaust steam line 311 is followed by the assembly of the medium pressure power turbine 320 and the medium pressure exhaust steam line 321. The power turbine system 7000 is terminated by an assembly of the low pressure power turbine 330 and the low pressure exhaust steam line 336, which sends the exhaust steam to the exhaust heat recovery steam generator 400.

Superheated steam product or saturated steam product produced by the generator 8 is delivered from the generator 8 to the power turbine subsystem 7000 via the first superheated steam product discharge line 301, which leads to the high pressure side (not shown) of the high pressure power turbine 310. Exhaust steam from the high pressure power turbine 310 is discharged from the high pressure power turbine 310 to the high pressure exhaust steam line 311.

The assembly described in the preceding paragraph is followed by the turbine reheated line 401 that exits the exhaust heat recovery steam generator 400 and leads to the medium pressure power turbine 320. In the turbine reheated line 401, the temperature of the exhaust steam is increased to the temperature of the superheated steam product or saturated steam product that exits through superheated steam product outlets (shown in FIG. 1 as 54, 67, 94, 132, 139 and 144, and not shown in FIG. 14) present in the generator 8. This is performed by combusting exhaust steam in a reheated chamber (not shown) of the exhaust heat recovery steam generator 400, and mixing the output from this combustion process with the main superheated steam product or saturated steam product flow stream, thus adding energy, and maintaining a constant inlet temperature of the steam that leads into the medium pressure power turbine 320 from the turbine reheated line 401. Superheated steam product or saturated steam product is delivered to the medium pressure power turbine 320 via the turbine reheated line 401, with exhaust steam from the medium pressure power turbine 320 being discharged to the medium pressure exhaust steam line 321. The exhaust steam flows from the medium pressure exhaust steam line 321 to the low pressure power turbine 330, and then out of the low pressure exhaust steam line 336, which sends the exhaust steam to the exhaust heat recovery steam generator 400.

An electrical power generation subsystem 8000 that is located near the low pressure power turbine 330 has an electrical energy conversion facility 500 that contains one or more electrical generators and power conditioners. These electrical generators and power conditioners develop the electrical energy end product 501 of this trigeneration steam energy generating plant 10000 from the superheated steam product or saturated steam product.

The exhaust heat recovery subsystem 2000, which contains the exhaust heat recovery steam generator 400, is a gas handling system that makes the most efficient use of the exhaust products produced by the generator 8, and by the three different power turbines (310, 320 and 330).

The exhaust heat recovery steam generator 400 contains a high pressure feed water inlet (not shown), a medium pressure feed water inlet (not shown), a low pressure feed water inlet (not shown), a high pressure economizer (not shown), a medium pressure economizer (not shown), a low pressure economizer (not shown), a high pressure boiler (not shown), a medium pressure boiler (not shown), a low pressure boiler (not shown), a high pressure drum (not shown), a medium pressure drum (not shown), a low pressure drum (not shown), a high pressure super heater outlet (not shown), a medium pressure steam outlet (now shown), and a low pressure steam outlet (not shown), all of which are conventional and commercially available. Exhaust heat recovery steam generators are commercially available from Babcock & Wilcox Company (Barberton, Ohio) and Energy Recovery International (Lincoln, Nebr.).

Low pressure steam that exits from the low pressure power turbine 330 is discharged into the low pressure exhaust steam line 336, and then into a low pressure feed water inlet (not shown) present on the exhaust heat recovery steam generator 400. Low pressure steam can exit from the exhaust heat recovery steam generator 400 through a twelfth valve 404 and into a low pressure steam discharge line 403. The energy present in this low pressure steam is suitable for a wide range of industrial applications, such as in the pulp and paper industry, in the sugar industry, for low pressure wash systems in the food industry, for industrial processing equipment, for the generation of electricity, in extruders, in mixers, in mills and in sifters.

A medium pressure steam outlet (not shown) present on the exhaust heat recovery steam generator 400 is connected to the turbine reheated line 401. The turbine reheated line 401 feeds medium pressure steam exiting from the exhaust heat recovery steam generator 400 to the medium pressure power turbine 320. However, a first 3-way valve 406 is present on the turbine reheated line 401, and can conduct medium pressure steam exiting from the exhaust heat recovery steam generator 400 into a first medium pressure steam discharge line 407, and then into a medium pressure steam and flow management system 402. The medium pressure steam and flow management system 402 contains, for example, pressure regulators, a cavitating fluid venturi control and/or temperature and pressures sensing transducers. Medium pressure steam can be directed from the medium pressure steam and flow management system 402 through a thirteenth valve 408 and into a medium pressure steam line 409 that leads into the water chiller 540. A ninth water line 541 transports water from the water chiller 540 to the water condenser 570, and a fourth water line 545 carries water from the water condenser 570 to the water chiller 540. A tenth water line 543 carries cold water from the water chiller 540 to a cooling unit (not shown), such as an air conditioner, for use in cooling applications, and an eleventh water line 544 carries hot water from the cooling unit back to the water chiller 540. The cooled air product of the water chiller 540 is suitable for a wide range of cooling industrial applications, such as air conditioning. A thirteenth water line 546 transports water from the water condenser 570 to the holding tank and water cooling tower 550, where air is blown across the water with, for example, fans to cool the water (taking the heat that is present in the water and dissipating it into the air).

Alternatively, medium pressure steam can flow from the medium pressure steam and flow management system 402 into a second medium pressure steam discharge line 407A and out of the trigeneration steam energy generating plant 10000. The energy present in this medium pressure steam is suitable for a wide range of industrial applications, such as for the production or processing of intravenous medical solutions (parenterals), surgical instruments and supplies, pharmaceuticals, hospital hardware, airline and medical wastes, closures and ampoules, glassware, bedding, containers, food products in pouches, cans, jars or trays, beverages and related items, and in grading, labeling and packaging production.

A superheated steam outlet (not shown) that is present on the exhaust heat recovery steam generator 400 is connected to a high pressure steam line 312 that sends a superheated steam product or saturated steam product to the central superheated steam drum 300. A second 3-way valve 314 present on the high pressure steam line 312 can be used to direct the superheated steam product or saturated steam product to a second superheated steam discharge line 313 and out of the trigeneration steam energy generating plant 10000.

The energy present in the superheated steam product or saturated steam product is suitable for a wide range of industrial applications, such as for the generation of electricity, using for example: (a) extraction turbines, which take steam at a high pressure, use some of the steam for the generation of electricity, and send the remainder of the steam to other steam processes located downstream of the turbine; (b) back pressure turbines, which take steam at a high pressure, use some of the pressure and pass all of the steam to other steam processes at a reduced pressure; and/or (c) condensing turbines, which take steam at a high pressure and, through a series of stages, take all of the energy available in the steam and discharge the steam at a very low, or at 0, pressure. Condensing turbines are generally used at power plants, where the only purpose for the steam is generally to produce electricity in a steam turbine. However, some of the steam may be used to pre-heat incoming boiler water.

Some of the other industrial applications for the energy present in this superheated steam product or saturated steam product include the heating of distillation columns, space heating, other heating and cooling processes, water heating for washing, sanitation and other cleaning processes, drying and/or dehumidification processes, evaporation processes, concentration and in the paper industry (in steam- and condensate-systems of single- and multi-cylinder machines to increase the pressure in the systems and/or to increase the performance capabilities of paper machines).

Method of Manufacture

The hydrocarbon combustion gas generator shown in FIG. 1, FIG. 2 and FIG. 3 can be manufactured in the manner described below, or by other methods. Other hydrocarbon combustion gas generators of the invention may be manufactured in the same, or in a similar, manner as is described below.

Most of the components of the hydrocarbon combustion gas generator 8 ("generator") can be machined from one or more pieces of material in a manner known by those of skill in the art. The separate components, or areas of components, of the generator 8 can be attached with one another by any suitable means, such as welding, using high strength bolts and accompanying socket head screws and lock washers (as needed) inserted into aligned and drilled bolt holes having a similar number, size and spatial orientation, compression fitting, or with the other methods and devices described hereinabove, using conventional methods and equipment known by those of skill in the art. Further, various means for the prevention of the leakage or other escape of gases and/or liquids between various components of the generator 8, such as those that are connected together with some type of a mechanical fastener, can be employed, such as gaskets and o-rings. The depths and widths of o-rings employed in the generator 8 will depend upon the maximum allowable operating pressure (MAOP) employed, and can readily be determined by those of skill in the art. For example, in the generator 8 shown in FIG. 1, a gasket or o-ring is preferably present between the fuel inlet manifold 12 and the fuel metering block 30, between the fuel metering block 30 and the first oxidizer manifold plate 40, between the first superheated steam product exit manifold 53 and the first water manifold plate 60, between the first water manifold plate 60 and the second oxidizer manifold plate 80, between the second water manifold 98 and the second oxidizer manifold plate 80, between the second superheated steam product exit manifold 93 and the second water manifold plate 110, between the second water manifold plate 110 and the third outer housing 130, and between the third outer housing 130 and the fifth water manifold 147.

In the discussion herein, a discussion about one component of the generator 8 applies to all of the same components that may be present in, or on, the generator 8. For example, a discussion about one first water manifold 51 applies to all of the first water manifolds 51 that may be present on the generator 8. Also, a discussion about one component of the generator 8 applies to all similar components that may be present in, or on, the generator 8. For example, the second water manifold 98 of the generator 8 may be manufactured in a manner similar to that of the first water manifold 51.

The fuel inlet manifold 12 is preferably designed to operate at a pressure ranging from about 1200 to about 2500 psig in a conventional manner. The connection device that is preferably present on the fuel inlet manifold 12, and other portions of the fuel inlet manifold 12, are all preferably machined from one piece of austenitic/ferritic steel. A series of equally-spaced bolt holes are preferably drilled into the connection device present on the fuel inlet manifold 12, with the number, size and spatial distribution of the bolt holes being optimized in a manner known by those of skill in the art for a particular fuel pressure. The number, size and spatial orientation of the bolt holes should be arranged in a manner permitting their alignment with bolt holes present on a similar connection device present on a fuel flow control device. High strength bolts with lock washers or washers and/or nuts, or socket head screws with lock washers or washers that are preferably made of austenitic/ferritic steel (hereinafter collectively referred to as "fasteners") can the be inserted into the drilled bolt holes to connect the fuel inlet manifold 12 with the fuel flow control device. Other components, or areas of components, of the generator 8 can be attached in a similar manner, as is shown in FIG. 1, FIG. 2 and FIG. 3.

The fuel inlets 9 may be drilled and tapped at an angle in the fuel inlet manifold 12, with fuel passageways leading from the fuel inlets 9 towards, and connecting with, the fuel chambers 10, which may also be drilled into the fuel inlet manifold 12. The aft end of the fuel inlet manifold 12 is preferably attached to the forward end of the fuel metering block 30 using fasteners. The area between the aft end of the fuel inlet manifold 12 and the forward end of the fuel metering block 30 are preferably sealed with a high pressure gasket. Alternatively, an optional o-ring groove can be machined into the base of the fuel inlet manifold 12, with the o-ring depth and width being based on the MAOP, and readily determinable by a person of skill in the art. The o-ring and gasket should be made of a high temperature and pressure material.

The fuel metering block 30, the injector wear plate 32 and the first fuel port tubes 36 are preferably each separately machined from one piece of austenitic/ferritic steel. The first fuel ports 34 are drilled through the injector wear plate 32, the fuel metering block 30, the first oxidizer inlet 42, the first oxidizer manifold plate 40 and the first transfer injector plate 44 (for the subsequent insertion of the first fuel port tubes 36 therein). The first fuel port tubes 36 are inserted into the injector wear plate 32 and through the fuel metering block 30, the first oxidizer manifold plate 40 and the first transfer injector plate 44. The injector wear plate 32 may be pressed into a pocket machined into the forward end of the fuel metering block 30.

The second fuel ports 65 can be drilled through the first water manifold plate 60, the second water inlet 62, the fuel wear plate 63, the feed water manifold 64, the second oxidizer manifold 82, the second transfer injector plate 84 and the second oxidizer manifold plate 80 in the manner described above in connection with the first fuel ports 34 (for the subsequent insertion of the second fuel port tubes 66 therein). As is shown in FIG. 2, the second fuel port tubes 66 can be inserted through the second fuel ports 65, the first water manifold plate 60, the feed water manifold 64, the second oxidizer manifold plate 80, the second oxidizer manifold 82 and the second transfer injector plate 84.

The first oxidizer manifold plate 40 is preferably designed to operate at a pressure ranging from about 1200 to about 2500 psig in a conventional manner, and is preferably machined from one piece of austenitic/ferritic steel.

The first transfer injector plate 44 is preferably machined from one piece of austenitic/ferritic steel. The design of the first transfer injector plate 44 permits multiple first fuel ports 34 to be present therein, in which multiple first fuel port tubes 36 may be inserted for different types of fuel. The number of first fuel ports 34 desired, which is determined by the selected fuel and O/F ratio, can be drilled into the first transfer injector plate 44. The first transfer injector plate 44 can be pressed into a pocket machined into the aft end of the first oxidizer manifold plate 40. The first oxidizer manifold 41 may be machined into the first oxidizer manifold plate 40. The first oxidizer injector orifices 46 can be drilled into the first transfer injector plate 44, the forward end of which can be attached to the aft end of the first oxidizer manifold plate 40.

The second transfer injector plate 84 is also preferably machined from one piece of austenitic/ferritic steel. The design of the second transfer injector plate 84 permits multiple second fuel ports 65 to be present therein, in which multiple second fuel port tubes 66 may be inserted for different types of fuel. The number of second fuel ports 65 desired, which is determined by the selected fuel and O/F ratio, can be drilled into the second transfer injector plate 84. The second transfer injector plate 84 can be pressed into a pocket machined into the aft end of the second oxidizer manifold plate 80. The second oxidizer manifold 82 may be machined into the second oxidizer manifold plate 80. The second oxidizer injector orifices 85 can be drilled into the second transfer injector plate 84, the forward end of which can be attached to the aft end of the second oxidizer manifold plate 80.

The igniter housing 26 of the igniter 20 is preferably machined from one piece of austenitic/ferritic steel that is compatible with an oxidizer. The mixing chamber 28 may be drilled into the aft end of the igniter 20, and should have the same, or corresponding, diameter as the flame tube 29 that is drilled into the fuel metering block 30, the first oxidizer inlet 42 and the first oxidizer manifold plate 40. The igniter fuel inlet 22 and the igniter oxidizer inlet 24 may be drilled and tapped at an angle through the igniter housing 26, allowing the oxidizer and fuel employed in the igniter 20 to intersect in the center of the mixing chamber 28. An electronic igniter interface may be drilled and tapped, using screw threads, at the forward end of the igniter housing 26 and mixing chamber 28 to attach a high voltage sparking device (that can ignite a mixture of oxidizer and fuel in the mixing chamber 28) to the igniter housing 26. The igniter housing 26 may be welded to the fuel metering block 30, and should have the mixing chamber 28 aligned with the flame tube 29.

The first combustion chamber 70 is preferably a cylindrical hollow tube that has its sidewalls formed from the first tube assembly 71, which fits within the first outer housing 50. The first outer housing 50 has one or more first water inlet passageway 55 drilled into it, and one or more first superheated steam product exit passageways 56 drilled into it. Each of the individual tubes present within the first tube assembly 71 is preferably drilled and sealed to form one or more water inlets and one or more superheated steam product outlets. The individual tubes, which are preferably made of ferritic/austenitic steel, can then be welded together to form a preferably concentric tubular shell. The outside of the first tube assembly 71 is preferably wrapped or covered with a high temperature material.

The aft end of the first oxidizer manifold plate 40 preferably has a groove 71*a* machined into it, where the forward end of the first tube assembly 71 can be inserted into the first oxidizer manifold plate 40. The forward end of the first water manifold plate 60 also preferably has a groove 71*b* machined into it, where the aft end of the first tube assembly 71 can be inserted into the first water manifold plate 60. These areas (where the two different components of the generator 8 come into contact) are preferably sealed with a gasket.

The first water manifold 51 can be welded to the forward end of the first outer housing 50, and can be attached with bolts to the aft end of the first oxidizer manifold plate 40. The first superheated steam product exit manifold 53 can be welded to the aft end of the first outer housing 50, and can be attached with bolts to the forward end of the first water manifold plate 60.

The second combustion chamber 100 is preferably also a cylindrical hollow tube that has the sidewalls of its forward end formed with the second tube assembly 101, which fits within the second outer housing 90. The second outer housing 90 has one or more second water inlet passageways 95 drilled into it, and one or more second superheated steam product exit passageways 96 drilled into it. Each of the individual tubes present in the second tube assembly 101 is preferably drilled and sealed to form one or more water inlets and one or more superheated steam product outlets. The individual tubes, which are preferably made of ferritic/austenitic steel, can then be welded together to form a concentric tubular shell. The outside of the second tube assembly 101 is preferably wrapped or covered with a high temperature material.

The aft end of the second oxidizer manifold plate 80 preferably has a groove 101a machined into it, where the forward end of the second tube assembly 101 can be inserted into the second oxidizer manifold plate 80. The forward end of the second water manifold plate 110 also preferably has a groove 101b machined into it, where the aft end of the second tube assembly 101 can be inserted into the second water manifold plate 110. These areas (where the two different components of the generator 8 come into contact) are preferably also sealed with a gasket.

The second water manifold 98 can be welded to the forward end of the second outer housing 90, and can be attached with fasteners to the aft end of the second oxidizer manifold plate 80. The second superheated steam product exit manifold 93 can be welded to the second outer housing 90 between its forward end and aft end, and can be attached with fasteners to the forward end of the second water manifold plate 110.

The third combustion area 120 is a cylindrical hollow tube that has no wall (or other closure) at its aft end, allowing a combustion gas exhaust product produced by the generator 8 to exit from the generator 8. A tube 121 that is preferably hollow (but that may be solid), and that preferably forms the sidewalls of the aft end of the second combustion chamber 100, and of the forward end of the third combustion area 120, is also preferably made from one piece of austenitic/ferritic steel.

The forward end of the third combustion area 120 preferably has one or more hot oxidizer orifices 122 evenly spaced in one or more rows drilled into the tube 121. The hot oxidizer orifices 122 should be aligned with the hot oxidizer manifold 136, and should be drilled in one or more rows radially around the circumference of the tube 121.

The first water manifold 51, the first superheated steam product exit manifold 53, the second water manifold 98 and the second superheated steam product exit manifold 93 are each preferably designed to operate at a pressure up to about 4500 psia and at a temperature of up to about 1150° F., and more preferably at a pressure of about 2500 psia and a temperature of about 1000° F. Each of these components of the generator 8 preferably is separately machined from one piece of austenitic/ferritic steel, and has a connection device, such as a flange, having one or more equally spaced bolt holes drilled therein, at its forward end or aft end for attachment with fasteners to another component or area of the generator 8. Each of these components has one or more inlets or outlets for water and/or a superheated steam product or dry saturated steam product (the first water inlet 52, the first superheated steam product outlet 54, the third water inlet 92 and the third superheated steam product outlet 94) drilled therein, or attached thereto.

The first water inlet 52, the first superheated steam product outlet 54, the third water inlet 92 and the third superheated steam product outlet 94 each preferably have a flange type interface that is welded to the first water manifold 51, the first superheated steam product exit manifold 53, the second water manifold 98 and the second superheated steam product exit manifold 93, respectively. The lower portion of the first water manifold 51 and of the first superheated steam product exit manifold 53 each preferably have a machined flange type surface that can be welded to the first outer housing 50. The first water manifold 51 preferably has a connection device, such as a flange, at its forward end having one or more drilled bolt holes, permitting it to be bolted or otherwise fastened to the aft end of the first oxidizer manifold plate 40. Preferably, the area in which these two components of the generator 8 come into contact is sealed with a gasket. Alternatively, an o-ring groove can be machined into the base of the flange at its aft end. A similar connection device present on the aft end of the first superheated steam product exit manifold 53 permits it to be bolted to the forward end of the first water manifold plate 60. Preferably, the area in which these two components of the generator 8 come into contact is also sealed with a gasket. Alternatively, an o-ring groove can be machined into the base of the flange at its aft end.

The lower portions of the second water manifold 98 and of the second superheated steam product exit manifold 93 can be attached to the second outer housing 90 in the same manner described hereinabove in connection with the first water manifold 51 and the first superheated steam product exit manifold 53. The forward end of the second water manifold 98 can be attached to the aft end of the second oxidizer manifold plate 80, and the aft end of the second superheated steam product exit manifold 93 can be attached to the forward end of the second water manifold plate 110, in the same manner described hereinabove in connection with the first water manifold 51 and the first superheated steam product exit manifold 53.

The second water manifold plate 110 is preferably machined from one piece of austenitic/ferritic steel, and preferably has a connection device, such as a flange, at its aft end for attachment using fasteners to the forward end of the third outer housing 130, which preferably has a similar connection device. Preferably, the area in which these two components of the generator 8 come into contact is sealed with a gasket. Alternatively, an o-ring groove can be machined into the aft end of the second water manifold plate 110. The second water manifold plate 110 preferably has a groove 101b machined into its forward end to allow the second tube assembly 101 to be inserted into this groove 101b. This groove 101b permits a superheated steam product, which will have a high temperature, and which will be under a large amount of pressure, to exit from superheated steam product outlet holes that are present in the individual tubes contained in the second tube assembly 101, and to flow into the second superheated steam product exit manifold 93. The forward end of the second water manifold plate 110 preferably has one or more equally spaced drilled and taped bolt holes that correspond in number, alignment and spatial orientation with bolt holes drilled into a connection device, such as a flange, present on the aft end of the second superheated steam product exit manifold 93. The second water manifold plate 110 can then be attached with the second superheated steam product exit manifold 93 using fasteners.

The third outer housing 130 is preferably designed to withstand a pressure of up to about 4500 psia, and a temperature of up to about 1150° F., with a pressure of about 2600 psia and temperature of about 1000° F. being more preferred. The third outer housing 130 preferably is machined from one piece of austenitic/ferritic steel, and has a plurality of equally spaced bolt holes drilled into a connection device, such as a flange, present at its aft end, permitting its attachment using bolts to the fifth water manifold 147.

The fourth water inlet 131, the third water manifold 135 and the fourth superheated steam product outlet 132 are each preferably machined into the third outer housing 130. The areas in which the different components of the generator 8 come into contact are preferably sealed with a gasket. The fifth water inlet 133, the fourth water manifold 137 and the fifth superheated steam product outlet 139 are preferably machined into the third outer housing 130 in a similar manner.

The third outer housing 130 preferably has a pocket machined into an area between its forward end and its aft end, which extends radially from its internal diameter. The aft end of the oxidizer transfer tube 49, which fits within this pocket, can be welded to the third outer housing 130, allowing hot oxidizer to pass from the oxidizer transfer tube 49 through the hot oxidizer manifold 136, which also fits within this pocket, and become injected through the hot oxidizer orifices 122 into the third combustion area 120. The hot oxidizer manifold 136 is positioned between the aft end of the oxidizer transfer tube 49 and the tube 121.

The fifth water manifold 147 is preferably machined from one piece of austenitic/ferritic steel, and preferably has a series of equally spaced bolt holes drilled into a connection device, such as a flange, present at its upper portion, permitting it to be attached with one or more fasteners to the aft end of the third outer housing 130. Preferably, the area in which these two components of the generator 8 come into contact is sealed with a gasket. Alternatively, an o-ring groove can be machined into the aft end of the base of a connection device present at the aft end of the third outer housing 130.

The fifth water manifold 147 preferably has a cavity machined into an area between its forward end and its aft end that permits it to receive the feed water that is flowing under pressure through the sixth water inlet 149. The third tube assembly 146 preferably contains an array of a plurality of concentric hollow tubes, and is fitted into a fourth outer housing 140. These tubes preferably are welded together in a manner that forms a conical cone, and are preferably made of austenitic/ferritic steel.

The forward end of the third tube assembly 146 can be welded to the lower portion of the fifth water manifold 147, and the aft end of the third tube assembly 146 can be welded to the forward end of the third superheated steam product exit manifold 143.

The third superheated steam product exit manifold 143 is preferably machined from one piece of austenitic/ferritic steel. The forward end (and bottom portion) of the third superheated steam product exit manifold 143 preferably has a cavity machined into it, permitting the aft end of the third tube assembly 146, the tubes of which form a conical cone, to be welded to it. The sixth superheated steam product outlet 144 can be attached to the third superheated steam product exit manifold 143 in the same manner described hereinabove in connection with the first superheated steam product outlet 54.

The exhaust plate 148 preferably is also made from one piece of ferritic/austenitic steel, and has a series of equally spaced bolt holes drilled into a connection device, such as a flange, present at its upper portion, permitting it to be attached using one or more fasteners to a waste heat converter (not shown), such as an exhaust heat recovery steam generator (FIG. 14), having a connection device containing similarly numbered, sized and spaced bolt holes. The area in which the third superheated steam product exit manifold 143 and the exhaust plate 148 come into contact is preferably sealed with a flange (or other) gasket, or with an o-ring, preventing hot combustion gas exhaust from escaping from this area of the generator 8.

The following non-limiting examples describe and illustrate a preferred hydrocarbon combustion gas generator of the present invention, as well as other aspects of the invention. These examples are intended to be merely illustrative of the hydrocarbon combustion gas generator of the invention, and not limiting thereof in either scope or spirit.

EXAMPLE 1

Hydrocarbon Combustion Gas Generator

In this example, a 10-megawatt hydrocarbon combustion gas generator ("generator") having about a 97% combustion efficiency is constructed of austenitic/ferritic steel generally in the manner shown in the drawings. The generator has an overall length of about 162 inches and an overall outside diameter of about 16.75 inches. It has two combustion chambers and a third combustion area, each of which has an inside diameter of about 13.25 inches and an outside diameter of about 14.75 inches. However, the portion of the third combustion area from which a combustion gas exhaust product exits the generator has different diameters. This part of the third combustion area is cone shaped, with the forward end of the cone having an inside diameter of about 13.25 inches and an outside diameter of about 14.75 inches, and with the aft end of the cone having an inside diameter of about 25 inches and an outside diameter of about 26.50 inches.

The first combustion chamber has a length of about 36 inches, and has its sidewalls formed with a first tube assembly containing 58 tubes that is about 36 inches long. The first tube assembly also lines the inside of a first outer housing. Each of the tubes present in the bundle of individual tubes that forms the first tube assembly has an outside diameter of about 0.75 inches and an inside diameter of about 0.622 inches. Feed water having a temperature of about 250° F. is supplied to the first tube assembly through a first water inlet at a flow rate of about 1737.5 gallons per minute. The feed water travels from a source of water to the first water inlet, into a first water manifold, and then into 58 first water inlet passageways. The water then travels through each of the 58 individual tubes that are present in the first tube assembly at a flow rate of about 9.90 to about 10.1 gallons per minute per tube, where the water is converted into a superheated steam product or dry saturated steam product. The superheated steam product or dry saturated steam product produced in the tubes travels out of 58 first superheated steam product exit passageways and into a first superheated steam product exit manifold. From there, the superheated steam product or dry saturated steam product travels through a first superheated steam product outlet and out of the generator into a superheated steam product collection device at a temperature of about 1000° F., and at a pressure of about 2,000 psig.

The second combustion chamber has a length of about 36 inches, and has the sidewalls at its forward end formed with a second tube assembly containing 58 tubes that is about 36 inches long. The second tube assembly lines the inside of a second outer housing. Each of the tubes present in the bundle of individual tubes that forms the second tube assembly has an outside diameter of about 0.75 inches and an inside diameter of about 0.622 inches. Feed water having a temperature of about 250° F. is supplied to the second tube assembly through a third water inlet at a flow rate of about 1737.5 gallons per minute. The feed water travels from a source of water to the third water inlet, into a second water manifold, and then into 58 second water inlet passageways.

The water then travels through the 58 individual tubes that are present in the second tube assembly at a flow rate of from about 9.90 to about 10.1 gallons per minute per tube, where it is converted into a superheated steam product or dry saturated steam product. The superheated steam product or dry saturated steam product produced in the tubes travels out of 58 second superheated steam product exit passageways and into a second superheated steam product exit manifold. From there, the superheated steam product or dry saturated steam product travels through a third superheated steam product outlet and out of the generator into a superheated steam product collection device at a temperature of about 1000° F., and at a pressure of about 2,000 psig.

A single hollow tube that forms the sidewalls of the aft end of the second combustion chamber, and the forward end of the third combustion area, has a length of about 24 inches, an outside diameter of about 14.75 inches and an inside diameter of about 13.25 inches. Feed water having a temperature of about 250° F. is supplied from a source of water through a fourth water inlet into a third water manifold at a flow rate of about 1737.5 gallons per minute, where it is converted into a superheated steam product or dry saturated steam product. The superheated steam product or dry saturated steam product exits the generator into a superheated steam collection device through a fourth superheated steam product outlet at a temperature of about 1000° F., and at a pressure of about 2,000 psig. Feed water having a temperature of about 250° F. is also supplied from a source of water through a fifth water inlet into a fourth water manifold at a flow rate of about 1737.5 gallons per minute, where it is converted into a superheated steam product or dry saturated steam product. The superheated steam product or dry saturated steam product exits the generator into a superheated steam collection device through a fifth superheated steam product outlet at a temperature of about 1000° F., and at a pressure of about 2,000 psig.

A liquid oxygen (LOX) oxidizer is pumped from a source of LOX into a first oxidizer inlet. The LOX then flows into a first oxidizer manifold, where it is distributed in a radial manner to provide cooling for a first transfer injector plate, and where it becomes converted from a liquid into a gas. The resulting gaseous oxygen then passes through a plurality of first oxidizer injector orifices at an angle of about 66 degrees into the first combustion chamber zone at a flow rate of about 1.35 pounds per second, and at a pressure of about 600 psig. At the same time, EF-15 fuel (described hereinabove under "Fuel") having an energy value of 19,700 Btus per pound is pumped from a source of this fuel separately into a fuel inlet manifold and into two separate fuel inlets. The fuel that is pumped into the two separate fuel inlets passes into two separate chambers, respectively, that are present in the fuel inlet manifold. The fuel then passes through a plurality of first fuel port tubes at an angel of about 90 degrees into the first combustion chamber zone initially at a flow rate of about 1.142 pounds per second, and at a pressure of about 600 psig, and subsequently (when the feed water reaches the designed operating pressure) at the slower flow rate of about 0.95 pounds per second. The oxidizer and the EF-15 fuel pass into the first combustion chamber zone at a combined oxidizer and fuel flow rate of about 3.42 pounds per second, and at an O/F ratio ranging from about 1.2 to about 1.79, and preferably about 1.19, in a vortexing manner to allow a sufficient homogenous mix of the fuel and oxidizer gases in the first combustion chamber. (Some of the fuel becomes in a gaseous state while some of the fuel remains in a solid state.) The vortexing is enhanced by the injection of both the oxidizer and the EF-15 fuel into the first combustion chamber at an angle, and allows for a residence time of the EF-15 fuel in the first combustion chamber of approximately 0.12 to 0.15 seconds (once the mixture of oxidizer and EF-15 fuel is ignited by a natural or propane gas flame from an igniter). In the first combustion chamber, the average combustion temperature is from about 2,500° F. to about 2,800° F. and the average combustion pressure is about 600 psig.

Additional LOX is pumped from a source of LOX into a second oxidizer inlet. The LOX then flows into a second oxidizer manifold, where the LOX is distributed in a radial manner to provide cooling for a second transfer injector plate, and for a plurality of second fuel port tubes, thereby converting the liquid oxidizer into a gas. The gaseous oxidizer passes through a plurality of second oxidizer injector orifices at an angle of about 70 degrees into the second combustion chamber zone at a rate of about 2.646 pounds per second, and at a pressure of about 500 psig. At the same time, the incomplete combustion product produced in the first combustion chamber, which includes some unburned EF-15 fuel, passes from the first combustion chamber into the second combustion chamber zone through a plurality of second fuel port tubes at a rate of about 0.890 pounds per second, and at a pressure of about 500 psig. The O/F ratio in the second combustion chamber is from about 3.38 to about 5.03, and is preferably about 4.8. In the second combustion chamber, the average combustion temperature is from about 4,500° F. to about 5,500° F. and the average combustion pressure is 500 psig. The additional oxidizer and the combustion product produced in the first combustion chamber (containing some gas and some unburned fuel) enter the second combustion chamber in a vortexing manner to allow a sufficient homogenous mix of the remaining EF-15 fuel and the oxidizer gases. The vortexing is enhanced by the injection of the additional oxidizer into the second combustion chamber at an angel.

Water is pumped from a source of water into a second water inlet at a flow rate of about 1737.5 gallons per minute. The water then travels into a feed water manifold, which distributes the water in a radial manner for the cooling of the upper portion of a plurality of second fuel port tubes (to help them maintain their structural integrity). The water becomes converted into a superheated steam product or dry saturated steam product that exits the generator through a second superheated steam product outlet. The superheated steam product or dry saturated steam product that exits the generator through the second superheated steam product outlet (and through all other superheated steam product outlets present in this generator) has a temperature of about 1000° F. and has a pressure of about 2,000 psig.

Excess oxidizer that enters into an oxidizer transfer tube travels through the oxidizer transfer tube and passes into a hot oxidizer manifold that is adjacent to the outside of the tube that forms the sidewalls of the forward end of the third combustion area. The hot oxidizer manifold distributes the oxidizer around the tube, and through a plurality of hot oxidizer orifices, where the additional oxidizer enters at a flow rate of 0.798 pounds per second into the combustion gas product stream, which has a flow rate of about 0.178 pounds per second of unburned EF-15 fuel. In the third combustion area, the average combustion temperature is from about 5,000° F. to about 5,500° F. and the average combustion pressure is about 500 psig. The O/F ratio of the oxidizer and the EF-15 fuel for the combustion gas product stream that is present in the third combustion area is from about 3.98 to about 6.3, and is preferably about 4.4, thus achieving about a 97% combustion efficiency of the EF-15 fuel.

The vortexing of the EF-15 fuel that is present in the combustion product that passes from the first combustion chamber into the second combustion chamber allows for a residence time of the hydrocarbon fuel material in the second combustion chamber and in the third combustion area that totals about 0.12 seconds.

The hot combustion gas exhaust product that is produced by generator exists the generator by passing out of the aft end of the third combustion area, which is about 24 inches long, which has sidewalls formed by a third tube assembly in the shape of a conical cone, and that extends away from the generator at about a 35 degree angle. A fourth outer housing is lined with the third tube assembly. Feed water having a temperature of about 250° F. passes from a source of water through a six water inlet into a fifth water manifold at a flow rate of about 1737.5 gallons per minute, where it enters the forward end of the third tube assembly at a flow rate of from about 9.90 to about 10.1 gallons per minute per tube and becomes converted into a superheated steam product or dry saturated steam product. The superheated steam product or dry saturated steam product travels towards the aft end of the third tube assembly, passes into the third superheated steam product exit manifold and then exits out of the generator through a sixth superheated steam product outlet at a temperature of about 1000° F. and at a pressure of about 2,000 psig. The combustion gas exhaust product temperature is from about 4,500° F. to about 5,000° F. when it exits the generator.

The hydrocarbon combustion gas generator described in this example is capable of producing from about 67,528 pounds of a superheated steam product or dry saturated steam product per hour (about 36,466 pounds per hour of dry saturated steam and about 31,062 pounds per hour of superheated steam) at the temperatures and pressures described which, in turn, could generate about 10 megawatts of electricity per hour. Further, the combustion gas exhaust product produced by this generator, if diverted to a heat recovery steam generator, such as the exhaust heat recovery steam generator shown in FIG. 14, could generate from about 10 to about 15 additional megawatts of electricity per hour. Thus, a total of about 20 to about 25 megawatts of electrical power per hour could be produced by this generator.

In the configuration described in this example, the physical size of the generator is reduced considerably (by from about 20% to about 50%) in comparison with conventional steam generators that produce a similar output of generated steam at the temperatures and pressures described above.

Using LOX and EF-15 fuel, the generator described in this example produces an environmentally clean combustion gas exhaust product. The combustion gas exhaust product contains no (0 weight percent) N, NOx, NO, $NO_2$, $N_2O$, $N_2$, S, SOx, SO, $SO_2$, $SO_3$, CO, HCl, $CH_4$, arsenic, uranium, mercury, lead, thorium, volatile organic compounds (VOCs), dioxin, radium, radon, polonium, bismuth, other carcinogenic and/or mutagenic substances, particulate matter, coal ash or fly ash. Additionally, it contains a significantly smaller quantity of $CO_2$ (about a 97% reduction of $CO_2$) than would be produced by a conventional coal-burning plant that uses the same amount of coal, and/or that is capable of producing the same amount of electrical power. Further, this generator is safe, inexpensive, durable and efficient.

Various modifications, additions and/or deletions can be made to the hydrocarbon combustion gas generator described in this example, and to the temperatures, pressures, angles, sizes, other parameters and steps described above. Further, various fuels and/or oxidizers can be employed in this generator, and varying ranges of dry saturated steam and superheated steam can be produced by the generator. All such modifications, additions and deletions are within the scope of the appended claims form part of the present application.

EXAMPLE 2

Analysis of Components of Combustion Gas Exhaust Products After Natural Gas, Methanol and Kerosene are Separately Combusted in a 10-Megawatt Hydrocarbon Combustion Gas Generator of the Invention Using Air or LOX as the Oxidizer The components, quantities thereof (in terms of number of moles and pounds) and weight percents thereof that are present in the combustion gas exhaust products produced after 2,000 pounds (1 ton) of natural gas, methanol and kerosene (oil #1) are separately combusted in the 10-megawatt hydrocarbon combustion gas generator described in Example 1, using either air or LOX as the oxidizer, with each combustion gas exhaust product exiting the hydrocarbon combustion gas generator at a pressure of about 1,000 psig and at the indicated temperature (which varies at 1,000 psig, depending upon the type of fuel and oxidizer employed), were determined using the thermochemical computer software GUIPEP, and are set forth in the tables below. (In contrast with the apparatuses of the present invention, fuel combustion apparatuses, systems or plants for the production of steam or electrical power that employ air as an oxidizer would generally explode if LOX was employed as an oxidizer.)

| A. Natural Gas (Fuel) and LOX (Oxidizer)-(Exhaust Temperature of 2024° F.) | | | |
|---|---|---|---|
| Component | Moles Present in Combustion Gas Exhaust Product | Pounds Present in Combustion Gas Exhaust Product | Weight Percent |
| Carbon Monoxide (CO) | 0 | 0 | 0 |
| Carbon Dioxide ($CO_2$) | 28.300 | 229.801 | 11.49007144 |
| Water ($H_2O$) | 56.005 | 454.771 | 22.73856718 |
| Oxygen (O) | 0 | 0 | 0 |
| Oxygen ($O_2$) | 161.9946 | 1315.427 | 65.7713614 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 246.2996 | 2,000 | 100 |

0 pounds of NOx (0 weight percent) was determined to be present in the combustion gas exhaust product.

B. Natural Gas (Fuel) and Air (Oxidizer)-(Exhaust Temperature of 1995° F.)

| Component | Moles Present in Combustion Gas Exhaust Product | Pounds Present in Combustion Gas Exhaust Product | Weight Percent |
|---|---|---|---|
| Carbon Monoxide (CO) | 0 | 0 | 0 |
| Carbon Dioxide ($CO_2$) | 28.295 | 190.666 | 9.53332230 |
| Water ($H_2O$) | 56.59561 | 381.373 | 19.06866953 |
| Oxygen (O) | 0 | 0 | 0 |
| Oxygen ($O_2$) | 1.99 | 1.341 | 0.0670488 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 211.70924 | 1426.6172 | 71.33086 |
| Nitric Oxide (NO) | 2.95 | 0.0019 | 0.00010 |
| Methane ($CH_4$) | 0 | 0 | 0 |
| Total | 296.7989 | 2,000 | 100 |

1,426.61 pounds of NOx was determined to be present in the combustion gas exhaust product.

Tables A and B above show that, when the same amount of natural gas is combusted in the same apparatus of the invention using air, rather than LOX, as the oxidizer, a significant increase in the amount of the criteria air pollutant NOx becomes present in the combustion gas exhaust product.

C. Methanol (Fuel) and LOX (Oxidizer)-(Exhaust Temperature of 2125° F.)

| Component | Moles Present in Combustion Gas Exhaust Product | Pounds Present in Combustion Gas Exhaust Product | Weight Percent |
|---|---|---|---|
| Carbon Monoxide (CO) | 0 | 0 | 0 |
| Carbon Dioxide ($CO_2$) | 14.167 | 304.260 | 15.21302141 |
| Water ($H_2O$) | 28.33643 | 608.553 | 30.42764278 |
| Oxygen (O) | 0 | 0 | 0 |
| Oxygen ($O_2$) | 50.62326 | 1087.185 | 54.3592284 |
| Hydrogen ($H_2$) (Gas) | 0 | 0 | 0 |
| Hydroperoxo ($HO_2$) | 0 | 0 | 0 |
| Hydroxyl Radical (HO) | 0.0001 | 0.002 | 0.00011 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 93.12726 | 2,000 | 100 |

0 pounds of NOx (0 weight percent) was determined to be present in the combustion gas exhaust product.

D. Methanol (Fuel) and Air (Oxidizer)-(Exhaust Temperature of 1946° F.)

| Component | Moles Present in Combustion Gas Exhaust Product | Pounds Present in Combustion Gas Exhaust Product | Weight Percent |
|---|---|---|---|
| Carbon Monoxide (CO) | 0 | 0 | 0 |
| Carbon Dioxide ($CO_2$) | 14.167 | 231.949 | 11.59747254 |
| Water ($H_2O$) | 28.33598 | 463.939 | 23.19694257 |
| Oxygen (O) | 0 | 0 | 0 |
| Oxygen ($O_2$) | 9.16 | 1.500 | 0.0749873 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 79.55949 | 1302.61 | 65.13051 |
| Nitric Oxide (NO) | 1.03 | 0.0016 | 0.00008 |
| Methane ($CH_4$) | 0 | 0 | 0 |
| Total | 122.153943 | 2,000 | 100 |

1,302.61 pounds of NOx was determined to be present in the combustion gas exhaust product.

Tables C and D above show that, when the same amount of methanol is combusted in the same apparatus of the invention using air, rather than LOX, as the oxidizer, a significant increase in the criteria air pollutant NOx becomes present in the combustion gas exhaust product.

E. Kerosene (Fuel) and LOX (Oxidizer)-(Exhaust Temperature of 2385° F.)

| Component | Moles Present in Combustion Gas Exhaust Product | Pounds Present in Combustion Gas Exhaust Product | Weight Percent |
|---|---|---|---|
| Carbon Monoxide (CO) | 0 | 0 | 0 |
| Carbon Dioxide ($CO_2$) | 32.364 | 412.790 | 20.63952307 |
| Water ($H_2O$) | 32.36441 | 412.791 | 20.63954221 |
| Oxygen (O) | 0 | 0 | 0 |
| Oxygen ($O_2$) | 92.07708 | 1174.394 | 58.7197103 |
| Hydrogen ($H_2$) (Gas) | 0 | 0 | 0 |
| Hydroperoxo ($HO_2$) | 0 | 0 | 0 |
| Hydroxyl Radical (HO) | 0.00192 | 0.0244 | 0.00122 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 156.8077 | 2,000 | 100 |

0 pounds of NOx (0 weight percent) was determined to be present in the combustion gas exhaust product.

F. Kerosene (Fuel) and Air (Oxidizer)-(Exhaust Temperature of 1939° F.)

| Component | Moles Present in Combustion Gas Exhaust Product | Pounds Present in Combustion Gas Exhaust Product | Weight Percent |
|---|---|---|---|
| Carbon Monoxide (CO) | 0 | 0 | 0 |
| Carbon Dioxide ($CO_2$) | 32.36415 | 260.181 | 13.00905301 |
| Water ($H_2O$) | 32.36415 | 260.194 | 13.00970020 |
| Oxygen (O) | 0 | 0 | 0 |
| Oxygen ($O_2$) | 6.51 | 5.234 | 0.2616882 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 183.39137 | 1474.388632 | 73.71943 |
| Nitric Oxide (NO) | 3.16 | 0.002540 | 0.00013 |
| Methane ($CH_4$) | 0 | 0 | 0 |
| Total | 248.7693 | 2,000 | 100 |

1,474.39 pounds of NOx was determined to be present in the combustion gas exhaust product.

Tables E and F above show that, when the same amount of kerosene is combusted in the same apparatus of the invention using air, rather than LOX, as the oxidizer, a significant amount of the criteria air pollutant NOx becomes present in the combustion gas exhaust product.

EXAMPLE 3

Analysis of Components of Combustion Gas Exhaust Products After Eighteen Different Engineered Fuels are Separately Combusted in a 10-Megawatt Hydrocarbon Combustion Gas Generator of the Invention The components, quantities thereof (in terms of number of moles and pounds) and weight percents thereof that are present in the combustion gas exhaust products produced after 2,000 pounds (1 ton) of the eighteen Engineered Fuels described below are separately combusted in the 10-megawatt hydrocarbon combustion gas generator described in Example 1, using LOX as the oxidizer, with each combustion gas exhaust product exiting the hydrocarbon combustion gas generator at a pressure of about 600 psig and at the indicated temperature (which varies at 600 psig, depending upon the type of fuel employed), were determined using the thermochemical computer software GUIPEP, and are set forth in the tables below.

A. EF-1 Fuel (Exhaust Temperature of 2787° F.)

| Component | Moles Present in Combustion Gas Exhaust Product | Pounds Present in Combustion Gas Exhaust Product | Weight Percent |
|---|---|---|---|
| Carbon Monoxide (CO) | 0.02 | 0.37 | 0.01897 |
| Carbon Dioxide ($CO_2$) | 31.91 | 508.22 | 25.41074 |
| Water ($H_2O$) | 31.68 | 504.48 | 25.22400 |
| Oxygen (O) | 0.02 | 0.40 | 0.02007 |
| Oxygen ($O_2$) | 61.52 | 979.74 | 48.98669 |
| Hydrogen ($H_2$) (Gas) | 5.67 | 0.09 | 0.00451 |
| Hydroperoxo ($HO_2$) | 1.34 | 0.02 | 0.00107 |
| Hydroxyl Radical (HO) | 0.30 | 4.78 | 0.23937 |
| Hydrogen (H) | 6.47 | 0.01 | 0.00052 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 9.90 | 0.001 | 0.00008 |
| Nitrogen Gas ($N_2$) | 0.08 | 1.32 | 0.066 |
| Nitric Oxide (NO) | 0.03 | 0.53 | 0.02661 |
| Methane ($CH_4$) | 0 | 0 | 0 |
| Total | 125.59 | 2,000 | 100 |

1.85 pounds of NOx (0.093 weight percent) was determined to be present in the combustion gas exhaust product.

B. EF-2 Fuel (Exhaust Temperature of 2994° F.)

| Component | Moles Present in Combustion Gas Exhaust Product | Pounds Present in Combustion Gas Exhaust Product | Weight Percent |
|---|---|---|---|
| Carbon Monoxide (CO) | 0.55 | 10.92 | 0.54639 |
| Carbon Dioxide ($CO_2$) | 31.66 | 624.89 | 31.24495 |
| Water ($H_2O$) | 29.55 | 583.24 | 29.16211 |
| Oxygen (O) | 0.28 | 5.60 | 0.28029 |
| Oxygen ($O_2$) | 37.61 | 742.21 | 37.11051 |
| Hydrogen ($H_2$) (Gas) | 0.09 | 1.84 | 0.09239 |
| Hydroperoxo ($HO_2$) | 3.62 | 0.07 | 0.00357 |
| Hydroxyl Radical (HO) | 1.42 | 28.05 | 1.40270 |
| Hydrogen (H) | 0.02 | 0.55 | 0.02752 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00009 | 0.001775 | 0.0009 |
| Nitrogen Gas ($N_2$) | 0.067 | 1.34 | 0.06708 |
| Nitric Oxide (NO) | 0.063 | 1.24 | 0.06240 |
| Methane ($CH_4$) | 0 | 0 | 0 |
| Total | 101.35 | 2,000 | 100 |

2.59 pounds of NOx (0.130 weight percent) was determined to be present in the combustion gas exhaust product.

C. EF-3 Fuel (Exhaust Temperature of 2994° F.)

| Component | Moles Present in Combustion Gas Exhaust Product | Pounds Present in Combustion Gas Exhaust Product | Weight Percent |
|---|---|---|---|
| Carbon Monoxide (CO) | 0.43 | 8.55 | 0.42755 |
| Carbon Dioxide ($CO_2$) | 31.06 | 614.40 | 30.72037 |
| Water ($H_2O$) | 28.76 | 568.91 | 28.44558 |
| Oxygen (O) | 0.23 | 4.70 | 0.23516 |
| Oxygen ($O_2$) | 38.94 | 770.21 | 38.51091 |
| Hydrogen ($H_2$) (Gas) | 0.07 | 1.46 | 0.07306 |
| Hydroperoxo ($HO_2$) | 3.34 | 0.06 | 0.00330 |
| Hydroxyl Radical (HO) | 1.24 | 24.72 | 1.23607 |
| Hydrogen (H) | 0.02 | 0.41 | 0.02059 |
| Sulfur (S) | 0 | 0 | 0 |

-continued

C. EF-3 Fuel (Exhaust Temperature of 2994° F.)

| Component | Moles Present in Combustion Gas Exhaust Product | Pounds Present in Combustion Gas Exhaust Product | Weight Percent |
|---|---|---|---|
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00016 | 0.003165 | 0.00016 |
| Nitrogen Gas ($N_2$) | 0.22 | 4.39 | 0.21980 |
| Nitric Oxide (NO) | 0.10 | 2.14 | 0.10744 |
| Methane ($CH_4$) | 0 | 0 | 0 |
| Total | 101.11 | 2,000 | 100 |

6.54 pounds of NOx (0.327 weight percent) was determined to be present in the combustion gas exhaust product.

D. EF-4 Fuel (Exhaust Temperature of 2891° F.)

| Component | Moles Present in Combustion Gas Exhaust Product | Pounds Present in Combustion Gas Exhaust Product | Weight Percent |
|---|---|---|---|
| Carbon Monoxide (CO) | 0.13 | 2.23 | 0.11199 |
| Carbon Dioxide ($CO_2$) | 32.71 | 559.22 | 27.96145 |
| Water ($H_2O$) | 32.27 | 551.67 | 27.58374 |
| Oxygen (O) | 0.09 | 1.67 | 0.08362 |
| Oxygen ($O_2$) | 50.80 | 868.52 | 43.42606 |
| Hydrogen ($H_2$) (Gas) | 0.02 | 0.45 | 0.02270 |
| Hydroperoxo ($HO_2$) | 2.45 | 0.04 | 0.00209 |
| Hydroxyl Radical (HO) | 0.73 | 12.51 | 0.62595 |
| Hydrogen (H) | 0.005 | 0.08 | 0.00433 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00013 | 0.002222 | 0.00011 |
| Nitrogen Gas ($N_2$) | 0.14 | 2.41 | 0.12057 |
| Nitric Oxide (NO) | 0.06 | 1.14 | 0.05738 |
| Methane ($CH_4$) | 0 | 0 | 0 |
| Total | 117.00 | 2,000 | 100 |

3.56 pounds of NOx (0.178 weight percent) was determined to be present in the combustion gas exhaust product.

E. EF-5 Fuel (Exhaust Temperature of 2896° F.)

| Component | Moles Present in Combustion Gas Exhaust Product | Pounds Present in Combustion Gas Exhaust Product | Weight Percent |
|---|---|---|---|
| Carbon Monoxide (CO) | 0.12 | 2.34 | 0.11747 |
| Carbon Dioxide ($CO_2$) | 29.73 | 557.08 | 27.853 |
| Water ($H_2O$) | 28.88 | 541.17 | 27.058 |
| Oxygen (O) | 0.09 | 1.76 | 0.088 |
| Oxygen ($O_2$) | 46.53 | 871.73 | 43.58 |
| Hydrogen ($H_2$) (Gas) | 0.02 | 0.46 | 0.02333 |
| Hydroperoxo ($HO_2$) | 2.27 | 0.04 | 0.00213 |
| Hydroxyl Radical (HO) | 0.68 | 12.80 | 0.64025 |
| Hydrogen (H) | 0.0049 | 0.09 | 0.00459 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00025 | 0.004683 | 0.00023 |
| Nitrogen Gas ($N_2$) | 0.53 | 10.09 | 0.50459 |
| Nitric Oxide (NO) | 0.12 | 2.39 | 0.11965 |
| Methane ($CH_4$) | 0 | 0 | 0 |
| Total | 106.75 | 2,000 | 100 |

12.489 pounds of NOx (0.624 weight percent) was determined to be present in the combustion gas exhaust product.

F. EF-6 Fuel (Exhaust Temperature of 2905° F.)

| Component | Moles Present in Combustion Gas Exhaust Product | Pounds Present in Combustion Gas Exhaust Product | Weight Percent |
|---|---|---|---|
| Carbon Monoxide (CO) | 0.14 | 2.74 | 0.13735 |
| Carbon Dioxide ($CO_2$) | 30.10 | 563.62 | 28.181 |
| Water ($H_2O$) | 29.34 | 549.24 | 27.46 |
| Oxygen (O) | 0.10 | 1.97 | 0.09897 |
| Oxygen ($O_2$) | 45.80 | 857.48 | 42.87404 |
| Hydrogen ($H_2$) (Gas) | 0.02 | 0.54 | 0.02702 |
| Hydroperoxo ($HO_2$) | 2.41 | 0.04 | 0.00226 |
| Hydroxyl Radical (HO) | 0.74 | 13.91 | 0.69581 |
| Hydrogen (H) | 0.0059 | 0.11 | 0.00552 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00023 | 0.004305 | 0.00022 |
| Nitrogen Gas ($N_2$) | 0.43 | 8.08 | 0.40433 |
| Nitric Oxide (NO) | 0.11 | 2.22 | 0.11107 |
| Methane ($CH_4$) | 0 | 0 | 0 |
| Total | 106.84 | 2,000 | 100 |

10.312 pounds of NOx (0.516 weight percent) was determined to be present in the combustion gas exhaust product.

G. EF-7 Fuel (Exhaust Temperature of 2829° F.)

| Component | Moles Present in Combustion Gas Exhaust Product | Pounds Present in Combustion Gas Exhaust Product | Weight Percent |
|---|---|---|---|
| Carbon Monoxide (CO) | 0.04 | 0.77 | 0.038 |
| Carbon Dioxide ($CO_2$) | 30.52 | 525.93 | 26.297 |
| Water ($H_2O$) | 29.92 | 515.50 | 25.775 |
| Oxygen (O) | 0.04 | 0.72 | 0.036 |
| Oxygen ($O_2$) | 54.68 | 942.10 | 47.10 |
| Hydrogen ($H_2$) (Gas) | 9.93 | 0.17 | 0.00855 |
| Hydroperoxo ($HO_2$) | 1.63 | 0.02 | 0.00140 |
| Hydroxyl Radical (HO) | 0.40 | 7.05 | 0.35261 |
| Hydrogen (H) | 1.41 | 0.02 | 0.00121 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 2.07 | 0.003 | 0.00018 |

G. EF-7 Fuel (Exhaust Temperature of 2829° F.)

| Component | Moles Present in Combustion Gas Exhaust Product | Pounds Present in Combustion Gas Exhaust Product | Weight Percent |
| --- | --- | --- | --- |
| Nitrogen Gas ($N_2$) | 0.36 | 6.26 | 0.31341 |
| Nitric Oxide (NO) | 0.08 | 1.41 | 0.07051 |
| Methane ($CH_4$) | 0 | 0 | 0 |
| Total | 116.08 | 2,000 | 100 |

7.682 pounds of NOx (0.384 weight percent) was determined to be present in the combustion gas exhaust product.

H. EF-8 Fuel (Exhaust Temperature of 2884° F.)

| Component | Moles Present in Combustion Gas Exhaust Product | Pounds Present in Combustion Gas Exhaust Product | Weight Percent |
| --- | --- | --- | --- |
| Carbon Monoxide (CO) | 0.13 | 2.09 | 0.10473 |
| Carbon Dioxide ($CO_2$) | 39.50 | 595.98 | 29.79903 |
| Water ($H_2O$) | 31.81 | 480.01 | 24.00097 |
| Oxygen (O) | 0.10 | 1.54 | 0.07703 |
| Oxygen ($O_2$) | 59.91 | 903.80 | 45.19006 |
| Hydrogen ($H_2$) (Gas) | 2.32 | 0.35 | 0.01751 |
| Hydroperoxo ($HO_2$) | 2.54 | 0.03 | 0.00192 |
| Hydroxyl Radical (HO) | 0.73 | 11.05 | 0.55268 |
| Hydrogen (H) | 4.61 | 0.06 | 0.00348 |
| Sulfur (S) | 0 | 0 | 0 |
| Sulfur Dioxide ($SO_2$) | 0.06 | 1.02 | 0.05101 |
| Sulfur Oxide (SO) | 0 | 0 | 0 |
| Sulfuric Anhydride ($SO_3$) | 2.10 | 0.003 | 0.00016 |
| Nitrogen Dioxide ($NO_2$) | 1.68 | 0.002 | 0.00013 |
| Nitrogen Gas ($N_2$) | 0.18 | 2.807 | 0.14038 |
| Nitric Oxide (NO) | 0.08 | 1.218 | 0.06092 |
| Methane ($CH_4$) | 0 | 0 | 0 |
| Total | 132.57 | 2,000 | 100 |

4.0284 pounds of NOx (0.201 weight percent) was determined to be present in the combustion gas exhaust product.

I. EF-9 Fuel (Exhaust Temperature of 2876° F.)

| Component | Moles Present in Combustion Gas Exhaust Product | Pounds Present in Combustion Gas Exhaust Product | Weight Percent |
| --- | --- | --- | --- |
| Carbon Monoxide (CO) | 0.09 | 1.85 | 0.09250 |
| Carbon Dioxide ($CO_2$) | 31.78 | 590.69 | 29.53455 |
| Water ($H_2O$) | 25.89 | 481.24 | 24.06237 |
| Oxygen (O) | 0.07 | 1.39 | 0.06958 |
| Oxygen ($O_2$) | 48.84 | 907.88 | 45.39449 |
| Hydrogen ($H_2$) (Gas) | 1.70 | 0.31 | 0.01581 |
| Hydroperoxo ($HO_2$) | 1.97 | 0.03 | 0.00183 |
| Hydroxyl Radical (HO) | 0.55 | 10.37 | 0.51857 |
| Hydrogen (H) | 3.24 | 0.06 | 0.00301 |
| Sulfur (S) | 0 | 0 | 0 |
| Sulfur Dioxide ($SO_2$) | 0.06 | 1.26 | 0.06322 |
| Sulfur Oxide (SO) | 0 | 0 | 0 |
| Sulfuric Anhydride ($SO_3$) | 2.20 | 0.004 | 0.00020 |
| Nitrogen Dioxide ($NO_2$) | 1.52 | 0.0028 | 0.00014 |
| Nitrogen Gas ($N_2$) | 0.19 | 3.55 | 0.17756 |
| Nitric Oxide (NO) | 0.07 | 1.32 | 0.06617 |
| Methane ($CH_4$) | 0 | 0 | 0 |
| Total | 107.60 | 2,000 | 100 |

4.877 pounds of NOx (0.244 weight percent) was determined to be present in the combustion gas exhaust product.

J. EF-10 Fuel (Exhaust Temperature of 2960° F.)

| Component | Moles Present in Combustion Gas Exhaust Product | Pounds Present in Combustion Gas Exhaust Product | Weight Percent |
| --- | --- | --- | --- |
| Carbon Monoxide (CO) | 0.20 | 2.56 | 0.12825 |
| Carbon Dioxide ($CO_2$) | 19.92 | 252.09 | 12.605 |
| Water ($H_2O$) | 85.86 | 1086.15 | 54.30 |
| Oxygen (O) | 0.22 | 2.85 | 0.14281 |
| Oxygen ($O_2$) | 48.99 | 619.75 | 30.98 |
| Hydrogen ($H_2$) (Gas) | 0.16 | 2.11 | 0.105 |
| Hydroperoxo ($HO_2$) | 5.07 | 0.06 | 0.00321 |
| Hydroxyl Radical (HO) | 1.99 | 25.25 | 1.26283 |
| Hydrogen (H) | 2.77 | 0.35 | 0.01751 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00024 | 0.003 | 0.00015 |
| Nitrogen Gas ($N_2$) | 0.53 | 6.70 | 0.33531 |
| Nitric Oxide (NO) | 0.16 | 2.07 | 0.10370 |
| Methane ($CH_4$) | 0 | 0 | 0 |
| Total | 158.11 | 2,000 | 100 |

8.783 pounds of NOx (0.439 weight percent) was determined to be present in the combustion gas exhaust product.

K. EF-11 Fuel (Exhaust Temperature of 3126° F.)

| Component | Moles Present in Combustion Gas Exhaust Product | Pounds Present in Combustion Gas Exhaust Product | Weight Percent |
| --- | --- | --- | --- |
| Carbon Monoxide (CO) | 1.87 | 28.27 | 1.41352 |
| Carbon Dioxide ($CO_2$) | 18.95 | 285.88 | 14.29423 |
| Water ($H_2O$) | 83.98 | 1266.57 | 63.32882 |
| Oxygen (O) | 0.78 | 11.82 | 0.59117 |
| Oxygen ($O_2$) | 20.13 | 303.65 | 15.18261 |
| Hydrogen ($H_2$) (Gas) | 1.34 | 20.33 | 1.01652 |
| Hydroperoxo ($HO_2$) | 6.38 | 0.096 | 0.00481 |
| Hydroxyl Radical (HO) | 4.67 | 70.44 | 3.52216 |
| Hydrogen (H) | 3.51 | 5.28 | 0.26445 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.00011 | 0.0016 | 0.00008 |

-continued

K. EF-11 Fuel (Exhaust Temperature of 3126° F.)

| Component | Moles Present in Combustion Gas Exhaust Product | Pounds Present in Combustion Gas Exhaust Product | Weight Percent |
|---|---|---|---|
| Nitrogen Gas ($N_2$) | 0.34 | 5.23 | 0.26154 |
| Nitric Oxide (NO) | 0.15 | 2.40 | 0.12009 |
| Methane ($CH_4$) | 0 | 0 | 0 |
| Total | 132.61 | 2,000 | 100 |

7.634 pounds of NOx (0.382 weight percent) was determined to be present in the combustion gas exhaust product.

L. EF-12 Fuel (Exhaust Temperature of 2691° F.)

| Component | Moles Present in Combustion Gas Exhaust Product | Pounds Present in Combustion Gas Exhaust Product | Weight Percent |
|---|---|---|---|
| Carbon Monoxide (CO) | 0.11 | 2.16 | 0.10806 |
| Carbon Dioxide ($CO_2$) | 30.91 | 565.89 | 28.29454 |
| Water ($H_2O$) | 28.56 | 522.93 | 26.14670 |
| Oxygen (O) | 0.08 | 1.63 | 0.08169 |
| Oxygen ($O_2$) | 48.46 | 887.29 | 44.36457 |
| Hydrogen ($H_2$) (Gas) | 0.02 | 0.41 | 0.02059 |
| Hydroperoxo ($HO_2$) | 2.23 | 0.04 | 0.00204 |
| Hydroxyl Radical (HO) | 0.65 | 11.99 | 0.59959 |
| Hydrogen (H) | 4.38 | 0.08 | 0.00401 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0002 | 0.00366 | 0.00018 |
| Nitrogen Gas ($N_2$) | 0.31 | 5.78 | 0.28927 |
| Nitric Oxide (NO) | 0.09 | 1.77 | 0.08875 |
| Methane ($CH_4$) | 0 | 0 | 0 |
| Total | 109.25 | 2,000 | 100 |

7.564 pounds of NOx (0.378 weight percent) was determined to be present in the combustion gas exhaust product.

M. EF-13 Fuel (Exhaust Temperature of 2830° F.)

| Component | Moles Present in Combustion Gas Exhaust Product | Pounds Present in Combustion Gas Exhaust Product | Weight Percent |
|---|---|---|---|
| Carbon Monoxide (CO) | 0.04 | 0.78 | 0.03929 |
| Carbon Dioxide ($CO_2$) | 30.95 | 537.47 | 26.874 |
| Water ($H_2O$) | 28.27 | 490.92 | 24.54645 |
| Oxygen (O) | 0.04 | 0.72 | 0.03630 |
| Oxygen ($O_2$) | 55.05 | 955.90 | 47.79528 |
| Hydrogen ($H_2$) (Gas) | 9.30 | 0.16 | 0.00807 |
| Hydroperoxo ($HO_2$) | 1.59 | 0.02 | 0.00138 |
| Hydroxyl Radical (HO) | 0.39 | 6.89 | 0.34497 |
| Hydrogen (H) | 1.36 | 0.02 | 0.00118 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 1.99 | 0.003 | 0.00017 |
| Nitrogen Gas ($N_2$) | 0.32 | 5.70 | 0.28520 |
| Nitric Oxide (NO) | 0.07 | 1.35 | 0.06771 |
| Methane ($CH_4$) | 0 | 0 | 0 |
| Total | 115.19 | 2,000 | 100 |

7.061 pounds of NOx (0.353 weight percent) was determined to be present in the combustion gas exhaust product.

N. EF-14 Fuel (Exhaust Temperature of 2821° F.)

| Component | Moles Present in Combustion Gas Exhaust Product | Pounds Present in Combustion Gas Exhaust Product | Weight Percent |
|---|---|---|---|
| Carbon Monoxide (CO) | 0.03 | 0.67 | 0.03373 |
| Carbon Dioxide ($CO_2$) | 30.53 | 529.69 | 26.48458 |
| Water ($H_2O$) | 28.15 | 488.47 | 24.42350 |
| Oxygen (O) | 0.03 | 0.64 | 0.03227 |
| Oxygen ($O_2$) | 55.62 | 964.95 | 48.24800 |
| Hydrogen ($H_2$) (Gas) | 8.17 | 0.14 | 0.00709 |
| Hydroperoxo ($HO_2$) | 1.51 | 0.02 | 0.00131 |
| Hydroxyl Radical (HO) | 0.36 | 6.38 | 0.31907 |
| Hydrogen (H) | 1.14 | 0.01 | 0.00099 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 2.27 | 0.003 | 0.00020 |
| Nitrogen Gas ($N_2$) | 0.43 | 7.49 | 0.37459 |
| Nitric Oxide (NO) | 0.08 | 1.49 | 0.07466 |
| Methane ($CH_4$) | 0 | 0 | 0 |
| Total | 115.29 | 2,000 | 100 |

8.989 pounds of NOx (0.449 weight percent) was determined to be present in the combustion gas exhaust product.

O. EF-15 Fuel (Exhaust Temperature of 3001° F.)

| Component | Moles Present in Combustion Gas Exhaust Product | Pounds Present in Combustion Gas Exhaust Product | Weight Percent |
|---|---|---|---|
| Carbon Monoxide (CO) | 0.63 | 12.37 | 0.61852 |
| Carbon Dioxide ($CO_2$) | 31.85 | 625.51 | 31.27561 |
| Water ($H_2O$) | 30.72 | 603.20 | 30.16019 |
| Oxygen (O) | 0.31 | 6.09 | 0.30498 |
| Oxygen ($O_2$) | 36.66 | 719.78 | 35.98948 |
| Hydrogen ($H_2$) (Gas) | 0.10 | 2.14 | 0.10705 |
| Hydroperoxo ($HO_2$) | 3.80 | 0.07 | 0.00373 |
| Hydroxyl Radical (HO) | 1.53 | 30.16 | 1.50807 |
| Hydrogen (H) | 0.03 | 0.64 | 0.03238 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |

-continued

O. EF-15 Fuel (Exhaust Temperature of 3001° F.)

| Component | Moles Present in Combustion Gas Exhaust Product | Pounds Present in Combustion Gas Exhaust Product | Weight Percent |
|---|---|---|---|
| Nitric Oxide (NO) | 0 | 0 | 0 |
| Methane ($CH_4$) | 0 | 0 | 0 |
| Total | 101.86 | 2,000 | 100 |

0 pounds of NOx (0 weight percent) was determined to be present in the combustion gas exhaust product.

P. EF-16 Fuel (Exhaust Temperature of 3002° F.)

| Component | Moles Present in Combustion Gas Exhaust Product | Pounds Present in Combustion Gas Exhaust Product | Weight Percent |
|---|---|---|---|
| Carbon Monoxide (CO) | 0.04 | 0.73 | 0.03690 |
| Carbon Dioxide ($CO_2$) | 32.31 | 527.289 | 26.36449 |
| Water ($H_2O$) | 32.14 | 524.406 | 26.22031 |
| Oxygen (O) | 0.04 | 0.686 | 0.03431 |
| Oxygen ($O_2$) | 57.60 | 939.77 | 46.98877 |
| Hydrogen ($H_2$) (Gas) | 0.01 | 0.165 | 0.00830 |
| Hydroperoxo ($HO_2$) | 1.69 | 0.027 | 0.00138 |
| Hydroxyl Radical (HO) | 0.42 | 6.887 | 0.34439 |
| Hydrogen (H) | 1.41 | 0.023 | 0.00115 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 122.58 | 2000 | 100 |

0 pounds of NOx (0 weight percent) was determined to be present in the combustion gas exhaust product.

EXAMPLE 4

Comparison of Emission Rates of $CO_2$, NOx and $SO_2$ per Megawatt of Electricity Produced using Different Fuels The average emission rates in the United States from conventional coal-burning power plants for each megawatt of electricity produced are:

| Material | Number of Pounds (Lbs) per Megawatt Hour (MWh) of Electricity Produced |
|---|---|
| $CO_2$ | 2,249 |
| NOx | 6 |
| $SO_2$ | 13 |
| PM-10 | 0.30 |
| Mercury | 0.000055 |

However, depending upon the quality of the coal (from "clean" to "dirty" coal), uncontrolled $SO_2$ emissions can range from 7 to 60 pounds per MWh of electricity produced, and uncontrolled NOx emissions can range from 10 to more than 20 pounds per MWh of electricity produced. Current combustion waste practices at many power plants result in the release of toxic chemicals (usually present in combustion wastes, such as fly ash) into the environment.

The average emission rates in the United States from conventional natural gas-burning power plants for each megawatt of electricity produced are:

| Material | Number of Pounds (Lbs.) per Megawatt Hour (MWh) of Electricity Produced |
|---|---|
| $CO_2$ | 1,200 |
| NOx | 5 |
| $SO_2$ | 0.006 |
| PM-10 | 0.30 |
| Mercury | 0.000001 |

The number of pounds of $CO_2$, NOx and $SO_2$ present in the combustion gas exhaust product per megawatt hour (MWh) of electricity produced when the sixteen Engineered Fuels described below are separately combusted in the 10-megawatt hydrocarbon combustion gas generator described in Example 1, using LOX as the oxidizer, with each combustion gas exhaust product exiting the hydrocarbon combustion gas generator at a pressure of about 600 psig and at a temperature of about 2,698° F., were determined using the thermochemical computer software GUIPEP, and are set forth in the table below. In each case, and in the tables for coal and natural gas set forth hereinabove, 1 MWh of electricity is produced using 3,412,000 Btus of fuel. The number of pounds of fuel employed per megawatt hour of electricity produced is also shown in the table below.

| Fuel | Number of Pounds (Lbs.) of Fuel per Megawatt Hour (MWh) | Component Present in Combustion Gas Exhaust Product | Number of Pounds (Lbs.) per Megawatt Hour (MWh) of Electricity Produced |
|---|---|---|---|
| EF-1 | 178.44 | $CO_2$ | 45.34 |
|  |  | NOx | 0.17 |
|  |  | $SO_2$ | 0 |
| EF-2 | 176.87 | $CO_2$ | 55.26 |
|  |  | NOx | 0.23 |
|  |  | $SO_2$ | 0 |
| EF-3 | 214.32 | $CO_2$ | 65.84 |
|  |  | NOx | 0.70 |
|  |  | $SO_2$ | 0 |
| EF-4 | 189.16 | $CO_2$ | 52.89 |
|  |  | NOx | 0.34 |
|  |  | $SO_2$ | 0 |
| EF-5 | 180.61 | $CO_2$ | 50.31 |
|  |  | NOx | 1.13 |
|  |  | $SO_2$ | 0 |
| EF-6 | 204.80 | $CO_2$ | 57.72 |
|  |  | NOx | 1.06 |
|  |  | $SO_2$ | 0 |
| EF-7 | 182.55 | $CO_2$ | 48.00 |
|  |  | NOx | 0.70 |
|  |  | $SO_2$ | 0 |
| EF-8 | 197.88 | $CO_2$ | 58.97 |
|  |  | NOx | 0.40 |
|  |  | $SO_2$ | 0.10 |
| EF-9 | 178.44 | $CO_2$ | 52.70 |
|  |  | NOx | 0.44 |
|  |  | $SO_2$ | 0.11 |
| EF-10 | 122.82 | $CO_2$ | 17.56 |
|  |  | NOx | 0.47 |
|  |  | $SO_2$ | 0 |

-continued

| Fuel | Number of Pounds (Lbs.) of Fuel per Megawatt Hour (MWh) | Component Present in Combustion Gas Exhaust Product | Number of Pounds (Lbs.) per Megawatt Hour (MWh) of Electricity Produced |
|---|---|---|---|
| EF-11 | 107.70 | $CO_2$ | 13.58 |
|  |  | NOx | 0.47 |
|  |  | $SO_2$ | 0 |
| EF-12 | 180.94 | $CO_2$ | 51.20 |
|  |  | NOx | 0.68 |
|  |  | $SO_2$ | 0 |
| EF-13 | 177.89 | $CO_2$ | 47.81 |
|  |  | NOx | 0.63 |
|  |  | $SO_2$ | 0 |
| EF-14 | 178.27 | $CO_2$ | 47.21 |
|  |  | NOx | 0.80 |
|  |  | $SO_2$ | 0 |
| EF-15 | 175.06 | $CO_2$ | 54.75 |
|  |  | NOx | 0 |
|  |  | $SO_2$ | 0 |
| EF-16 | 186.40 | $CO_2$ | 49.14 |
|  |  | NOx | 0 |
|  |  | $SO_2$ | 0 |

The above table shows that the number of pounds of the combustion gas exhaust product components $CO_2$, NOx and $SO_2$ produced using the sixteen different Engineered Fuels identified above per megawatt of electricity produced is significantly lower than the average emissions of these components per megawatt of electricity produced in the United States using coal or natural gas in conventional combustion processes.

EXAMPLE 5

Generation of 25 Megawatts of Electricity using Different Fuels

Fuel oils generally are a mixture of hydrocarbons derived from refining crude petroleum. ASTM Standard D 396 provides specifications for fuel oil properties that divide fuel oils into various grades, such as grade #2, grade #4 and grade #6. Grade #2 fuel oil is a heavy distillate that is used primarily with pressure atomizing (gun) burners that spray the oil into a combustion chamber. Grade #4 fuel oil is an intermediate fuel that is intended for burners that atomize oils of higher viscosity than domestic burners can handle. Grade #6 fuel oil (Bunker C) is a high viscosity fuel oil that is used mostly in commercial and industrial heating.

The table below shows a comparison between several variables in the production of 25 megawatts of electricity per pound of fuel per hour (119,967,930 Btus per hour, 175,000 pounds of superheated steam product per hour, 25,000 kilowatts per hour and 218,400,000 kilowatts per year) by the hydrocarbon combustion gas generator described in Example 1 using six different types of fuels, including grade #2, grade #4 and grade #6 fuel oils, and LOX as the oxidizer (determined using the GUIPEP computer software). The costs associated with the EF-8 fuel include the receipt of tipping fees. The amount of LOX employed varies, depending upon the type of fuel employed, with different resulting O/F ratios. The operating cost per 25,000 kilowatt hours for all of the fuels was $270.39. The numbers in parentheses indicate negative values.

TABLE

| Fuel | Btus Per Pound | Fuel lb/hour | Total Btu/hour | O/F Ratio | LOX lb/hour | Fuel Cost per Pound |
|---|---|---|---|---|---|---|
| EF-8 Fuel | 17,243 | 6,957 | 119,967,930 | 2.0 | 13,915 | $(0.02) |
| Natural Gas | 21,500 | 5,580 | 119,967,930 | 2.2 | 12,276 | $0.129 |
| Coal Bituminous | 12,500 | 9,597 | 119,967,930 | 2.4 | 23,034 | $0.016 |
| Oil #6 | 18,788 | 6,385 | 119,967,930 | 2.2 | 14,048 | $0.097 |
| Oil #4 | 19,348 | 6,201 | 119,967,930 | 2.3 | 14,261 | $0.094 |
| Oil #2 | 19,683 | 6,095 | 119,967,930 | 2.4 | 14,628 | $0.083 |

| Fuel | LOX Cost per kWh | Total Fuel Cost | Total LOX Cost | Total Fuel Cost per kWh | Total Cost per kWh |
|---|---|---|---|---|---|
| EF-8 Fuel | $0.0135 | $(139.15) | $187.85 | $48.70 | $0.0128 |
| Natural Gas | $0.0135 | $719.81 | $165.72 | $885.53 | $0.0462 |
| Coal Bituminous | $0.0135 | $148.76 | $310.96 | $459.72 | $0.0292 |
| Oil #6 | $0.0135 | $617.46 | $189.64 | $807.11 | $0.0431 |
| Oil #4 | $0.0135 | $581.61 | $192.53 | $774.14 | $0.0418 |
| Oil #2 | $0.0135 | $503.45 | $197.48 | $700.93 | $0.0389 |

| Fuel | Fuel and LOX Cost per kWh | Operating Cost less Fuels |
|---|---|---|
| EF-8 Fuel | $0.0019 | $0.0108 |
| Natural Gas | $0.0354 | $0.0108 |
| Coal Bituminous | $0.0184 | $0.0108 |
| Oil #6 | $0.0323 | $0.0108 |
| Oil #4 | $0.0310 | $0.0108 |
| Oil #2 | $0.0280 | $0.0108 |

The above table shows that, when the EF-8 fuel of the invention was employed to produce the same amount of electrical power as the five other indicated fuels (all in the apparatus of the invention described in Example 1), using the same oxidizer, a significantly reduced fuel cost per kilowatt hour was achieved (a reduction of from about 89.5% to about 94.5%), resulting in a significantly reduced total cost per kilowatt hour (a reduction of from about 43% to about 73%).

EXAMPLE 6

Production of the "GG-1X" Hydrocarbon Combustion Gas Generator

A 1 MW hydrocarbon combustion gas generator named "GG-1X" was built. The GG-1X generator is the same as the generator described in Example 1 with the exception that it is about one half of the scale of that generator. The GG-1X generator has the ability to process about 1,000 pound/hour of waste fuel (fuel produced from waste materials).

EXAMPLE 7

GG-1X First Combustion Chamber Injectors and Combustion Stability Short Duration Hot-Fire Test First Test A first combustion chamber injectors and combustion stability short duration (less than 6 seconds) hot-fire test (LF-JP5-LOX-001—First Test) was performed in connection with the GG-1X hydrocarbon combustion gas generator. The purpose of this test was to observe combustion stability in the first combustion chamber employing a low O/F ratio.

The test conditions, objectives and component materials that were employed are set forth below. The water that was employed to cool the first combustion chamber was deionized. The fuel employed was K1 (kerosene), which is known by those of skill in the art. The term "Redlines" indicates the pressures below and above which the operation of the generator would be terminated. The term "GN2" represents gaseous nitrogen. The term JP5 represents a high-grade kerosene that contains an anti-freeze additive and an anti-fungal additive, which is known by those of skill in the art.

| Hardware: | Fuel inlet manifold | Carbon Steel |
|---|---|---|
| | Fuel metering block | Carbon Steel |
| | First oxidizer manifold plate | Stainless Steel |
| | First oxidizer injector orifices | Brass |
| | First fuel injector orifices | Brass |
| | First combustion chamber | Carbon Steel |

Scheduled Duration/Actual Duration: 5.00 seconds (maximum)/5.60 seconds

Reactant Supply:

| System | Fluid | Temperature (° F.) | Pressure (psig) | Orifice Diameter (inches) | Flow Rate (Pounds or Gallons per Second) |
|---|---|---|---|---|---|
| Oxidizer | LOX | −297 | 380 | 0.124 | 3.58 lb/sec |
| Fuel | K1 | Ambient | 429 | 0.807 | 1.30 lb/sec |
| Coolant | H₂O | Ambient | 40 | 0.50 | .05 gal/sec |

Redlines:

| LOX Supply | High = 480 psig | Low = 250 psig |
|---|---|---|
| Fuel | High = 530 psig | Low = 300 psig |

Purge Supply:

| System | Fluid | Temperature (° F.) | Pressure (psig) |
|---|---|---|---|
| Oxidizer | GN2 | Ambient | 450 |
| Fuel | GN2 | Ambient | 450 |

O/F Mixture Ratio: 2.75
Pressure in First Combustion Chamber: 300 psig

This test had a duration of 5.6 seconds and no combustion chamber burn through (i.e., the integrity of the first combustion chamber was completely maintained). Because the first combustion chamber and injector performances were satisfactory, this test was determined to be successful. The pressures measured at various times within a period of 6.1 seconds in connection with the LOX inlet, the JP5 inlet, the H₂O inlet and the first combustion chamber are set forth hereinbelow.

Although some combustion instability was observed in this test, a post-test inspection indicated that a LOX check valve had been sticking, and that such sticking was the cause of the combustion instability. The LOX check valve was removed and replaced with a new check valve, and this test was repeated (Example 8).

| | Pressure (psig) | | | |
|---|---|---|---|---|
| Time (seconds) | LOX Inlet | JP5 Inlet | H₂O Inlet | First Combustion Chamber |
| 0 | 0 | 0 | 0 | 0 |
| 0.2 | 50 | 68 | 42 | 68 |
| 0.4 | 150 | 200 | 42 | 205 |
| 0.6 | 291 | 349 | 41 | 291 |
| 0.8 | 370 | 400 | 40 | 299 |
| 1.0 | 205 | 399 | 40 | 200 |
| 1.2 | 375 | 425 | 40 | 280 |
| 1.4 | 382 | 431 | 40 | 302 |
| 1.6 | 380 | 429 | 41 | 300 |
| 1.8 | 381 | 429 | 41 | 300 |
| 2.0 | 210 | 420 | 40 | 285 |
| 2.2 | 381 | 429 | 41 | 301 |
| 2.4 | 380 | 429 | 40 | 302 |
| 2.6 | 380 | 429 | 40 | 300 |
| 2.8 | 380 | 429 | 40 | 301 |
| 3.0 | 381 | 431 | 40 | 301 |
| 3.2 | 199 | 415 | 42 | 270 |
| 3.4 | 380 | 429 | 41 | 300 |
| 3.6 | 381 | 431 | 42 | 301 |
| 3.8 | 380 | 429 | 41 | 301 |
| 4.0 | 150 | 420 | 40 | 199 |
| 4.2 | 380 | 429 | 40 | 301 |
| 4.4 | 380 | 429 | 40 | 300 |
| 4.6 | 381 | 431 | 42 | 300 |
| 4.8 | 382 | 432 | 41 | 300 |
| 5.0 | 380 | 429.8 | 41 | 300 |
| 5.2 | 382 | 429 | 40 | 301 |
| 5.4 | 380 | 429 | 40 | 299 |
| 5.6 | 300 | 350 | 40 | 275 |
| 5.8 | 250 | 300 | 41 | 200 |
| 6.0 | 100 | 201 | 40 | 73 |
| 6.1 | 0 | 0 | 40 | 0 |

EXAMPLE 8

GG-1X First Combustion Chamber Injectors and Combustion Stability Short Duration Hot Fire Test Second Test The GG-1X hydrocarbon gas combustion generator LOX check valve that had been employed in Example 7 was removed and replaced with a new check valve. Another first combustion chamber injectors and combustion stability short duration hot-fire test (LF-JP5-LOX-002—Second Test) was then performed in connection with the GG-1X hydrocarbon combustion gas generator. The purpose of this test was the same as the purpose of the first test. The test conditions, objectives and component materials that were employed were the same as those that were employed in the First Test (LF-JP5-LOX-001).

This test had a duration of 5.6 seconds and no combustion chamber burn through. In contrast with the First Test (LF-JP5-LOX-001), no combustion instability was observed in this test. A post test inspection indicated that the first combustion chamber and injector performances were satisfactory. Thus, this test was determined to be successful.

The pressures measured at various times within a period of 6.1 seconds in connection with the LOX inlet, the JP5 inlet, the H₂O inlet and the first combustion chamber are set forth hereinbelow.

| Time (seconds) | Pressure (psig) | | | |
|---|---|---|---|---|
| | LOX Inlet | JP5 Inlet | H₂O Inlet | First Combustion Chamber |
| 0 | 0 | 0 | 0 | 0 |
| 0.2 | 50 | 68 | 42 | 68 |
| 0.4 | 150 | 200 | 42 | 205 |
| 0.6 | 291 | 349 | 41 | 300 |
| 0.8 | 382 | 400 | 40 | 310 |
| 1.0 | 381 | 426 | 40 | 305 |
| 1.2 | 380 | 425 | 40 | 301 |
| 1.4 | 381 | 431 | 40 | 302 |
| 1.6 | 380 | 429 | 41 | 300 |
| 1.8 | 381 | 429 | 41 | 300 |
| 2.0 | 380 | 420 | 40 | 301 |
| 2.2 | 381 | 429 | 41 | 301 |
| 2.4 | 380 | 429 | 40 | 302 |
| 2.6 | 380 | 429 | 40 | 300 |
| 2.8 | 380 | 429 | 40 | 301 |
| 3.0 | 381 | 431 | 40 | 301 |
| 3.2 | 380 | 415 | 42 | 302 |
| 3.4 | 380 | 429 | 41 | 300 |
| 3.6 | 381 | 431 | 42 | 301 |
| 3.8 | 380 | 429 | 41 | 301 |
| 4.0 | 380 | 420 | 40 | 301 |
| 4.2 | 380 | 429 | 40 | 301 |
| 4.4 | 380 | 429 | 40 | 300 |
| 4.6 | 381 | 431 | 42 | 300 |
| 4.8 | 382 | 432 | 41 | 300 |
| 5.0 | 380 | 429.8 | 41 | 300 |
| 5.2 | 382 | 429 | 40 | 301 |
| 5.4 | 380 | 429 | 40 | 299 |
| 5.6 | 300 | 350 | 40 | 275 |
| 5.8 | 250 | 300 | 41 | 200 |
| 6.0 | 100 | 201 | 40 | 73 |
| 6.1 | 0 | 0 | 40 | 0 |

While the methods, apparatuses and fuels of the present invention have been shown and described herein with specificity, and with reference to certain preferred embodiments thereof, those of ordinary skill in the art will recognize numerous variations, modifications and substitutions of that which has been shown and described which can be made, and which are within the scope and spirit of the invention, as by adding, combining, subdividing parts or steps, by substituting equivalents, or by varying conditions, while retaining significant advantages of the processes, apparatuses and fuels of the invention, which are defined in the claims that follow. It is intended, therefore, that all of these modifications, variations and substitutions be within the scope and spirit of the present invention as described and claimed herein, and that the invention be limited only by the scope of the claims which follow, and that such claims be interpreted as broadly as possible.

Throughout this application, various books, patents, published patent applications, other publications, computer programs and Internet web sites have been cited. The teachings present in each of these books, patents, published patent applications, other publications, computer programs and Internet web sites are hereby incorporated by reference herein without admission that such is prior art.

The invention claimed is:

1. An apparatus for use as a hydrocarbon combustion gas generator comprising:
    a first combustion chamber in which a first combustion of fuel and oxidizer can be performed to produce an incomplete combustion product, the first combustion chamber having an inlet end and an outlet end;
    control and metering means for separately metering a fuel and an oxidizer into the first combustion chamber to achieve an incomplete combustion of the fuel in the first chamber;
    a second combustion chamber in which a second combustion of fuel and additional oxidizer can be performed to produce a second combustion product, the second combustion chamber having an inlet end and an outlet end, wherein the inlet end of the second combustion chamber is in fluid communication with the outlet end of the first combustion chamber;
    control and metering means for metering additional oxidizer into the second chamber combustion chamber to further combust fuel in the second chamber;
    a means for metering into the second combustion chamber the incomplete combustion product produced in the first combustion chamber; and
    a heat exchanger means for cooling the first and second combustion chambers and for optionally converting cooling water to steam, wherein the cooling water and steam are maintained separate from combustion gases produced by the first and second combustions.

2. The apparatus of claim 1, wherein the means for metering into the second combustion chamber the incomplete combustion product produced in the first combustion chamber comprises a plurality of tubular ports.

3. The apparatus of claim 1, further comprising a heat exchanger means for cooling the means for metering the incomplete combustion product produced in the first combustion chamber, wherein the cooling water is are maintained separate from combustion gases produced by the first combustion.

4. The apparatus of claim 1, wherein the second combustion is a complete combustion.

5. The apparatus of claim 1, wherein unmetered air is not permitted to mix with the fuel or the oxidizer in the first and second combustion chambers.

6. The apparatus of claim 1, wherein the control and metering means for separately metering a fuel and an oxidizer into the first combustion chamber comprises a plurality of orifices that approximate the inlet end of the first combustion chamber.

7. The apparatus of claim 6, wherein the fuel, the oxidizer, the incomplete combustion product, or all three, are metered into each respective combustion chamber in an angled manner, resulting in at least one point of impingement between the fuel and the oxidizer or betweenthe incomplete combustion product and the oxidizer.

8. The apparatus of claim 1, wherein the heat exchanger means comprises a plurality of tubes forming one or more tube assemblies, having at least one cooling water inlet and at least one steam outlet.

9. The apparatus of claim 8, wherein the one or more tube assemblies form walls defining at least one of the combustion chambers.

10. The apparatus of claim 1, wherein the control and metering means for separately metering a fuel into the first combustion chamber is adapted to separately meter two or more fuel types into the first combustion chamber.

11. The apparatus of claim 1, wherein air is not permitted to mix with the cooling water or steam in the heat exchanger means.

12. The apparatus of claim 1, further comprising:
    a third combustion chamber in which a third combustion of fuel and additional oxidizer can be performed to produce a third combustion product, the third combustion chamber having an inlet end and an outlet end, wherein the inlet end of the third combustion chamber is in fluid communication with the outlet end of the second combustion chamber;

control and metering means for metering additional oxidizer into the third combustion chamber to further combust fuel in the third chamber; and additional heat exchanger means for cooling the third combustion chamber and for optionally converting cooling water to steam, wherein the cooling water and steam are maintained separate from combustion gases produced by the third combustion.

13. The apparatus of claim 12, further comprising a means for metering into the third combustion chamber the second combustion product, wherein the second combustion product is an incomplete combustion product.

14. The apparatus of claim 1, further comprising an electronic igniter system or other means for igniting the fuel in the first combustion chamber.

15. The apparatus of claim 1, further comprising a source of oxidizer.

16. The apparatus of claim 15, wherein the oxidizer is a liquid oxidizer.

17. The apparatus of claim 15, wherein the oxidizer is selected from the group consisting of LOX, O, $O_3$, $H_2O_2$, and HAN, and combinations thereof.

18. The apparatus of claim 1, further comprising a source of one or more fuels.

19. The apparatus of claim 18, wherein at least one fuel is in solid particulate form.

20. The apparatus of claim 19, wherein the solid particulate fuel comprises plastic, rubber, or other waste materials.

21. The apparatus of claim 19, wherein the solid particulate fuel has a particle size ranging from about 31 to about 2300 microns.

22. The apparatus of claim 18, wherein at least one additional fuel is a liquid or gaseous fuel.

23. The apparatus of claim 1, wherein from about 97% to about 100% of the fuel metered into the first combustion chamber is combusted by the apparatus.

24. A system for generating electricity comprising:
the apparatus of claim 1, wherein the apparatus generates steam; and
an electrical power-generating device powered by the steam.

25. The system of claim 24, wherein the steam is a superheated steam, dry saturated steam, or a combination of both.

26. The system of claim 24, wherein the electrical power-generating comprises a steam-driven turbine.

27. The system of claim 24, which can produce from 1 megawatt to 600 megawatts of electrical power per day.

28. The system of claim 24, which is a cogeneration system, a trigeneration system, or a quadgeneration system.

29. A process for combusting a fuel comprising:
supplying at least one fuel to the apparatus of claim 1;
supplying at least one oxidizer to said apparatus; and
combusting said fuel and said oxidizer in said apparatus.

30. The process of claim 29, wherein the first combustion occurs at a temperature ranging from about 1,200° F. to about 5,800° F., at a pressure ranging from about 500 psig to about 1,500 psig and during a period of time ranging from about 0.025 seconds to about 10 seconds.

31. The process of claim 29, wherein the second combustion occurs at a temperature ranging from about 3,000° F. to about 5,800° F., at a pressure ranging from about 300 to about 1,500 psig and during a period of time ranging from about 0.025 to about 10 seconds.

32. The process of claim 29, wherein the oxidizer comprises LOX.

33. The process of claim 29, wherein the fuel comprises a non-waste material.

34. The process of claim 33, wherein the non-waste material comprises wood, coal, hydrogen, methane, ethane, butane, propane, natural gas, gasoline, diesel fuel, kerosene, fuel oil, methanol, alcohol, a product that contains plastic, mixed plastic or plastic resin, or a combination thereof.

35. The process of claim 29, wherein the combustion gases produced by the first and second combustions contain substantially no mercury, SO, $SO_2$, $SO_3$, NO, $NO_2$, $N_2O$, CO, $CH_4$, HCl or dioxin.

36. A method for disposing of hazardous or waste materials comprising:
supplying a first fuel to the apparatus of claim 1, wherein the first fuel comprises at least one hazardous or waste material;
supplying at least one oxidizer to said apparatus; and
combusting said fuel and said oxidizer in said apparatus.

37. The method of claim 36, wherein the hazardous material comprises infectious medical waste, biological or chemical weapons, components thereof, or a container therefor.

38. The method of claim 36, wherein the waste material comprises scrap tires, plastic packaging materials, carpet scraps, low-density polyethylene, high density polyethylene, or components thereof.

39. The method of claim 38, wherein the waste material comprises carpet scrap and high-density polyethylene, and further comprising supplying to the apparatus a second fuel comprising hydrogen.

40. The method of claim 39, wherein the combusting said fuels and said oxidizer produces between about 19,200 BTUs per pound of said fuels and about 32,600 BTUs per pound of said fuels.

41. The method of claim 39, wherein the carpet scrap is present in the combined first and second fuels in an amount ranging from about 27% to about 48% by weight of the fuels, the hydrogen is present in the combined first and second fuels in an amount ranging from about 23% to about 38% by weight of the fuels, and the high-density polyethylene is present in the combined first and second fuels in an amount ranging from about 25% to about 40% by weight of the fuels.

* * * * *